Feb. 18, 1958  G. A. CHADWICK ET AL  2,823,587
LOADING AND RAMMING MECHANISM FOR SEMI-AUTOMATIC GUNS
Filed Nov. 28, 1942  47 Sheets-Sheet 1

INVENTORS
GEORGE A. CHADWICK  PHILIAS H. GIROUARD
JOHN H. SIHLER  CARL V. HICKMAN
BY  DAVID WERTMAN
ATTORNEY

Feb. 18, 1958  G. A. CHADWICK ET AL  2,823,587
LOADING AND RAMMING MECHANISM FOR SEMI-AUTOMATIC GUNS
Filed Nov. 28, 1942                                    47 Sheets-Sheet 3

Fig. 3

INVENTORS
GEORGE A. CHADWICK  PHILIAS H. GIROUARD
JOHN H. SIHLER  CARL V. HICKMAN
BY  DAVID WERTMAN
ATTORNEY

Feb. 18, 1958 G. A. CHADWICK ET AL 2,823,587
LOADING AND RAMMING MECHANISM FOR SEMI-AUTOMATIC GUNS
Filed Nov. 28, 1942 47 Sheets-Sheet 6

Fig.6

INVENTORS
GEORGE A. CHADWICK   PHILIAS H. GIROUARD
JOHN H. SIHLER   CARL V. HICKMAN
BY   DAVID WERTMAN

ATTORNEY

Feb. 18, 1958 G. A. CHADWICK ET AL 2,823,587
LOADING AND RAMMING MECHANISM FOR SEMI-AUTOMATIC GUNS
Filed Nov. 28, 1942 47 Sheets-Sheet 10

INVENTORS
GEORGE A. CHADWICK PHILIAS H. GIROUARD
JOHN H. SIHLER CARL V. HICKMAN
BY DAVID WERTMAN
ATTORNEY

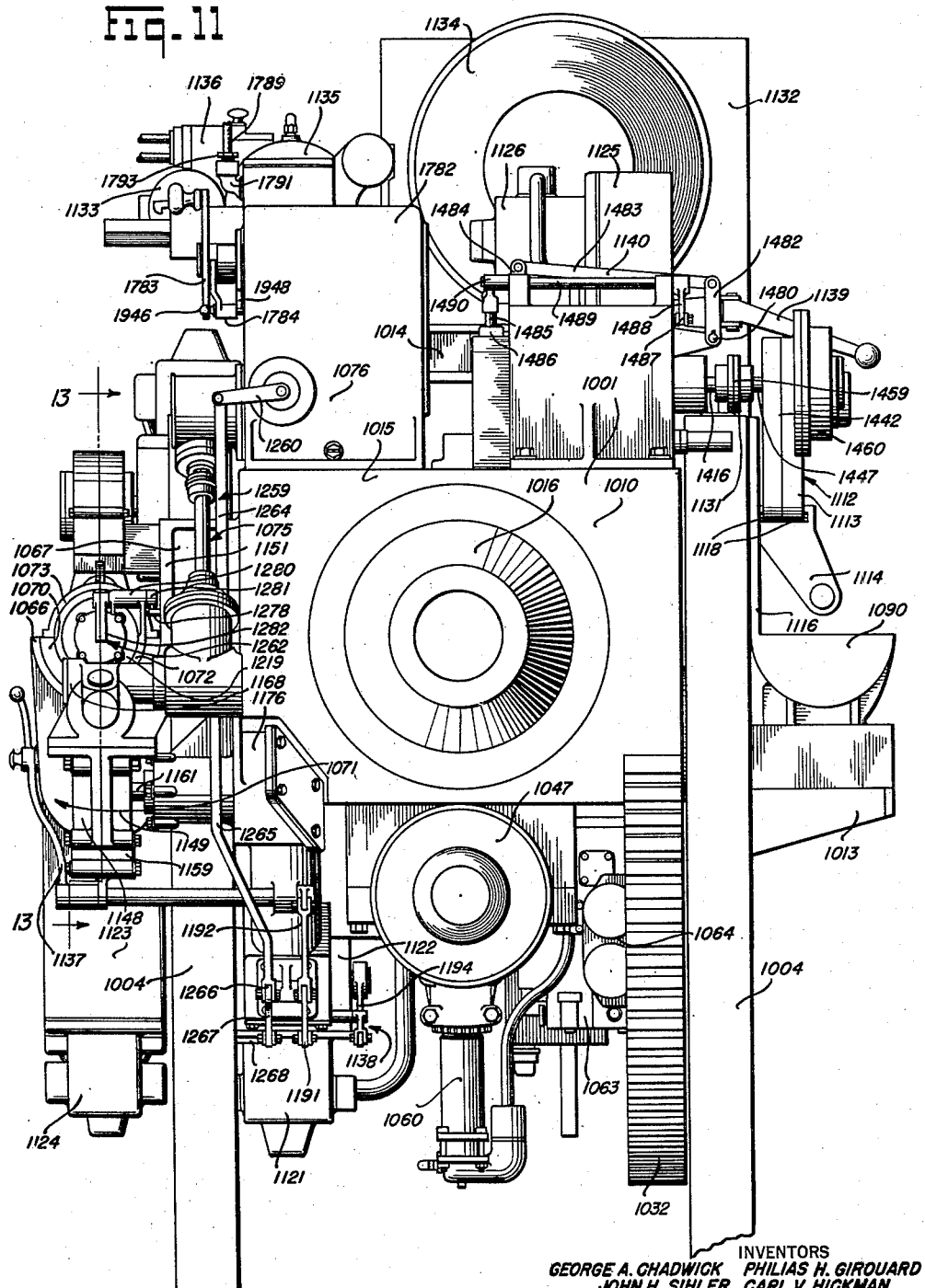

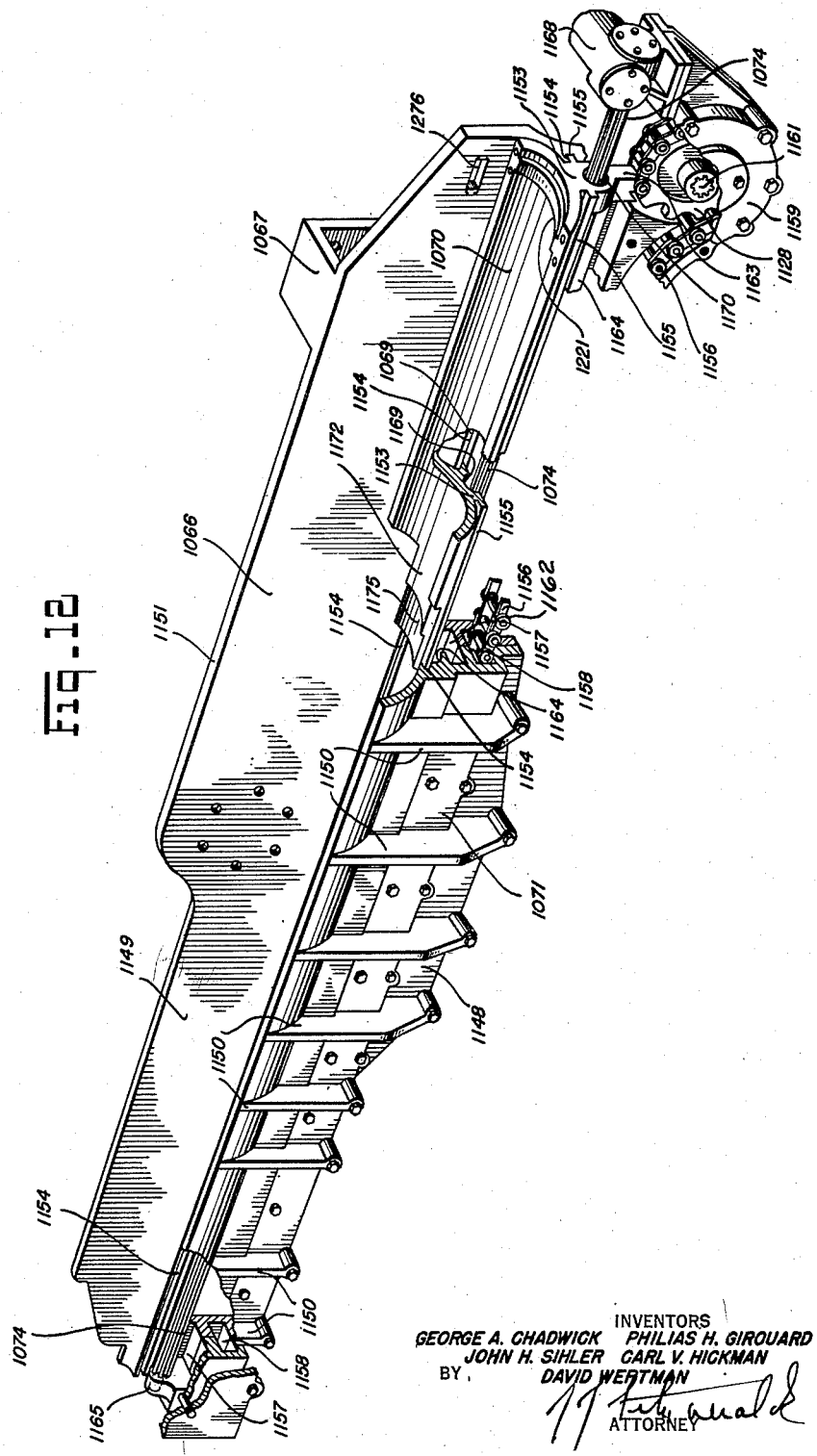

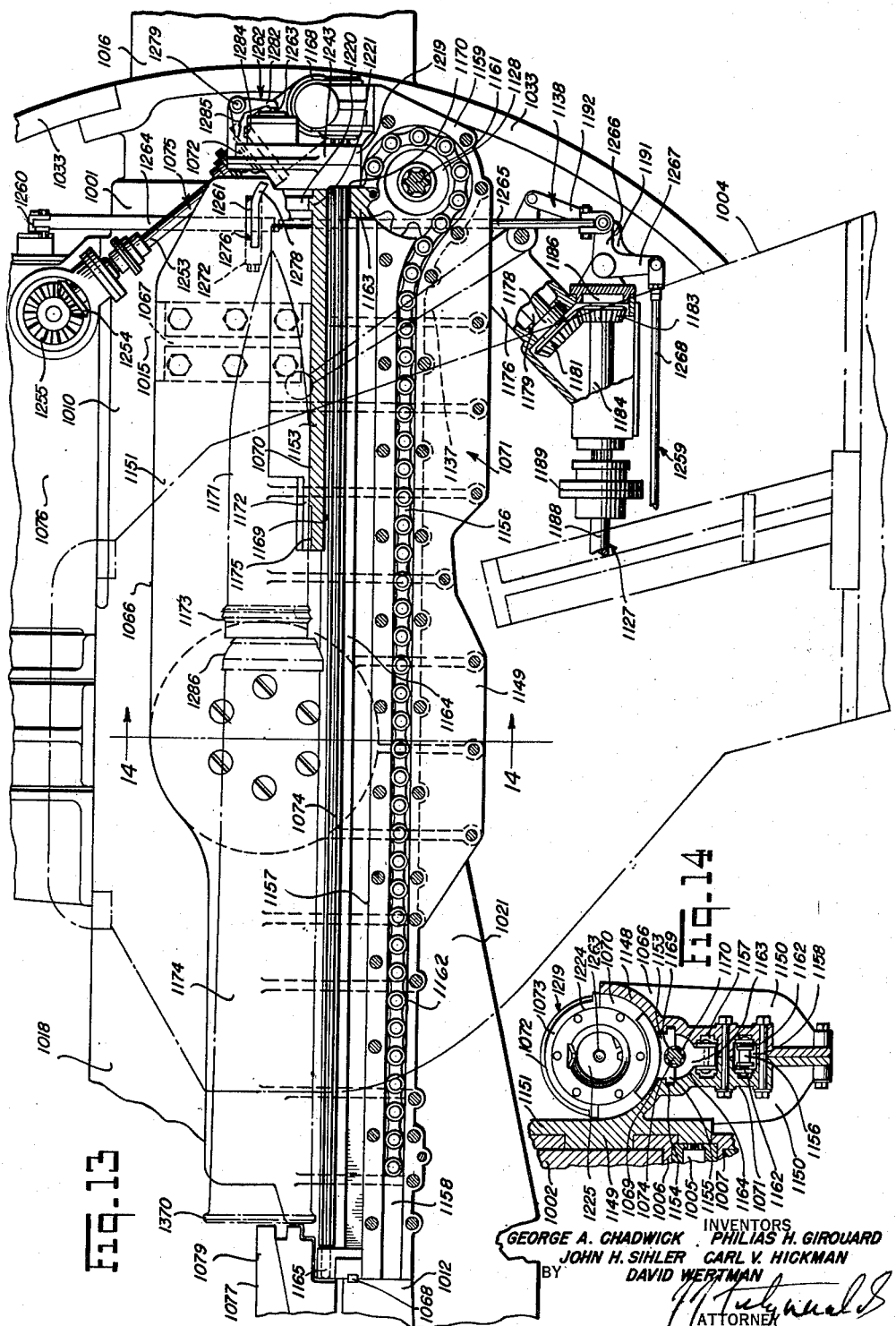

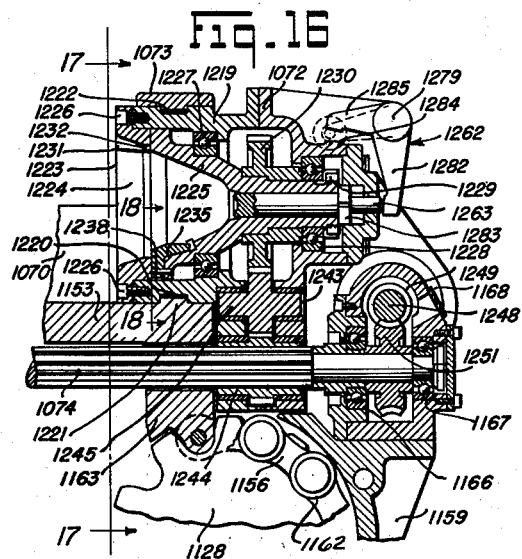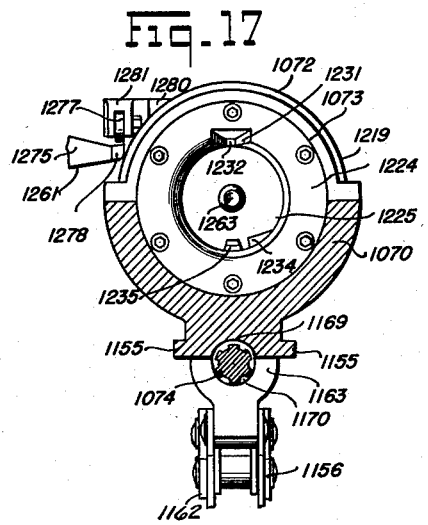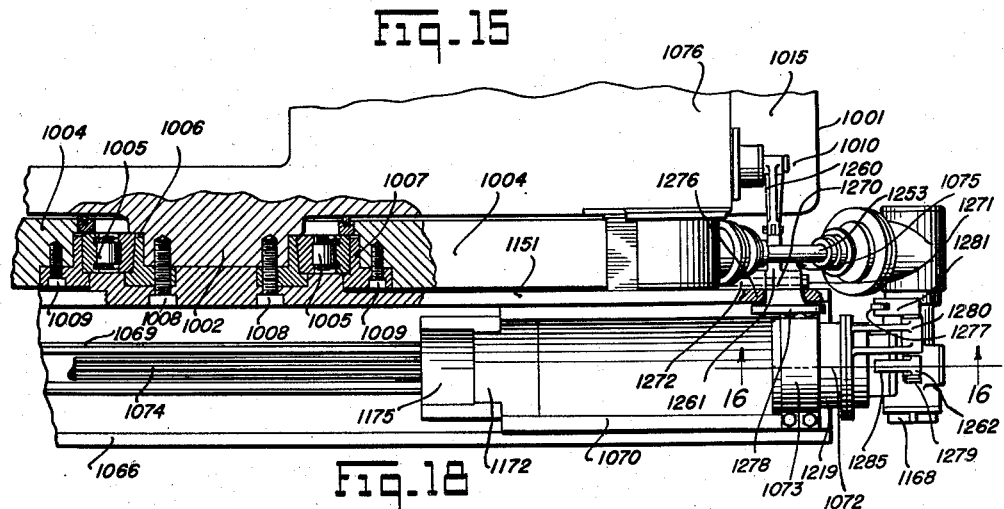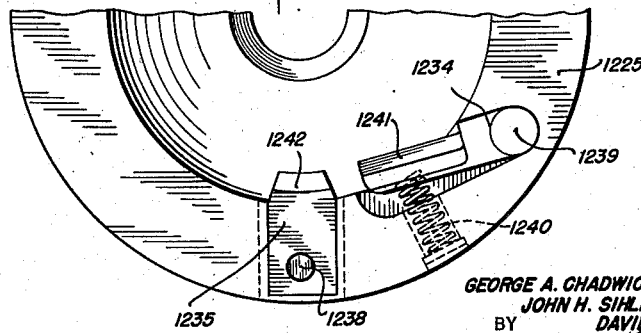

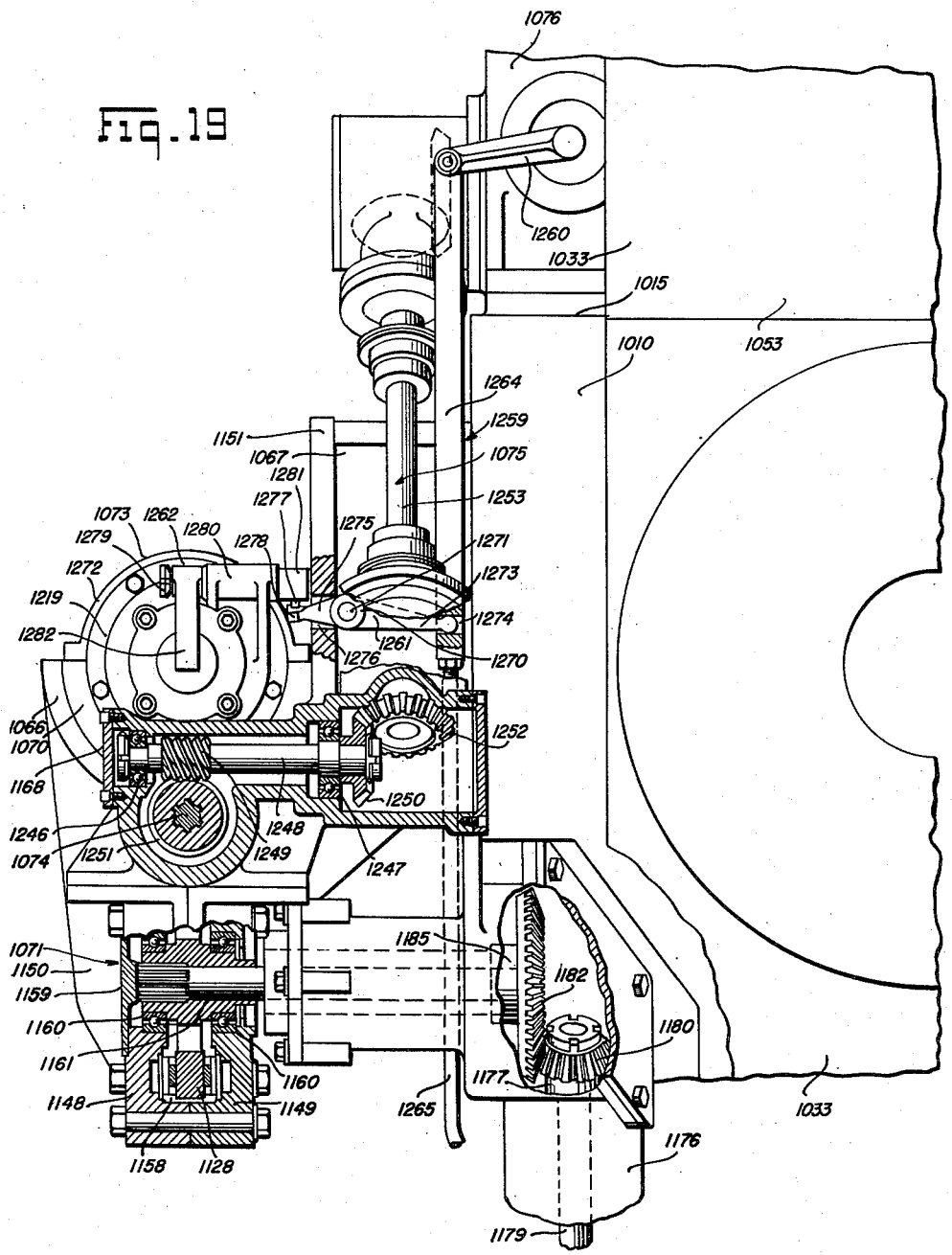

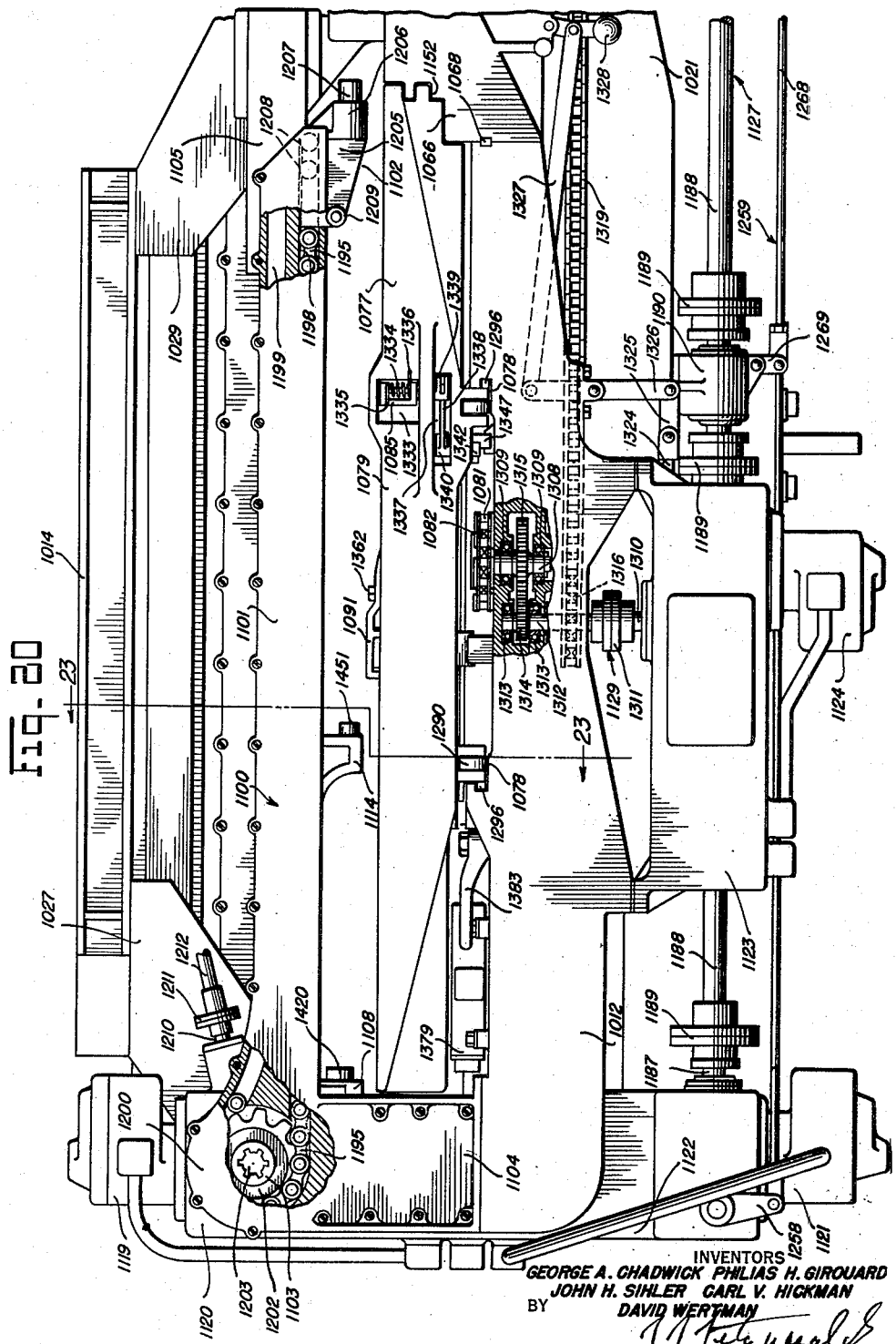

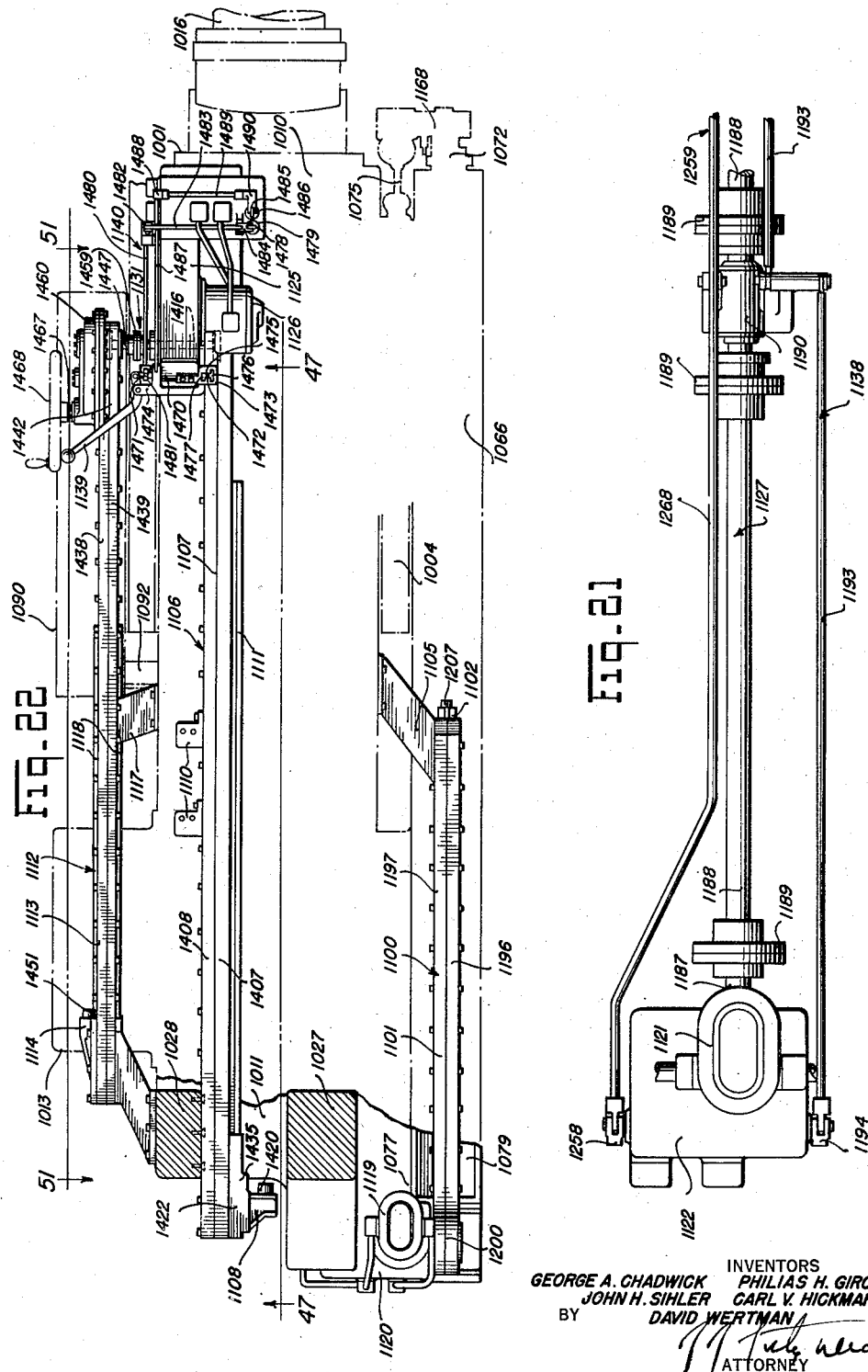

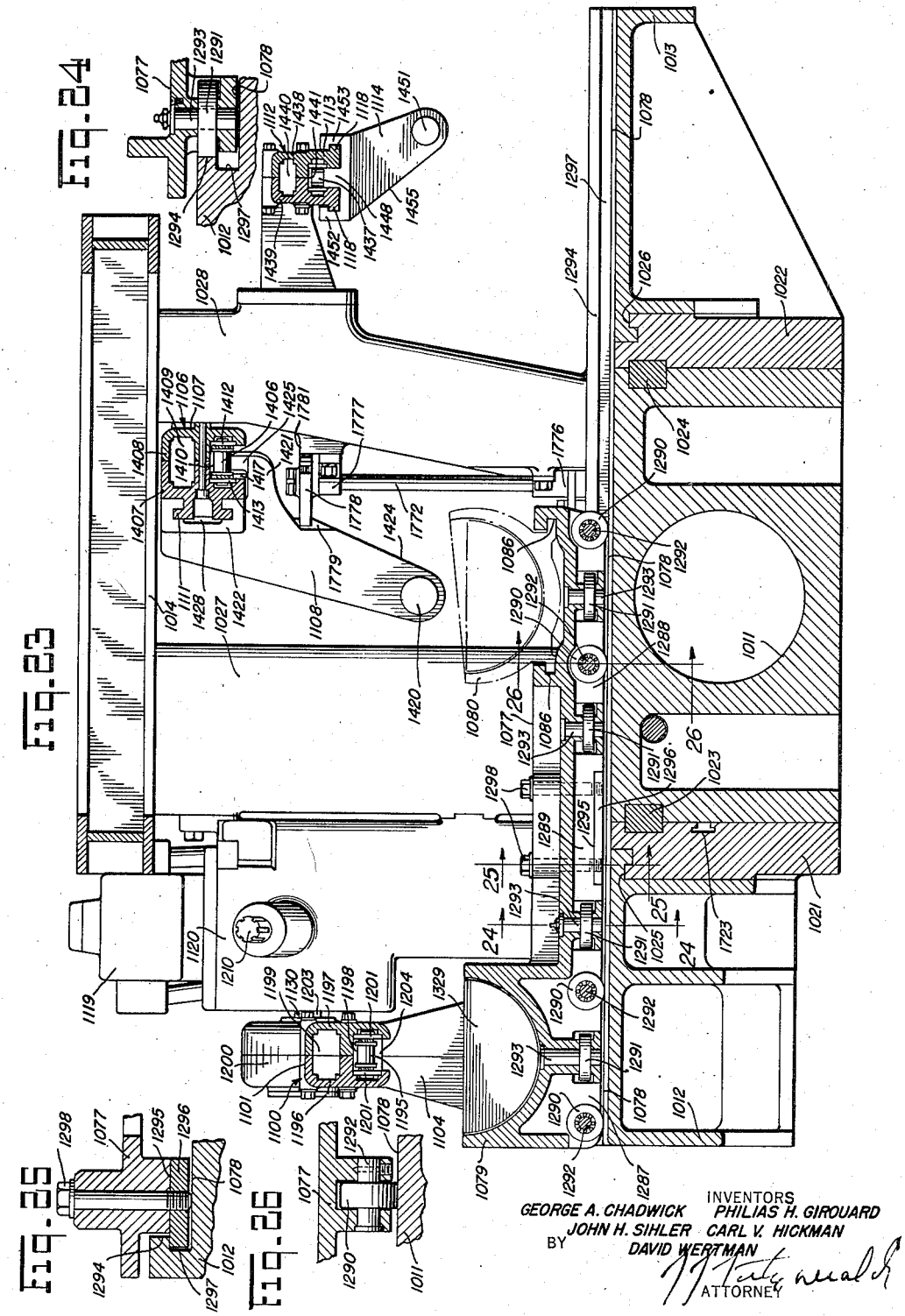

Feb. 18, 1958 G. A. CHADWICK ET AL 2,823,587
LOADING AND RAMMING MECHANISM FOR SEMI-AUTOMATIC GUNS
Filed Nov. 28, 1942 47 Sheets-Sheet 19
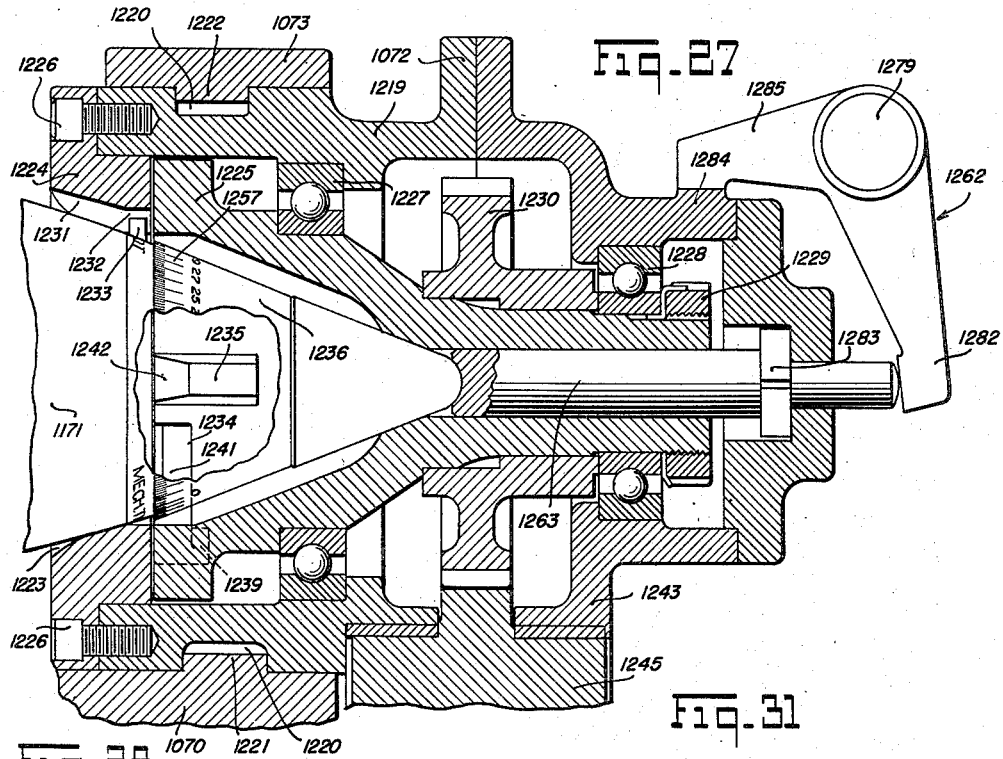
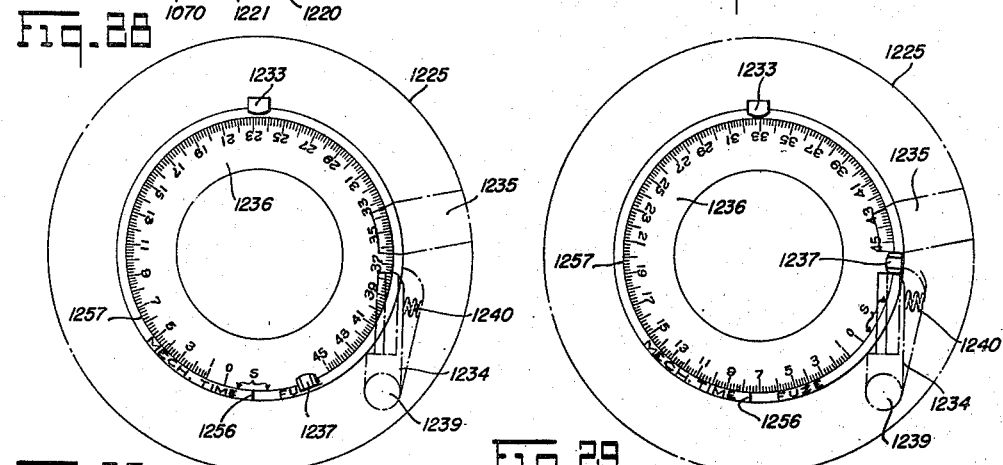
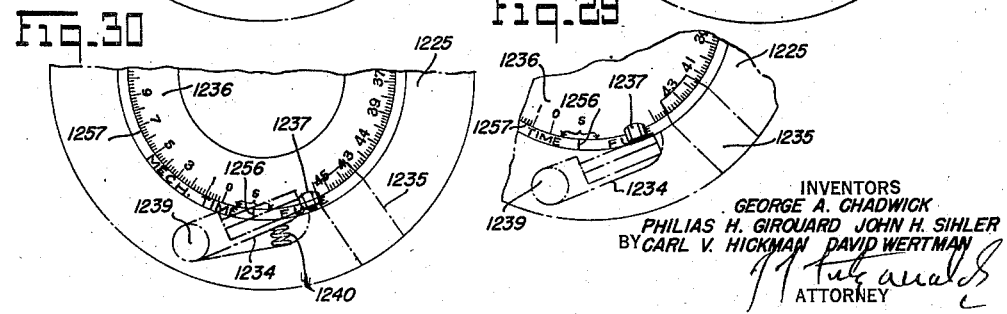
INVENTORS
GEORGE A. CHADWICK
PHILIAS H. GIROUARD  JOHN H. SIHLER
BY CARL V. HICKMAN  DAVID WERTMAN
ATTORNEY

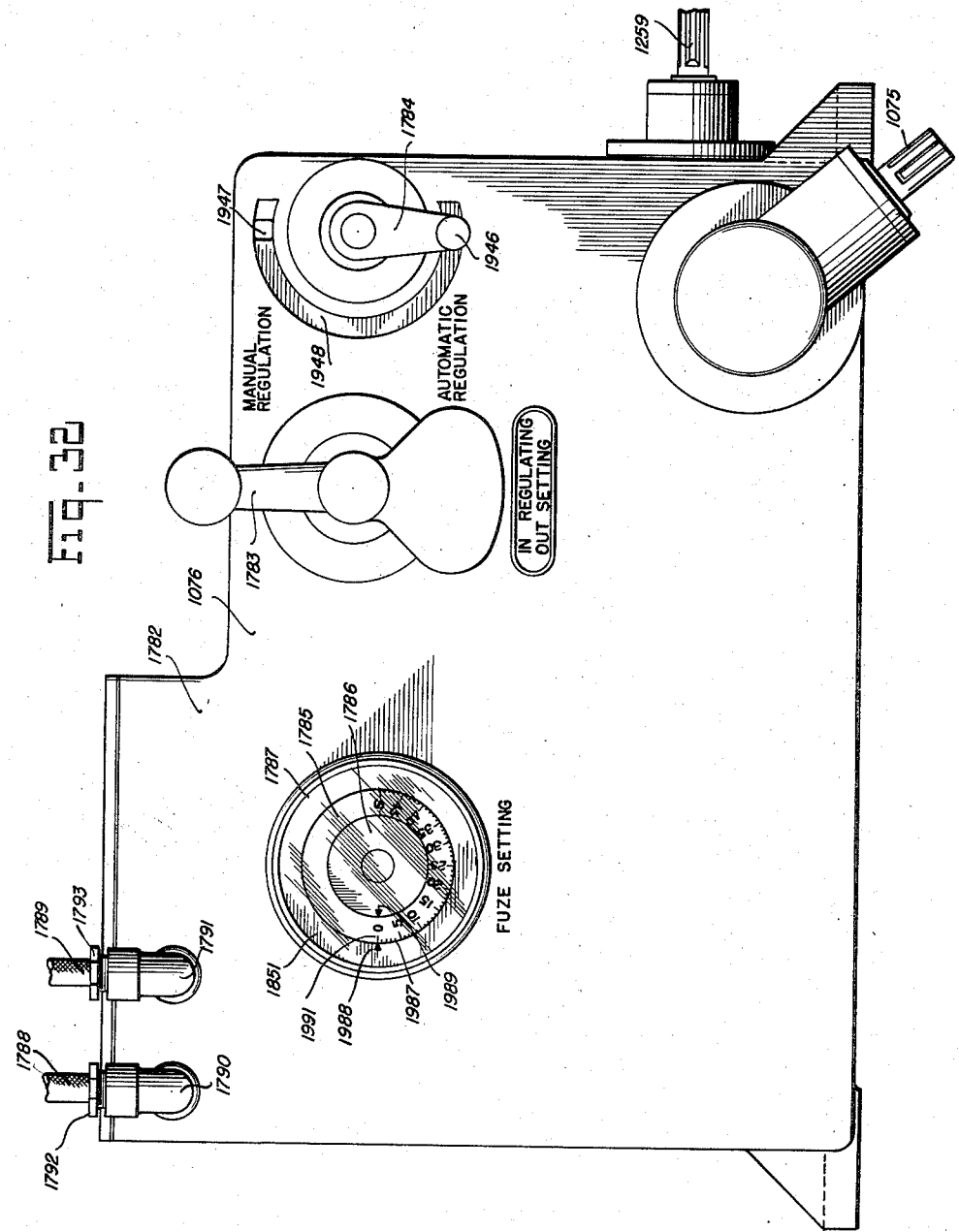

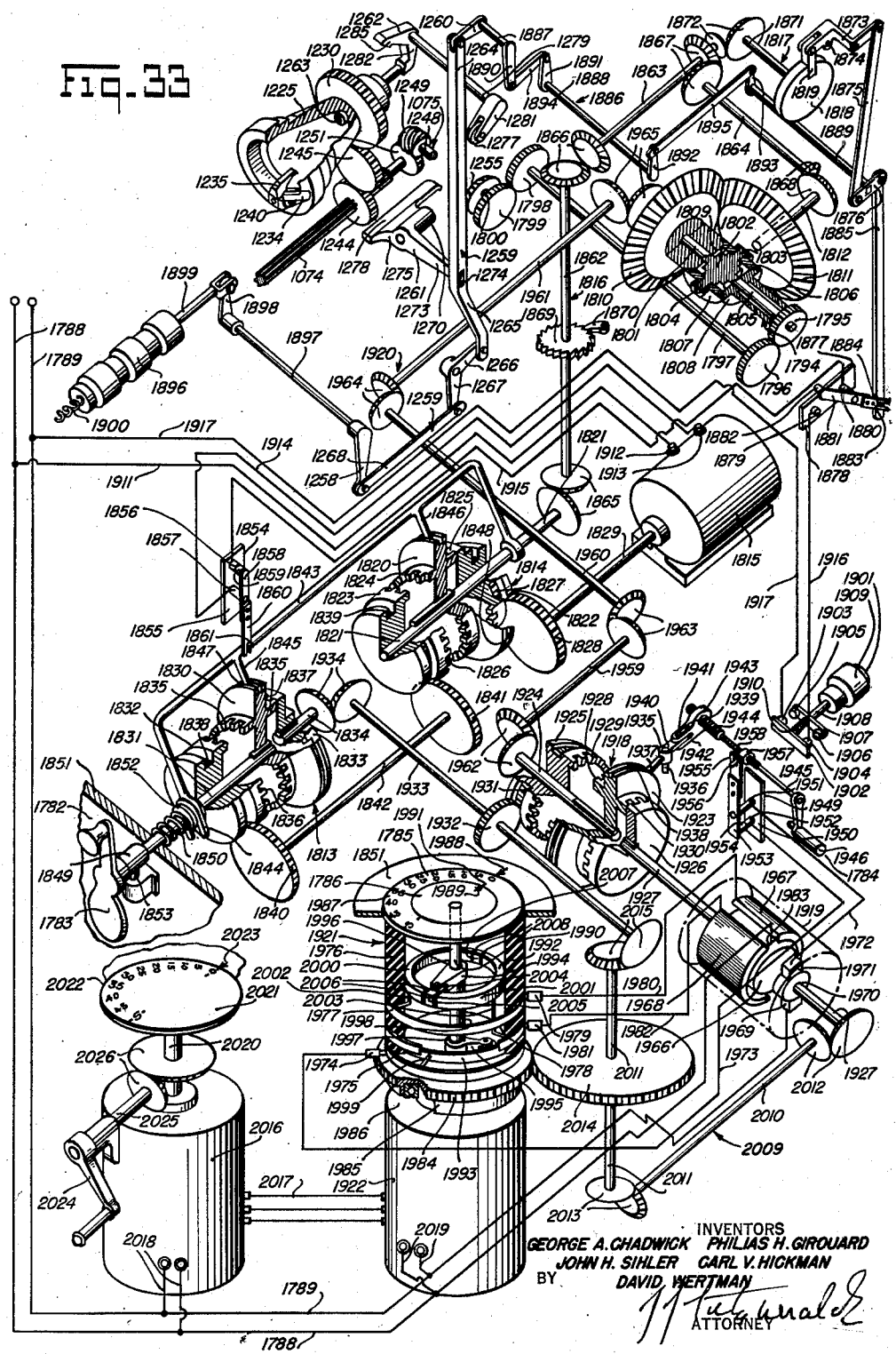

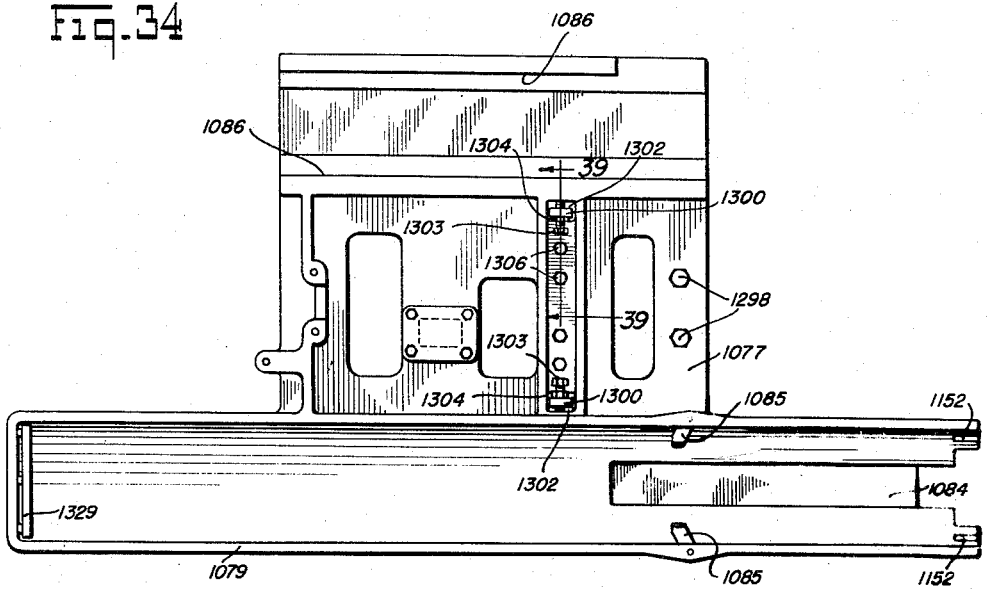
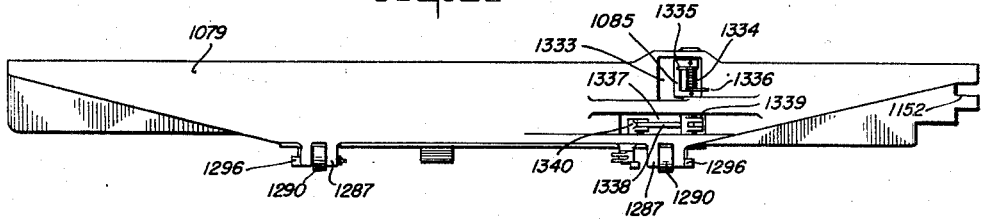
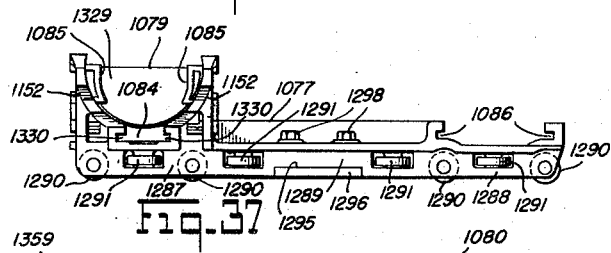
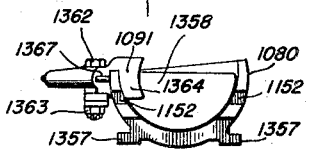
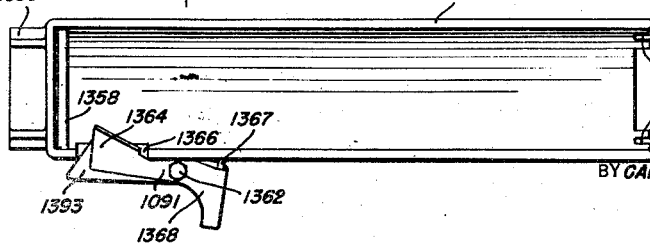

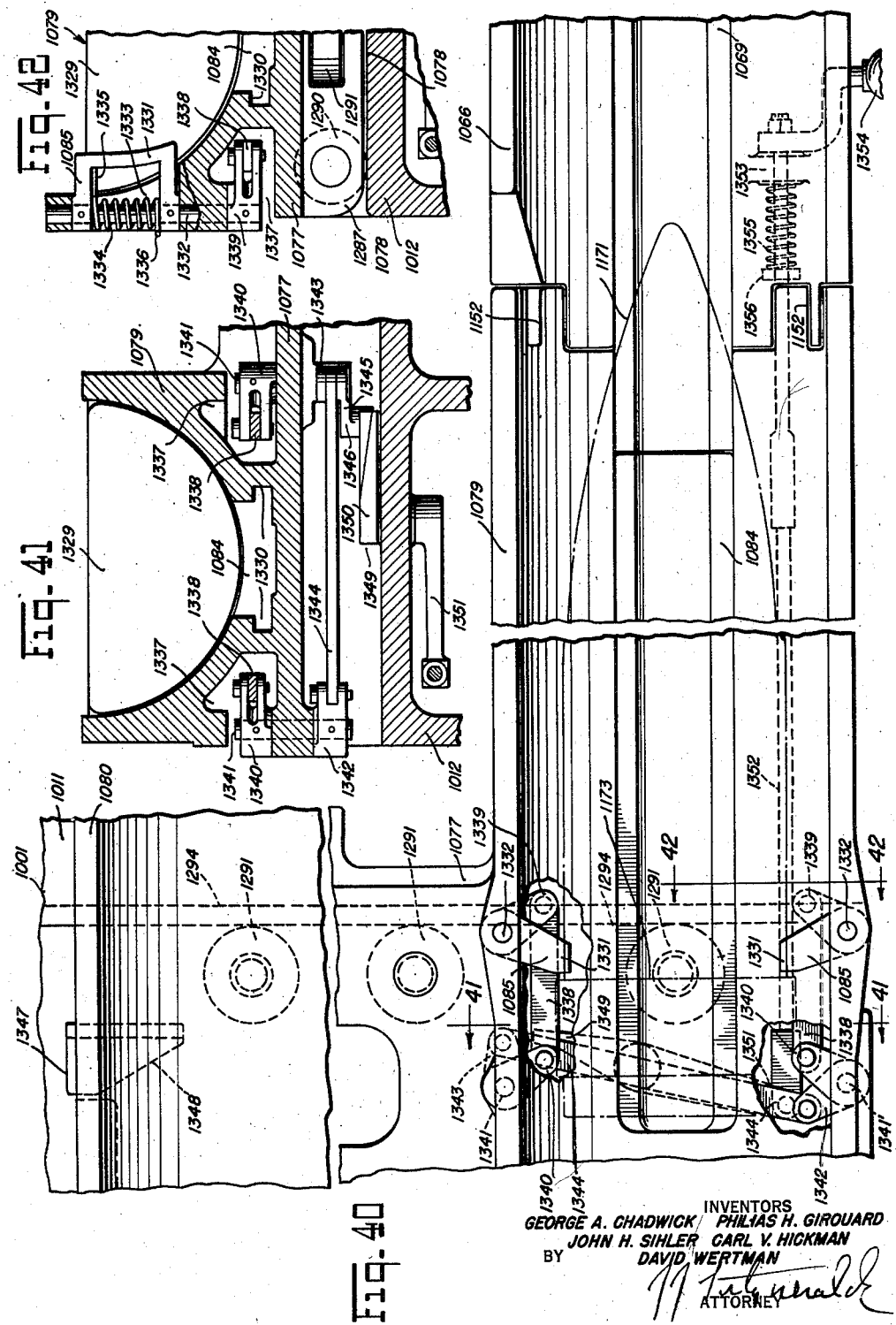

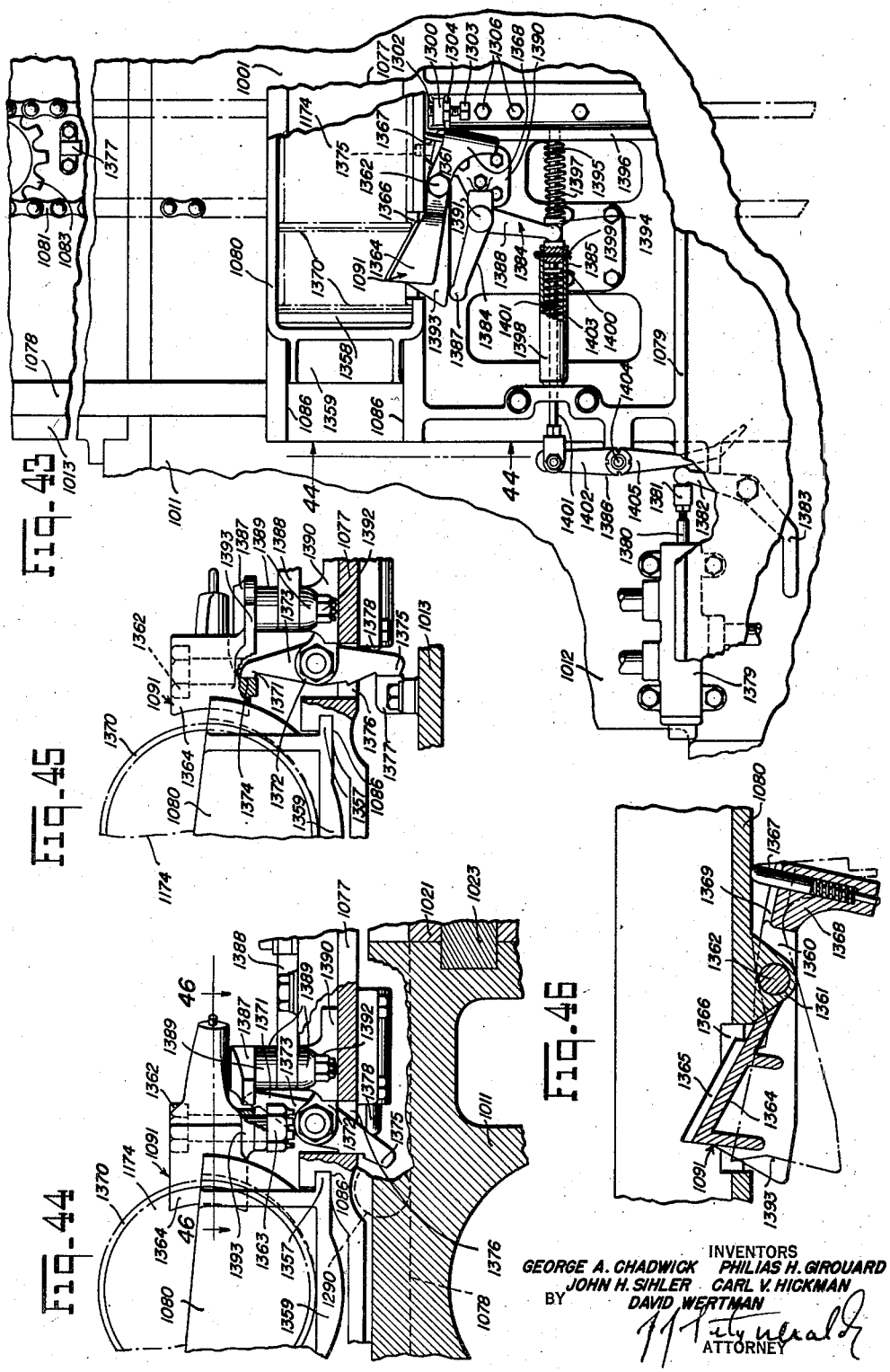

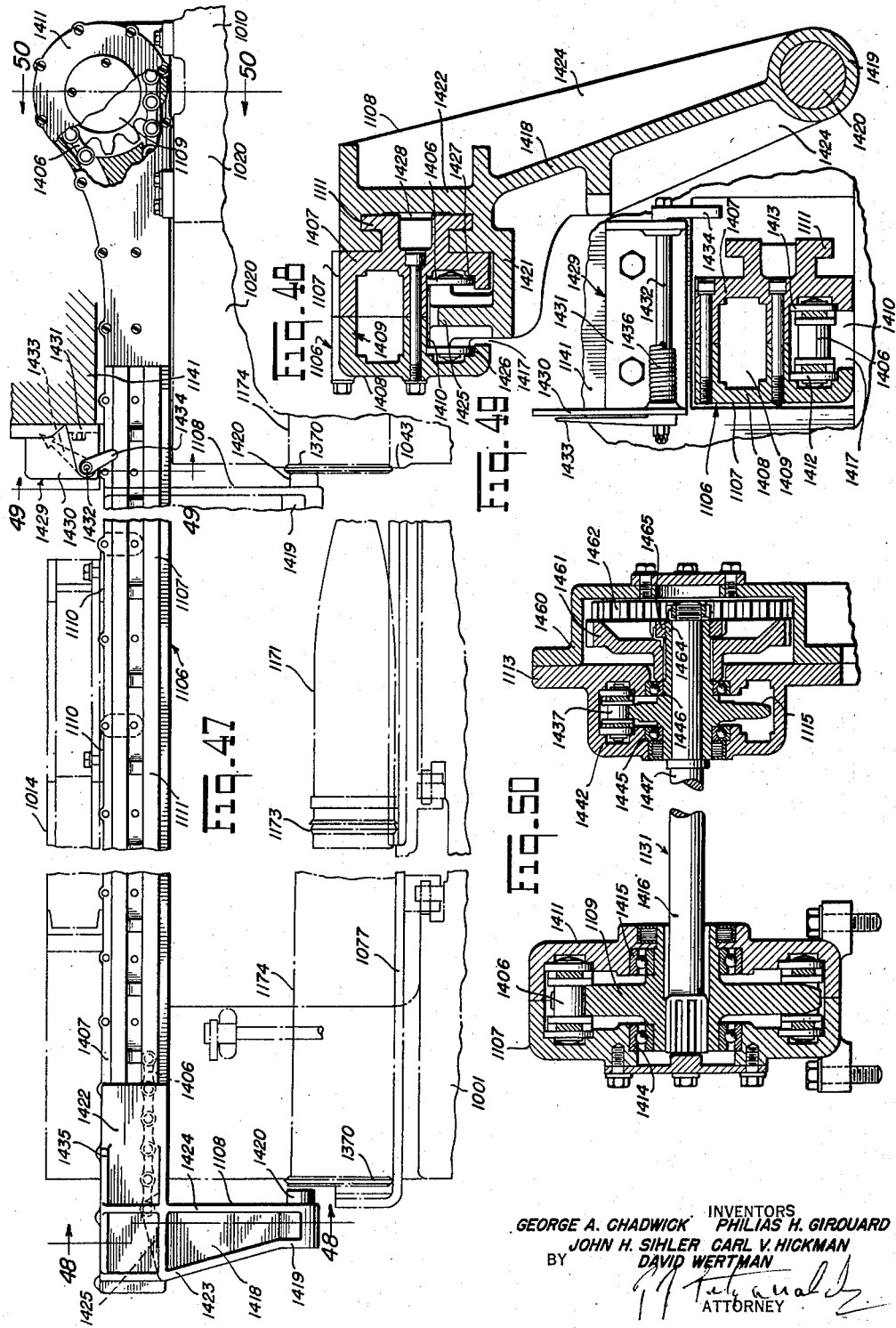

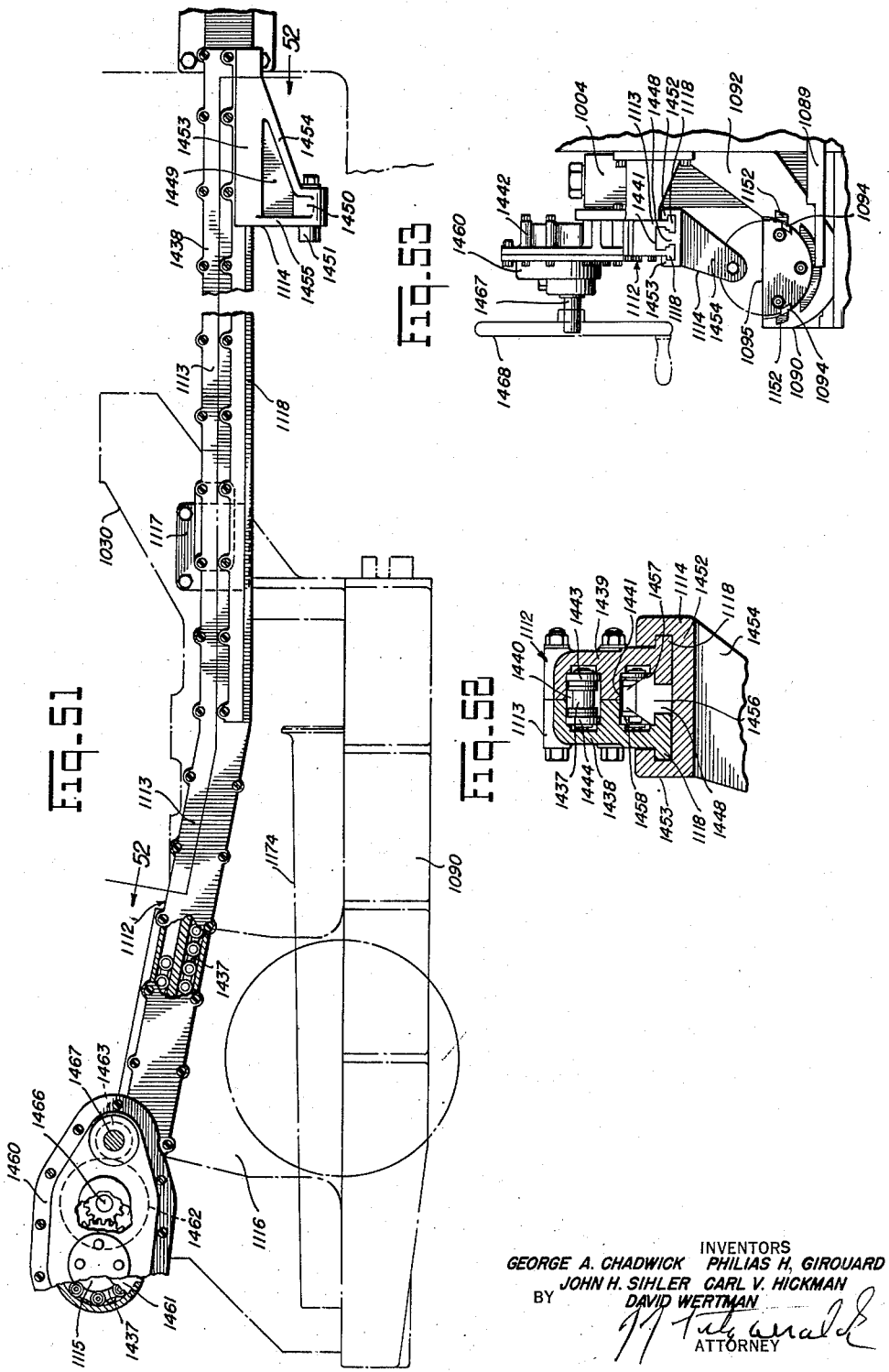

Feb. 18, 1958     G. A. CHADWICK ET AL     2,823,587
LOADING AND RAMMING MECHANISM FOR SEMI-AUTOMATIC GUNS
Filed Nov. 28, 1942     47 Sheets-Sheet 27

Fig. 54

INVENTORS
GEORGE A. CHADWICK   PHILIAS H. GIROUARD
JOHN H. SIHLER   CARL V. HICKMAN
BY   DAVID WERTMAN

ATTORNEY

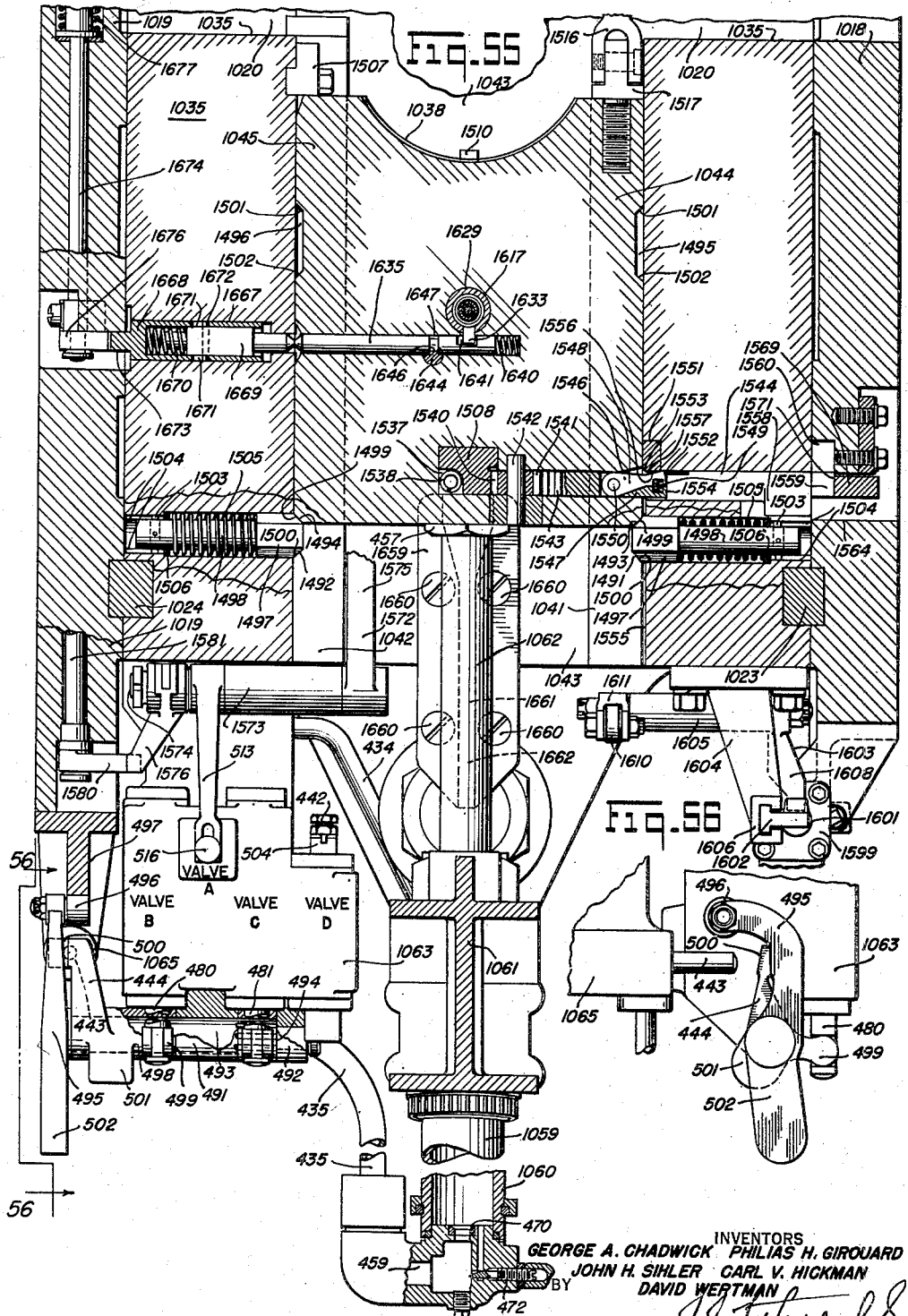

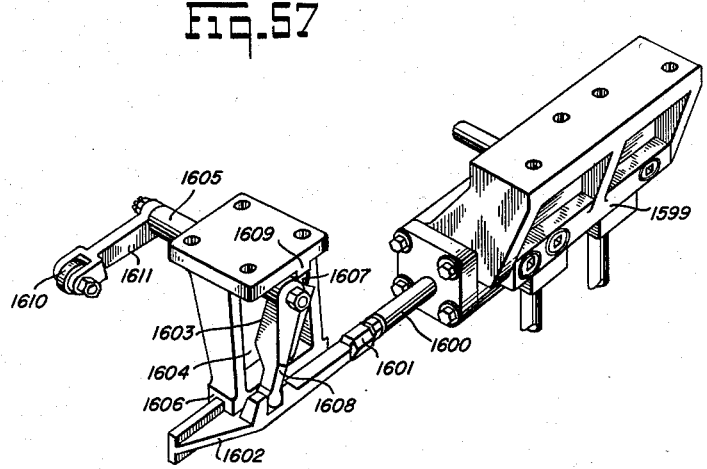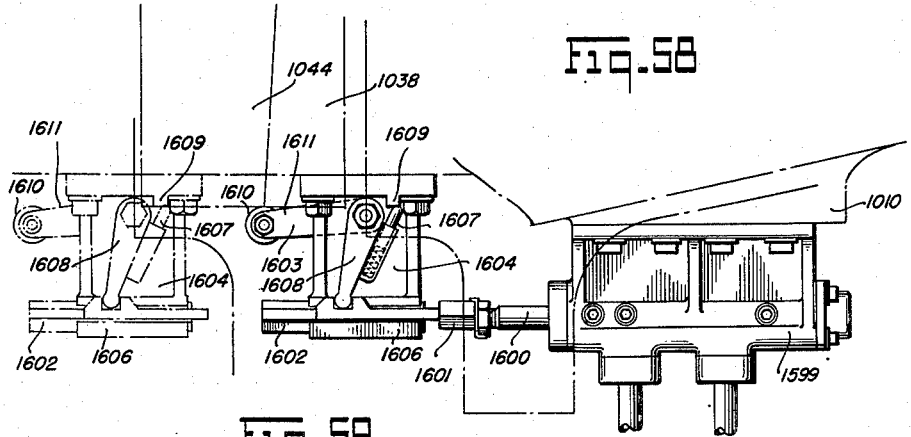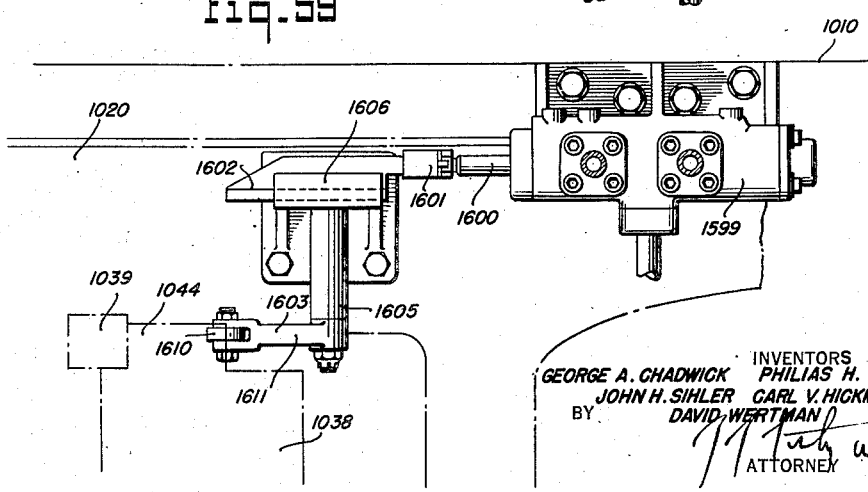

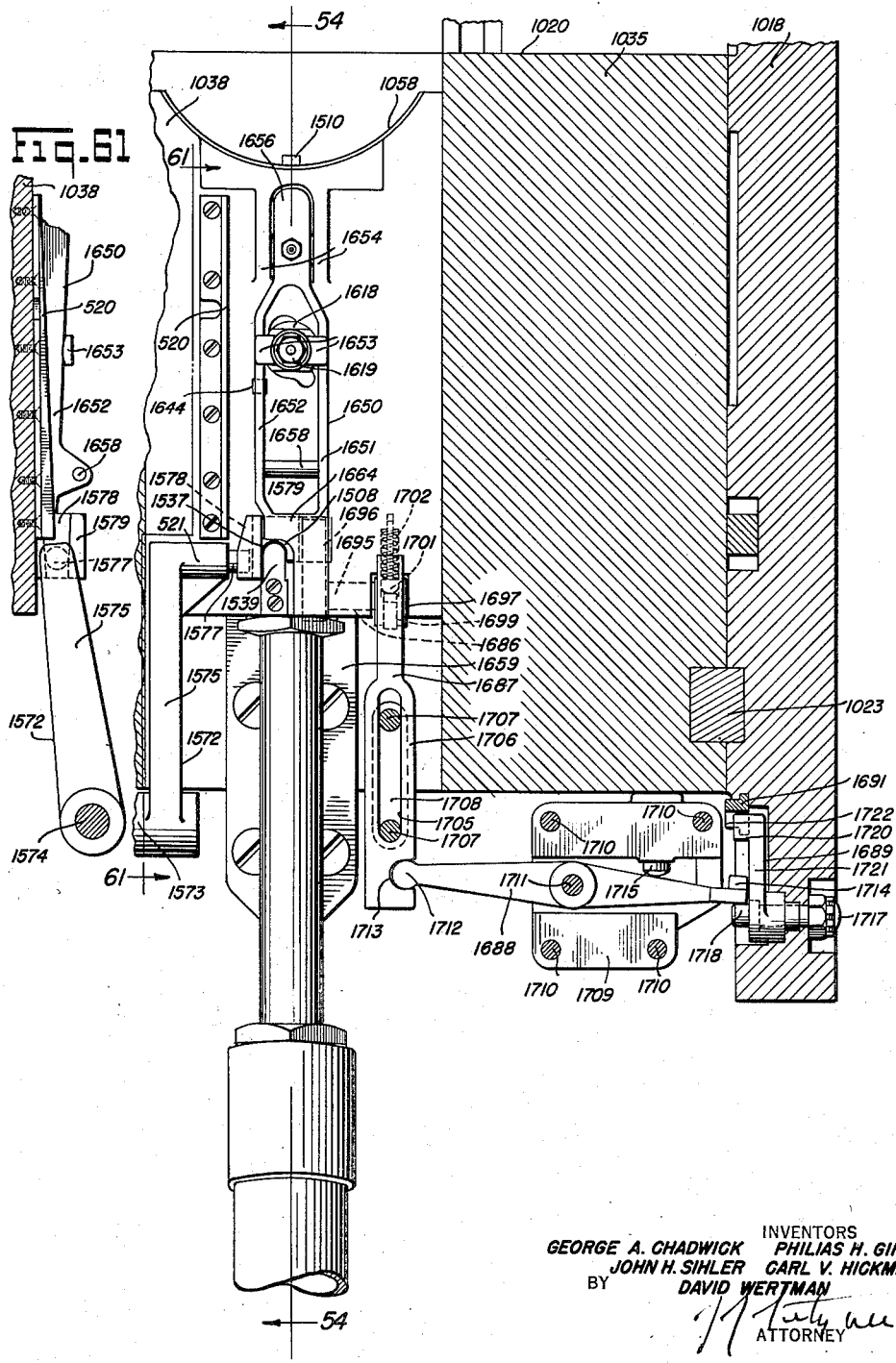

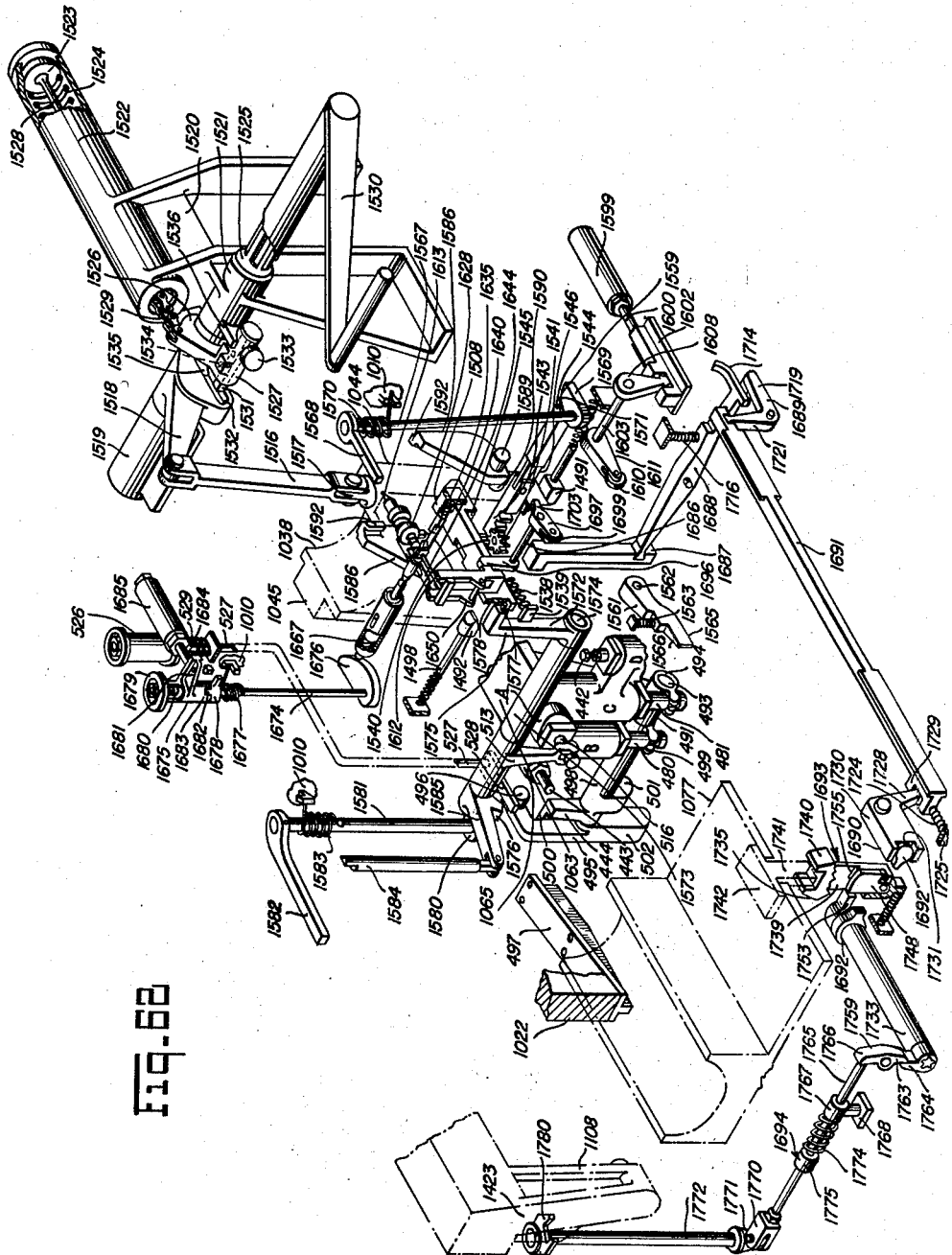

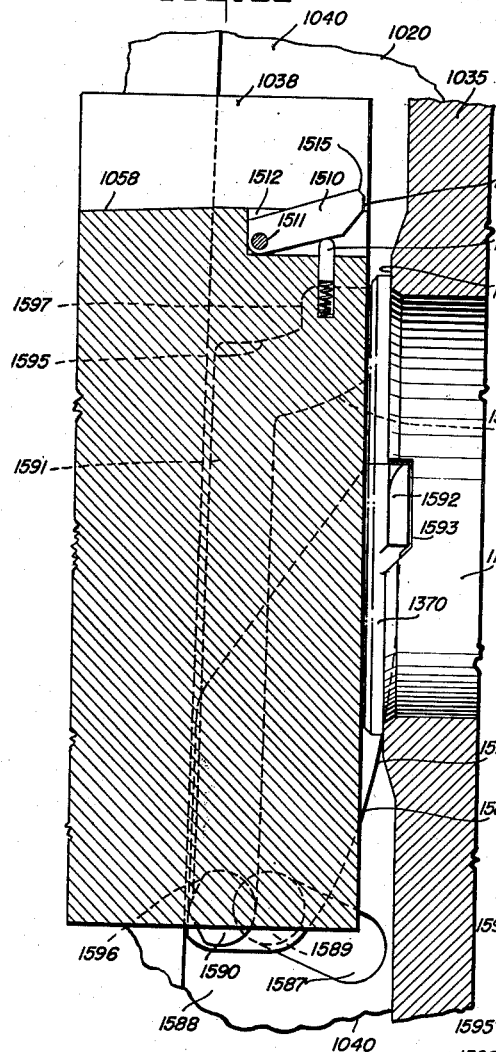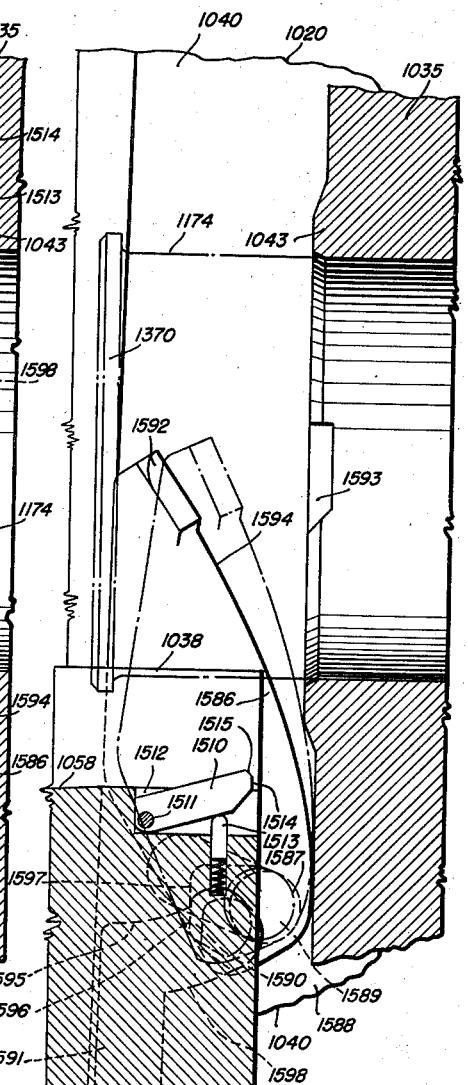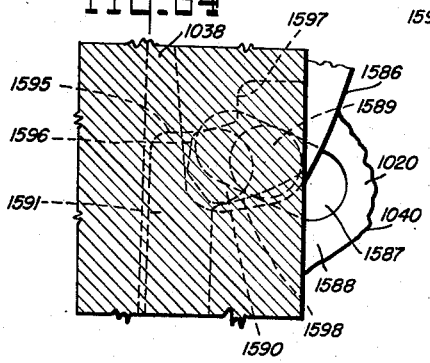

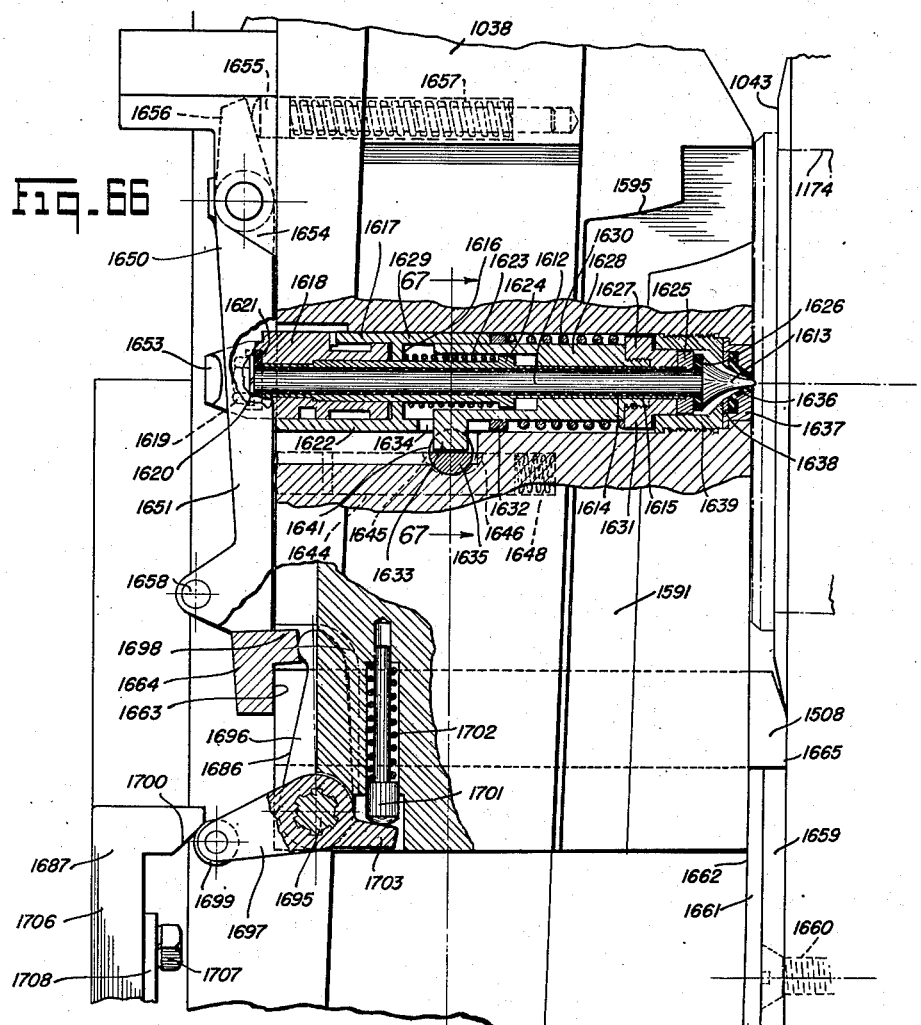

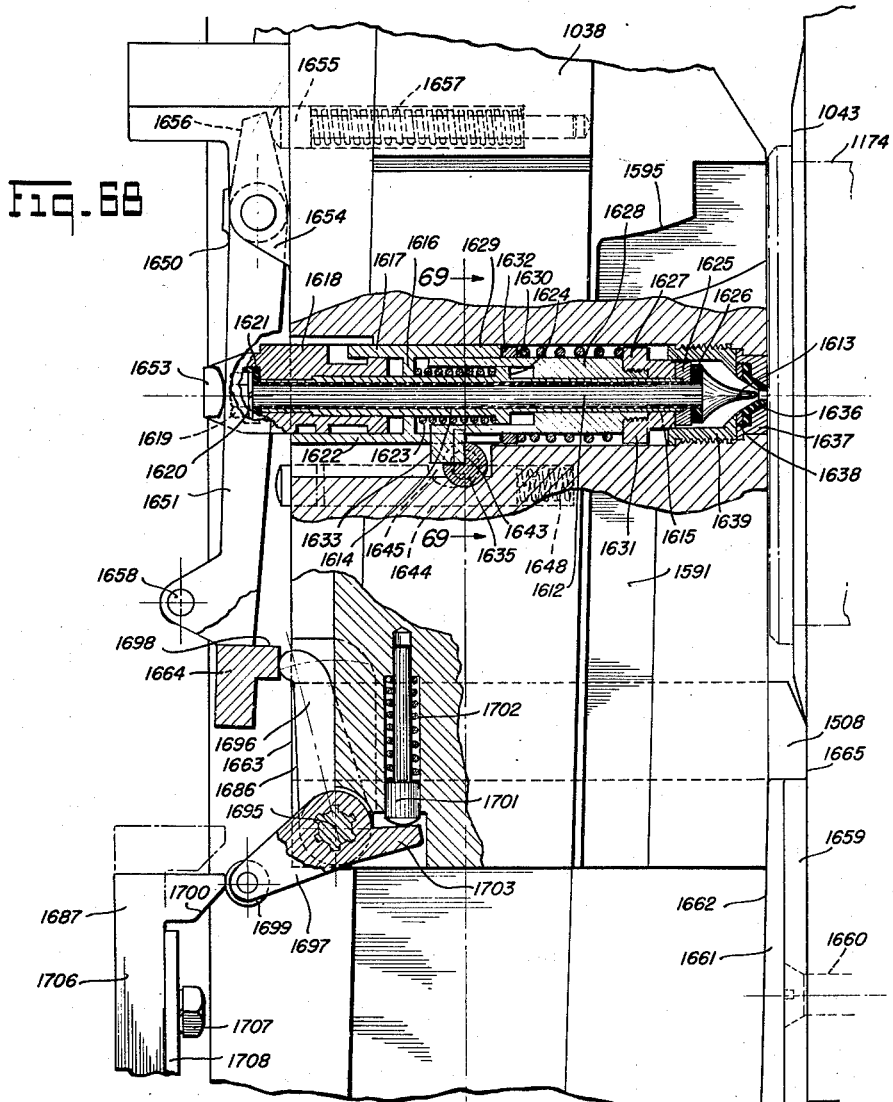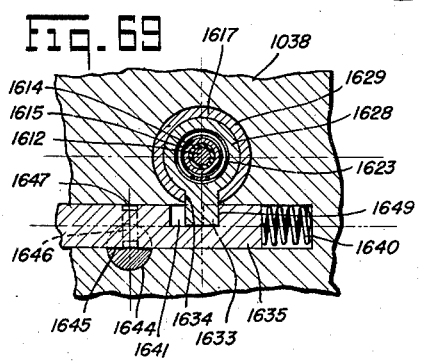

Feb. 18, 1958    G. A. CHADWICK ET AL    2,823,587
LOADING AND RAMMING MECHANISM FOR SEMI-AUTOMATIC GUNS
Filed Nov. 28, 1942    47 Sheets-Sheet 35

INVENTORS
GEORGE A. CHADWICK  PHILIAS H. GIROUARD
JOHN H. SIHLER    CARL V. HICKMAN
BY    DAVID WERTMAN
ATTORNEY

Feb. 18, 1958 G. A. CHADWICK ET AL 2,823,587
LOADING AND RAMMING MECHANISM FOR SEMI-AUTOMATIC GUNS
Filed Nov. 28, 1942 47 Sheets-Sheet 36
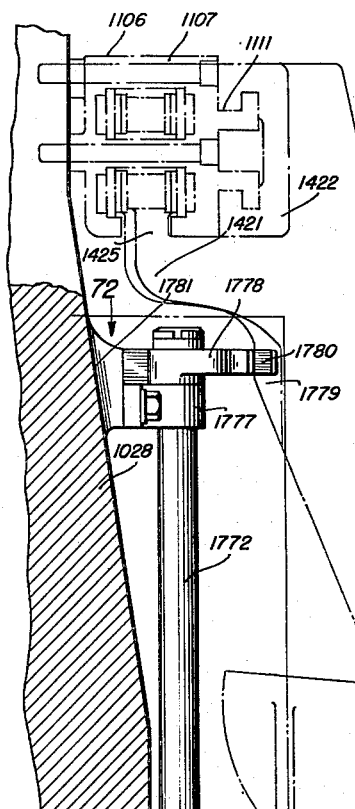
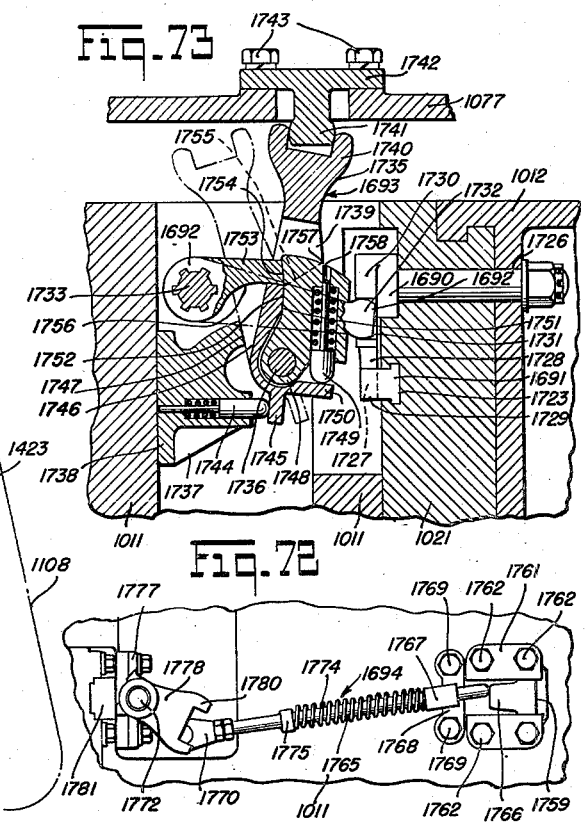
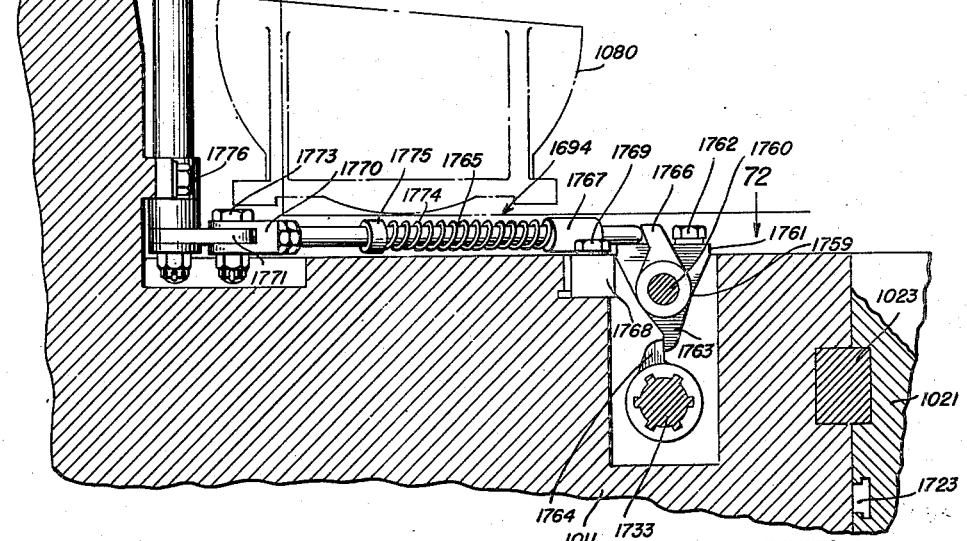
INVENTORS
GEORGE A. CHADWICK    PHILIAS H. GIROUARD
JOHN H. SIHLER    CARL V. HICKMAN
BY    DAVID WERTMAN
ATTORNEY Feb. 18, 1958  G. A. CHADWICK ET AL  2,823,587
LOADING AND RAMMING MECHANISM FOR SEMI-AUTOMATIC GUNS
Filed Nov. 28, 1942  47 Sheets-Sheet 37
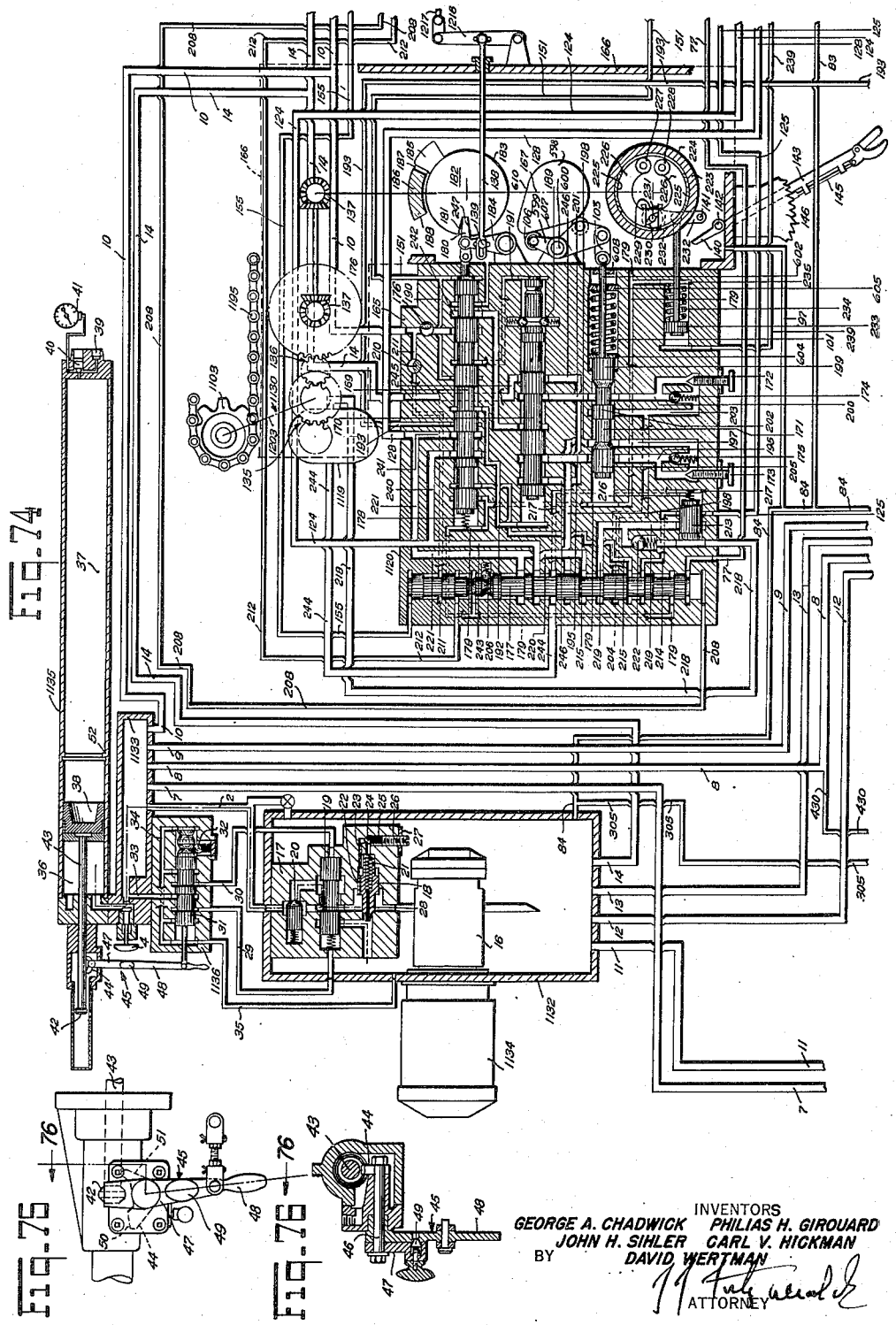
INVENTORS
GEORGE A. CHADWICK  PHILIAS H. GIROUARD
JOHN H. SIHLER  CARL V. HICKMAN
BY  DAVID WERTMAN
ATTORNEY Feb. 18, 1958  G. A. CHADWICK ET AL  2,823,587
LOADING AND RAMMING MECHANISM FOR SEMI-AUTOMATIC GUNS
Filed Nov. 28, 1942  47 Sheets-Sheet 38

INVENTORS
GEORGE A. CHADWICK  PHILIAS H. GIROUARD
JOHN H. SIHLER  CARL V. HICKMAN
BY  DAVID WERTMAN
ATTORNEY

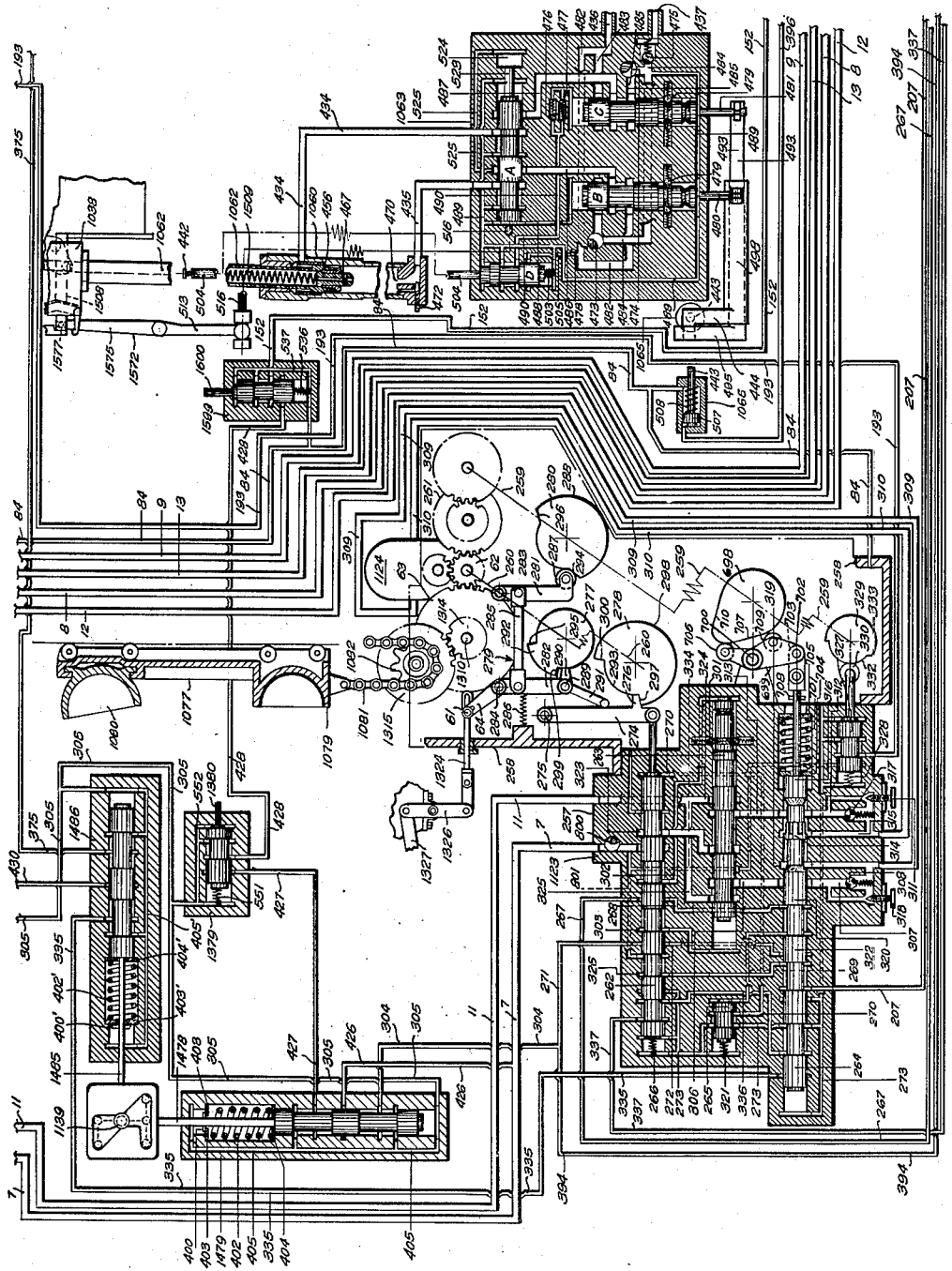

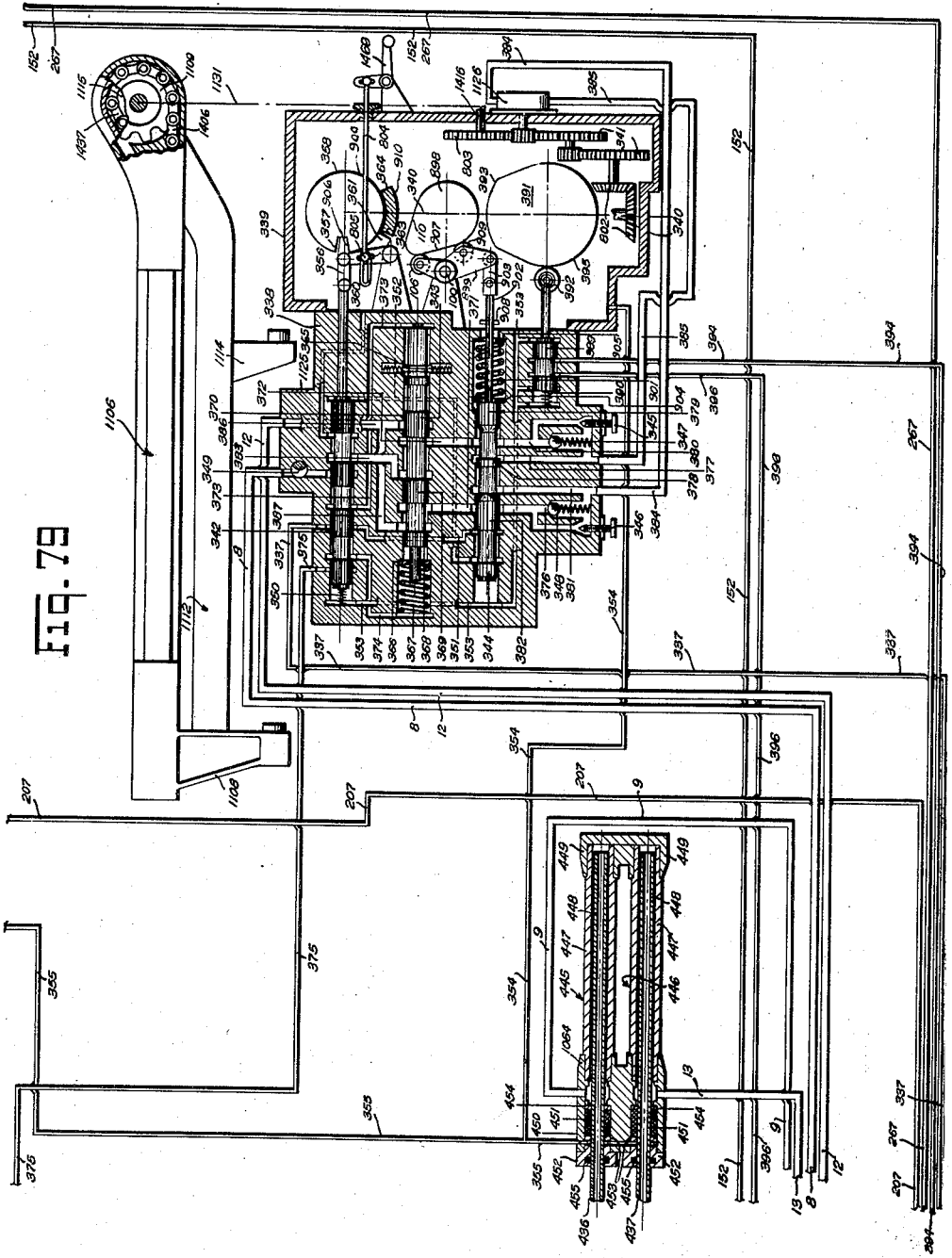

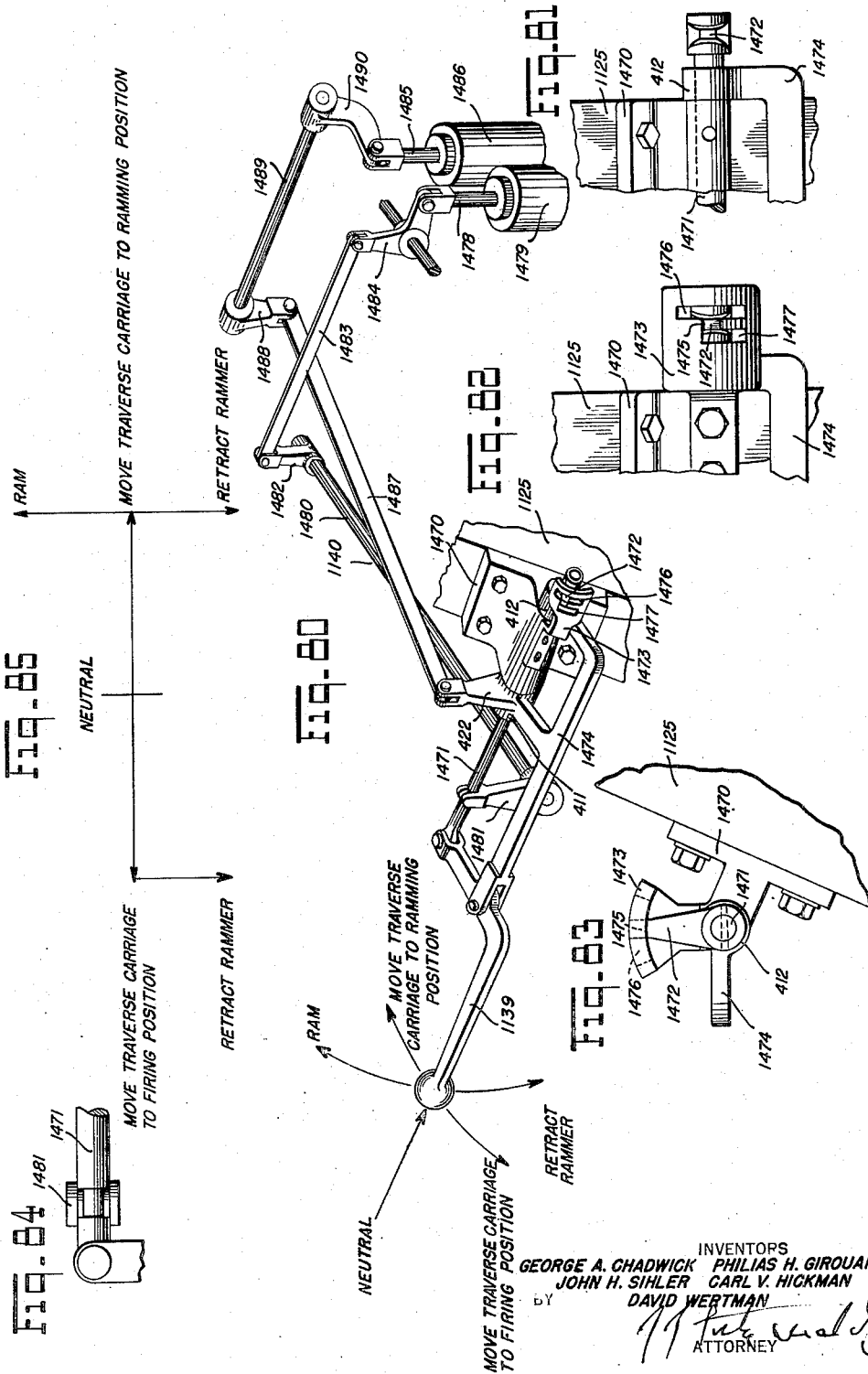

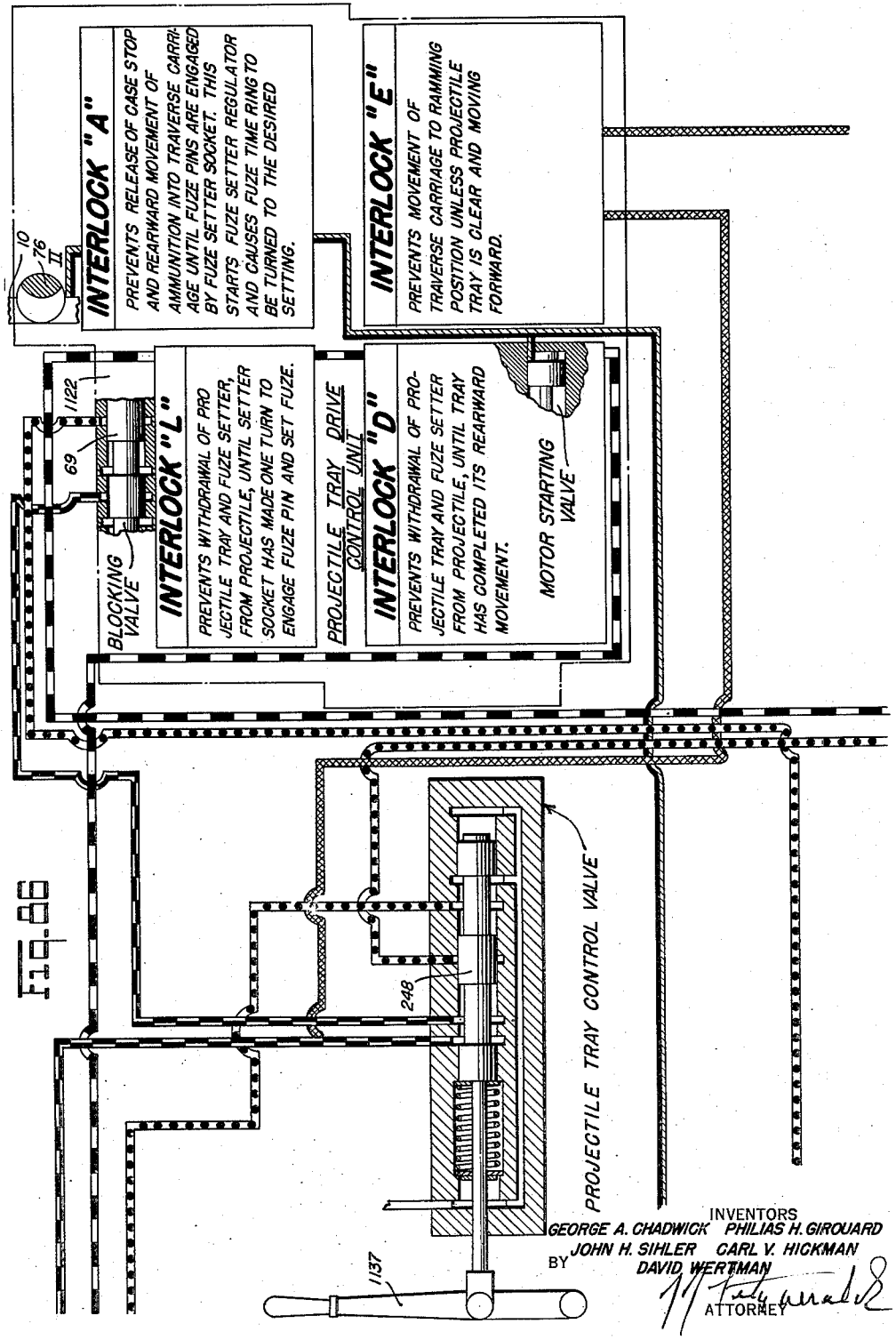

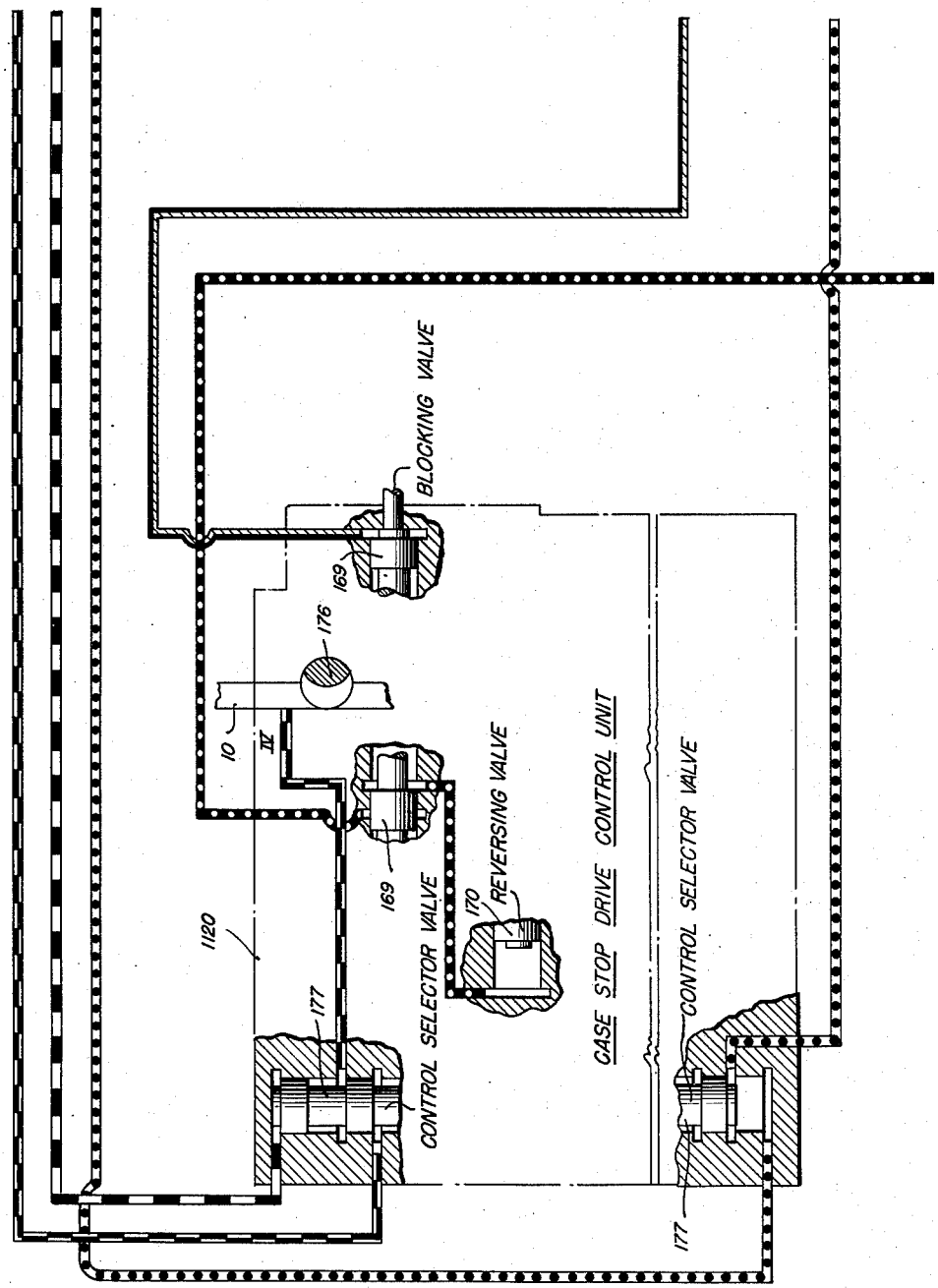

Feb. 18, 1958     G. A. CHADWICK ET AL     2,823,587
LOADING AND RAMMING MECHANISM FOR SEMI-AUTOMATIC GUNS
Filed Nov. 28, 1942     47 Sheets-Sheet 44

Fig. 88

INVENTORS
GEORGE A. CHADWICK    PHILIAS H. GIROUARD
JOHN H. SIHLER   CARL V. HICKMAN
BY     DAVID WERTMAN
ATTORNEY

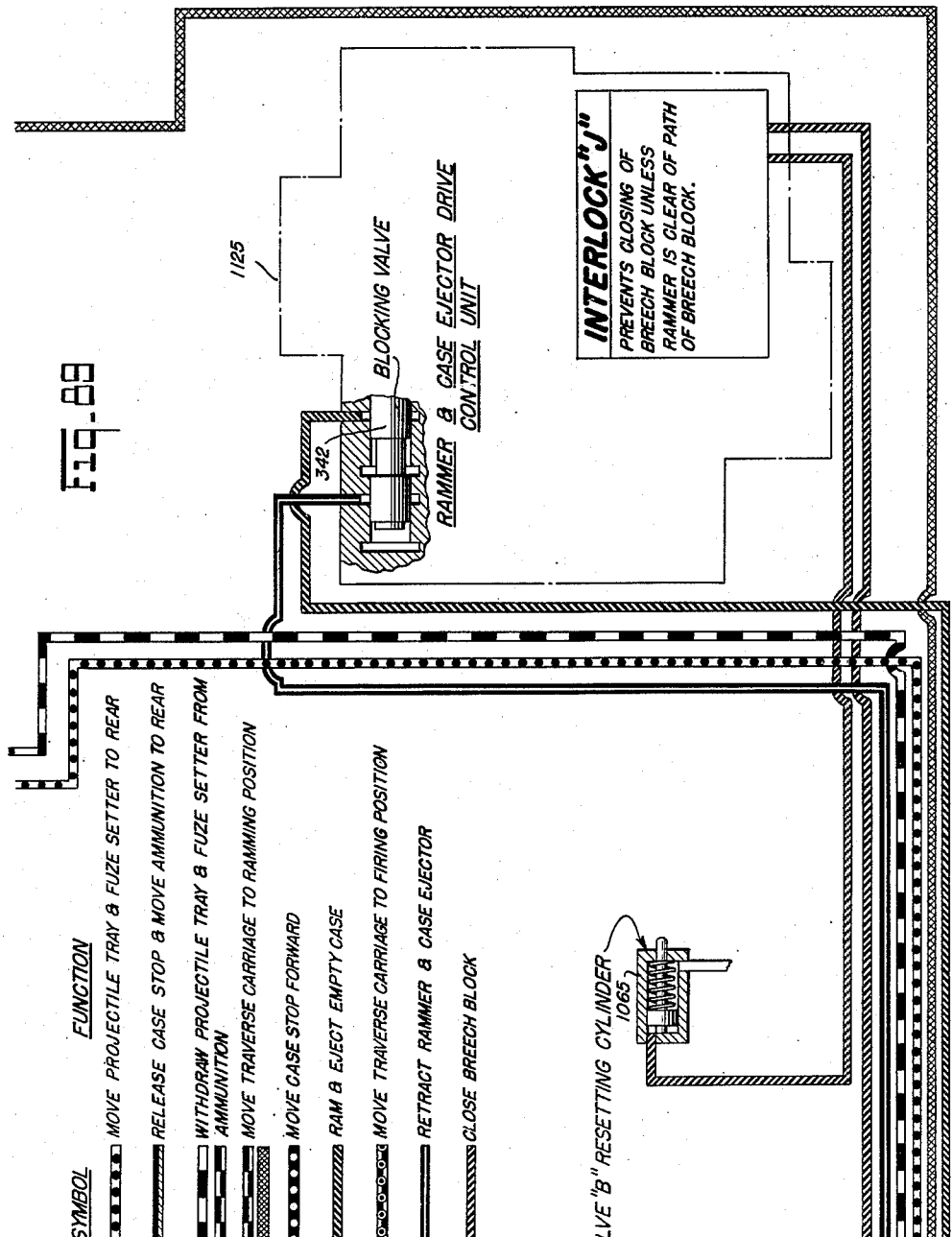

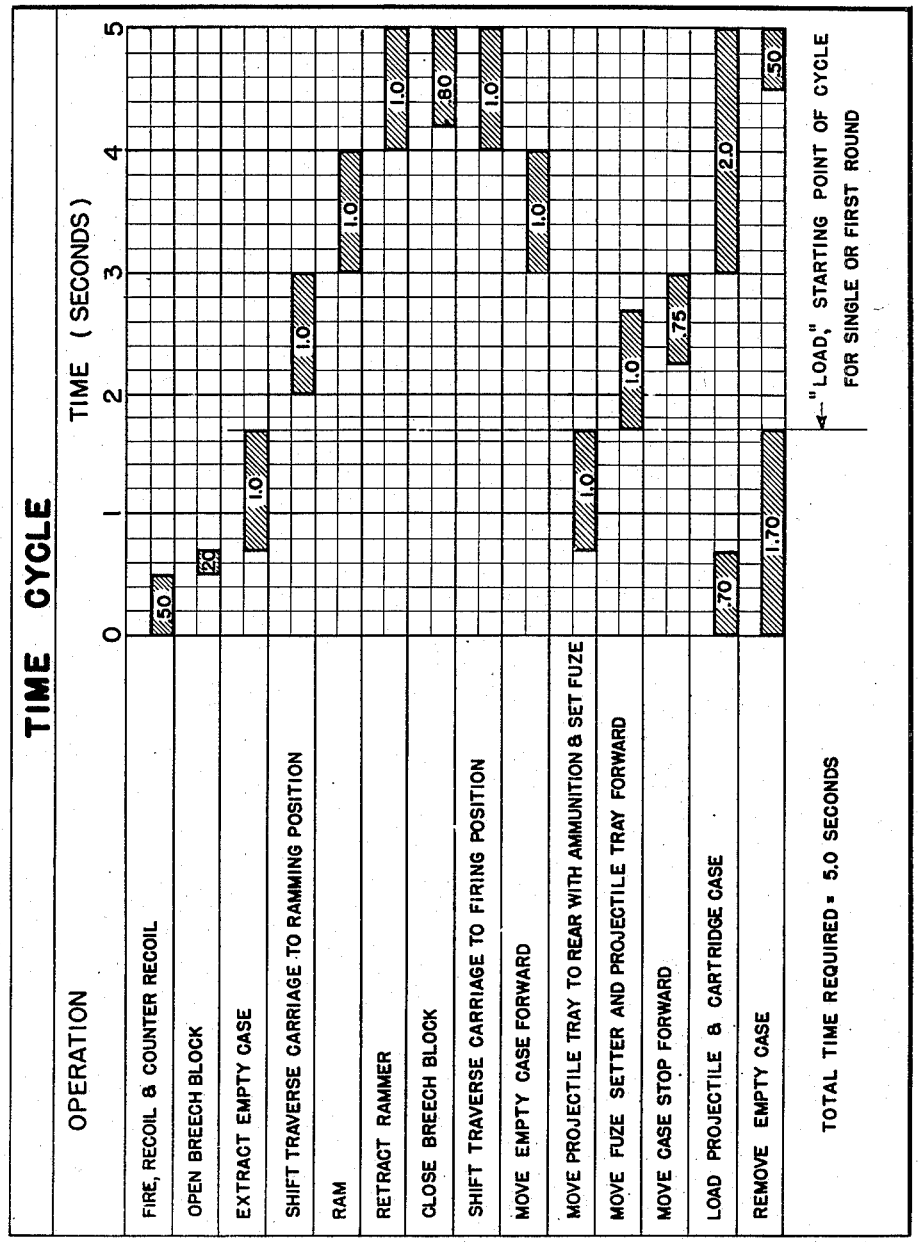

Feb. 18, 1958  G. A. CHADWICK ET AL  2,823,587
LOADING AND RAMMING MECHANISM FOR SEMI-AUTOMATIC GUNS
Filed Nov. 28, 1942  47 Sheets-Sheet 47

INVENTORS
GEORGE A. CHADWICK  PHILIAS H. GIROUARD
JOHN H. SIHLER  CARL V. HICKMAN
BY  DAVID WERTMAN
ATTORNEY

United States Patent Office 2,823,587
Patented Feb. 18, 1958

2,823,587

LOADING AND RAMMING MECHANISM FOR SEMI-AUTOMATIC GUNS

George A. Chadwick, Washington Grove, Md., and Philias H. Girouard, John H. Sihler, Carl V. Hickman, and David Wertman, Washington, D. C.

Application November 28, 1942, Serial No. 467,182

136 Claims. (Cl. 89—4)

(Granted under Title 35, U. S. Code (1952), sec. 266)

The present invention relates to major caliber guns with calibers of the order of magnitude of six inches or greater, employing separate or semi-fixed ammunition and intended to be effective for both anti-aircraft and surface fire.

In guns of this caliber it is highly desirable that a substantially normal or conventional position of the trunnions be maintained in order to keep the weight of the gun at a minimum in effecting a proper gun balance. In view of the excessive lengths of ammunition required by the larger caliber guns, however, difficulty has heretofore been encountered in loading these guns for anti-aircraft fire when employing conventionally positioned trunnions. Since in loading such guns it has been the practice to initially position the round of ammunition on the center line of the gun adjacent the breech thereof, it has been found necessary to first depress the gun from high angles of elevation to a loading position. This has necessarily been time consuming and hence detrimental to the loading cycle, which must be carried out in the smallest practicable time for anti-aircraft fire.

The necessity for first depressing the gun to a loading position is effectively overcome by the present invention through the provision of a novel method for operating the gun and through the provision of novel instrumentalities for loading the gun in situ at all angles of elevation that are essential to effective anti-aircraft fire. These instrumentalities are normally semi-automatic in their operation and when so operated are hydraulically actuated, suitable interlocks being provided to insure the proper sequence of operation and to prevent improper firing of the gun. While the gun of the present invention is to be understood as having a conventional turret mounting, in that it is intended primarily for naval use, this is not considered essential. Other well known types of gun mountings may be employed within the purview of the present invention to make the gun available for general military use, whether naval or otherwise.

In its preferred embodiment the gun of the present invention includes a slide or cradle provided with conventionally positioned trunnions in which the gun housing and barrel of major caliber are mounted for reciprocating movement and are connected by conventional recoil and counter-recoil mechanisms to the slide. The breech block, as usual, incorporates a firing pin mechanism and is movable transversely of the gun housing for cooperation with the barrel, a novel hydraulically actuated unit being preferably employed for imparting movement to the breech block. Extractors are arranged for actuation by the breech block in its opening movement to remove the empty cartridge case from the gun barrel and eject the same rearwardly of the gun.

Loading and empty case trays are rigidly secured to opposite sides of the slide adjacent the trunnions thereof for receiving respectively the successive rounds of ammunition and the empty cartridge case removed from the gun. These two trays thus tilt with the gun slide in all of its angles of elevation, and by reason of their securement to the forward portion of the slide are at all times accessible to the two operators, who are positioned on opposite sides of the gun adjacent the trunnion axis. A projectile tray is mounted for sliding movement lengthwise of the loading tray and has secured thereto fuse setting means engageable with the projectile nose for setting the conventional fuse time ring thereof. The fuse setting means is driven by a fuse setting indicator-regulator mounted on the gun slide and preferably the former performs both the fuse setting and regulating functions either separately or simultaneously.

A carriage capable of movement transversely of the gun, that is from one side to the other, and hereinafter referred to as the traverse carriage is mounted on the slide rearwardly of the gun housing and incorporates two trays. One tray is rigid with the carriage and receives a round of ammunition from the loading tray as the projectile tray moves rearwardly, while the other tray of the carriage is secured to the gun housing for reciprocation therewith and receives the empty cartridge case ejected from the gun by the extractors. When the round of ammunition has been moved into the ammunition receiving tray and the empty cartridge case has been ejected into the reciprocating tray, the traverse carriage may be moved from the firing position described to the ramming position. In this latter position the ammunition receiving tray is properly aligned with the breech of the gun and the reciprocating tray with the empty case tray, so that the round of ammunition may be rammed into the gun simultaneously with the ejection of the empty cartridge case into the empty case tray.

A case stop, rammer and case ejector are securely mounted on the slide and are aligned respectively with the loading tray, the breech of the gun and the empty case tray. The case stop supports the weight of the round of ammunition by its engagement with the cartridge case and is pushed to the rear by the projectile tray and fuse setting means through the interposed ammunition. During the rearward movement therefore the ammunition is held firmly between the case stop and the fuse setting means of the projectile tray to permit a setting of the fuse as the ammunition and projectile tray travel to the rear into the ammunition receiving tray of the traverse carriage.

Separate hydraulic drive units are provided for the projectile tray, the case stop and the traverse carriage, while a single hydraulic unit preferably provides a joint drive for the rammer and the empty case ejector. These drive units are suitably mounted on the slide, while the hydraulic unit for actuating the breech block is mounted on the gun housing and recoils with the gun. In the preferred embodiment the power plant or source for supplying the necessary hydraulic energy to these units is securely affixed to a platform which forms a part of the slide. A projectile tray control lever on one side of the gun controls the movements of the projectile tray and case stop, while a traverse carriage and rammer control lever on the other side of the gun provides a control for the movements of the traverse carriage, the case stop, the rammer, the empty case ejector and the breech block.

As previously noted, each gun requires two operators who are positioned on opposite sides of the gun. One operator manipulates the projectile tray control lever and when this is not required loads the ammunition into the appropriate trays at the proper time. The other operator manipulates the traverse carriage and rammer control lever and when this is no longer required removes the empty cartridge case from the empty case tray and disposes of the same. The control manipulations, that is loading and removal operations, occur simultaneously with the operation of certain mechanical and hydraulic units of the gun. Many of these units, however, also operate simultaneously. This simultaneity of operation unaccompanied by any depression of the gun to the loading position makes it possible to complete the loading cycle in a very short time and is an important feature of the present invention.

The method of operating major caliber guns contemplated by the present invention thus includes, among others, the steps of extracting an empty cartridge case from the gun and moving a round of ammunition from adjacent one of the trunnions thereof to positions at the rear of the gun with or without setting of the fuse, of simultaneously moving the round and the extracted cartridge case transversely of the gun to positions respectively for alignment with the gun barrel and for clearance relatively to the gun, and of simultaneously ramming the round of ammunition into the gun barrel and ejecting the cartridge case to a position adjacent the other of said trunnions. When operating the gun cyclically, however, the periods required for placing a round of ammunition at one trunnion and for removing an empty cartridge case from another trunnion extend from one cycle into a succeeding cycle and are important in the method. In connection with the foregoing, the methods of loading the gun and removing the empty cartridge case therefrom are alone considered novel.

In order to insure effective operation of the projectile tray, case stop, traverse carriage and the rammer and case ejector when operating semi-automatically, the drive units and source of hydraulic energy associated therewith incorporate certain novel features. Thus each unit, comprised of a motor and a control unit, has embodied in the control unit thereof a blocking valve for admitting fluid pressure to the motor, a reversing valve for reversing the direction of drive of the motor and an acceleration valve for controlling the speed of operation of said motor. Mechanism controllable by the motor shifts the last-mentioned valve in an intermittent fashion to provide a variable speed control, while the first-mentioned valve assists in unlocking the drive unit by withdrawing a detent from a slotted disk rotatable with the motor. By providing a delayed shift for the reversing valve a transient operation occurs which facilitates the withdrawal of the detent from the slot.

The power plant or source of hydraulic energy comprises a tank containing a hydraulic medium, a manifold connected to the various hydraulic units of the gun and an accumulator connected in series relation with the manifold and tank. A pump supplies the hydraulic medium from the tank to the manifold and to the accumulator for charging the latter, means being provided for automatically by-passing the pump to the tank when the accumulator has been fully charged and for automatically re-establishing the supply of the medium by the pump to the manifold after the accumulator has been partially discharged. The power plant thus supplies a variable amount of energy which increases with the simultaneous operation of certain of the hydraulic units in the gun cycle. This is considered an important feature of the present invention.

The hydraulic unit for operating the breech block includes a piston connected with the breech block, a cylinder supported from the gun housing for receiving the piston and a control unit interposed between the cylinder and source of hydraulic energy. The control unit includes a valve shiftable by the breech bolt for admitting hydraulic fluid from the source to the cylinder, a pair of valves for controlling the direction of flow of the hydraulic fluid within the cylinder and a valve actuatable by the breech block in opening for shifting one of the pair of valves to terminate the flow of the hydraulic fluid from the source through the first-mentioned valve to the cylinder. For reasons which will appear hereinafter the breech block is designed to move beyond the open position that is beyond the edge of the bore of the gun. A spring compressible by the breech block as it moves beyond its loading position in opening returns the breech block to its loading position upon termination of the fluid flow.

The breech block, in moving beyond its loading position, clears the bore and operates the extractors for removing the empty cartridge case from the gun barrel and ejecting the same rearwardly into the reciprocating tray of the traverse carriage, where it is locked in place by a pivotally mounted member. A novel feature of the present invention resides in the utilization of some of the kinetic energy of the ejected cartridge case for shifting one of the hydraulic interlock valves secured to the slide adjacent the traverse carriage. This is accomplished through a linkage actuatable by the pivotal locking member, the linkage including a mechanism for momentarily storing some of the energy of the ejected cartridge case for use in shifting the valve. The hydraulic unit for operating the breech block is adjustable to open the breech block at varying speeds to effect proper extraction.

The fuse setting means, as previously noted, is movable longitudinally of the loading tray and is driven by a shaft in its positions along the tray. Setting and regulating mechanisms are mounted on the slide and are connected to the shaft through a differential for combining the outputs of the mechanisms. By this arrangement simultaneous setting and regulation are made possible during the movement of the fuse setting means longitudinally of the loading tray, thus conserving time in the loading cycle and insuring an accurate setting of the projectile fuse. The setting and regulating mechanisms may be either manually or automatically operated, four combinations of setting and regulation being possible. Thus, it is possible to have both the setting and regulation occur either automatically or manually, or to have automatic setting and manual regulation or manual setting and automatic regulation.

In the firing pin mechanism of the present invention the cocking lever in its inoperative position is arranged to engage and release the safety latch. Thus misfire cannot occur when firing by percussion. Novel mechanical interlocks are also provided which prevent firing of the gun unless the traverse carriage is in the firing position and the rammer has retracted sufficiently to clear the breech block in the recoil of the gun. These interlocks include portions that are mounted to recoil and counter-recoil with the gun housing and breech block for rotating the cocking lever to hold the firing pin withdrawn, and portions that are mounted on the slide to be actuated by the traverse carriage and rammer. The rammer firing pin interlock mechanism includes a linkage limited for movement on either side of its dead center position which is operable by the rammer before moving the same within the recoil distance of the breech block, while the traverse carriage firing pin interlock mechanism includes a trigger mechanism operable by the traverse carriage upon leaving the firing position.

In the light of the foregoing, it is an object of the present invention to provide methods of loading live ammunition and removing the empty cartridge case from major caliber guns adjustable in elevation in which the loading of a round of ammunition, accompanied or unaccompanied by fuse setting, is initiated at a position adjacent one of the trunnions and in which the empty cartridge case is ejected to a position adjacent the other of said trunnions;

It is another object of the present invention to provide a method of cyclically operating major caliber guns adjustable in elevation in which the loading of a round of ammunition, accompanied or unaccompanied by fuse setting, is initiated at a position adjacent one of the trunnions, in which the empty cartridge case is ejected to a position adjacent the other of said trunnions, and in which the periods for placing a round of ammunition adjacent one of the trunnions and for removing an empty cartridge case from adjacent the other of said trunnions extend from one gun cycle into the succeeding gun cycle;

It is still another object of the present invention to provide a manual or semi-automatic apparatus for loading and removing an empty cartridge case from major caliber guns adjustable in elevation in which the loading of a round of ammunition is initiated at a position adjacent one of the trunnions and in which the empty cartridge case is ejected to a position adjacent the other of said trunnions;

It is still another object of the present invention to provide a hydraulically actuated semi-automatic apparatus of the character stated in which suitable hydraulic interlocks insure the proper sequence of operation between the component parts thereof and in which the source of hydraulic energy for the apparatus is variable to accommodate the peak loads occasioned by the joint movements of certain parts of the apparatus;

It is another and further object of the present invention to provide a fuse setting means movable longitudinally of the slide operable by separate or combined setting and regulating mechanisms which may be either manually or automatically actuated; and It is among other and still further objects of the present invention to provide novel hydraulic drive units for use in the semi-automatic apparatus; to provide a novel manual or automatic hydraulic unit for opening and closing the breech block; to provide novel mechanisms for actuating certain of the hydraulic interlocks; and to provide novel firing pin interlock mechanisms.

Other objects and many of the attendant advantages of this invention will be readily appreciated as the same becomes better understood by reference to the following detailed description when considered in connection with the accompanying sheets of drawings wherein:

Fig. 3 is a fragmentary perspective view of the forward portion of the gun, with certain parts omitted, showing, among other things, the construction of the slide and the gun housing;

Fig. 6 is a sectional view in elevation of the gun taken on the line 6—6 of Fig. 4;

Fig. 11 is a front elevational view of the gun of the present invention;

Fig. 12 is a view in perspective showing details of construction of the loading and projectile trays;

Fig. 13 is an enlarged fragmentary sectional view in elevation of the forward portion of the gun taken on the line 13—13 of Fig. 11;

Fig. 14 is a fragmentary sectional view taken on the line 14—14 of Fig. 13 showing further details of construction of the loading and projectile trays;

Fig. 15 is an enlarged fragmentary plan view of the forward portion of the gun showing, among other things, the mounting of the fuse setter on the projectile tray;

Fig. 16 is a fragmentary view in sectional elevation taken on the line 16—16 of Fig. 15 showing certain details of construction of the fuse setter and its drive connections;

Fig. 17 is a sectional view through the projectile tray taken on the line 17—17 of Fig. 16 and showing in end elevation the fuse setter mounted on the tray;

Fig. 18 is a fragmentary view in end elevation of the movable fuse setter socket member taken on the line 18—18 of Fig. 16;

Fig. 19 is an enlarged fragmentary front elevational view of the gun partly broken away and showing certain details of the drive connections for the fuse setter and projectile tray;

Fig. 20 is an enlarged fragmentary view in elevation of the rearward portion of the gun as seen from the right side of the gun;

Fig. 21 is a fragmentary plan view of the rearward portion of the gun depicted in Fig. 20 as seen from the under side of the gun and showing, among other things, certain details of control linkages;

Fig. 22 is a plan view of the gun omitting certain parts thereof taken on line 22—22 of Fig. 6 and showing the mounting of the case stop, rammer and case ejector with reference to the slide together with the traverse carriage, rammer and case ejector control connections;

Fig. 23 is a fragmentary sectional view of the rearward portion of the gun taken on the line 23—23 of Fig. 20 and showing, among other things, the mounting of the traverse carriage on the gun slide;

Fig. 24 is a fragmentary sectional view taken on the line 24—24 of Fig. 23 showing the engagement of one of the horizontal carriage rollers with a vertical slide track;

Fig. 25 is a fragmentary sectional view taken on the line 25—25 of Fig. 23 depicting the details of one of the locking plates for locking the traverse carriage to the gun side;

Fig. 26 is a fragmentary sectional view taken on the line 26—26 of Fig. 23 showing the engagement of one of the vertical carriage rollers with a horizontal slide track;

Fig. 27 is an enlarged fragmentary sectional view of the fuse setter with the nose of a projectile shown engaged in the setter socket preparatory to the setting operation;

Figs. 28–31 show various steps in the setting of the projectile fuse time ring attending a single revolution of the movable fuse setter socket member;

Fig. 32 is an exterior view on an enlarged scale of the fuse setting indicator-regulator which regulates the movable socket member and rotates the same through one complete revolution to set the fuse;

Fig. 33 is a perspective view showing, among other things, the interior mechanisms of the fuse setting indicator-regulator, the movable socket member driven thereby and the synchronous transmission system associated with the regulating mechanism;

Figs. 34–36 are respectively plan, side and end elevational views of the transverse carriage with the reciprocating carriage tray removed;

Figs. 37 and 38 are respectively plan and end elevational views of the reciprocating carriage tray;

Fig. 39 is a fragmentary sectional view taken on the line 39—39 of Fig. 34 illustrating the manner of securing the traverse carriage chain to the traverse carriage;

Fig. 40 is a fragmentary plan view of the traverse carriage on an enlarged scale disclosing the details of the projectile holding pawls and the associated actuating mechanism;

Figs. 41 and 42 are fragmentary sectional views taken on the lines 41—41 and 42—42 respectively of Fig. 40 showing further details of the projectile holding pawls and the associated actuating mechanism;

Fig. 43 is a fragmentary plan view of the traverse carriage on an enlarged scale showing the details of the empty case latch associated with the reciprocating tray and the linkage actuated by the latch for operating the empty case traverse carriage interlock valve;

Fig. 44 is a fragmentary sectional view partly broken away and taken on the line 44—44 of Fig. 43 disclosing further details of the empty case latch and the mechanism for releasing the same;

Fig. 45 is a fragmentary partly broken away view similar to that of Fig. 44 but showing the releasing mechanism associated with the latch in a position to release the latch;

Fig. 46 is a fragmentary sectional view taken on the line 46—46 of Fig. 44 disclosing further details of the empty case latch as well as its manner of mounting;

Fig. 47 is a view in side elevation of the rammer and rammer indicator taken on the line 47—47 of Fig. 22;

Fig. 48 is a sectional view taken on the line 48—48 of Fig. 47 showing the details of the rammer head.

Figure 9:
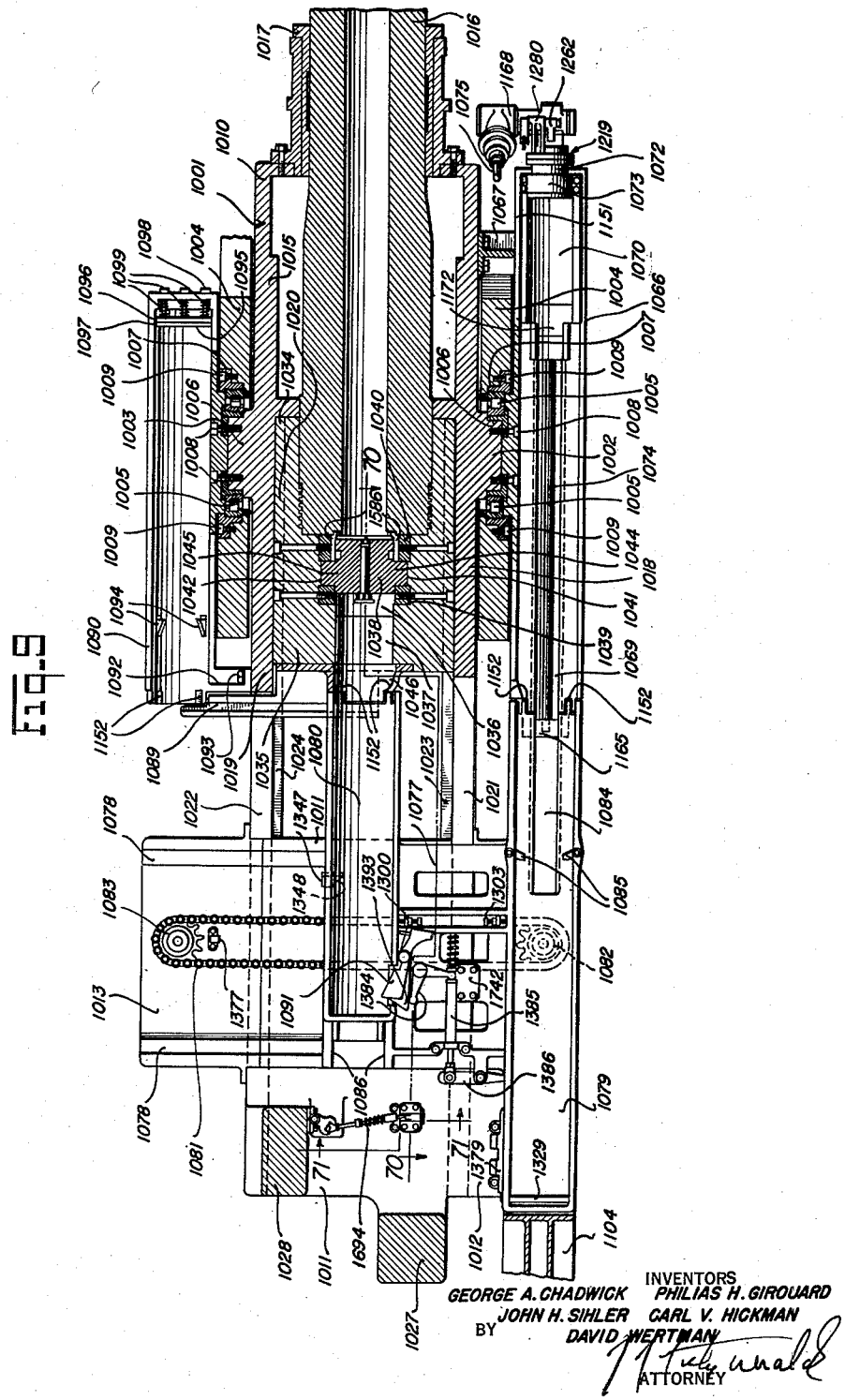
Fig. 9 is a plan view in section of the gun with the breech block in its closed position taken on the line 9—9 of Fig. 6.
Figure 70:
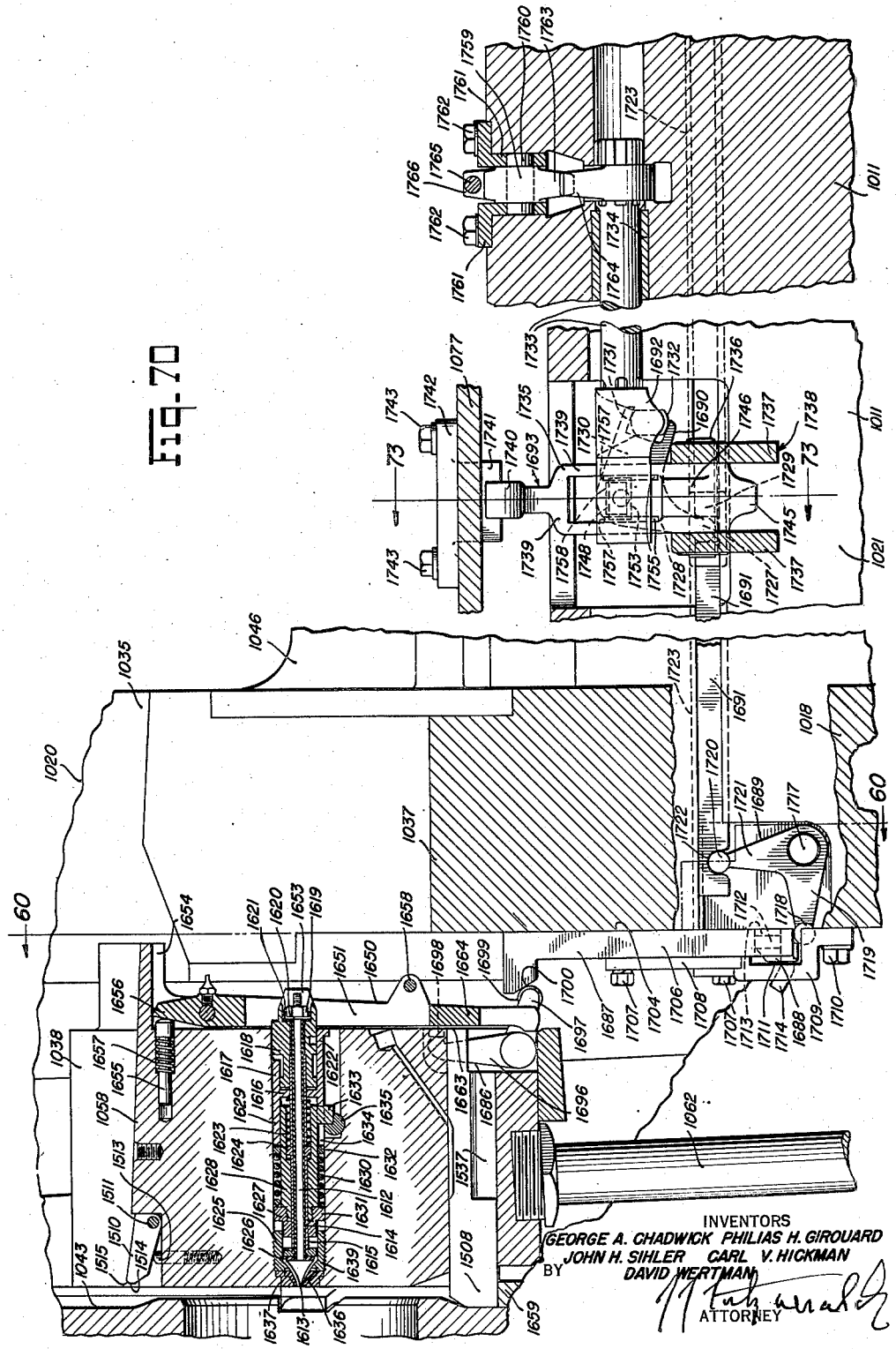
Figure 77:
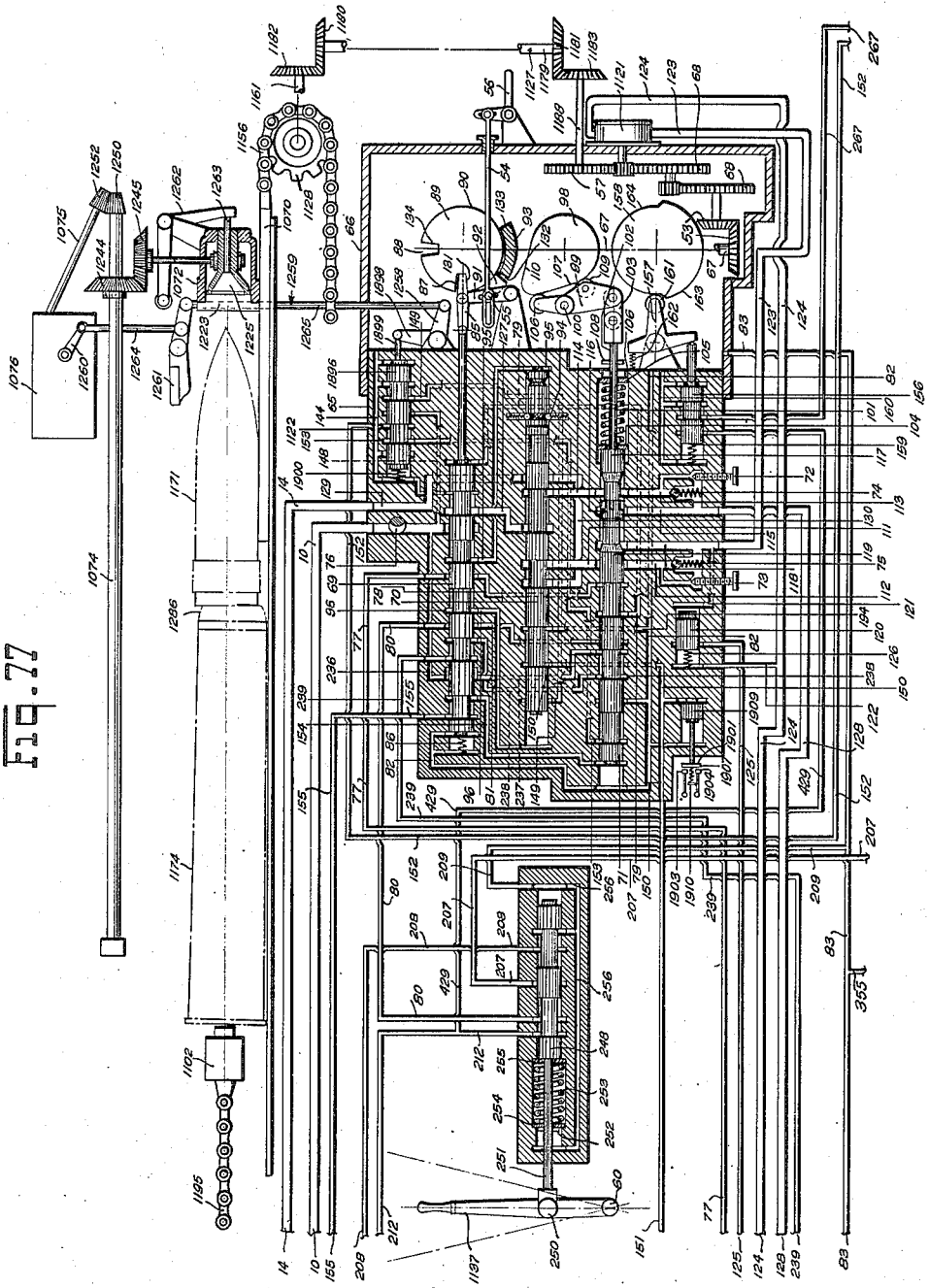

Fig. 49 is a sectional view taken on the line 49—49 of Fig. 47 disclosing details of the rammer housing and of the rammer indicator;

Fig. 50 is a sectional view taken on the line 50—50 of Fig. 47 showing the details of the common drive connection between the rammer and case ejector drive control unit and the sprockets of the rammer and case ejector housings;

Fig. 51 is a view in side elevation of the case ejector and of the manual drive connection for the rammer and case ejector taken on the line 51—51 of Fig. 22;

Fig. 52 is a fragmentary sectional view taken on the line 52—52 of Fig. 51 showing details of the case ejector head and housing;

Fig. 53 is a rear view in elevation of the case ejector and of the manual drive connection for the rammer and case ejector;

Fig. 54 is a partial sectional sectional view taken on the line 54—54 of Fig. 60 showing, among other things, certain details of the breech block and of the breech block operating mechanism;

Fig. 55 is a partial sectional view taken on the line 55—55 of Fig. 54 showing further details of the breech block and breech block operating mechanism;

Fig. 56 is a fragmentary view in side elevation of the breech block operating valve block and the valve resetting cylinder taken on the line 56—56 of Fig. 55;

Fig. 57 is a view in perspective of the projectile tray breech block interlock valve and the linkage for actuating the same;

Fig. 58 is a view in side elevation of the projectile tray breech block interlock valve and the linkage for actuating the same;

Fig. 59 is a plan view of the projectile tray breech block interlock valve and the linkage for actuating the same as seen from the under side of the gun;

Fig. 60 is a partial view in end elevation of the breech block and of the mechanical firing pin interlock mechanism taken on the pline 60—60 of Fig. 70;

Fig. 61 is a partial view in section taken on the line 61—61 of Fig. 60 showing details of the cam plate mounted on the breech block and of the lever arm adapted for cooperation therewith;

Fig. 62 is a diagrammatic perspective view showing, among other things, the breech block unlatching mechanism, the firing pin mechanism with its associated interlocks and the mechanism for shifting the valves of the breech operating valve block;

Figs. 63–65 are fragmentary sectional views taken on the center line of the gun housing showing the empty case extractors and breech block in various phases of operation;

Fig. 66 is a view on an enlarged scale of the breech block partly broken away to show the firing pin mechanism in its firing position together with certain details of its interlock;

Fig. 67 is a fragmentary sectional view taken on the line 67—67 of Fig. 66 showing the sear and safety latch in positions to release the cocking sleeve;

Fig. 68 is a view on an enlarged scale of the breech block partly broken away to show the firing pin mechanism in its cocked position together with certain details of its interlock;

Fig. 69 is a fragmentary sectional view taken on the line 69—69 of Fig. 68 showing the sear and safety latch in positions respectively to latch and lock the cocking sleeve;

Fig. 70 is a fragmentary broken sectional view taken on the line 70—70 of Fig. 9 showing certain details of construction of the carriage and rammer firing pin interlock mechanisms;

Fig. 71 is a fragmentary sectional view taken on the line 71—71 of Fig. 9 disclosing, among other things, certain details of the linkage which completes the firing pin and rammer interlock mechanism;

Fig. 72 is a plan view taken on the line 72—72 of Fig. 71 showing further details of the linkage which completes the firing pin and rammer interlock mechanism;

Fig. 73 is a view partly in section taken on the line 73—73 of Fig. 70 and partially broken away showing, among other things, the details of the trigger mechanism which completes the firing pin and traverse carriage interlock mechanism;

Fig. 74 is a detailed showing of a part of the hydraulic circuit including the power plant and the case stop drive unit;

Fig. 75 is an enlarged fragmentary view in elevation disclosing details of the mechanism for automatically actuating the pilot valve of the power plant;

Fig. 76 is a sectional view taken on the line 76—76 of Fig. 75 showing further details of the mechanism for automatically actuating the pilot valve of the power plant;

Fig. 77 is a detailed showing of a part of the hydraulic circuit including the projectile tray control valve and the projectile tray drive unit;

Fig. 78 is a detailed showing of another part of the hydraulic circuit including the traverse carriage and rammer control valves, the traverse carriage drive unit and the breech operating valve block;

Fig. 79 is a detailed showing of a still further part of the hydraulic circuit including the sliding joint assembly and the rammer and case ejector drive unit;

Fig. 80 is a perspective view of the control lever and linkage for operating the traverse carriage control valve and the rammer and case ejector control valve;

Fig. 81 is a fragmentary plan view of a part of the control lever linkage with the slotted guide plate omitted;

Fig. 82 is a fragmentary plan view of a part of the control lever linkage but with the slotted guide plate added;

Fig. 83 is a fragmentary view in side elevation of a part of the control lever linkage as seen from the right side of Fig. 82;

Fig. 84 is a detail of the linkage connecting the control lever with the traverse carriage control valve;

Fig. 85 illustrates diagrammatically the various positions of the control lever lug in the slotted guide plate corresponding to various positions of the control lever;

Fig. 86 is a detailed showing of portions of the hydraulic control circuits associated with the projectile tray control valve and the projectile tray drive control unit;

Fig. 87 is a detailed showing of portions of the hydraulic control circuits associated with the case stop drive control unit;

Fig. 88 is a detailed showing of portions of the hydraulic control circuits associated with the traverse carriage and rammer control valves and with the traverse carriage drive control unit;

Fig. 89 is a detailed showing of portions of the hydraulic control circuits associated with the valve resetting cylinder and with the rammer and case ejector drive control unit;

Fig. 90 shows the time cycle diagram for the normal cycle of operation of the gun starting with firing;

Figs. 91-96 show diagrammatically the loading of the first round of ammunition; and Figs. 97-101 the loading of a round of ammunition and the ejection of the empty cartridge case in a normal cycle of operation.

In view of the complex nature of the present invention there is incorporated at this point an outline which is followed in the detailed description of the gun. This outline not only indicates the sequence in which the descriptive matter is presented, but also makes possible a ready reference to any part of the descriptive matter when desired.

OUTLINE

| | Column |
|---|---|
| The basic gun structure and certain general features of construction | 11 |
| The loading and projectile trays | 16 |
| The projectile tray drive and control connections | 17 |
| The case stop and drive connections | 18 |
| The fuse setter and drive connections | 19 |
| The interlock A | 21 |
| The fuse setting indicator-regulator | 22 |
|     The setting mechanism | 23 |
|     The setting operation | 27 |
|     The regulating mechanism | 28 |
|     The regulating operation | 31 |
|     The combined setting and regulating operations | 32 |
| The movement of the ammunition into the traverse carriage | 33 |
| Traverse carriage mounting and drive connections | 34 |
| The ammunition receiving tray | 35 |
| The reciprocating tray | 37 |
| Interlock F | 38 |
| The rammer | 40 |
| The case ejector | 41 |
| The rammer and case ejector drive connections | 42 |
| The traverse carriage, rammer, and case ejector control connections | 42 |
| The movement of the ammunition from the firing position to the ramming position | 44 |
| The ramming of the ammunition and the ejection of the empty case | 45 |
| The retraction of the rammer and case ejector and the closing of the breech block | 46 |
| The breech block | 46 |
| The breech bolt and the breech block unlatching mechanism | 49 |
| The empty case extractors | 51 |
| Interlock C | 52 |
| The firing pin mechanism | 53 |
| The firing mechanism | 56 |
| Interlock K | 57 |
|     The carriage firing pin interlock mechanism | 58 |
|     The rammer firing pin interlock mechanism | 60 |
| The operation of the interlock K in the loading cycle | 61 |
| The power plant | 64 |
| The drive units | 67 |
| The projectile tray drive control unit | 68 |
|     The blocking valve | 68 |
|     The reversing valve | 70 |
|     The acceleration valve | 71 |
|     The pressure regulator | 74 |
| The operation of the projectile tray drive unit | 74 |
|     Rearward operation | 74 |
|     Forward operation | 75 |
|     The transient operation | 76 |
| The interlocks of the projectile tray drive control unit | 77 |
|     Interlock A | 77 |
|     Interlock L | 79 |
|     Interlock D | 80 |
|     Interlock E | 80 |
| The case stop drive control unit | 81 |
|     The blocking valve | 82 |
|     The reversing valve | 83 |
|     The acceleration valve | 83 |
|     The control selector valve | 86 |
|     The foot valve | 87 |
|     The case stop brake | 89 |
| The operation of the case stop drive unit | 90 |
|     Rearward operation of case stop and projectile tray | 90 |
|     Rearward operation of the case stop at high angles of elevation | 92 |
|     Forward operation of the case stop | 93 |
|     The absence of any transient operation | 93 |
| The projectile tray control valve | 94 |
|     The valve construction and control lever | 94 |
|     The rearward movement of the control lever | 95 |
|     The forward movement of the control lever | 96 |
| The traverse carriage drive control unit | 97 |
|     The blocking valve | 98 |
|     The reversing valve | 100 |
|     The acceleration valve | 101 |
|     The venting valve | 103 |
| The operation of the traverse carriage drive unit | 105 |
|     Movement of the traverse carriage to ramming position | 105 |
|     Movement of the traverse carriage to firing position | 105 |
|     The transient operation | 106 |
| The interlocks of the traverse carriage drive control unit | 107 |
|     Interlock B | 107 |
|     Interlock H | 108 |
|     Interlock I | 108 |
| The rammer and case ejector drive control unit | 109 |
|     The blocking valve | 109 |
|     The reversing valve | 110 |
|     The acceleration valve | 112 |
| The operation of the rammer and case ejector drive unit | 114 |
|     Forward operation | 114 |
|     Rearward operation | 115 |
|     The transient operation | 116 |
| The interlock of the rammer and case ejector drive control unit | 117 |
| The traverse carriage and rammer control valves | 117 |
|     The valve construction | 117 |
|     The lever and linkage for operating the two valves | 119 |
|     The normal upward movement of the control lever | 121 |
|     The normal downward movement of the control lever | 122 |
|     The operation of the control lever to release jammed ammunition | 123 |
|     Miscellaneous features of operation of the control lever | 123 |
| The breech block operating mechanism | 124 |
| The breech block operating cylinder assembly | 125 |
| The breech operating valve block and the valve resetting cylinder | 126 |
|     The valves B and C | 127 |
|     The valve D | 128 |
|     The valve resetting cylinder | 129 |
|     The valve A | 129 |
| The operation of the breech block mechanism to open the breech block | 131 |

| | Column |
|---|---|
| The operation of the breech block mechanism to close the breech block | 132 |
| The interlocks between the projectile tray, the breech block, and the traverse carriage | 133 |
| Interlock C | 133 |
| Interlock F | 134 |
| The control circuit sequence and the hydraulic interlocks | 134 |
| Circuit group A | 135 |
| Circuit group B | 135 |
| Circuit group C | 136 |
| The normal cycle of operation | 137 |
| Before firing | 137 |
| Breech block opening | 137 |
| Extraction | 137 |
| Registering the breech block | 137 |
| Extractor return | 137 |
| Loading ammunition | 137 |
| Moving ammunition into traverse carriage | 137 |
| Release of case stop and starting of fuse setting motor | 138 |
| Stopping of projectile tray and case stop | 138 |
| Withdrawing projectile tray and fuse setter from projectile | 138 |
| Moving traverse carriage to ramming position | 138 |
| Moving case stop forward | 138 |
| Ramming ammunition and ejecting empty case | 139 |
| Moving traverse carriage to firing position | 139 |
| Retraction of rammer and case ejector | 139 |
| Breech block closing | 139 |
| Breech block locking | 139 |
| Removing empty case | 139 |
| The preparation of the gun for firing | 139 |
| The time cycle | 139 |
| The movement of the ammunition and the empty cartridge case in the gun cycle | 141 |
| The loading of the first round of ammunition | 141 |
| The normal gun cycle | 142 |

THE BASIC GUN STRUCTURE AND CERTAIN GENERAL FEATURES OF CONSTRUCTION

Turning now to Figs. 1 to 11 of the drawings and particularly to Figs. 1 to 3 and 9 thereof, there is shown depicted therein a slide or cradle identified in general by the reference character 1001 supported by the trunnions 1002 and 1003 from the girders or deck lugs 1004 of the turret mounting. The trunnion support is effected through the usual roller bearings 1005, the inner and outer races of which are securely positioned by suitable retaining rings 1006 and 1007 affixed to the trunnions and girders in any convenient manner, as by the bolts 1008 and 1009 respectively. The slide or cradle 1001 includes five principal parts, the body member 1010, a center piece 1011, two side pieces 1012 and 1013 and a platform 1014 supported from the body member 1010 and center piece 1011.

The body member 1010, with which the normally positioned trunnions 1002 and 1003 are integral, includes a hollow forward portion 1015 of substantially rectangular configuration apertured to slidably receive the conventional gun barrel 1016 in the body supported bushing 1017 (Figs. 7 and 9); and a rearward portion including two lateral bifurcations 1018 and 1019 (Fig. 3) between which the housing 1020 (Fig. 9) is slidably supported during the recoil and counter-recoil of the gun. To the lower arms 1021 and 1022 of the bifurcations 1018 and 1019 respectively are secured keys 1023 and 1024 for slidably supporting the gun housing 1020 in its reciprocating movements. The bifurcation 1018 is so cut where its arms diverge as to provide ample clearance for the nose of the projectile when moving the same into a position of alignment with the breech of the gun.

Figure 1:
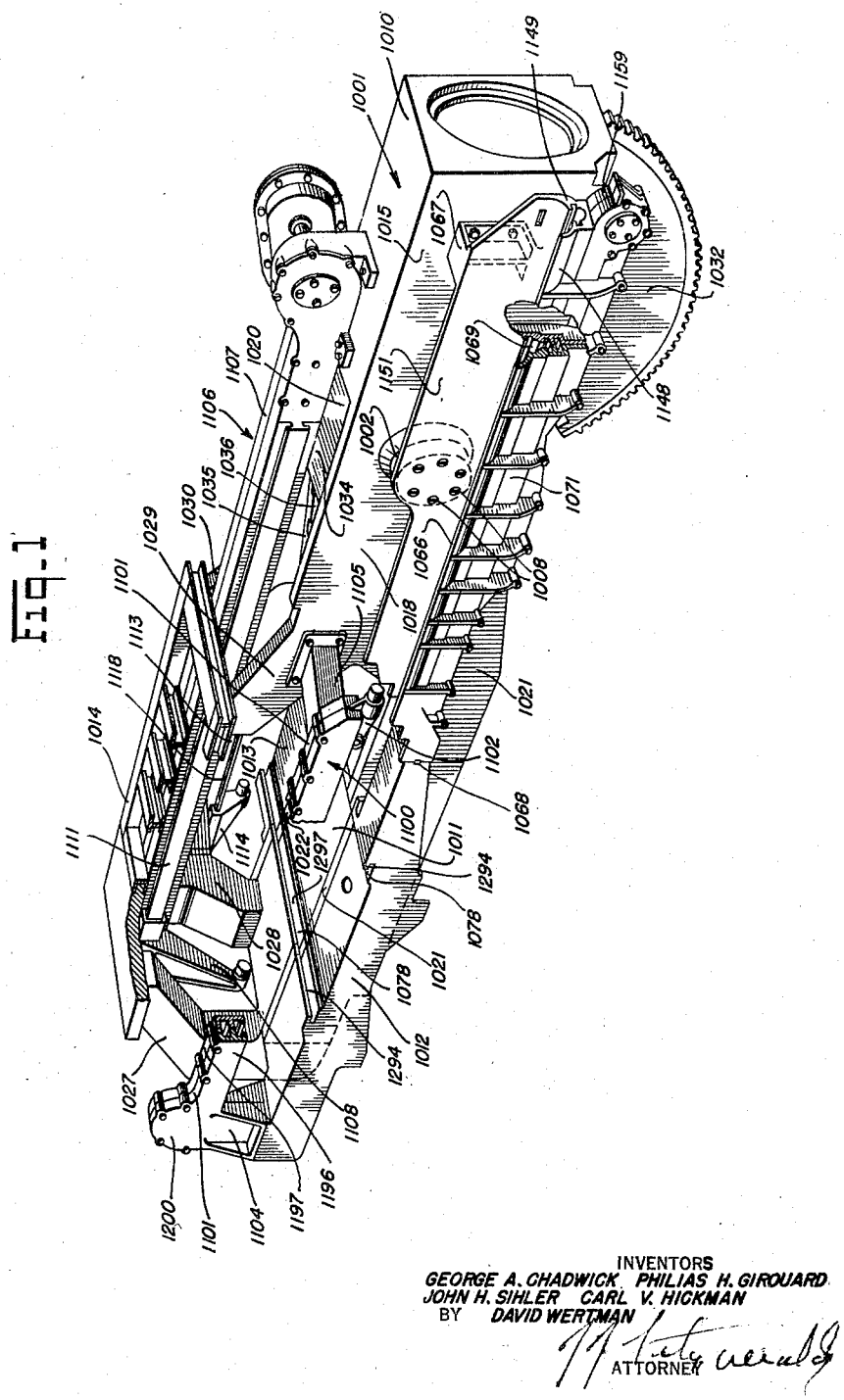
Fig. 1 is a view in perspective of the right side of the gun, with certain parts omitted, showing, among other things, the construction of the slide and the mounting of the loading tray, the case stop, the rammer and the case ejector relative to the slide.
Figure 2:
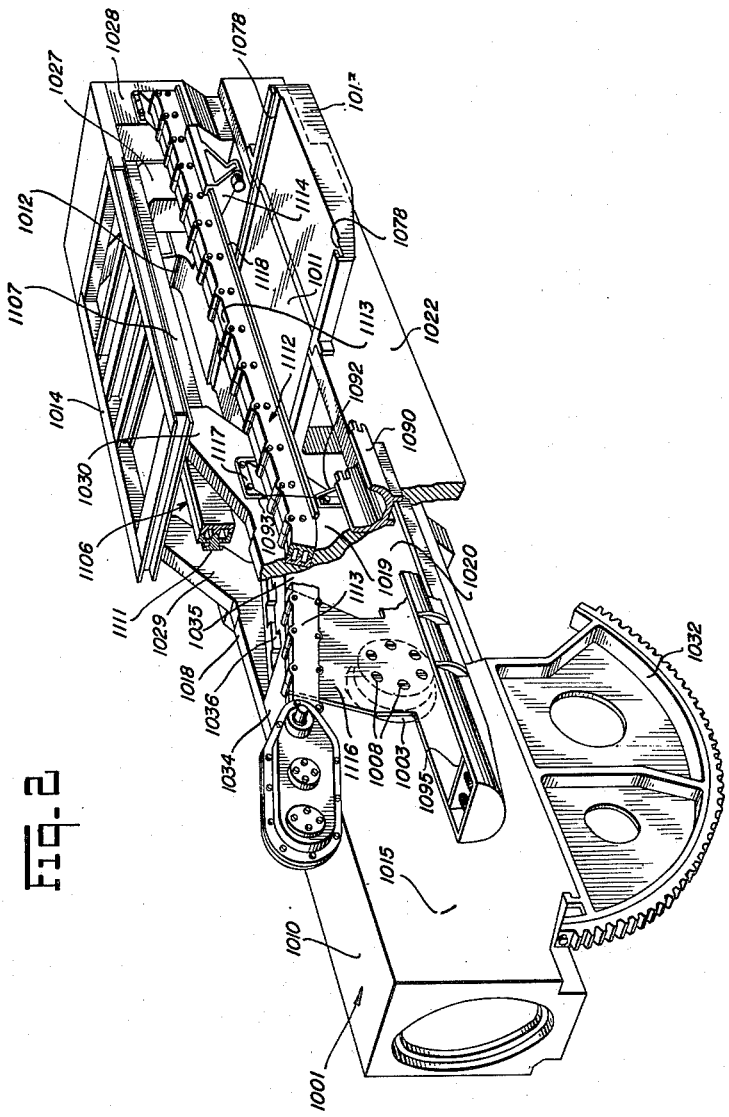
Fig. 2 is a view in perspective of the left side of the gun, with certain parts omitted, showing, among other things, the construction of the slide and the mounting of the empty case tray, the rammer and the case ejector relative to the slide.
Figure 7:
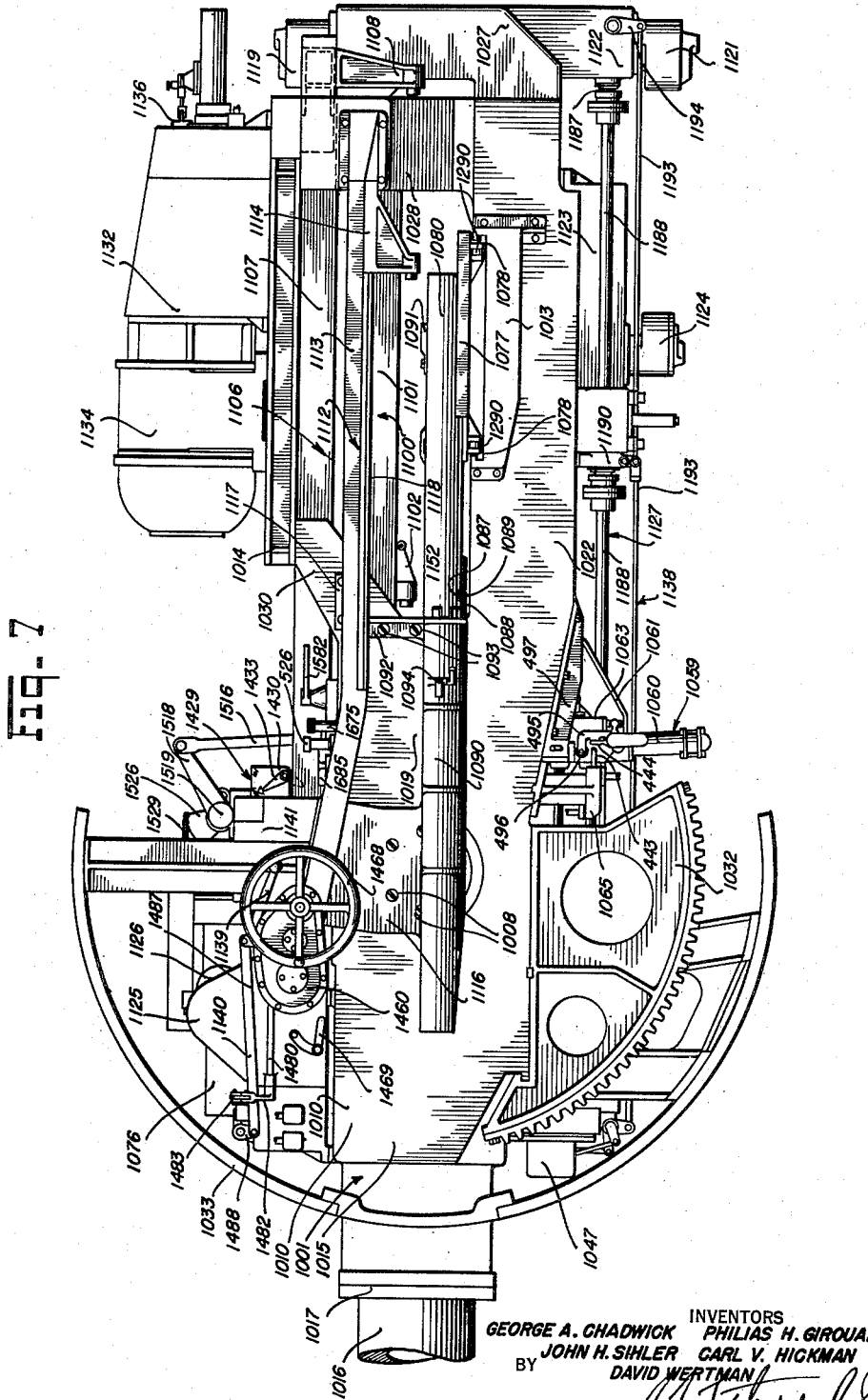
Fig. 7 is an elevational view of the left side of the gun of the present invention.

The center piece 1011 and the two side pieces 1012 and 1013 (Fig. 3) are fixedly secured to the lower bifurcation arms 1021 and 1022 in any suitable manner and are positioned to provide a proper clearance for the recoil of the gun housing 1020. The keys 1023 and 1024 also serve to support the center piece 1011 from the lower arms 1021 and 1022 of the bifurcations, while tongue-and-groove constructions 1025 and 1026 are conveniently employed for securing the side pieces 1012 and 1013 to the lower bifurcation arms 1021 and 1022 respectively in order that they may provide rigid lateral supports. Uprights 1027 and 1028 (Figs. 1, 2 and 9) integral with or otherwise secured to the center piece 1011 support one end of a substantially rectangular frame or platform 1014, the other end of which is supported from the upwardly extending arms 1029 and 1030 of the bifurcations 1018 and 1019 respectively. The frame 1014 may conveniently have cast into it one or more lead counterweights 1031 (Fig. 6) to assist in balancing the gun and its associated parts. A conventional elevating gear 1032. Figs. 2 and 7) is secured to the slide 1001; and a shield 1033 (Fig. 5) is mounted on the slide to cover the turret slot through which the gun barrel 1016 projects.

The gun housing 1020 (Figs. 3, 6 and 9) includes a forward portion 1034 in threaded engagement with the barrel 1016 and a rearwardly extending portion 1035 that is slotted transversely at 1036 (Fig. 3) and longitudinally at 1037 for receiving the breech block 1038 (Fig. 9), the ammunition and rammer. The gun barrel is of major caliber, which, purely by way of illustration, is taken as six inches. Guide strips 1039 and 1040 are secured in any convenient manner, as by bolts, to the walls of the vertical slot 1036 to provide grooves 1041 and 1042 inclined with respect to the breech face 1043 (Figs. 3 and 6) for receiving the lateral extensions 1044 and 1045 respectively of the breech block. Thus, a wedging action of the breech block 1038 is insured in its closing movement. An extension 1046 (Fig. 3) secured, as by bolts, to the rear portion 1035 of the gun housing forms a continuation of the arcuate longitudinal slot 1037 and locks the reciprocating tray of the transverse carriage to the housing 1020 in a manner to be pointed out hereinafter. The design and arrangement of the vertical and longitudinal housing slots 1036 and 1037 are such as to permit unimpeded movement of the rammer head and ammunition when loading the gun.

Figure 10:
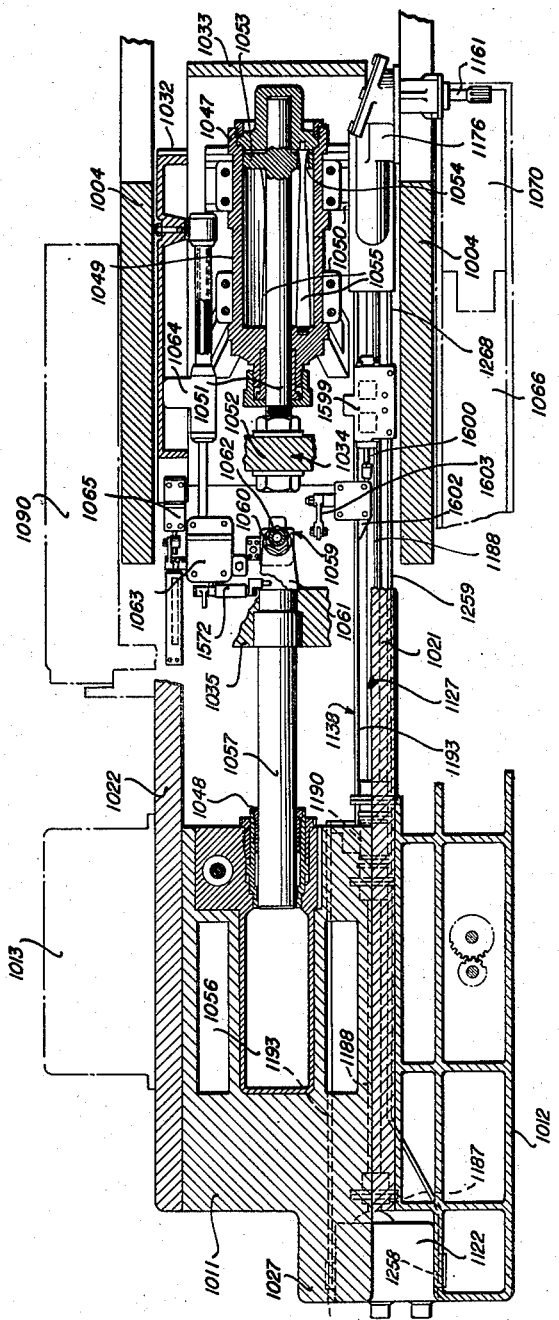
Fig. 10 is a plan view in section of the gun taken on the line 10—10 of Fig. 6 and showing, among other things, the construction of the recoil and counterrecoil mechanisms.

The recoil system is of conventional construction and includes the usual recoil and counter-recoil mechanisms 1047 and 1048. Thus as shown in Figs. 6 and 10 the recoil cylinder 1049 is securely mounted on the hollow forward portion 1015 of the gun slide by suitable brackets 1050 and has the free end of the piston rod 1051 bolted to a depending lug 1052 of the forward housing portion 1034. The energy of recoil is absorbed in the usual manner by the resistance the hydraulic fluid in the cylinder 1049 offers to movement of the piston 1053 as the liquid passes through the piston apertures 1054 under the control of the tapered valve rods 1055 secured to the cylinder 1049. The counter-recoil cylinder 1056 is securely mounted in the center piece 1011 of the gun slide and carries a charge of compressed air against which the piston 1057 secured to the housing portion 1035 acts in the recoil of the gun. The pressure of the compressed air charge is such as to return the gun to and maintain the same in battery at all angles of elevation.

The upper surface 1058 of the breech block 1038 (Fig. 6) is of arcuate contour and forms a continuation of the longitudinal housing slot 1037 when the breech block is in its loading position. A hydraulically actuated breech block operating mechanism is preferably provided for automatically opening and closing the breech block at the proper time. It is to be expressly understood, however, that any suitable mechanism may be employed for this purpose, whether hydraulically or otherwise actuated. The breech block operating mechanism is shown more particularly in Figs. 6, 7 and 10 as including the breech block operating cylinder assembly 1059, the cylinder 1060 of which is secured to the gun housing portion 1035 by the bracket 1061 and the piston rod 1062 of which is attached to the breech block 1038. A breech operating valve block 1063 (Figs. 10, 54, and 55), which serves as a control unit, is mounted on the housing portion 1035 for supplying hydraulic fluid to the cylinder 1060; and is in turn connected with the fixed hydraulic assemblies of the gun by the sliding joint assembly 1064 on the body member 1010 of the gun slide. A valve resetting cylinder 1065 also mounted on the body member 1010 of the gun slide operates to reset one of the valves in the breech operating valve block 1063 to initiate closing movement of the breech block.

The loading tray 1066 (Fig. 1) has a substantially semi-cylindrical configuration and is rigidly secured approximately midway of its length to the trunnion 1002 by the bolts 1008 (Fig. 9). Additional support for the tray 1066 is received through the bracket 1067 (Figs. 1 and 9) secured to the forward portion of the tray and bolted to the body member 1010 of the slide; and through the key 1068 (Figs. 1 and 5) interconnecting the rear portion of the tray 1066 with the side piece 1012. The loading tray 1066 is longitudinally slotted at 1069 (Figs. 1, 5 and 9) to slidably receive a projectile tray 1070 of approximately semi-cylindrical configuration which is driven by a chain and sprocket in the housing 1071 of the loading tray. The tray 1070 supports the projectile and aligns the same with the fuse setter 1072 mounted on the forward end of the projectile tray by the strap 1073 bolted thereto. A splined shaft 1074 (Figs. 5 and 9) supported by the loading tray 1066 imparts movement to the fuse setter 1072 and is driven through the connections 1075 from the fuse setting indicator-regulator 1076 securely attached to the hollow forward portion 1015 of the slide body member. It is to be understood, however, that the setting operation may be accomplished by any suitable mechanism independent of the fuse setting indicator-regulator; and that the regulating operation will then be carried out by the fuse setting indicator-regulator to the exclusion of any setting operation.

A traverse carriage 1077 (Figs. 5, 6, 7 and 9) is mounted on the tracks 1078 of the slide 1001 for traversing movement and supports two trays 1079 and 1080 of substantially semi-cylindrical configuration. A chain 1081 (Fig. 9) secured at its ends to the carriage 1077 and engaging the driving and driven sprockets 1082 and 1083 respectively on the side pieces 1012 and 1013 of the slide 1001 moves the traverse carriage from the firing position shown in Fig. 9 to the ramming position and vice versa. The tray 1079 is rigid with the carriage 1077 and receives the ammunition from the loading tray 1066 as the ammunition is moved to the rear by the projectile tray 1070. A slot 1084 (Fig. 9) in the ammunition receiving tray 1079 allows the projectile tray 1070 to enter; and projectile holding pawls 1085 prevent the forward movement of the projectile through engagement with the rotating band of the projectile as the projectile tray 1070 is withdrawn. Mechanism to be detailed hereinafter actuates the pawls 1085 to release the projectile when the carriage 1077 reaches the ramming position.

The other carriage tray 1080 receives the empty cartridge case ejected from the gun and is mounted in the guide channels 1086 of the carriage 1077 for reciprocation with the gun housing 1020 during the recoil and counter-recoil. A tongue-and-groove construction 1087 (Figs. 6 and 7) of the reciprocating tray 1080 engages a corresponding construction 1088 (Figs. 3 and 6) of the housing extension 1046 to form a sliding interlocking joint for insuring reciprocation of the tray 1080 with the housing 1020. The tongue-and-groove construction 1088 of the housing extension 1046 extends laterally as an arm 1089 to the empty case tray 1090 (Figs. 3 and 9) so that the reciprocating tray 1080 may be brought into terminal engagement with the empty case tray 1090 when the traverse carriage 1077 is moved to the ramming position. A latch 1091 is mounted on the reciprocating tray 1080 for locking the ejected cartridge case in the tray and is retracted from its latching position by mechanism to be detailed hereinafter when the carriage 1077 reaches the ramming position.

The empty case tray 1090 (Figs. 2 and 7–9) has a substantially semi-cylindrical configuration and is rigidly secured approximately midway of its length to the remaining trunnion 1003 by the bolts 1008. Additional support for the tray is provided by the bracket 1092 secured to the tray and bolted to the slide bifurcation 1019 at 1093. A pair of spring biased latches 1094 projects through slots in the tray to hold any empty case ejected into the tray until it is removed by the operator. A buffer 1095 (Fig. 9) including a base 1096 provided with a layer 1097 of resilient material is slidably mounted in the end of the tray 1090 by the stud bolts 1098 to compress the springs 1099 and thus absorb the kinetic energy of the ejected cartridge case. From the foregoing description it should be clear that all trays tilt with the gun slide through all of its angles of elevation; and that the loading and empty case trays 1066 and 1090, by reason of their securement to the trunnions, are at all times accessible to the two operators who are positioned on opposite sides of the gun adjacent the trunnion axis.

The case stop 1100 includes a housing 1101 (Figs. 1, 4 and 5) in which there is slidably mounted a case stop head 1102 secured to a chain driven by a sprocket wheel 1103. The housing 1101 is aligned with the loading tray 1066 and is rigidly secured at one end to the side piece 1012 of the slide by an upright portion 1104 integral with the housing 1101. The forward end of the housing 1101 is bolted to the slide bifurcation 1018 by the bracket 1105. The case stop head 1102 supports the weight of the ammunition through engagement with the cartridge case and is pushed to the rear by the projectile tray 1070. The ammunition is thus held firmly between the case stop head 1102 and the fuse setter 1072 of the projectile tray in its rearward movement to permit setting of the fuse.

The rammer 1106 includes a housing 1107 (Figs. 1, 2, 4 and 6) in which there is slidably mounted a rammer head 1108 secured to a chain driven by a sprocket wheel 1109. The housing 1107 is rigidly bolted at its rear end to the upright 1028 integral with the slide center piece 1011 and at its forward end to the hollow forward portion 1015 of the slide body member 1010. Intermediate support for the rammer housing 1107 is preferably provided by brackets 1110 (Fig. 22) bolted to the slide platform 1014. The rammer housing 1107 is not aligned with the breech of the gun so as to make the ammunition in the ammunition receiving tray 1079 readily accessible in the event access thereto is desired because of a jam during the ramming operation. Since, however, the terminal portion of the rammer head 1108 is aligned with the breach of the gun additional support is provided for the head by the lateral guide 1111 integral with the rammer housing 1107.

The case ejector 1112 includes a housing 1113 (Figs. 1, 2, 4 and 6) in which there is slidably mounted a case ejector head 1114 secured to a chain driven by a sprocket wheel 1115. The housing 1113 is also rigidly bolted at its rear end to the upright 1028 integral with the slide center piece 1011; but at its forward end is bolted to an extension 1116 of the empty case tray 1090 to receive support from the trunnion 1003. Intermediate support for the ejector housing 1113 is provided by the bracket 1117 extending therefrom and bolted to the slide bifurcation 1019. The case ejector housing 1113 is not aligned with the empty case tray 1090 but is mounted in close proximity to the slide 1001 so that the empty cartridge case may be removed from the empty case tray without difficulty. The terminal portion of the ejector head 1114, however, being aligned with the empty case tray 1090 receives additional support from the lateral guides 1118 integral with the ejector housing 1113.

Separate hydraulic drive units are provided for the projectile tray 1070, the case stop 1100 and the traverse carriage 1077 while a single hydraulic unit preferably provides a joint drive for the rammer 1106 and case ejector 1112. Each drive unit includes a hydraulic motor and a drive control unit from which the motor is supported. The case stop motor 1119 and its drive control unit 1120 as well as the projectile tray motor 1121 and its drive control unit 1122 (Figs. 4, 5, 7 and 8) are mounted at the rear end of the slide 1001. To facilitate the mounting of these units and the reduction of piping therebetween the case stop drive control unit 1120 and the projectile tray drive control unit 1122 are fashioned as an integral structure which is keyed and securely bolted to the slide center piece 1011 and its upright 1027 as clearly shown in Fig. 8. The traverse carriage drive control unit 1123 with its motor 1124 is bolted or otherwise secured to the side piece 1012 (Figs. 5 and 8) of the slide, while the joint rammer and case ejector drive control unit 1125 with its motor 1126 (Figs. 4, 6 and 7) is securely mounted on the hollow forward portion 1015 of the slide body member 1010.

Figure 4:
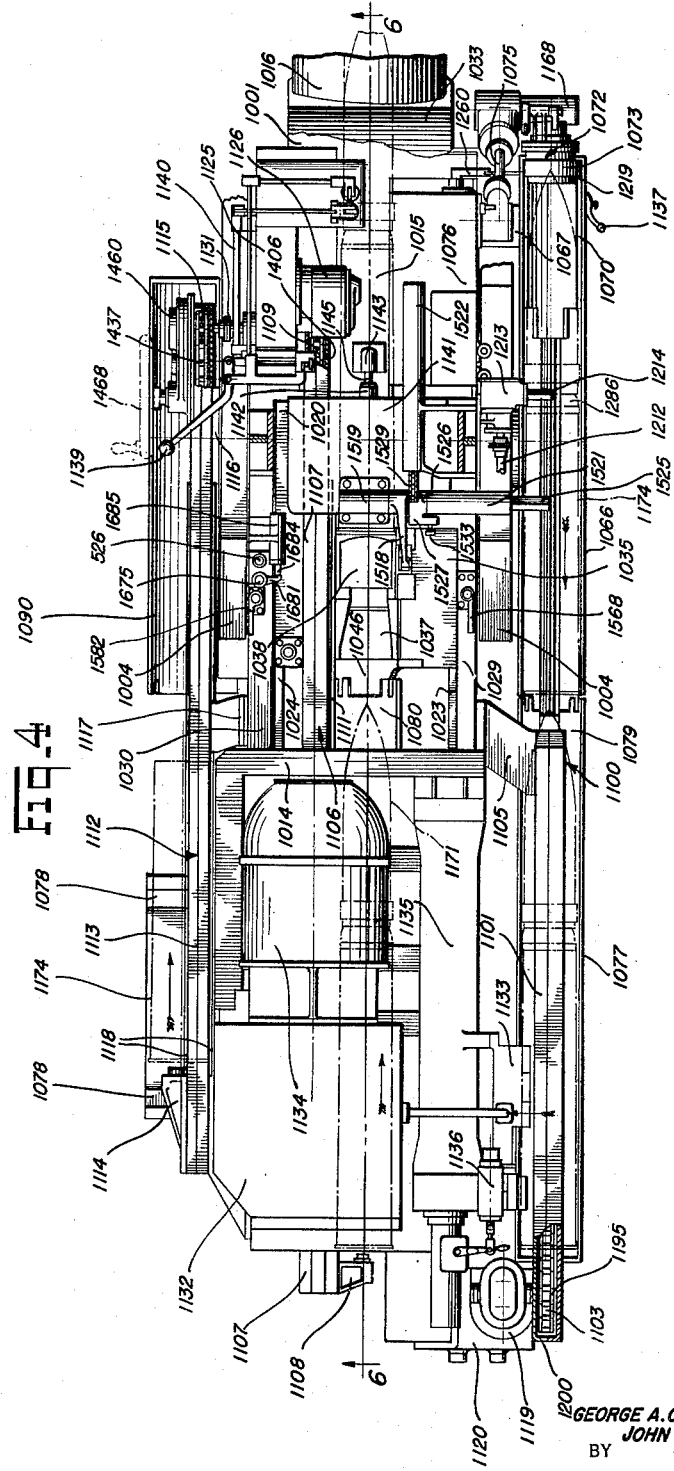
Fig. 4 is a plan view of the gun of the present invention.
Figure 8:
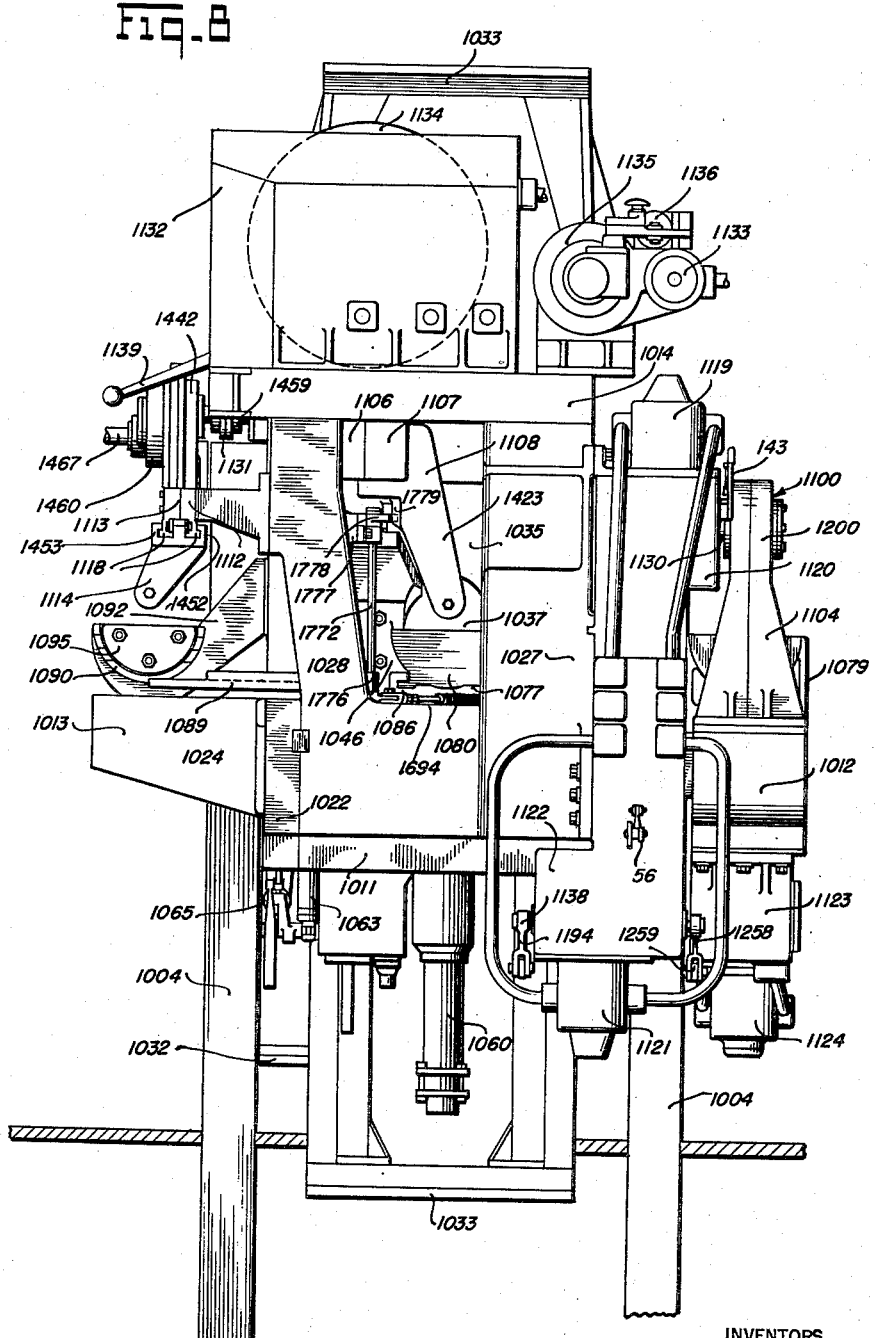
Fig. 8 is a rear elevational view of the gun of the present invention.

The sprockets in the various chain housings and the sprocket 1082 associated with the traverse carriage are driven from their respective drive control units through mechanical drive connections to be detailed hereinafter. As indicated generally in the drawings, a drive connection 1127 (Figs. 5, 7 and 10) interconnects the projectile tray drive control unit 1122 with the sprocket wheel 1128 (Fig. 5) in the housing 1071 of the loading tray 1066 so that the desired movement may be imparted to the projectile tray 1070, while a drive connection 1129 (Fig. 5) interconnects the traverse carriage drive control unit 1123 with the drive sprocket 1082. The drive connection between the case stop drive control unit 1120 and the sprocket 1103 (Fig. 5) in the case stop housing 1101 is identified in general by the reference character 1130 (Fig. 8). The sprockets 1109 and 1115 of the rammer and case ejector housings 1107 and 1113 are driven from the rammer and case ejector drive control unit 1125 through a common drive connection identified in general by the reference character 1131 (Fig. 4).

A single power plant or source of hydraulic energy (Figs. 4 to 8) in the embodiment shown is securely mounted on the slide platform 1014 for supplying the necessary hydraulic energy to the various drive units and the breech block operating mechanism. It is to be understood, however, that the power plant may optionally be removed from the gun and mounted instead in any suitable place in the turret, flexible connections intermediate the power plant and the hydraulic units of the gun being then employed for supplying the necessary hydraulic energy while yet permitting elevation of the gun to all angles essential to anti-aircraft fire. The power plant includes a supply tank 1132 from which a suitable hydraulic fluid medium is pumped into a manifold 1133 connected therewith. This is accomplished through a pump housed within the tank 1132 driven by the electric motor 1134. The manifold 1133 connects with an accumulator 1135 for storing hydraulic energy, the charging of which is controlled by the pilot valve 1136. As will be pointed out more in detail hereinafter, suitable piping extends from the manifold 1133 of the power plant to the various drive control units 1120, 1122, 1123 and 1125 and to the sliding joint assembly 1064 connected with the breech operating valve block 1063 in order to insure a supply of the necessary hydraulic energy.

A projectile tray control lever 1137 (Figs. 4, 5 and 11) is pivotally supported from the forward portion of the slide at one side of the gun and controls the movement of the projectile tray 1070 and the case stop 1100. To the accomplishment of this end the control lever is connected by a suitable linkage 1138 (Figs. 5, 7, 10 and 11) to be detailed hereinafter with the projectile tray control valve which is conveniently incorporated in the projectile tray drive control unit 1122. A traverse carriage and rammer control lever 1139 (Figs. 4, 7 and 11) is mounted on the rammer and case ejector drive control unit 1125 and is accessible from the other side of the gun. This lever controls the movements of the traverse carriage 1077, the case stop 1100, the rammer 1106, the empty case ejector 1112 and the breech block 1038. In order that this control may be accomplished the traverse carriage and rammer control lever 1139 is connected by a linkage 1140 to be subsequently detailed to the traverse carriage control valve and the rammer and case ejector control valve incorporated in the rammer and case ejector drive control unit 1125.

A counterweight 1141 (Figs. 4, 5 and 6) is secured to the gun housing 1020 to provide a suitable balancing moment for the moving parts of the recoil and counter-recoil mechanisms 1047 and 1048 (Fig. 10) and for certain parts of the gun housing 1020 during recoil and counterrecoil. In order to lock the gun in battery when it is not in use a rod 1142 (Fig. 6) is conveniently threaded at one end into a socket 1143 integral with the body member 1010 of the slide and extends through the counterweight 1141 of the gun housing for threaded engagement at its other end with one or more retaining nuts 1144 which are adapted when threaded on the rod to contact the counter weight. The rod 1142 is purposely made of reduced cross section at 1145 so that the rod may fracture at this point if the gun is inadvertently fired without first removing the nuts 1144. Guards, one of which is shown at 1146 (Fig. 6), extend from the slide platform 1014 in juxtaposed relation to the traverse carriage 1077 to prevent the accidental removal of the ammunition or the empty cartridge case from their respective trays.

THE LOADING AND PROJECTILE TRAYS

Turning now to Figs. 12 to 18 of the drawings and particularly to Fig. 12 thereof, the loading tray 1066 is shown as fashioned of two substantially similar complementary ribbed members 1148 and 1149 bolted or otherwise secured together to form a construction of approximately semi-cylindrical configuration for receiving the cartridge case and slidably supporting the projectile tray 1070. The ribs 1150 impart the necessary strength and rigidity to the loading tray, while the vertical guard or extension 1151 integral with the ribbed member 1149 not only provides a securing means for the tray, but also facilitates the loading of the ammunition and protects the gun parts. The ammunition receiving tray 1079 (Figs. 9 and 20) of the traverse carriage 1077 is aligned with and forms a continuation of the loading tray 1066 when the traverse carriage is in the firing position. In order that continuity between the two trays 1066 and 1079 may be established and thus permit movement of the ammunition from the loading tray 1066 to the ammunition receiving tray 1079, the trays are provided at their terminal portions with a slidable tongue-and-groove construction 1152 (Fig. 20).

The complementary tray members 1148 and 1149 (Figs. 12 and 14) are cut to provide a longitudinal slot 1069 for allowing the passage of the lower central portion 1153 of the projectile tray 1070 and are recessed to provide guide channels 1154 which slidably receive the shoulders or lateral projections 1155 of the projectile tray. The shoulders 1155 are integral with the central projectile tray portion 1153 and extend substantially the full length of the projectile tray 1070 so as to provide the requisite bearing surfaces and a secure interlocking engagement between the two trays 1066 and 1070. The housing 1071 for the projectile tray chain 1156 and sprocket 1128 is preferably made integral with the loading tray 1066 and is formed by further recessing the complementary members 1148 and 1149 to provide guide channels 1157 and 1158 for the chain and a casing 1159 for the sprocket. The sprocket 1128 (Fig. 19) is supported by suitable roller bearings 1160 in the casing 1159 and is splined to the shaft 1161.

The rollers 1162 of the chain 1156 engage vertical and horizontal surfaces of the guide channels 1157 and 1158; and these channels as well as the projectile tray guide channels 1154 extend substantially the full length of the loading tray 1066. A lug 1163 integral with or otherwise secured to the forward end of the projectile tray portion 1153 is connected in any suitable manner with an end of the chain 1156. This chain connection is made possible by further recessing the complementary members 1148 and 1149 to provide a longitudinal slot 1164 extending between and merging with the guide channels 1154 and 1157. The slot 1164 has a shape conforming to that of the lug 1163 and allows the lug to project freely from the central tray portion 1153 into the upper guide channel 1157 for connection with the chain 1156.

The splined shaft 1074 for imparting movement to the fuse setter 1072 of the projectile tray 1070 is disposed substantially between the projectile tray guide channels 1154 and extends longitudinally of the loading tray 1066 for approximately the entire tray length. The shaft 1074 is supported at the rear end of the loading tray 1066 by a suitable bearing 1165 (Figs. 12 and 13) secured in any convenient manner in the upper guide channel 1157; and at the forward end of the loading tray is supported by suitable bearings 1166 and 1167 (Figs. 12 and 16) in a gear box 1168 bolted or otherwise affixed to the sprocket casing 1159. The manner in which the splined shaft 1074 imparts movement to the fuse setter 1072 of the projectile tray 1070 will be pointed out hereinafter. In order to permit setting of the fuse, however, during the rearward movement of the projectile tray, the central tray portion 1153 is provided with an arcuate recess 1169 for the shaft 1074 and its bearing 1165; and the lug 1163 secured thereto is apertured at 1170 to freely accommodate and permit rotation of the splined shaft 1074.

The projectile tray 1070 has a substantially semi-cylindrical configuration and a diameter which approximates that of the projectile 1171. This insures that the fixed fuse pin of the projectile will be maintained in a substantially vertical position after having been so loaded into the projectile tray until it is engaged by the fuse setter 1072. The wall of the projectile tray 1070 is cut away on both sides at its rear end to provide an extension 1172 (Figs. 12, 13 and 15). By cutting the wall away in this fashion it is possible for the projectile holding pawls 1085 (Fig. 9) to engage the rotating band 1173 of the projectile as the projectile tray 1070 enters the ammunition receiving tray 1079 of the traverse carriage to deposit the projectile 1171 and the cartridge case 1174. The ammunition supported at its rear by the case stop head 1102 does not move during the initial travel of the projectile tray 1070 because of the clearance between the projectile nose and the fuse setter 1072. In order to prevent damage to the rotating band 1173 as the projectile tray 1070 slides under the projectile 1171 in its initial movement, the tray extension 1172 (Figs. 12 and 15) is cut away at 1175 to provide a clearance that does not permit the projectile tray to engage the rotating band.

THE PROJECTILE TRAY DRIVE AND CONTROL CONNECTIONS

In Figs. 13 and 19 to 21 are shown the details of the drive connection 1127 which interconnects the projectile tray sprocket 1128 in the housing 1071 of the loading tray with the projectile tray drive control unit 1122 so that the desired movement may be imparted to the projectile tray 1070. As clearly indicated in Figs. 13 and 19, a gear housing 1176 is bolted or otherwise connected to the hollow forward portion 1015 of the gun slide and has rotatably mounted therein on suitable bearings 1177 and 1178 a shaft 1179 to the ends of which bevel gears 1180 and 1181 are secured. The bevel gear 1180 meshes with the bevel gear 1182 on the sprocket shaft 1161 while the remaining bevel gear 1181 meshes with the bevel gear 1183 on the shaft 1184. Suitable bearings 1185 and 1186 support the upper and lower shafts 1161 and 1184 respectively in the gear housing 1176. The lower shaft 1184 of the gear housing is connected to the output shaft 1187 (Figs. 20 and 21) of the projectile tray drive control unit 1122 by the drive shaft 1188 comprised of a number of sections interconnected by conventional flexible couplings 1189. These couplings compensate for any misalignment that may exist between the output shaft 1187 and the lower shaft 1184 of the gear housing. A bearing 1190 mounted on the slide provides intermediate support for the drive shaft 1188.

Figure 5:
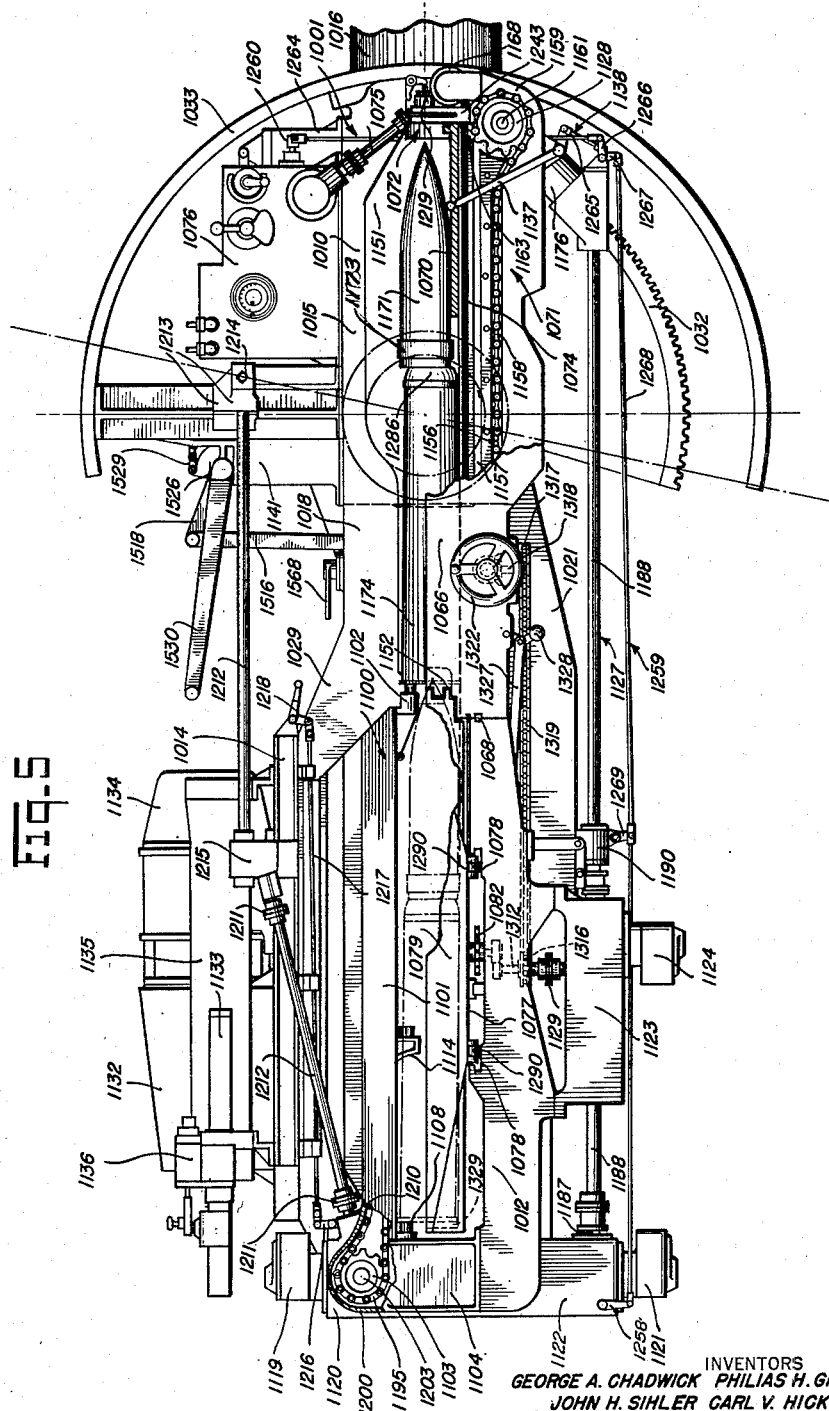
Fig. 5 is an elevational view of the right side of the gun of the present invention.

The projectile tray control lever 1137, as shown in Figs. 5, 11 and 13, is pivotally mounted on the tray housing 1071 and a gear housing 1176 in any suitable manner and is connected by the linkage 1138 to the projectile tray control valve in the projectile tray drive control unit 1122. This linkage includes a bell crank 1191 (Figs. 11 and 13) pivotally mounted on the housing 1176, one arm of which is connected by link 1192 to the control lever 1137 and the other arm of which is connected by a sectionalized rod 1193 (Figs 7 and 21) to a lever 1194 which directly actuates the projectile tray control valve in the projectile tray drive control unit 1122. The two sections of the control rod 1193 are supported in any convenient manner at their adjacent ends from the bearing 1190, the support being of a well known construction that permits movement of one of the rod sections to be transmitted to the other. By this arrangement the desired movement may be imparted to the projectile tray control valve, the details of which will be set forth hereinafter.

In case of power failure or failure of the hydraulic equipment, it will be necessary to move the projectile tray 1070 to its forward position in order to permit the loading of ammunition and the manual operation of the other units of the gun. While any convenient auxiliary mechanism may be provided for moving the projectile tray forward manually, this is accomplished in the embodiment shown by pushing and/or pulling directly on the projectile tray and fuse setter.

Before it becomes possible to operate the projectile tray manually, however, it is first necessary to release the projectile tray drive detent to be detailed hereinafter. This detent is incorporated in the projectile tray drive control unit 1122 and is operated by the lever 56 of the detent release (Fig. 8). The detent release unlocks the projectile tray from its rear position and is operated only during manual operation of the projectile tray.

THE CASE STOP AND DRIVE CONNECTIONS

The details of the case stop 1100 are shown in Figs. 20, 22 and 23. As there indicated, the case stop includes the housing 1101 in which there is slidably mounted the case stop head 1102 secured to the chain 1195 driven by the sprocket wheel 1103. The housing 1101 is shown by way of illustration as formed of two substantially complementary members 1196 and 1197 bolted together and recessed to provide guide channels 1198 and 1199 for the chain and a casing 1200 for the sprocket. The rollers 1201 of the chain 1195 engage vertical and horizontal surfaces of the guide channels 1198 and 1199, while the sprocket 1103 is supported by suitable roller bearings 1202 in the casing 1200 and is splined to the shaft 1203. The lower guide channel 1198 is slotted at 1204 for substantially its entire length to slidably receive the case stop head 1102 which is connected with one end of the chain in any suitable manner.

The case stop head 1102 (Fig. 20) is shown fashioned as a plate 1205 which projects from the guide channel 1198 to the housing exterior and has integral therewith a socket 1206 in which there is securely mounted a resilient buffer 1207 for engaging the cartridge case 1174. Rollers 1208 and 1209 secured to the plate 1205 in any convenient manner engage interior and exterior horizontal surfaces respectively of the lower guide channel 1198 so as to provide a counter-moment to balance that exerted by the case stop head through engagement with the ammunition. The drive connection 1130 between the case stop drive control unit 1120 and the sprocket wheel 1103 is comprised essentially of the output shaft 1203 splined to the sprocket as clearly indicated in Figs. 20 and 23. As previously noted, the case stop head 1102 supports the weight of the ammunition and is pushed to the rear by the projectile tray 1070.

In addition to the output shaft 1203, the case stop drive control unit 1120 is provided with a manual drive shaft 1210 (Figs. 5, 20 and 23) for manual operation of the case stop. The manual drive shaft 1210 is connected with the output shaft 1203 of the case stop drive control unit and thus rotates during normal hydraulic operation of the case stop. A flexible coupling 1211 and a sectionalized shaft 1212 (Fig. 5) interconnects the manual drive shaft 1210 with a gear box 1213 (Figs. 4 and 5) mounted on the hollow forward portion 1015 of the slide body member. The gear box 1213 is readily accessible to the loading operator and is provided with a splined shaft 1214 to which a handwheel may be secured. A gear box 1215 secured to the slide platform 1014 supports adjacent ends of the shaft sections 1212. By this arrangement it is possible to operate the case stop manually in the event of power failure or failure of the hydraulic equipment.

Before it becomes possible to operate the case stop manually, however, it is first necessary to release the case stop drive detent to be detailed hereinafter. This detent is incorporated in the case stop drive control unit 1120 and is operated by the lever 1216 (Figs. 5 and 23) of the detent release. In order that this lever may be conveniently operated it is connected by a shaft 1217 to the manually operated bell crank 1218, both of which are supported from the slide platform 1014 in any suitable manner. The detent release described above releases the case stop from its locked position and is operated only during manual operation of the case stop.

THE FUSE SETTER AND DRIVE CONNECTIONS

The function of the fuse setter 1072 is to provide a continuous supply of projectiles with their fuses set ready for loading into the gun. As shown more particularly in Figs. 16 to 18, 27 and in part in Fig. 33, the fuse setter 1072 includes a housing 1219 provided with a circumferential recess 1220 which engages complementary projections 1221 and 1222 on the projectile tray 1070 and strap 1073 respectively for mounting the housing rigidly on the forward end of the projectile tray. The housing 1219 supports a fuse setter socket 1223 which is comprised of a fixed annular member 1224 and a rotatable substantially conically shaped member 1225 for receiving the projectile nose, the fuse of which is to be set. The fixed socket member 1224 is bolted or otherwise secured to the housing 1219 at 1226, while the conically shaped socket member 1225 is rotatably supported in the housing by suitable bearings 1227 and 1228. A nut 1229 is conveniently employed for maintaining a splined gear 1230 and the inner race of the bearing 1228 in place on the rotating socket member 1225.

The fixed socket member 1224 is provided with a triangular bevel 1231 (Figs. 16, 17 and 27) which terminates in a slot 1232 adapted to receive the fixed fuse pin 1233. The triangular bevel 1231 permits a slight displacement of the fixed fuse pin 1233 from the vertical when loading the projectile 1171 into the projectile tray, yet insures that the fixed fuse pin will be vertically aligned when the projectile nose is properly seated in the socket 1223. As clearly shown in Figs. 16, 18, 27 and 33, a time ring pawl 1234 and lug 1235 are secured to the movable socket member 1225. The function of the pawl 1234 and lug 1235 is to rotate the conventional fuse time ring 1236 by engaging between their terminal surfaces (Fig. 30) the fuse pin 1237 integral with the time ring 1236. The lug 1235 (Fig. 18) is shown secured to the movable socket member 1225 by pin 1238, while the pawl 1234 pivotally mounted on the movable socket at 1239 is normally urged inwardly of the socket by the compression spring 1240. The pawl 1234 and lug 1235 are provided with beveled surfaces 1241 and 1242 respectively so that the projectile nose may properly seat in the socket 1223 before commencing the fuse setting operation.

In order that the fuse may be set while moving the ammunition from the loading tray 1066 into the ammunition receiving tray 1079 of the traverse carriage, the fuse setter housing 1219 is provided with a depending portion 1243 (Figs. 13 and 16) in which is enclosed suitable gearing for driving the gear 1230 of the rotatable socket member 1225 from the splined shaft 1074. The depending housing portion 1243 is so shaped that it may move freely between the guide channels 1154 (Fig. 14) of the loading tray and lengthwise of the splined shaft 1074. As shown more clearly in Fig. 16, a gear 1244 is mounted in suitable bearings of the housing portion 1243 and is splined to the shaft 1074 in all positions of the projectile tray. The gear 1244 in turn drives the socket gear 1230 through an intermediate gear 1245 of the housing portion, thus imparting the desired rotation to the movable socket member 1225.

The splined shaft 1074 is driven through the connections 1075 (Fig. 15) from the fuse setting indicator-regulator 1076 on the slide portion 1015. As clearly indicated in Figs. 15, 16 and 19, the gear box or housing 1168 has mounted therein in suitable bearings 1246 and 1247 a shaft 1248, to one end of which there is secured a worm 1249 and to the other end of which there is fixed the bevel gear 1250. The worm 1249 meshes with a worm gear 1251 on the splined shaft 1074 and the bevel gear 1250 meshes with the bevel gear 1252 fixed to the shaft 1253 which is driven through the bevel gears 1254 and 1255 (Fig. 13) of the fuse setting indicator-regulator. By this arrangement the fuse setting indicator-regulator at the proper time will operate to rotate the movable socket member 1225 of the fuse setter through one complete revolution to set the fuse time ring 1236 to the desired position. This setting of the fuse is normally accomplished while the projectile tray is moving to the rear to deposit the ammunition in the ammunition receiving tray of the traverse carriage.

In order that it may be understood how the fuse is set, reference is made to Figs. 28 to 31 of the drawings. In Fig. 28 the fixed fuse pin 1233 is shown vertically positioned as it actually would appear after engaging the slot 1232 (Fig. 27) of the fixed socket member 1224; and the movable fuse pin 1237 of the time ring 1236 is shown in its safety position, which is the normal setting of the fuse as the projectile is loaded into the projectile tray. In this safety position the letter "S" of the movable time ring 1236 is in opposed relation to the fixed indicium 1256 of the projectile; and the fixed and movable pins 1233 and 1237 are separated by an angle which is slightly less than 180°. Before the fuse setter socket 1223 engages the projectile nose the movable socket member 1225 is positioned by the fuse setting indicator-regulator 1076 with reference to the safety position of the movable fuse pin 1237, so that the time setting of the fuse may be brought into correspondence with the order of the fuse setting indicator-regulator. This positioning or regulation of the movable socket member 1225 may, in addition, occur during or after the setting operation, as will be noted herein subsequently.

On the assumption that the preliminary regulation or positioning of the movable socket member has taken place to effect a fuse setting of 7.6 seconds, the movable socket member 1225 will then occupy the position shown in Fig. 28 with reference to the movable fuse pin 1237 of the time ring. When the projectile nose is then properly seated in the socket 1223 the movable socket member 1225 will automatically commence rotating in a clockwise direction to set the fuse provided manual setting is not employed. This clockwise rotation consists of a single revolution and results in a fractional turning of the fuse time ring 1236, the magnitude of which depends upon the preliminary positioning or regulation of the movable socket member 1225. Thus as the movable socket member commences rotating in a clockwise direction from the position shown in Fig. 28, the movable fuse pin 1237 initially remains in the safety position shown. This position is not disturbed until the movable fuse pin is engaged between the terminal surfaces of the time ring pawl 1234 and lug 1235.

Thus as the movable socket member 1225 continues its clockwise rotation, the time ring pawl 1234 is laterally engaged by the movable fuse pin 1237 and is depressed to compress the spring 1240 as shown in Fig. 29. Upon further rotation of the movable socket member 1225 the movable fuse pin 1237, which still occupies its safety position, is cleared by the pawl 1234, thus permitting the spring 1240 to urge the time pawl inwardly of the socket (Fig. 30). This inward movement of the time pawl 1234 locks the movable fuse pin 1237 between the terminal surfaces of the time pawl 1234 and lug 1235, with the result that the fuse time ring 1236 of the projectile commences rotating with the movable socket member 1225 to set the fuse. In setting the fuse the time scale 1257 inscribed on the fuse time ring 1236 is moved in a clockwise direction with reference to the fixed indicium 1256. When the movable socket member 1225 has completed its single revolution it will occupy the position shown in Fig. 31, which is identical with that of Fig. 28. In the position of the movable socket member 1225 shown in Fig. 31 the fuse time ring 1236 will be set at 7.6 seconds.

THE INTERLOCK A

An interlock is provided for releasing the case stop and starting the fuse setting motor of the indicator-regulator when the nose of the projectile is engaged in the fuse setter socket and the cartridge case is being pushed against the case stop by the projectile. This interlock, designated interlock A, consists of the case stop release valve 1896 (Fig. 33) of the projectile tray drive control unit 1122, this valve being actuated by the lever 1258 as indicated in Figs. 5 and 33. This lever is connected by a linkage 1259 with a lever 1260 (Figs. 5, 19 and 33) of the fuse setting indicator-regulator 1076, this latter lever operating to withdraw a detent from a slotted disc of the indicator-regulator, as will be pointed out in detail hereinafter. The linkage 1259 is operated by the case stop drive starting lever 1261 actuatable by the bell crank 1262 of the fuse setter 1072 (Figs. 15 to 17 and 33) which is rotated by the pin 1263 of the movable socket member 1225. Thus when the linkage 1259 (Fig. 5) is operated, the detent will be withdrawn from the slotted disc of the fuse setting indicator-regulator 1076 and simultaneously therewith the case stop release valve of the projectile tray drive control unit 1122 will be shifted.

For the details of the linkage 1259 reference is made to Figs. 11, 13, 19 and in part to Fig. 33 wherein a fuse setting indicator control rod 1264 and a case stop drive starting rod 1265 suitably joined at their adjacent ends are shown connected respectively to the lever 1260 of the fuse setting indicator-regulator 1076 and to an arm of the bell crank 1266 pivotally mounted on the gear housing 1176. The remaining arm 1267 of this bell crank is connected by the control rod 1268 (Figs. 5, 20, 21 and 33) to the case stop release valve lever 1258 of the projectile tray drive control unit 1122. Intermediate support for the control rod 1268 is provided by the link 1269 pivoted on the drive shaft bearing 1190. The case stop drive starting lever 1261 (Figs. 13, 15, 19 and 33) has an integral sleeve 1270 at the fulcrum point which is pivoted on a fixed pin 1271 extending from a sleeve 1272 secured to the side extension 1151 of the loading tray 1066. One arm 1273 of the starting lever 1261 (Figs. 19 and 33) in slidably engaged in a recess 1274 of the fuse setting indicator control rod 1264, when the remaining arm 1275 of the lever extends through an opening 1276 of the loading tray extension 1151 for engagement with the roller 1277 actuatable by the bell crank 1262.

The roller engaging portion 1278 (Figs. 13, 15 and 33) of the lever arm 1275 is aligned with the roller 1277 of the bell crank and extends lengthwise of the projectile tray a sufficient distance to insure engagement with the roller and depression of the lever arm 1275 at the proper time. A slight downward curvature of the roller engaging portion 1278 of the lever provides for a gradual engagement with the roller 1277 of the bell crank. As shown in Figs. 15 to 17, 19 and in part in Fig. 33, a bell crank shaft 1279 is mounted in a bearing 1280 of the fuse setter housing 1219 and has secured to one end thereof a lever 1281 supporting the roller 1277, while to the other end thereof there is secured the bell crank 1262. The arm 1282 of the bell crank 1262 is adapted to be engaged by the pin 1263 slidably mounted in the movable socket member 1225. The pin 1263 is prevented from falling out of an empty socket by the shoulder 1283 integral therewith; but when urged forwardly by the projectile nose (Fig. 27) causes the bell crank 1262 to rotate and the roller 1277 to depress the arm 1275 of the case stop drive starting lever 1261 when engaged therewith. A stop 1284 on the fuse setter housing 1219 limits the counter-clockwise movement of the bell crank 1262 by engagement with its remaining arm 1285.

THE FUSE SETTING INDICATOR-REGULATOR

The functions of the fuse setting indicator-regulator are to rotate the movable socket member of the fuse setter through one complete revolution for setting the fuse of the projectile; to regulate or position the movable socket member with reference to the fuse either before, during or after the setting operation so as to insure correspondence between the time setting of the fuse and the order of the fuse setting indicator-regulator; and to indicate the time setting of the fuse visually. In its preferred embodiment a differential within the regulator housing is connected to drive the rotatable socket member through the connections and splined shaft heretofore described, and is in turn driven by setting and regulating mechanisms which may be either automatic or manual in their operation. By this arrangement it is possible to feed the outputs of the setting and regulating mechanisms either separately or simultaneously into the differential and to produce in the output thereof an algebraic summation for insuring the proper regulation of the fuse setter and the setting of the fuse.

With the fuse setting indicator-regulator of the present invention four combinations of setting and regulation are possible. Thus, it is possible to have both the setting and regulation occur either automatically or manually, or to have automatic setting and manual regulation, or manual setting and automatic regulation. Whether the setting be automatic or manual, however, the setting operation cannot commence until the projectile nose has engaged the fuse setter socket to withdraw a detent from a slotted disc within the indicator-regulator housing and unlock the setting mechanism as will presently appear. When adjusted for automatic regulation, the motor of the regulating mechanism together with the receiver of the synchronous transmission system operate as a follow-up system, a scale associated with the synchronous receiver indicating the time at which the fuse is to be set. This scale not only indicates the time setting of the fuse when regulating automatically, but also when regulating manually as will appear hereinafter.

Turning now to Figs. 11 and 32 of the drawings, the fuse setting indicator-regulator 1076 is shown as including the housing 1782 which is securely attached to the hollow forward portion 1015 of the slide in any suitable manner. The connections extending from the indicator-regulator for driving the splined shaft of the loading tray, and in turn the fuse setter 1072, are designated generally by the reference character 1075, while the linkage for actuating the case stop release valve of the projectile tray drive control unit 1122 and the lever 1260 (Fig. 11) of the indicator-regulator is identified by the reference character 1259. Manual regulation and setting are made possible by the rotatable counter-balanced handle 1783, manual regulation being accomplished with the handle 1783 and shaft secured thereto in their innermost positions in the housing 1782, while manual setting is achieved with these parts in their outermost positions as will become apparent as the description proceeds. Selection as between automatic and manual regulation is made possible by the selector 1784, the upper position of this control element providing for manual regulation and the lower position thereof for automatic regulation. An annular disc 1785 (Figs. 32 and 33) bearing a scale and a disc 1786 are exposed through a transparent cover plate 1787 of the indicator-regulator housing for indicating the desired fuse setting and the completion of the regulating action. In the automatic operation of the fuse setting indicator-regulator it is necessary to supply electrical energy to the setting and regulating motors, this being accomplished by the cables 1788 and 1789 (Fig. 32). These cables, as shown, are held in a fluid tight manner in the elbows 1790 and 1791 of the housing by stuffing boxes, the adjustable glands of which are shown at 1792 and 1793.

For the details of the mechanisms within the housing 1782 of the fuse setting indicator-regulator, reference is made to Fig. 33 of the drawings wherein the output of the differential 1794 is shown connected to drive the rotatable socket member 1225 through the connections 1075 and splined shaft 1074, the drive to these connections being achieved by the spur gears 1795 and 1796 associated with the differential output, the output shaft 1797, the spur gears 1798 and 1799 and the shaft 1800 which connects directly to the bevel gear 1255 (Figs. 13 and 33). The differential 1794 is of conventional construction and includes the rotatable shaft 1801 with which the spider 1802 is integral. Pins 1803, 1804 and 1805 are fixed to the spider 1802 and freely support for rotation the intermeshing bevel gears 1806, 1807 and 1808 respectively, the bevel gear 1808 being integral and rotating with the spur gear 1795 through the sleeve construction shown. A fourth bevel gear 1809 of the differential meshes with the bevel gears 1806 and 1807 and is freely rotatable on the shaft 1801, this bevel gear being driven by the pair of bevel gears 1810 and 1811, one of which, namely 1810, is integral therewith. On the assumption that the differential or regulating shaft 1801 remains stationary, rotation in the desired direction of the setting shaft 1812 connected to the pair of bevel gears 1868 and 1811 will cause rotation of the output shaft 1797 of the differential. If, on the other hand, the setting shaft 1812 and hence the bevel gear 1809 of the differential remains stationary, the magnitude and direction of rotation of the output shaft 1797 will depend upon the magnitude and direction of rotation of the regulating shaft 1801. If both the regulating and setting shafts 1801 and 1812 are simultaneously rotated it is obvious that the rotation of the output shaft 1797 will be proportional to the algebraic sum of the rotations of the regulating and setting shafts.

*The setting mechanism.*—The setting mechanism for driving the setting shaft 1812 either manually or automatically includes the clutch 1813 common to both the setting and regulating mechanisms, the clutch 1814 connected to be driven by the setting motor 1815 and also drivable by the common clutch 1813 when the handle 1783 of the latter is shifted to its outermost position, the drive connections 1816 common to both of the clutches and extending between the clutch 1814 and the setting shaft 1812, and the locking and control mechanism 1817 including the slotted disc 1818 and detent 1819 for unlocking the setting mechanism at the proper time and permitting only one revolution of the rotatable socket member 1225. The clutch 1814 includes the central member 1820 splined to the shaft 1821 and slidable lengthwise thereof for engagement with either of the members 1822 and 1823 freely rotatable on the shaft 1821. Positive engagement between the component parts of the clutch is effected through the teeth 1824 of the central member 1820 which are complementary with the teeth 1825 and 1826 of the end members 1822 and 1823 respectively. The clutch member 1822 is machined to provide gear teeth 1827 which mesh with a spur gear 1828 secured to the motor shaft 1829. The setting motor 1815 may be of any conventional prior art construction, and while shown as a single phase alternating current motor of the induction type, may be of any convenient direct current type if desired.

The clutch 1813 common to both the setting and regulating mechanisms includes the central member 1830 splined to the reciprocating shaft 1831, the end member 1832 freely rotatable on and stationary with respect to the reciprocating shaft 1831 and the end member 1833 fixedly secured and splined to the shaft 1834. Positive engagement between the component parts of this clutch is effected through the teeth 1835 of the central member 1830 which are complementary with the teeth 1836 and 1837 of the end members 1832 and 1833 respectively. Gear teeth 1838 and 1839 are machined in the end members 1832 and 1823 of the respective clutches 1813 and 1814 and mesh with the respective spur gears 1840 and 1841 connected by the shaft 1842.

An arm 1843 has one end freely slidable about the reciprocating shaft 1831 of the clutch 1813 and is held in a fixed position longitudinally thereof by the bifurcation 1844 which engages a peripheral groove of a shoulder 1852 integral with the shaft. The remaining end of the arm 1843, however, is slidable lengthwise of the shaft 1821. This arm has integral therewith the fingers 1845 and 1846 which slidably engage peripheral grooves 1847 and 1848 in the central members 1830 and 1820 of the respective clutches 1813 and 1814. By this arrangement a simultaneous shifting of the clutches 1813 and 1814 to and the maintenance of the same in the desired positions is made possible. Shifting of the reciprocating shaft 1831 and the clutches 1813 and 1814 from the positions shown is effected by the handle 1783, the sleeve 1849 of which is securely fixed to the shaft 1831 in any suitable manner. A compression spring 1850 interposed between a wall 1851 of the regulator housing 1782 and the shoulder 1852 integral with the shaft 1831 normally urges the clutches 1813 and 1814 to the engaged positions shown and causes the reciprocating shaft 1831 and handle 1783 to occupy their innermost positions. When the reciprocating shaft 1831 and handle 1783 are urged to their outermost positions against the compression of the spring 1850, the control members 1830 and 1820 of the two clutches are caused to disengage their respective end members 1833 and 1822 and engage their respective members 1832 and 1823, the latter position of engagement of the clutches being provisionally maintained by the non-positive spring biased detent 1853 of the housing cooperating with the terminal surface of the handle sleeve 1849.

With the reciprocating shaft 1831 and handle 1783 in their innermost positions and the clutches 1813 and 1814 engaged as shown automatic setting of the fuse is possible since the shaft 1821 is now driven by the motor 1815 directly through the clutch 1814. Rotation of the handle 1783 with the clutch 1813 positioned as shown will cause rotation of the shaft 1834 and thus make possible manual regulation as will be pointed out hereinafter. When the handle 1783 and reciprocating shaft 1831 are urged to their outermost positions to cause the central clutch members 1830 and 1820 to disengage the end members 1833 and 1822 and engage their respective end members 1832 and 1823, manual regulation and automatic setting are no longer possible. Instead, manual setting will be made possible by rotation of the handle 1783, rotation of this handle and the reciprocating shaft 1831 being transmitted through the clutch members 1830 and 1832, the spur gears 1838 and 1840, the shaft 1842, the spur gears 1841 and 1839, and the clutch members 1823 and 1820 to the shaft 1821.

The shifting of the handle 1783 and reciprocating shaft 1831 from their positions shown to their outermost positions for manual setting, effects the opening of a switch 1854 in the circuit of the setting motor 1815. This switch, it will be observed, includes an insulating base 1855 on which there are mounted the stationary electrical contacts 1856 and 1857. A switch blade 1858 provided with a contact 1859 for engagement with the contact 1856 is pivotally mounted on the fixed contact 1857 in any suitable manner, and has riveted thereto an insulated bifurcated extension 1860 for cooperation with the pin 1861 of the clutch arm 1843. Thus, with the clutch 1814 engaged as shown for automatic setting, the switch 1854 in the setting motor circuit is closed. When, however, the handle 1783 and reciprocating shaft 1831 are shifted to their outermost positions for manual setting, the movement of the arm 1843 with the shaft 1831 will through the pin 1861 and bifurcated extension 1860 pivot the switch blade 1858 to disengage the contacts 1859 and 1856 and prevent a closure of the motor circuit.

The drive connections 1816 extending between the shaft 1821 of the clutch 1814 and the setting shaft 1812 associated with the pair of bevel gears 1810 and 1811 include, the shafts 1862, 1863 and 1864, and the pairs of meshing bevel gears 1865, 1866, 1867 and 1868 connected therewith. A pinion 1869 is preferably secured to the shaft 1862 and cooperates with the pall 1870 to insure unidirectional rotation of the drive connections 1816 and hence of the setting mechanism when manually setting. The slotted disc 1818 of the unlocking mechanism 1817, it will be observed, is mounted to rotate with the shaft 1871 which is driven directly from the shaft 1863 of the drive connections 1816 through the pair of reduction gears 1872. The detent 1819 is removably positioned in the slot of the disc 1818 and is removed therefrom by a mechanism including the bifurcated lever 1873 between the bifurcation of which the detent 1819 is pivotally mounted for limited movement. The lever 1873 is pivoted on a fixed pin 1874 and is connected by a link 1875 to a cross bar 1876 which is actuated by a common linkage to be described presently. The gear ratios of the setting mechanism and of the drive connections between the output of the differential and fuse setter are preferably such that a plurality of integral revolutions of the handle 1783 or motor shaft 1829 are necessary to effect a single revolution of the rotatable socket member 1225. Since the slotted disc 1818 insures that only one revolution of the movable socket member 1225 occurs in the setting operation, the reduction gears 1872 are so chosen that the multiple rotation of the shaft 1863 will cause but one revolution of the slotted disc 1818. Thus, whether manual or automatic setting is contemplated, the setting mechanism cannot be placed in operation until the detent 1819 is removed from the slotted disc 1818.

A second switch 1877 is incorporated in the motor setting circuit and is normally open when the detent 1819 is seated in the slot of the disc 1818. This switch also includes an insulating base 1878 on which there are mounted the stationary contacts 1879 and 1880. A switch blade 1881 provided with a contact 1882 for engagement with contact 1879 is pivotally mounted on the fixed contact 1880 in any suitable manner and has riveted thereto an insulated bifurcated extension 1883 for cooperation with the pin 1884 of the link 1885. This link is pivotally connected to the other end of the cross bar 1876. For simultaneously withdrawing the detent 1819 from the disc and closing the switch 1877 by clockwise rotation of the lever 1260 attending the upward movement of the control rod 1264, a common linkage 1886 is shown connecting the lever 1260 with the cross bar 1876. The linkage 1886 consists of a series of shafts 1887, 1888, and 1889 to which are secured respectively the lever arms 1890, 1891, 1892 and 1893 interconnected by the links 1894 and 1895. As previously noted, the control rod 1264 forms a part of the linkage 1259 connecting the lever 1260 with the lever 1258, this latter lever actuating the case stop release valve 1896 through the shaft 1897 and lever 1898 connected with the valve rod 1899. When the rod 1264 is moved upwardly to close the switch 1877, withdraw the detent 1819 from the slotted disc and shift the case stop release valve 1896 to the left to release the case stop head 1102, a spring 1900 in the projectile tray drive control unit will be compressed by the valve 1896. Upon the completion of a single revolution of the movable socket member 1225 to set the fuse, the slot of the disc 1818 will again be aligned with the detent 1819. In consequence thereof, the spring 1900 will shift the case stop release valve 1896 to the right and through the linkages 1259 and 1886 will cause the detent 1819 to enter the slot of the disc 1818 and open the switch 1877.

A third switch 1901 is incorporated in the motor setting circuit, this switch being hydraulically actuated and under the control of the case stop release valve 1896. As will be noted in detail hereinafter in connection with the hydraulic circuit, when the case stop release valve 1896 is shifted to the left to release the case stop a hydraulic control circuit will be completed for closing the hydraulic switch 1901. The hydraulic switch is shown as including the insulating base 1902 on which are supported the stationary contacts 1903 and 1904. These contacts are operable to be engaged by the movable contacts 1905 and 1906 of the switch blade 1907 which is mounted in an insulating manner on a piston rod 1908 of the fuse setting motor starting valve 1909. The valve 1909, it is to be noted, is disposed within the projectile tray drive control unit 1122. A compression spring 1910 is interposed between the switch blade 1907 and the insulating base 1902 and normally holds the switch contacts in spaced relation. When the valve 1909 is urged to the left against the compression of the spring 1910 by fluid pressure under the control of the case stop release valve 1896, the movable contacts 1905 and 1906 will engage the respective stationary contacts 1903 and 1904 to close the switch. After the movable socket member 1225 has completed one revolution to set the fuse, the compression spring 1910 of the switch 1901 will shift the valve 1909 to the right and in so doing will separate the switch contacts. Some time lag in the separation of the contacts necessarily occurs because of the time required to vent the hydraulic fluid at the right end of the valve 1909, as will appear hereinafter. To thus insure a prompt opening of the setting motor circuit upon the completion of one revolution of the movable socket member 1225, the switch 1877 previously described is provided.

The current mains 1788 and 1789 are shown by way of illustration as supplying single phase alternating current and are employed, among other things, in the energization of the setting motor 1815. As clearly indicated in Fig. 33, the setting motor circuit extends from the current main 1788 by the conductor 1911 to the terminal 1912 of the motor 1815; and continues from the remaining motor terminal 1913 through the conductor 1914 to the stationary contact 1857 of the switch 1854. The circuit proceeds from the stationary contact 1856 of this switch along the conductor 1915 to the stationary contact 1880 of the switch 1877; and from the remaining stationary contact 1879 of this switch through the conductor 1916 to the stationary contact 1904 of the hydraulic switch 1901. The other stationary contact 1903 of the hydraulic switch is connected by the conductor 1917 to the remaining current main 1789 to complete the setting motor circuit. If then the switches 1854, 1877 and 1901 are closed, it is obvious that the setting motor circuit will be energized from the current mains 1788 and 1789. In order that it may be understood how the setting operation is carried out automatically, it will be assumed that the clutches 1813 and 1814 are engaged as shown in Fig. 33 and that the switch 1854 in consequence thereof is closed; that the detent 1819 is initially seated in the slot of the disc 1818 and that the switch 1877 operating conjointly therewith is in its open position; and that the hydraulic switch 1901 is initially open. Under these circumstances the setting motor circuit is de-energized and the setting mechanism is locked by the detent 1819. Regulation, it will be assumed, has occurred before the setting operation which is now described.

*The setting operation.*—When the projectile tray has moved to the rear sufficiently, the projectile nose engages the tray supported socket member 1225 and depresses the arm 1275 of the case stop drive starting lever 1261 through the socket pin 1263, the bell crank 1262, and the roller 1277 in engagement therewith. The case stop drive starting lever 1261, through the upward movement of the rods 1264 and 1265 of the linkage 1259, shifts the case stop release valve 1896 to the left against the compression of the spring 1900; and by clockwise rotation of the lever 1260 acting through the common linkage 1886 simultaneously withdraws the detent 1819 from its slotted disc and closes the switch 1877. The closing of the hydraulic switch 1901 follows immediately upon shifting the case stop release valve 1896 to the left to release the case stop. Since the three switches 1854, 1877 and 1901 are now closed to cause energization of the setting motor circuit, and the detent 1819 has been withdrawn from the slotted disc 1818 to release the setting mechanism, rotation of the movable socket member 1225 takes place. The socket member 1225 is now driven by the motor 1815 through the clutch 1814, the drive connections 1816, the differential 1794, and the drive connections between the output of the differential and the fuse setter. During and before the completion of the single revolution of the slotted disc 1818 and movable socket member 1225, the detent 1819 is held in peripheral contact with the disc 1818 by the compression spring 1900 associated with the case stop release valve 1896.

When the slotted disc 1818 and hence the movable socket member 1225 has made one complete revolution to set the projectile fuse time ring, the case stop release valve 1896 will be shifted to the right by the compression spring 1900 and through the linkages 1259 and 1886 will cause the detent 1819 to enter the slot of the disc 1818 and the switch 1877 to open. Thus, simultaneously with the deenergization of the motor 1815 the setting mechanism is locked preparatory to a subsequent setting operation. Shortly after the case stop release valve 1896 shifts to the right the hydraulic switch 1901 opens automatically, the delayed opening of this switch being caused by the time required to vent the hydraulic fluid at the right end of the valve 1909 as already noted.

When manual instead of automatic setting is desired the handle 1783 is urged to its outermost position and detented in place, at the same time opening the switch 1854 and preventing the energization of the setting motor 1815. Rotation of the handle 1783 is not possible until the detent 1819 is withdrawn from the slotted disc 1818 in the manner previously described to unlock the setting mechanism. When this occurs the handle 1783 is rotated to impart rotation to the movable socket member 1225, rotation being transmitted through the clutch members 1830 and 1832, the spur gears 1838 and 1840, the shaft 1842, the spur gears 1841 and 1839, clutch members 1820 and 1823, drive connections 1816, the differential 1794 and the drive connections between the output of the differential and the fuse setter. When the slotted disc 1818 and movable socket member 1225 have each completed one revolution the detent 1819 again enters the slot of the disc 1818 to lock the setting mechanism preparatory to a subsequent setting operation.

*The regulating mechanism.*—The regulating mechanism for driving the differential shaft 1801 manually or automatically includes the clutch 1918 connected to be driven by the regulating motor 1919 or manually by the clutch 1813; the drive connections 1920 between the clutch 1918 and the regulating or differential shaft 1801; and the follow-up contact mechanism 1921 associated with the receiver 1922 of the synchronous transmission system. The clutch 1918 includes the central member 1923 splined to the shaft 1924 and slidable lengthwise thereof for engagement with either of the end members 1925 or 1926, the end member 1925 being freely rotatable on the shaft 1924 and the other member 1926 being splined and fixed to the motor shaft 1927. Positive engagement between the component parts of the clutch 1918 is effected through the teeth 1928 of the central member 1923 which are complementary with the teeth 1929 and 1930 of the end members 1925 and 1926 respectively. The end member 1925 of the clutch 1918 is machined to provide gear teeth 1931 which mesh with a spur gear 1932 secured to the shaft 1933 that is capable of being manually driven from the shaft 1834 of the clutch 1813 through the pair of bevel gears 1934. Thus by rotation of the handle 1783 with the clutch 1813 positioned as shown, it is possible to regulate manually as will be pointed out more in detail hereinafter.

In order to shift the central clutch member 1923 out of engagement with the end member 1926 into engagement with end member 1925 and vice versa, a lever 1935 is provided which is rotatably mounted on the fixed pivot 1936. The arm 1937 of this lever slidably engages the peripheral groove 1938 in the central member 1923, while a pin 1939 secured to the arm 1940 of the lever slides in elongated slots 1941 of the bifurcation 1942 integral with the sleeve 1943. A threaded portion 1944 integral with the shaft 1945 engages the sleeve 1943 and has a coarse pitch such that clockwise rotation of the selector handle 1784 through one-half revolution from the position shown in Fig. 33 will cause the central clutch member 1923 to disengage the end member 1926 and engage the end member 1925. The knob 1946 (Figs. 11 and 32) of the selector handle 1784 is spring biased in a conventional manner so that it may serve as a non-positive detent to releasably lock the handle 1784 in either of its two positions by engagement with the diametrical notches 1947 of the arcuate strip 1948 secured to the regulator housing. With the selector 1784 in the position shown, automatic regulation of the fuse setter is possible since the shaft 1924 is now driven by the motor 1919 directly through the clutch members 1923 and 1926. When the selector 1784 is rotated in a clockwise direction through one-half revolution to cause the central clutch member 1923 to disengage the end member 1926 and engage the end member 1925, automatic regulation will no longer be possible. Instead, manual regulation will be made possible by rotation of the handle 1783 of the clutch 1813. Rotation of this handle with the clutch 1813 positioned as shown will cause rotation of the shaft 1834 and in turn rotation of the shaft 1924 through the bevel gears 1934, shaft 1933, spur gears 1931 and 1932 and clutch members 1925 and 1923.

The rotation of the selector handle 1784 from the automatic regulating position shown to the manual regulating position effects the opening of a switch 1949 in the circuit of the regulating motor 1919. This switch includes rotate in the same direction as the synchronous motor 1922 and by the same amount, the insulating cylinder 1976 is driven by the regulating motor 1919 through a one to one drive connection 2009 to cause the cylinder to move in the same direction and through the same angle as the contact arm 1994. Upon completion of this movement therefore, the insulated portion 2005 of the upper contact ring 1992 will re-engage the roller 2004 of the contact arm 1994 to open the motor circuit. The drive connection 2009 is formed by the shafts 2010 and 2011, the two pairs of bevel gears 2012 and 2013 associated therewith and the spur gear 2014 meshing with the gear 1984 which supports the insulating cylinder 1976. In order to indicate on the annular scale 1987 the time at which the fuse is to be set when regulating manually, the shaft 1933 which derives the end member 1925 of the clutch 1918 is shown extended and connected to an extension of the shaft 2011 by the pair of bevel gears 2015. The gear ratios of the regulating mechanism and of the drive connections between the output of the differential and fuse setter are such that one half revolution in either direction of either the regulating motor shaft 1927 or the handle 1783 of the clutch 1813 will cause a single revolution of the movable socket member 1225 in a corresponding direction. In arranging the gear ratios to achieve this result consideration must be taken of the fact that the bevel gear 1808 of the differential 1794 rotates with twice the speed of the regulating shaft 1801 when driven only by this shaft.

The synchronous transmission system is of conventional construction and includes the usual motor 1922 and generator 2016 which serve respectively as the receiver and the transmitter. The stators of the generator 2016 and motor 1922 are connected by the usual transmission line 2017, while the rotors are to be understood as being energized by single phase alternating current from the conductor pairs 2018 and 2019 connected with the current mains 1788 and 1789. The arrangement is such that when the transmission circuit 2017 is energized the rotor of the synchronous motor 1922 will assume a position corresponding electrically to the position of the rotor of the generator 2016 which generates the fuse setting order. The transmitter 2016 is located at the fire control station and may be manually or automatically driven to indicate and generate the fuse setting order. Purely by way of illustration, the shaft 2020 of the generator 2016 is shown connected to the disc 2021 which is provided with a scale 2022 that is identical in all respects with the annular scale 1987 of the follow-up contact mechanism 1921. The scale 2022 cooperates with a fixed indicium 2023 to indicate the desired time setting of the fuse. Rotation is imparted to the rotor of the generator 2016 and the disc 2021 by the handle 2024 and shaft 2025 which are connected with the generator shaft 2020 through the pair of bevel gears 2026.

*The regulating operation.*—Thus, it is evident that if the disc 2021 of the generator 2016 is adjusted to indicate a desired fuse setting, the fuse setting order generated by the transmitter will cause the rotor of the synchronous motor 1922 to assume a position identical with the rotor position of the generator 2016. In consequence thereof the contact arm 1994 and indicator disc 1786 secured to the motor shaft 1990 will rotate through an angle corresponding to the desired fuse setting time indicated by the transmitter 2016. The regulating motor 1919 will therefore be energized to rotate through the same angle; and, when regulating automatically, will position the movable socket member 1225 for the desired fuse setting through the clutch 1918 engaged as shown, the drive connections 1920, the differential 1794, and the drive connections between the output of the differential and the fuse setter. When the movable socket member 1225 is properly positioned, the insulating cylinder 1976 of the follow-up contact mechanism 1921 will have been rotated by the regulating motor 1919 through the drive connection 2009 to break the regulating motor circuit. The zero line 1991 of the annular scale 1987 will then again be brought into coincidence with the fiducial mark 1989 of the disc 1786 secured to the motor shaft 1990; and the fiducial mark 1988 on the housing wall 1851 will indicate the desired fuse setting on the annular scale 1987. The fuse time indication of the follow-up contact mechanism 1921, it is to be noted, will now agree with the fuse time indication of the transmitter 2016.

When it is desired to regulate manually the selector handle 1784 is first shifted to its manual regulating position to cause the central clutch member 1923 to engage the end member 1925 and simultaneously therewith open the switch 1949 as previously described. Rotation of the handle 1783 with the clutch 1813 positioned as shown will through the shaft 1834, bevel gears 1934, shaft 1933, spur gears 1931 and 1932, clutch 1918, drive connections 1920, the differential 1794 and the drive connections between the output of the differential and fuse setter, position the movable socket member 1225 for the desired fuse setting. The desired fuse setting is indicated by the fiducial mark 1988 of the housing wall 1851 on the annular scale 1987 of the insulating cylinder 1976 which is manually driven through the shaft 1933, the bevel gears 2015 and spur gears 2014 and 1984 already noted. If the synchronous transmission system is still in operation when operating manually, the desired fuse setting of the transmitter 2016 will be duplicated on the annular scale 1987 of the follow-up contact mechanism 1921 and at the movable socket member 1225 if the zero line 1991 of the annular scale 1987 is made to coincide with the fiducial mark or pointer 1989 of the disc 1786. It is to be carefully noted in the regulating operation that a partial or single clockwise rotation of the movable socket member 1225 as viewed in Fig. 33 positions the socket member to increase the time setting of the fuse, while a similar counter-clockwise rotation of the socket member 1225 positions this member to decrease the time setting of the fuse. In the setting operation, however, the movable socket member 1225 always rotates through a single rotation and always in a counter-clockwise direction as viewed in Fig. 33.

*The combined setting and regulating operations.*—As previously noted, four combinations of manual and automatic setting and regulating are possible. Thus, it is possible to carry out both the regulating and setting operations either automatically or manually, or to perform the regulating operation automatically and the setting operation manually or vice versa. Only when regulating and setting manually must the two operations be performed separately, for with the handle 1783 of the clutch 1813 in its innermost position only manual regulation by the handle is possible and when in its outermost position only manual setting can be undertaken. In all other combinations of regulating and setting the regulation can be carried out either before, during or after the setting operation. Simultaneous regulation and setting is made possible by the differential 1794, since the rotation of the output shaft 1797 of the differential is then proportional to the algebraic sum of the inputs from the regulating and setting mechanisms. The feature of simultaneous setting and regulation is highly advantageous since it conserves time in the loading cycle and insures an accurate setting of the projectile fuse under conditions of rapidly changing ranges as encountered in anti-aircraft fire.

For illustrative purposes, it will be assumed that the fuse is to be set at 7.6 seconds; that regulation and setting are both to be automatic; and that the regulating operation is to precede the setting operation. Under these circumstances the clutches 1813, 1814 and 1918 of the regulating and setting mechanisms will be positioned as shown in Fig. 33; and all other parts of the mechanisms there depicted will have the initial positions indicated. In an insulating base 1950 on which there are mounted the stationary electrical contacts 1951 and 1952. A switch blade 1953 provided with a contact 1954 for engagement with the contact 1952 is pivotally mounted on the fixed contact 1951 in any suitable manner and has riveted thereto an insulated bifurcated extension 1955 for cooperation with the pin 1956 integral with the sleeve 1957. The sleeve 1957 engages a second threaded portion 1958 of the shaft 1945 and has a different pitch, the pitch being so chosen as to insure opening of the switch 1949 shortly after the central clutch member 1923 commences shifting to its manual position, but before the teeth 1928 disengage the teeth 1930 of the end member 1926. Any conventional expedient may be employed to prevent rotation of the sleeve 1957 during rotation of the shaft 1945. Thus, with the clutch 1918 engaged as shown for automatic regulation, the switch 1949 in the regulating motor circuit is closed. When, however, the selector handle 1784 is shifted to its manual regulating position, the rotation of the shaft 1945 will through the pin 1956 and bifurcated extension 1955 pivot the switch blade 1953 to disengage the contacts 1954 and 1952 and prevent a closure of the motor circuit. The pitch of the threaded portion 1958 insures that the teeth 1928 and 1930 of the clutch member 1923 and 1926 respectively will first engage before the switch 1949 is again closed when shifting the clutch to its automatic position. The drive connections 1920 between the shaft 1924 of the clutch 1918 and the regulating shaft 1801 of the differential 1794 include the shafts 1959, 1960 and 1961 and the pairs of meshing bevel gears 1962, 1963, 1964 and 1965 connected therewith.

The regulating motor 1919 is reversible and may be of any conventional prior art construction adapted for operation on either direct or alternating current. By way of illustration, the motor 1919 is shown as a single phase alternating current motor of the series commutator type in which reversal of the direction of rotation is accomplished through the use of a multiple field winding. The armature of the motor is identified by the reference character 1966 and the two separate series field windings by the reference characters 1967 and 1968. The field windings 1967 and 1968 are alternatively employed and are so wound that the winding 1967 will cause clockwise rotation of the motor shaft 1927 when connected in series with the armature 1966, while the winding 1968 will cause counter-clockwise rotation of the motor shaft when similarly connected.

The regulating motor circuit extends from the current main 1789 to the brush 1969, through the commutator 1970 and armature 1966 to the brush 1971 from whence it continues along the conductor 1972 to the stationary contact 1951 of the switch 1949. From the other stationary contact 1952 of the switch the circuit continues by the conductor 1973 to the follow-up contact mechanism 1921 to be presently described where a brush 1974 of the conductor engages a slip ring 1975 supported by the insulating cylinder 1976 of the contact mechanism. Depending upon the relative position of the insulating cylinder 1976, the current will pass out of the contact mechanism through either the upper slip ring 1977 or the lower slip ring 1978, both of which are likewise supported by the insulating cylinder. If the current leaves the contact mechanism 1921 by the slip ring 1977 it will pass along the brush 1979 and conductor 1980 through the winding 1967 to cause clockwise rotation of the motor shaft 1927. If, on the other hand, the current leaves by the lower slip ring 1978, it will pass instead along the brush 1981 and conductor 1982 through the field winding 1968 to cause a reverse rotation of the motor shaft. Both of the field windings 1967 and 1968 are connected at their free ends by the common conductor 1983, the circuit being completed to the source of alternating current by connection of this conductor with the other current main 1788.

The function of the follow-up contact mechanism 1921 is to insure the energization of the regulating motor circuit so that the regulating motor 1919 will rotate in a direction and an amount equal to that of the synchronous motor 1922. When adjusted for automatic regulation therefor, the motor 1919 of the regulating mechanism together with the motor 1922 of the synchronous transmission system will operate as a follow-up system in which the regulating motor performs the follow-up function. As clearly indicated in Fig. 33 a spur gear 1984 is freely mounted for rotation by its sleeve 1985 on a suitable bearing of the synchronous motor casing 1986 and has rigidly secured thereto the insulating cylinder 1976. The cylinder 1976 has an annular disc 1785 fixed at its upper end bearing the scale 1987. This scale is adapted for cooperation with the fiducial mark 1988 on the wall 1851 of the regulator housing, as well as for cooperation with the fiducial mark 1989 of the concentric disc 1786 secured to the synchronous motor shaft 1990. The scale 1987 is shown by way of example as graduated in a counter-clockwise direction in major divisions of 5 seconds up to 45 seconds to indicate the fuse time setting of the projectile; and terminates in the letter "S" which is diametrically opposed to the zero line or mark 1991 of the scale. When the letter "S" of the scale 1785 is brought into coincidence with the fiducial mark 1988 of the housing wall, the fuse time ring of the projectile will be set at its safety position if it has not already been so set.

To the inner walls of the insulating cylinder 1976 there are fixedly secured in any suitable manner the electrical contact rings 1992 and 1993 which are continuously engaged by the roller contact arms 1994 and 1995 rigidly fixed to the synchronous motor shaft 1990, but electrically insulated therefrom by the insulating bushings 1996 and 1997. An electrical conductor 1998 is welded or otherwise secured to the annular portions of the contact arms 1994 and 1995 so that current from the lower contact ring 1993 may pass through the contact arms to the upper contact ring 1992. The lower contact ring 1993 is electrically connected with the slip ring 1975 by the conductor 1999, while the insulated electrically conductive segments 2000 and 2001 of the upper contact ring 1992 are connected to the upper and lower slip rings 1977 and 1978 by the conductors 2002 and 2003 respectively. When the fiducial marks 1988 and 1989 of the housing wall 1851 and disc 1786 respectively are aligned with the zero line 1991 of the annular scale 1987 as indicated, the roller 2004 of the upper contact arm 1994 will engage the portion 2005 of the contact ring 1992 which is electrically insulated from the ring segments 2000 and 2001 by the insulating strips 2006. A diametrical portion 2007 of the ring 1992 is also insulated from the ring segments 2000 and 2001 by insulating strips 2008, thus electrically insulating the ring segment 2000 from the ring segment 2001.

If, therefore, the contact arm 1994 is moved by the synchronous motor shaft 1990 from the neutral position shown to engage the ring segment 2000 the motor circuit will be completed through the motor field winding 1967 to cause clockwise rotation of the motor shaft 1927. The motor circuit through the contact mechanism 1921 will extend from the brush 1974 and slip ring 1975 along the conductor 1999 to the contact ring 1993, from thence through the contact arm 1995, conductor 1998 and contact arm 1994 to the ring segment 2000, and from this segment along the conductor 2002 to the slip ring 1977 engaging the brush 1979. If, on the other hand, the contact arm 1994 is moved to engage the ring segment 2001, the motor circuit through the contact mechanism 1921 will be completed from the ring segment 2001 along the conductor 2003 to the lower slip ring 1978 and brush 1981 to cause energization of the motor field winding 1968 and counterclockwise rotation of the motor shaft 1927.

In order to insure that the regulating motor 1919 will order to carry out the regulating operation the disc 2021 of the transmitter 2016 at the fire control station is adjusted to indicate a fuse time of 7.6 seconds. The fuse setting order generated by the transmitter 2016 will then be duplicated on the annular scale 1987 of the follow-up contact mechanism 1921, and in duplicating the order will position the movable socket member 1225 for the desired fuse setting through the drive connections between the regulating motor 1919 and the fuse setter 1072. When the movable socket member 1225 has been positioned as indicated in Fig. 28 by a fractional counterclockwise rotation, the setting operation is ready to commence. This operation is initiated when the projectile nose engages the fuse setter socket and results in a single clockwise rotation of the movable socket member as viewed in Fig. 28 by the setting motor 1815 (Fig. 33) and drive connections associated therewith. The details of operation of the fuse setter 1072 in setting the time ring 1236 of the projectile nose have already been described. Upon the completion of the single clockwise rotation of the movable socket member 1225, therefore, the projectile fuse will have been set at 7.6 seconds.

THE MOVEMENT OF THE AMMUNITION INTO THE TRAVERSE CARRIAGE

With the case stop head 1102 and the projectile tray 1070 locked in their forward positions as indicated in Fig. 5, the cartridge case 1174 is loaded into the loading tray 1066 with the base of the cartridge case in contact with the buffer of the case stop head 1102. Then the projectile 1171 is loaded into the projectile tray 1070 so that the base of the projectile is in contact with the cartridge case cork plug 1286 and the fixed fuse pin is in an approximate vertical position. It is to be expressly understood in this connection that a projectile may optionally be employed which does not require any fuse setting in view of the dual nature of the present gun. When the ammunition has been loaded by the operator as described above, the operator moves the projectile tray control lever 1137 to the rear and through the control linkage 1138 causes the projectile tray drive control unit 1122 to be released from its locked forward position if the traverse carriage 1077 is locked in the firing position indicated in Fig. 9. The projectile tray 1070 is then moved to the rear through its drive connection 1127, its acceleration being controlled by the projectile tray drive control unit 1122.

During the initial rearward travel of the projectile tray no movement of the ammunition takes place. The projectile tray 1070 slides beneath the projectile 1171 until the projectile nose (Figs. 27 and 33) engages the fuse setting socket 1223 and operates the case stop drive starting lever 1261 (Figs. 19 and 33) through the socket pin 1263, the bell crank 1262 and roller 1277. The case stop drive starting lever 1261 through the linkage 1259 (Figs. 5 and 33) operates the interlock A to release the case stop head 1102 and close the fuse setting motor starting circuit of the indicator-regulator 1076 for automatic setting. When the case stop head 1102 is released from its locked forward position by the interlock A, the projectile tray drive control unit 1122 in combination with the case stop drive control unit 1120 move the projectile tray 1070, the ammunition, and the case stop head 1102 to the rear. During this rearward travel the ammunition is held firmly between the case stop head 1102 and the fuse setter 1072 to permit setting of the fuse.

At the end of the projectile tray travel the projectile tray 1070 (Fig. 9) enters the slot 1084 of the ammunition receiving tray 1079, while the projectile tray drive control unit 1122 (Fig. 5) decelerates the case stop head 1102, the ammunition, and the projectile tray 1070. The projectile tray is locked in its rear position by the projectile tray drive control unit 1122; and at the same time the case stop drive control unit 1120 in combination with the projectile tray drive control unit 1122 locks the case stop head 1102 in the position to which it has been moved by the projectile tray and the ammunition.

The case stop drive control unit 1120 prevents disengagement of the projectile fuse pins 1233 and 1237 (Figs. 27 and 31) from the fuse setter socket 1223. Since the case stop head 1102 supports the weight of the ammunition in order to prevent disengagement of the fuse pins, it is necessary that the projectile tray 1070 (Fig. 5) push the case stop head 1102 through the interposed ammunition as the ammunition is moved to the rear into the ammunition receiving tray 1079 of the traverse carriage. When the case stop head 1102, the ammunition and the projectile tray 1070 approach the end of the projectile tray travel they are decelerated by the projectile tray drive control unit 1122 as previously noted.

The distance moved by the case stop head 1102 as it is pushed to the rear by projectile tray 1070 is not constant for each round of ammunition due to the variations in the length of the projectile 1171 and the cartridge case 1174. However, as soon as the projectile tray 1070 is locked in its rear position by the projectile tray drive control unit 1122, the case stop drive control unit 1120 locks the case stop head 1102 and prevents disengagement of the fuse pins 1233 and 1237 from the fuse setting socket 1223. This arrangement permits a continual setting of the fuse as the range of the target changes until the fuse setter 1072 and the projectile tray 1070 are withdrawn from the ammunition.

TRAVERSE CARRIAGE MOUNTING AND DRIVE CONNECTIONS

The traverse carriage 1077, as previously noted, is mounted on the tracks 1078 (Fig. 9) of the slide for traversing movement and supports two trays 1079 and 1080 of substantially semi-cylindrical configuration. As shown more particularly in Figs. 34 to 38, the tray 1079 is rigid with the carriage 1077 and is adapted to receive the ammunition from the loading tray 1066. The tray 1080, on the other hand, receives the empty cartridge case from the gun and is mounted in the guide channels 1086 of the traverse carriage 1077 for reciprocation with the gun housing during recoil and counter-recoil. Adequate provision is made for the recoil of the gun housing 1020 (Fig. 9) by positioning the carriage 1077 (Fig. 34) substantially centrally of the tray 1079.

As clearly indicated in Figs. 35 and 36, the carriage 1077 is provided with two pairs of integral transverse channels 1287 and 1288 which merge at their adjacent ends in a central solid transverse portion 1289 likewise integral with the carriage. In each of the channels 1287 and 1288 (Fig. 23) two vertical and horizontal rollers 1290 and 1291 are mounted on pins 1292 and 1293 respectively. The vertical and horizontal rollers 1290 and 1291 engage horizontal tracks 1078 (Fig. 26) and vertical tracks 1294 (Fig. 24) respectively on the slide 1001. The tracks 1078 and 1294 extend from one side of the slide to the other and thus provide a proper guide for the carriage 1077 as it is moved from the firing position shown in Figs. 9 and 23 to the ramming position and vice versa.

Each solid transverse carriage portion 1289 (Fig. 23) between adjacent ends of the channels 1287 and 1288 is recessed at 1295 to receive a locking plate 1296. This plate engages a transverse recess 1297 of the slide between the tracks 1078 and 1294 (Fig. 25) and is secured to the carriage by the bolts 1298. By using a plate 1296 on each end of the carriage (Figs. 20 and 35) the carriage 1077 is locked to the slide 1001, yet is capable of traversing movement by virtue of the tracks 1078 and 1294 and the rollers 1290 and 1291 in engagement therewith. Thus the traverse carriage will remain properly positioned on its tracks at high angles of elevation of the gun; and even at these angles will move with reduced friction through the engagement of the horizontal rollers 1291 with the vertical tracks 1294.

As previously noted, a chain 1081 (Figs. 9 and 20) secured to the carriage 1077 and engaging the driving and driven sprockets 1082 and 1083 respectively moves the traverse carriage 1077 from the firing position shown in Fig. 9 to the ramming position and vice versa. The manner in which each end of the chain is secured to the carriage is shown in Figs. 34 and 39. As there indicated, each end of the chain 1081 is provided with a terminal 1299 having two apertured extensions 1300 and 1301 disposed at right angles to each other. The extension 1300 projects through an opening 1302 of the carriage body and receives a screw 1303 adjustable into engagement with a wall of the carriage for adjusting the tension of the chain 1081. A nut 1304 locks the screw in position after the desired adjustment has been effected. In order to insure a secure engagement of the terminal 1299 with the carriage 1077, the remaining terminal extension 1301 is clamped to the carriage by a plate 1305 held in position by bolts 1306 extending through elongated apertures 1307 of the extension 1301.

The driven or idler sprocket 1083 (Fig. 9) is mounted in any suitable manner on the side piece 1013 of the slide, while the driving sprocket 1082 (Fig. 20) is secured to a shaft 1308 which is mounted on bearings 1309 in the side piece 1012 of the slide. The details of the drive connection 1129 interconnecting the traverse carriage drive control unit 1123 with the drive sprocket 1082 are clearly shown in Fig. 20. As there depicted, the output shaft 1310 of the traverse carriage drive control unit 1123 is connected by a flexible coupling 1311 to the drive shaft 1312 mounted on suitable bearings 1313 in the side piece 1012 of the slide. The spur gear 1314 of the drive shaft 1312 meshes with the gear 1315 on the sprocket shaft 1308 and by this arrangement makes it possible to hydraulically control the movement of the traverse carriage 1077.

Provision is made for operating the traverse carriage 1077 manually in the event of power failure or failure of the hydraulic equipment. As indicated in Figs. 5 and 20, a sprocket wheel 1316 on the drive shaft 1312 and a sprocket wheel 1317 on the shaft 1318 are engaged by an endless chain 1319. The sprocket shaft 1318 mounted on suitable bearings in the loading tray 1066 is directly actuated by bevel gears which in turn are driven by the handwheel 1322 through spur gears. By this arrangement, therefore, it is possible to manually move the traverse carriage 1077 from the firing position to the ramming position and vice versa.

Before it becomes possible to operate the traverse carriage 1077 manually, however, it is first necessary to release the traverse carriage drive detents to be detailed hereinafter. These detents are incorporated in the traverse carriage drive control unit 1123 and are operated by the control rod 1324 (Fig. 20) of the detent release. In order that this rod may be conveniently operated, it is connected by a link 1325 to one end of the lever 1326 pivotally mounted on the side piece 1012. The other end of the lever 1326 is connected by the link 1327 to the manual control lever 1328 pivoted on the loading tray 1066. The detent release releases the traverse carriage 1077 from each of its two locked positions and is operated only during manual operation of the traverse carriage.

THE AMMUNITION RECEIVING TRAY

The terminal tongue-and-groove constructions 1152 of the ammunition receiving tray 1079 are clearly shown in Figs. 34 to 36 of the drawings. As previously noted, these constructions slidably engage corresponding terminal constructions of the loading tray 1066 (Figs. 9 and 20) when the traverse carriage is in the firing position and thus allow movement of the ammunition into the receiving tray 1079. A buffer 1329 of any suitable resilient material secured at the rear of the carriage tray 1079 receives the impact of the ammunition when the case stop is released attending the withdrawal of the projectile tray from the traverse carriage. The ammunition receiving tray 1079 is cut to provide a longitudinal slot 1084 for allowing the passage of the central portion 1153 (Fig. 14) of the projectile tray 1070; and is recessed to provide the guide channels 1330 (Fig. 36) which slidably receive the shoulders or lateral projections 1155 of the projectile tray. Through this arrangement, therefore, the projectile tray 1070 may enter the ammunition receiving tray 1079 of the traverse carriage to deposit ammunition when the carriage is in the firing position.

When the projectile tray 1070 has entered the ammunition receiving tray 1079 of the traverse carriage and is locked in its rear position, the projectile holding pawls 1085 (Figs. 9 and 34–36) will have moved into a position to engage the rotating band of the projectile as the projectile tray is withdrawn. For the details of the holding pawls and the mechanism for actuating the same, reference is made to Figs. 20 and 40 to 42 of the drawings. As there shown, each pawl 1085 has a substantially U-shaped configuration with a portion 1331 conforming to the outer surface of the projectile. A pin 1332 rigidly secured to each pawl pivotally mounts the pawls 1085 in lateral openings 1333 of the ammunition receiving tray 1079; and a spring 1334 surrounding the pin urges the pawl towards and maintains the same in a normal forward position. The end 1335 of the spring is welded or otherwise affixed to the pawl 1085 while the remaining end 1336 is secured in any suitable manner to a side wall of the ammunition receiving tray 1079.

Thus, as the ammunition enters the ammunition receiving tray 1079 the rear of the cartridge case will engage the two pawls 1085 and pivot the same inwardly of the tray openings 1333 and out of the path of the cartridge case, while at the same time tensioning the springs 1334. As the terminal portion of the projectile 1171 moves into a position opposite the pawls 1085 the pawl portions 1331 are urged by the springs 1334 to slidably engage the rotating band 1173 of the projectile. Finally, when the projectile tray 1070 has come to rest and is locked in its rear position in the ammunition receiving tray 1079, the portions 1331 of the pawls will have moved to engage the body of the projectile immediately forward of the rotating band 1173 as clearly shown in Fig. 40. The pawls 1085 are now in a position to engage the terminal surface of the rotating band 1173; and prevent any forward movement of the projectile 1171 as the projectile tray 1070 is withdrawn.

Mechanism is provided for automatically withdrawing the pawls 1085 out of the path of the rotating band 1173 and cartridge case 1174 when the traverse carriage has reached the ramming position, thus allowing the ammunition to be rammed into the gun. As clearly shown in Figs. 20, 35 and 40 to 42, the traverse carriage 1077 has longitudinal openings 1337 disposed immediately below the ammunition receiving tray 1079 for accommodating each a link 1338, one end of which is pivotally connected to a bifurcated lever 1339 of the pin 1332 secured to the pawl 1085. The links 1338 extend rearwardly on each side of the tray 1079 and are connected to bifurcated levers 1340 fixed on the rotatable pins 1341 of the carriage 1077. Each of the pins 1341 extends to the under side of the carriage for securement to the bifurcated levers 1342 and 1343 which are interconnected by the link 1344. The lever 1343 has an arm 1345 integral therewith to which is secured the cam follower 1346. By pushing the follower 1346 to the rear, the pawls 1085 are moved out of the path of the rotating band 1173 and cartridge case 1174 through the mechanism described.

This movement of the pawls is accomplished automatically by the cam 1347 (Figs. 9, 20 and 40) on the slide as the traverse carriage 1077 is moved to the ramming position. The cam 1347, it will be observed, is mounted in the path of movement of the cam follower 1346; and in the approximate position the ammunition receiving tray 1079 will occupy when in the ramming position. Thus, as the traverse carriage 1077 approaches the ramming position the follower 1346 commences engagement with the cam surface 1348 to begin moving the pawls 1085 out of the path of the rotating band 1173 and cartridge case 1174. When the traverse carriage finally reaches the ramming position and is locked in place the pawls will have been fully retracted to allow the ammunition to be rammed into the gun.

When it becomes necessary to return unfired ammunition from the traverse carriage 1077 to the loading tray 1066, the projectile holding pawls 1085 must first be moved to their fully retracted positions so as not to impede movement of either the projectile or the cartridge case. This is conveniently accomplished by a lever 1349 (Figs. 40 and 41), the arm 1350 of which is operable to engage the cam follower 1346, and the arm 1351 of which is connected to be manually actuated by the control rod 1352. The lever 1349 is pivotally mounted at its central portion on the slide side piece 1012, while the free end of the control rod 1352 is supported from a lug 1353 of the loading tray 1066 and is connected to a handle 1354. A compression spring 1355 surrounding the control rod 1352 and engaging a pin 1356 thereof abuts against the lug 1353 of the loading tray to urge the lever arm 1350 to its normally inoperative position. Thus, when it is desired to retract the projectile holding pawls 1085 preparatory to returning unfired ammunition, the handle 1354 of the control rod is moved forwardly against the compression of the spring 1355.

THE RECIPROCATING TRAY

The reciprocating tray 1080 (Figs. 9 and 36 to 38) is provided with the shoulders or lateral projections 1357 which extend for substantially the full length of the tray and engage the guide channels 1086 of the traverse carriage. The manner in which the tray 1080 is interlocked with the housing extension 1046 to insure reciprocation of the tray with the gun housing 1020 during recoil and counter-recoil has already been noted. When the traverse carriage 1077 is in the firing position of Fig. 9 the reciprocating tray 1080 is aligned with and forms a continuation of the housing extension 1046, this alignment being made possible through the terminal tongue-and-groove construction 1152. This tongue-and-groove construction is identical with the tongue-and-groove construction 1152 of the loading and ammunition receiving trays 1066 and 1079 (Figs. 20, 34 and 35) and with the tongue-and-groove construction 1152 of the empty case tray 1090.

Through these terminal constructions it is possible to align the reciprocating tray 1080 with the empty case tray 1090 and the ammunition receiving tray 1079 with the housing extension 1046 when the traverse carriage 1077 has been moved to the ramming position. In this position the gap between the terminal portions of the trays will be bridged even though the gun is slightly out of battery. A buffer 1358 (Figs. 37 and 38) of any suitable resilient material secured at the rear of the reciprocating tray 1080 receives the impact of the ejected cartridge case. In order to strengthen the reciprocating tray 1080 at its rear so that it may adequately withstand the impact of the empty cartridge case, the tray is provided at this point with a ribbed extension 1359. As previously noted, the interlocking engagement of the reciprocating tray 1080 with the housing extension 1046 is maintained in all positions of the traverse carriage 1077 through the guide arm 1089 (Figs. 7 and 9).

The details of the empty case latch 1091 for locking the ejected cartridge case in the reciprocating tray 1080 and the mechanism for retracting the latch when the traverse carriage is moved to the ramming position are shown in Figs. 43 to 46 of the drawings. The latch 1091 is shown fashioned as a lever and is provided with an opening 1360 at its central portion to receive the lug 1361 integral with the tray 1080 for pivotally supporting the lever. A pivotal mounting of the latch is accomplished by the bolt 1362 which extends through the latch 1091 and lug 1361 and is held in place by the nut 1363. The arm 1364 of the latch performs the latching function and is provided with an arcuate face 1365 to conform to the body of the cartridge case 1174. With no cartridge case in the tray, the arm 1364 is urged inwardly of the tray through an opening 1366 in its side wall. This inward movement of the latch is accomplished by the spring pressed plunger 1367 which engages the outer surface of the tray 1080 and is mounted in the remaining arm 1368 of the latch. When fully retracted, however, the arcuate face 1369 (Fig. 46) of the arm 1368 engages the exterior surface of the tray 1080 to limit the movement of the latch 1091.

When the traverse carriage 1077 is in the firing position preparatory to receiving the empty cartridge case, the arm 1364 of the latch 1091 will project into the reciprocating tray 1080 in the manner depicted in Fig. 43. As the ejected cartridge case 1174 travels rearwardly into the tray 1080, however, the flange 1370 of the case will slidably engage the face 1365 of the arm 1364 to partially retract the latch 1091. The locking of the cartridge case 1174 actually occurs as the flange 1370 leaves the face 1365 of the lever arm to engage the buffer 1358. When this occurs the spring pressed plunger 1367 causes the lever arm 1364 to move inwardly of the tray an amount until the face 1365 engages the body of the cartridge case 1174. In this partially retracted position of the latch the empty cartridge case 1174 is locked in the tray 1080, since any forward movement of the cartridge case is effectively prevented by the arcuate terminal surface (Figs. 44 and 45) of the lever arm 1364 which engages the cartridge case flange 1370.

Mechanism is provided for automatically withdrawing the latch 1091 to its fully retracted position to release the flange 1370 when the traverse carriage is in the ramming position, so that the case ejector may move the empty cartridge case into the empty case tray during the ramming operation. This mechanism as shown in Figs. 44 and 45 includes a lever 1371 pivotally mounted on a lug 1372 of the traverse carriage 1077. The arm 1373 of the lever is operable to engage an abutment 1374 (Fig. 45) integral with the latch 1091, while the remaining lever arm 1375 projects through an opening 1376 in the traverse carriage to engage the stop 1377 (Figs. 43 and 45) on the slide side piece 1013 when the traverse carriage reaches the ramming position. A spring pressed plunger 1378 (Figs. 44 and 45) on the under side of the traverse carriage 1077 maintains the lever 1371 in its normally inoperative position. If then the latch 1091 is partially retracted to lock an empty cartridge case in the tray 1080, the subsequent movement of the traverse carriage 1077 to the ramming position will fully retract the latch to release the flange 1370 of the cartridge case. This occurs when the stop 1377 engages the lever arm 1375 to rotate the lever 1371 and latch 1091 to the position shown in Fig. 45.

INTERLOCK F

An interlock is provided which prevents the withdrawal of the projectile tray and fuse setter from the projectile unless the empty case has been extracted into the reciprocating tray and locked in the rear position. This interlock is designated interlock F and consists of a three way valve 1379, the details of which will be described hereinafter. As shown in Figs. 9, 20 and 43, the body of the valve is bolted to the slide side piece 1012 at one side of the traverse carriage 1077 and is provided with a piston rod 1380 which is normally urged to the position shown to block the control pressure by a spring in the valve body. The piston rod 1380 is terminated in an adjustable abutment block 1381 that engages the arm 1382 of the manually operated lever 1383 pivoted on the slide piece 1012.

A counterclockwise rotation of the auxiliary control lever 1383 shifts the interlock valve 1379 to the left to permit the porting of control pressure, as will be pointed out in detail hereinafter. The manual shifting of the interlock valve 1379 becomes necessary when loading the first round of ammunition since under these circumstances there is no empty case in the carriage tray 1080.

When, however, a cartridge case has been locked in the carriage tray 1080 as previously described, the interlock valve 1379 will be shifted to the left automatically by a linkage shown in Figs. 43 to 46. This linkage consists essentially of a latch actuated bell crank 1384, a mechanism 1385 connected with the bell crank for storing some of the energy of the ejected cartridge case and a lever 1386 operated by the mechanism for shifting the interlock valve 1379. The shifting of the interlock valve 1379 to the left causes the displacement of hydraulic fluid within the valve body and within certain pipe lines connected therewith. The displacement of this fluid requires a longer time than that consumed by the cartridge case in partially retracting the latch 1091. These circumstances, therefore, make it necessary to store some of the kinetic energy of the cartridge case during the latching operation; and to utilize the stored energy within the time required for shifting the interlock valve.

How the foregoing is accomplished will become apparent from a detailed consideration of the linkage broadly outlined above. The bell crank 1384 consisting of the two arms 1387 and 1388 is pivotally supported in the bifurcation 1389 of the lug 1390 secured to the traverse carriage 1077, pivotal mounting of the bell crank 1384 being achieved by the bolt 1391 held in position by the nut 1392. The arm 1387 of the bell crank at all times engages the lateral surface of the cam 1393 integral with the latch 1091, while the remaining arm 1388 engages the circumferential recess of the spool 1394 forming a part of the energy storing mechanism 1385. The energy storing mechanism 1385 is shown in its normally inoperative position (Fig. 43) and includes a rod 1395 secured to the spool slidably supported at its free end in a rib or flange 1396 of the traverse carriage. A compression spring 1397 disposed between the spool 1394 and flange 1396 serves to restore the mechanism 1385 to the inoperative position shown in Fig. 43 when the case ejector has ejected the cartridge case into the empty case tray.

To the other end of the spool 1394 there is secured a cylinder 1398 as by a cotter pin 1399 in which there is disposed a piston 1400, the rod 1401 of which is pivotally connected to one end of the lever arm 1402. A spring 1403 is arranged between the piston 1400 and one end of the cylinder 1398 and serves to store a part of the kinetic energy of the ejected cartridge case for operating the lever 1386 to shift the interlock valve 1379. The lever 1386 is pivoted at 1404 on the carriage 1077 and has its remaining arm 1405 engaging the arm 1382 of the manually operated lever 1383. The partial retraction of the latch 1091 attending the locking of an empty cartridge case causes a counterclockwise movement of the bell crank 1384 (Fig. 43) and a movement of the spool 1394, rod 1395 and cylinder 1398 to the right with the attendant compression of the springs 1397 and 1403. Compression of the spring 1403 is possible because of the momentary immobilization of the piston 1400 due to the time required to operate the interlock valve 1379. The energy thus stored in the spring 1403 is gradually dissipated in moving the piston 1400 to the right until it recontacts the terminal surface of the spool 1394. During this movement of the piston 1400 the lever 1386 shifts the interlock valve 1379 to the left to permit porting of the desired control pressure.

As the traverse carriage 1077 moves to the ramming position the arm 1405 of the lever 1386 disengages the auxiliary control lever 1383, thus permitting the interlock valve 1379 to shift to the right to occupy its normal position. The lever 1386, however, is retained in the position to which it has been moved by clockwise rotation until the empty case is removed by the case ejector into the empty case tray and the lever 1371 (Fig. 45) has disengaged the stop 1377. When this occurs the latch 1091 is released and simultaneously therewith the compression spring 1397 urges the bell crank arm 1388, the cylinder 1398 and piston 1400 engaged therewith to the left to restore the lever 1386 to its normally inoperative position shown. The curved terminal portion of the lever arm 1405 permits proper engagement of this arm with the auxiliary control lever 1383 when the traverse carriage is again moved to the firing position under various conditions of operation.

It should be carefully noted that the interlock valve 1379 will be properly shifted to permit the porting of control pressure only when the empty case has been extracted into the carriage tray 1080 and locked in the rear position. The interlock F prevents a possible jam which would occur if the empty case remained partly in the carriage tray 1080 and partly in the housing extension 1046. It also provides a fixed time between the withdrawal of the projectile tray and fuse setter from the projectile and the loading of the ammunition into the gun. This fixed time interval determines a constant correction factor to be applied to the fuse setter and thus insures a more accurate firing of the gun when used for anti-aircraft purposes.

THE RAMMER

The details of the rammer are shown in Figs. 22, 23 and 47 to 50 of the drawings. As there indicated, the rammer 1106 includes a housing 1107 in which there is slidably mounted the rammer head 1108 secured to the chain 1406 driven by the sprocket wheel 1109. The housing 1107 is shown by way of illustration as formed of two substantially complementary members 1407 and 1408 bolted together and recessed to provide guide channels 1409 and 1410 and a casing 1411 for the sprocket 1109. The rollers 1412 and 1413 (Fig. 49) of the chain engage vertical and horizontal surfaces of the guide channels, while the sprocket 1109 is supported by suitable roller bearings 1414 and 1415 (Fig. 50) in the casing 1411 and is splined to the shaft 1416. The lower guide channel 1410 (Figs. 48 and 49) is slotted at 1417 for substantially its entire length to slidably receive the rammer head 1108 which is connected with one end of the chain 1406 in any suitable manner. Since the rammer housing 1107 is not aligned with the breech of the gun for reasons already noted, additional support is provided for the head 1108 by the lateral guide 1111 which is preferably made integral with the housing.

The rammer head 1108 (Figs. 23, 47 and 48) is shown comprised of a plate 1418 extending obliquely downward from the housing 1107 and terminating in an integral socket 1419 in which there is securely mounted a resilient buffer 1420. The buffer 1420 is aligned with the breech and is adapted to engage the cartridge case 1174, while the obliquity of the plate 1418 is such that the rammer head 1108 may enter the vertical and longitudinal housing slots 1036 and 1037 (Fig. 3) for ramming the ammunition into the gun. The plate 1418 is provided at its upper end with two extensions 1421 and 1422 disposed at right angles to each other for cooperation respectively with the chain 1406 and guide 1111 of the rammer housing. The extensions 1421 and 1422, the plate 1418 and the socket 1419 are shown reinforced by integral ribs or flanges 1423 and 1424 to impart the necessary strength and rigidity to the rammer head. A lug 1425 integral with the plate extension 1421 projects inwardly of the housing slot 1417 for securement with the chain 1406 and is guided in the channel 1410 by rollers 1426 and 1427 engaging vertical and horizontal channel surfaces. The remaining plate extension 1422 is provided with a T-shaped slot 1428 for slidably receiving the T-shaped guide 1111. The plate extension 1422 is of sufficient length to adequately resist the moments to which the head 1108 is subjected when ramming the ammunition into the gun.

A rammer indicator 1429 is provided for indicating when the ramming stroke has been completed. This indicator (Figs. 6, 7, 47 and 49) includes a plate 1430 on which there are inscribed suitable indicia such as "Out" and "In," the plate being supported by the bracket 1431 from the housing counterweight 1141. A shaft 1432 is rotatably mounted in the arms of the bracket and has a pointer 1433 secured at one end thereof for cooperation with the indicia on the plate 1430, while a lever 1434 secured to the remaining end of the shaft 1432 is arranged to be engaged and actuated by a cam surface 1435 (Figs. 22 and 47) of the rammer head extension 1422. A coil spring 1436 secured to the shaft 1432 and bracket 1431 normally maintains the pointer 1433 in a position to indicate that the rammer head is out or retracted. As the rammer head 1108 approaches its forward position, however, when ramming ammunition into the gun, the cam surface 1435 of the head extension 1422 engages the lever 1434 and initiates rotation of the pointer 1433. When the rammer has completed its ramming stroke by causing the flange of the cartridge case to contact the breech face of the gun, the pointer 1433 will be rotated to the indicium "In" to indicate this fact. Upon retraction of the rammer, the indicator spring 1436 automatically returns the pointer 1433 to its "Out" position. The rammer indicator 1429 is so mounted as to be exposed to the view of the operator of the control lever 1139.

THE CASE EJECTOR

The details of the case ejector are shown in Figs. 22, 23 and 50 to 53 of the drawings. As there indicated, the case ejector 1112 includes the housing 1113 in which there is slidably mounted a case ejector head 1114 secured to the chain 1437 driven by the sprocket wheel 1115. The housing 1113 is shown by way of example as formed of two substantially complementary members 1438 and 1439 bolted together and recessed to provide guide channels 1440 and 1441 (Fig. 52) for the chain 1437 and a casing 1442 (Fig. 50) for the sprocket 1115. The rollers 1443 and 1444 (Fig. 52) of the chain 1437 engage vertical and horizontal surfaces of the guide channels, while the sprocket 1115 (Fig. 50) is supported by suitable roller bearings 1445 and 1446 in the casing 1442 and is fixed to the shaft 1447. The lower guide channel 1441 is slotted at 1448 (Figs. 52 and 53) for the greater part of its length to slidably receive the ejector head 1114 which is connected with one end of the chain 1437 in any suitable manner. Since the ejector housing 1113 is not aligned with the empty case tray 1090 for reasons already noted, additional support is provided for the head 1114 by the lateral guide 1118 which are preferably made integral with the housing.

The case ejector head 1114 (Figs. 51 to 53) is also comprised of a plate 1449 extending obliquely downward from the housing 1113 and terminating in an integral socket 1450 for supporting a resilient buffer 1451. The obliquity of the plate 1449 is such as to align the buffer 1451 with the empty case tray 1090, thus facilitating the ejection of the empty cartridge case from the traverse carriage. At its upper end the plate 1449 is provided with two recessed extensions 1452 and 1453 for receiving the lateral guides 1118. The extensions 1452 and 1453 are of sufficient length to adequately resist the moments to which the head is subjected when ejecting the cartridge case into the empty case tray 1090. Ribs or flanges 1454 and 1455 are integral with the plate 1449 and socket 1450 and merge with the extensions 1452 and 1453 for imparting the necessary strength and rigidity to the ejector head. A lug 1456 integral with the plate extensions 1452 and 1453 projects inwardly of the housing slot 1448 for securement with the chain 1437 and is guided in the channel 1441 by rollers 1457 and 1458 engaging vertical and horizontal surfaces.

THE RAMMER AND CASE EJECTOR DRIVE CONNECTIONS

The details of the common drive connection 1131 between the rammer and case ejector drive control unit 1125 and the sprockets 1109 and 1115 of the rammer and case ejector housings are shown in Figs. 22 and 50. As there indicated, the shaft 1416 of the control unit 1125 is the common drive output shaft for the rammer and case ejector. This shaft is directly connected to the sprocket 1109 (Fig. 50) in the rammer housing, while a flexible coupling 1459 (Fig. 22) connects the shaft 1416 with the sprocket shaft 1447 (Fig. 50) of the ejector housing. Rotation of the common shaft 1416 by the hydraulic unit 1125 will thus simultaneously impart rotation to the two sprockets 1109 and 1115 and movement to the rammer and case ejector heads 1108 and 1114.

Provision is made for operating the rammer and case ejector manually in the event of power failure or failure of the hydraulic equipment. The details of the manual drive connection are shown in Figs. 22, 50, 51 and 53. As there disclosed, the manual drive connection includes a gear housing 1460 bolted or otherwise secured to the ejector housing 1113 adjacent the sprocket casing 1442. A gear train is enclosed by the gear housing 1460 and includes the reduction gears 1461, 1462 and 1463. A gear 1461 (Fig. 50) of the train is splined to an extension 1464 of the ejector sprocket 1115 and is locked in place by the nut 1465. The gears 1462 and 1463, however, are mounted on separate shafts 1466 and 1467 within the housing 1460, the gear 1462 being freely rotatable on its shaft, while the gear 1463 is fixed to rotate with the shaft 1467. A handwheel 1468 is removably splined to the shaft 1467 and when in position makes it possible to impart manual rotation to the two sprockets 1109 and 1115 and through these movement to the rammer and case ejector.

Before it becomes possible to operate the rammer and case ejector manually, however, it is first necessary to release the rammer and case ejector drive detent to be detailed hereinafter. This detent is incorporated in the rammer and case ejector drive control unit 1125 (Fig. 22) and is operated by the lever 1469 (Fig. 7) of the detent release. The detent release described above releases the rammer and case ejector 1106 and 1112 from their locked positions; and is operated only during manual operation of the rammer and case ejector.

THE TRAVERSE CARRIAGE, RAMMER, AND CASE EJECTOR CONTROL CONNECTIONS

A traverse carriage and rammer control lever 1139 (Fig. 22) is mounted on the rammer and case ejector drive control unit 1125 for controlling the movements of the traverse carriage 1077, the case stop 1100, the rammer 1106, the empty case ejector 1112 and the breech block 1038. This control is accomplished through a linkage 1140 interconnecting the lever 1139 with the traverse carriage control valve and the rammer and case ejector control valve, both of which are conveniently incorporated in the rammer and case ejector drive control unit 1125. The details of these valves and of the linkage and lever will be noted hereinafter in connection with the hydraulic circuit. However, in order to facilitate an understanding of the modus operandi of the mechanisms already described, certain features of the control lever and linkage will be described at this point.

A bearing 1470 (Figs. 6 and 22) secured in any suitable manner to the rammer and case ejector drive control unit 1125 slidably and rotatably supports a rod 1471, to one end of which there is rigidly secured a lug 1472 for cooperation with the slotted guide plate 1473 mounted on bearing 1470. A link 1474 is mounted on the rod 1471 by bearings which engage the lateral surfaces of the bearing 1470 on the rammer and case ejector drive control unit 1125. Thus, movement of the link 1474 longitudinally of the bearing 1470 is prevented, while permitting sliding movement of the rod 1471 through this bearing and those of the link 1474. The manually operated traverse carriage and rammer control lever 1139 is pivotally connected to the ends of the rod 1471 and the link 1474 by bifurcations. When rotation of the lever 1139 is therefore permitted, the bifurcated construction insures that the lever 1139, link 1474 and rod 1471 will rotate as a unit about the bearing 1470.

The plate 1473 serves to guide and limit the movement of the traverse carriage and rammer control lever 1139 and to this end is provided with a longitudinal slot 1475 which terminates in two transverse slots 1476 and 1477. The transverse slot 1476, it will be noted, extends to both sides of the longitudinal slot 1475. The lug 1472, which slides in the slots of the plate, makes it possible for the control lever 1139 to occupy six different positions. When the traverse carriage and rammer control lever 1139 is in the neutral position shown, the lug 1472 is centrally positioned in the longitudinal slot 1475 and the lever cannot be rotated about the bearing 1470.

A linkage (Figs. 6, 7, 11 and 22) interconnects the rod 1471 and the piston rod 1478 of the traverse carriage control valve 1479 to shift this valve to the desired positions through the proper manipulation of the control lever 1139. This linkage consists of a rotatably mounted rod 1480, to one end of which there is rigidly secured a lever 1481 that is engaged and operated by the rod 1471. To the other end of the rotatably mounted rod 1480 there is also rigidly secured a lever 1482 that is pivotally connected with a link 1483. A bell crank 1484 connects with the other end of the link 1483 and with the free end of the piston rod 1478 of the traverse carriage control valve 1479 to impart the desired movement to this valve.

A linkage also interconnects the link 1474 and the piston rod 1485 of the rammer and case ejector control valve 1486 to shift this valve to the desired position when the control lever 1139, link 1474 and rod 1471 are rotated as a unit about bearing 1470. This linkage consists of the link 1487 pivotally connected at one end with the link 1474, and connected at the other end with the lever 1488 rigid with the rotatable shaft 1489. Another lever 1490 rigidly secured to the rotatable shaft 1489 connects to the free end of the piston rod 1485 of the rammer and case ejector control valve 1486 to impart the desired movement to this valve.

By means of the foregoing construction the control lever 1139 can be shifted to either the left or the right of the neutral position shown, to move the lug 1472 into either the transverse slot 1476 or the transverse slot 1477. When shifted to move the lug 1472 into a transverse slot, the lever 1139, link 1474 and rod 1471 can as a unit be rotated through a limited angle about the bearing 1470. The shifting of the lever 1139 to either the right or left of its neutral position effects the desired control of the traverse carriage control valve 1479 (Figs. 6 and 22), while rotation of the lever 1139 about the bearing 1470 operates the rammer and case ejector control valve 1486 (Figs. 6, 11 and 22) in the desired manner. When the traverse carriage and rammer control lever 1139 is in its neutral position the lug 1472 is centrally positioned in the longitudinal slot 1475 of the plate 1473. In consequence thereof, the lever cannot be rotated about the bearing 1470.

When the control lever 1139 is moved from its neutral position to the position "move traverse carriage to ramming position," the lug 1472 moves to the right from its neutral position along the longitudinal slot 1475 and is stopped with the lever when the lug abuts the wall portion of the transverse slot 1476 in alignment with the longitudinal slot. With the control lever in the position "move traverse carriage to ramming position," upward rotation of the lever 1139 about the bearing 1470 will cause the lever to occupy the "ram" position. In the "ram" position the lug 1472 abuts the upper terminal wall surface of the transverse slot 1476 to limit the upward rotation of the lever. Upon completion of the ramming stroke the traverse carriage and rammer control lever 1139 is released and is then automatically returned to its neutral position by spring action of the control valves in a manner to be pointed out hereinafter.

When the control lever 1139 is moved from its neutral position to the position "move traverse carriage to firing position," the lug 1472 moves to the left from its neutral position along the longitudinal slot 1475 and is stopped with the lever when the lug abuts the wall portion of the transverse slot 1477 in alignment with the longitudinal slot. With the control lever 1139 in the position "move traverse carriage to firing position," it is only possible to rotate the lever downwardly about the bearing 1470 to occupy the "retract" position. In the "retract" position the lug 1472 abuts the lower terminal wall surface of the transverse slot 1477 to limit the downward rotation of the lever. Upon release of the control lever 1139, the lever is again returned to its neutral position by the spring action of the control valves.

THE MOVEMENT OF THE AMMUNITION FROM THE FIRING POSITION TO THE RAMMING POSITION

At the end of the projectile tray travel the projectile tray 1070 (Fig. 9) enters the slot 1084 of the ammunition receiving tray 1079, while the projectile tray drive control unit 1122 (Fig. 5) decelerates the case stop head 1102, the amunition and the projectile tray 1070. The projectile tray is locked in its rear position by the projectile tray drive control unit 1122; and at the same time the case stop drive control unit 1120, in combination with the projectile tray drive control unit 1122, locks the case stop head 1102 in the position to which it has been moved by the projectile tray and the ammunition. When the projectile tray 1070 has entered the ammunition receiving tray 1079 and is locked in its rear position, the projectile holding pawls 1085 (Fig. 9) will have moved into a position to engage the rotating band of the projectile to prevent forward movement of the projectile as the projectile tray is withdrawn.

In describing the hydraulic movement of the ammunition from the firing position to the ramming position it will be assumed that the fuse setter socket has made one complete revolution to set the projectile fuse; that the projectile tray has completed its rearward travel and is locked in its rear position; that the breech block is open; and that the empty case latch has locked the ejected cartridge case in the reciprocating carriage tray. The interlock F, as previously noted, prevents the porting of control pressure unless the empty cartridge case is properly latched. Other interlocks to be detailed hereinafter insure that the remaining events shall have occurred before control pressure can be ported to initiate withdrawal of the projectile tray. The operation of moving the ammunition to the ramming position is then begun by moving the traverse carriage and rammer control lever 1139 (Fig. 22) to the "move traverse carriage to ramming position" to shift the traverse carriage control valve 1479 (Figs. 6 and 22) to its appropriate position.

The movement of the traverse carriage and rammer control lever 1139 to the position described closes appropriate hydraulic control circuits to be detailed hereinafter and releases the projectile tray drive control unit 1122 (Fig. 5) from its locked rear position. The projectile tray 1070 then commences withdrawing from the ammunition, its acceleration, constant velocity, and deceleration, being controlled by the projectile tray drive control unit. The projectile tray drive control unit 1122 ultimately locks the projectile tray 1070 in its forward position. Simultaneously, with the release of the projectile tray drive control unit 1122 the case stop head 1102 is released from its locked position, thus allowing the ammunition to complete its rearward movement in the carriage tray 1079 at high angles of elevation. In the final movement of the ammunition to the rear, the case stop motor 1119 (Fig. 5) is driven as a pump by the component weight of the ammunition. When the ammunition reaches its rearward position in the carriage tray 1079 the cartridge case will engage the resilient buffer 1329.

As soon as the projectile tray 1070 has withdrawn from the ammunition and moved forward sufficiently to clear the traverse carriage 1077, an interlock of the projectile tray drive control unit 1122 permits the porting of control pressure to unlock the traverse carriage drive control unit 1123 (Fig. 5). The traverse carriage drive control unit then moves the traverse carriage 1077 automatically from the firing position (Fig. 9) to the ramming position, the acceleration, deceleration and locking of the traverse carriage in the ramming position being controlled by the traverse carriage control unit 1123. When the traverse carriage 1077 has moved towards the ramming position sufficiently to prevent any interference between a forwardly moving case stop head 1102 and the ammunition in the traverse carriage, an interlock in the traverse carriage drive control unit 1123 is operated.

The operation of this interlock closes an appropriate control circuit and causes the case stop head 1102 to move forward automatically. The case stop drive control unit 1120 (Fig. 5) controls the acceleration, constant velocity and deceleration of the case stop head 1102 and finally locks the head in its forward position. The arrangement is preferably such that the traverse carriage 1077 arrives at the ramming position at the same time that the case stop head 1102 reaches its forward position. When the traverse carriage 1077 finally reaches the ramming position and is locked in place the projectile holding pawls 1085 (Figs. 9, 40 and 41) will have been fully retracted by the engagement of the cam follower 1346 with the cam 1347 to allow the ammunition to be rammed into the gun. At the same time the lever 1371 (Figs. 9, 43 and 45) will have engaged the stop 1377 to fully retract the empty case latch 1091 and release the flange of the cartridge case. The case ejector head 1114 may now move the empty cartridge case into the empty case tray 1090 during the ramming operation.

THE RAMMING OF THE AMMUNITION AND THE EJECTION OF THE EMPTY CASE

Movement of the traverse carriage and rammer control lever 1139 (Fig. 22) from the position "move traverse carriage to ramming position" to the "ram" position shifts the rammer and case ejector control valve 1486 (Figs. 6, 11 and 22) to its proper position and releases the rammer and case ejector drive control unit 1125 from its locked rear position. This release is effected only if the traverse carriage 1077 is locked in the ramming position and if the breech block 1038 is open. The rammer and case ejector heads 1108 and 1114 (Figs. 9, 22 and 23) then move forward simultaneously and contact the cartridge case and the empty case respectively. The rammer head 1108 moves the cartridge case and the projectile into the gun barrel and stops against the case when the flange of the cartridge case contacts the breech face of the gun. During the ramming stroke the case ejector head 1114 moves the empty cartridge case into the empty case tray 1090, where it is locked in place by the latches 1094 and its kinetic energy is absorbed by the buffer 1095.

The rammer and case ejector heads 1108 and 1114 are decelerated at the end of the ramming stroke by the rammer and case ejector drive control unit 1125. If the ammunition has been rammed forward sufficiently the rear of the cartridge case flange will contact the breech block case retaining pawl to be described and thus prevents the ammunition from moving to the rear. It is necessary to hold the traverse carriage and rammer control lever 1139 in the "ram" position in order to complete the ramming stroke, the end of this stroke being indicated visually by the rammer indicator 1429 (Fig. 7).

THE RETRACTION OF THE RAMMER AND CASE EJECTOR AND THE CLOSING OF THE BREECH BLOCK

At the completion of the ramming stroke the traverse carriage and rammer control lever 1139 (Fig. 22) is moved to the position "move traverse carriage to firing position" and then immediately to the "retract" position to shift the carriage and rammer control valves 1479 and 1486 (Figs. 6 and 22) to their proper position. When the control lever 1139 has been moved as described, the traverse carriage 1077 is unlocked from its ramming position and commences moving to the firing position (Fig. 9); and the rammer and case ejector heads 1108 and 1114 begin retracting. The traverse carriage drive control unit 1123 (Fig. 5) moves the traverse carriage to the firing position, where the traverse carriage is automatically locked in place. The rammer and case ejector drive control unit 1125 (Fig. 22) retracts the rammer and case ejector heads 1108 and 1114 and locks them automatically in their retracted positions.

As soon as the rammer head 1108 has retracted sufficiently to clear the breech block 1038, the rammer and case ejector drive control unit 1125 (Fig. 6) operates an interlock to be described which ports control pressure to the valve resetting cylinder 1065 (Figs. 6 and 7). This cylinder then operates to reset one of the valves in the breech operating valve block 1063 to initiate closing movement of the breech block 1038. As soon as the traverse carriage 1077 has moved a short distance towards the firing position and the breech block 1038 has started to move in the closing direction, the traverse carriage and rammer control lever 1139 may be released. Upon releasing the lever, it will be returned by spring action to its neutral position. The traverse carriage will continue moving to the firing position, where it will lock in place; and the breech block closes completely, at which time it will be locked by the breech bolt.

THE BREECH BLOCK

The details of the breech block and its mounting are disclosed in Figs. 54 and 55 of the drawings. As there shown, the breech block 1038 is provided with the lateral extensions or shoulders 1044 and 1045 slidably engaging the inclined guide grooves 1041 and 1042 of the housing 1020. Spring loaded wedges 1491 and 1492 in the housing cooperate with beveled surfaces 1493 and 1494 of the lateral extensions 1044 and 1045 and with the beveled grooves 1495 and 1496 thereof for releasably latching the breech block in certain of its positions. Each of the wedges includes a head 1497 and an integral shank 1498, the head being provided with beveled surfaces 1499 and 1500 which are complementary with the beveled surfaces 1493 and 1494 of the breech block and with the beveled surfaces 1501 and 1502 of the grooves 1495 and 1496. A pin 1503 is fixed to the shank 1498 and slidably engages slots 1504 in the housing to insure proper cooperation between the beveled surfaces of the head 1497 and those of the breech block 1038. A compression spring 1505 contacts the head 1497 and a washer 1506 loosely surrounding the shank 1498 for urging the wedges 1491 and 1492 inwardly to engage the breech block 1038, the spring having sufficient strength to releasably latch the breech block in either its loading position or its closed position. A stop or lug 1507 secured to the gun housing 1020 limits the upward movement of the breech block.

Certain details of the hydraulic mechanism for automatically opening and closing the breech block are also shown in Figs. 54 and 55. A detailed description of this mechanism will be set forth in connection with the description of the hydraulic circuit. Certain general features of the mechanism, however, are noted at this point. As shown in the drawings, the hydraulic mechanism includes the breech block operating cylinder assembly 1059, the cylinder 1060 of which is secured to the gun housing by the bracket 1061 and the piston rod 1062 of which is attached to the breech block 1038. A breech operating valve block 1063, which serves as a control unit, is mounted on the housing for supplying hydraulic fluid to the cylinder 1060; and is in turn connected with the fixed hydraulic assemblies of the gun by the sliding joint assembly 1064 secured to the slide. The valve resetting cylinder 1065 is also mounted on the slide and operates to reset one of the valves in the breech operating valve block 1063 to initiate closing movement of the breech block.

The operation of the spring loaded wedges 1491 and 1492 in the opening and closing of the breech block will now be described. In order to clarify the statement of operation, it will be assumed that the maximum travel of the breech block in its opening movement is approximately 10.5 inches. It is to be understood, however, that the distance of 10.5 inches is in no wise deemed critical and that it is employed for illustrative purposes only. Other maximum distances of travel for the breech block are clearly within the purview of the present invention and will readily suggest themselves to those skilled in the art in the light of the teachings herein. In the closed position of the breech block shown (Fig. 55) the block 1038 is effectively locked by the breech bolt 1508 (Fig. 54) and the beveled surfaces 1499 of the wedges 1491 and 1492 engage corresponding surfaces 1493 and 1494 of the shoulders 1044 and 1045. As the gun counter-recoils, mechanism to be detailed withdraws the breech bolt 1508 and opens a valve in the valve block 1063 to port pressure to the cylinder assembly 1059. During this withdrawal the spring loaded wedges 1491 and 1492 hold the breech block in its closed position to permit retraction of the breech bolt 1508 and unlatching of the breech block. Upon the porting of fluid pressure to the cylinder assembly 1059, the breech block opens and the wedges 1491 and 1492 are urged inwardly of the housing, out of the path of the breech block.

After the first nine inches of travel of the breech block, the wedges 1491 and 1492 move into the shoulder grooves 1495 and 1496 and the beveled surfaces 1500 of the wedges momentarily contact the beveled surfaces 1502 of the grooves. As the breech block 1038 continues its downward travel from the nine inch or loading position to operate the empty case extractors, a spring 1509 in the cylinder assembly 1059 whose initial compression is substantially equal to the weight of the breech block is further compressed until the breech block completes its downward travel to the 10.5 inch position. Over travel of the breech block is prevented by the engagement of the beveled surfaces 1499 of the wedges with the beveled surfaces 1501 of the grooves. The energy stored in the spring 1509 of the cylinder assembly now moves the breech block upwardly to its nine inch or loading position where the beveled surfaces 1500 of the wedges recontact the beveled surfaces 1502 of the grooves and latch the breech block in place. The breech block 1038 is now detented in place prepraratory to the ramming operation and will remain in the loading position until the valve resetting cylinder 1065 resets one of the valves of the breech operating valve block 1063 to initiate closing movement of the breech block. When this occurs the breech block 1038 closes and is arrested in its upward movement by striking the stop or lug 1507. In this position the beveled surfaces 1499 of the wedges re-engage the beveled surfaces 1493 and 1494 of the shoulders and hold the breech block in position until it is again locked by the breech bolt.

As previously noted, when the ammunition has been rammed forward sufficiently the rear of the cartridge case flange will contact a breech block case retaining pawl to prevent the ammunition from moving to the rear at high angles of elevation upon withdrawal of the rammer. The pawl, identified by the reference character 1510 (Fig. 63), is pivotally mounted by a pin 1511 in a recess 1512 disposed substantially centrally of the upper surfaces 1058 of the breech block. A spring pressed plunger 1513 normally urges the pawl 1510 to the position shown, its upward movement terminating in this position by the abutment of the rear of the pawl with the rear wall of the recess. With the breech block in its nine inch or loading position it is evident that the ammunition will depress the pawl 1510 into the recess 1512 during the ramming operation. When, however, the cartridge case flange 1370 contacts the breech face 1043, the pawl 1510 will have been urged upwardly by the plunger 1513 to cause its terminal surface 1514 to engage the rear of the cartridge case flange and thus prevent the ammunition from moving to the rear. A beveled surface 1515 of the pawl moves into a position to be engaged by the ejected cartridge case 1174 during the opening of the breech block and thus insures depression of the pawl 1510 as the breech block opens beyond its nine inch or loading position.

Provision is made for operating the breech block manually in the event of power failure or failure of the hydraulic equipment. As shown in Figs. 4 to 7 and 62 the mechanism for manually opening and closing the breech block includes a link 1516 pivotally secured at one end to a lug 1517 in the shoulder 1044 of the breech block 1038 and at the other end to the lever arm 1518. The lever arm 1518 is rotatably mounted in the bearing 1519 which is fixedly secured to the counterweight 1141 connected to and positioned on the gun housing 1020. Thus it should be clear that the lever arm 1518 and bearing 1519 recoil and counter-recoil with the gun housing 1020. A frame 1520 bolted or otherwise secured to the slide has a bearing 1521 integral therewith and a cylinder 1522 in which there is enclosed a piston 1523 and a compression spring 1524. The cylinder, piston and spring provide a counter-poise for the breech block. A shaft 1525 rotatably supported by the bearing 1521 has a cam 1526 and a lever arm 1527 secured to one end thereof, the cam being connected with the piston rod 1528 by the chain 1529. A handle 1530 is removably splined to the remaining end of the shaft 1525.

A clutch is provided for connecting the lever arm 1527 of the shaft 1525 with the lever arm 1518 which directly actuates the breech block 1038. The clutch includes a pin 1531 slidable within the lever arm 1527 and movable from the retracted position shown to a position to engage the recess 1532 of the lever arm 1518. Movement of the pin 1531 is accomplished by the knob 1533 which is secured to the pin through a slot in the lever arm 1527. A spring pressed non-positive detent 1534 releasably latches the pin 1531 in either of its two positions. If the pin has been shifted to engage the recess 1532 of the lever arm 1518 it will be automatically moved to its retracted position by the beveled surface 1535 of the recess during recoil of the gun. The cam 1526, lever arms 1518 and 1527 and spring 1524 are so designed with reference to each other and the breech block 1038 so that the mechanism will substantially balance the breech block in all of its positions. A stop 1536 integral with the bearing 1521 limits the upward movement of the lever arm 1527.

The mechanism for manually opening and closing the breech block is shown in Fig. 62 of the drawings with the clutch disengaged, the breech block closed and the gun in battery. If now it becomes necessary to open the breech block 1038 manually to load ammunition into the gun, the pin 1531 is first shifted to the left by the knob 1533 where it is detented in place and caused to engage the recess 1532 of the lever 1518. On the assumption that the breech bolt 1508 has been withdrawn, the handle 1530 is rotated in a counterclockwise direction until the breech block 1038 reaches the desired position. During this rotation the chain 1529 engages the cam surface of the cam 1526 and the spring 1524 in the cylinder 1522 is further compressed. As previously explained, however, the cam 1526, lever arms 1518 and 1527 and the spring 1524 are so designed with reference to each other and the breech block that the mechanism substantially balances the breech block in all of its positions. After the ammunition has been loaded into the gun, the breech block 1038 is closed by rotating the handle 1530 in a clockwise direction. When closed and latched in place by the breech bolt 1508, the gun may be fired. During recoil of the gun the pin 1531 is moved to its retracted position by the beveled surface 1535 of the recess and is detented in place. In this position of the pin the clutch is disengaged. The arrangement of the clutch is therefore such that when the breech block is hydraulically operated the shaft 1525 will be disconnected from the lever 1518.

THE BREECH BOLT AND THE BREECH BLOCK UNLATCHING MECHANISM

The details of the breech bolt and the breech block unlatching mechanism are shown in Figs. 54, 55, 60 and 62 of the drawings. As there indicated, one side of the breech bolt 1508 is provided with a longitudinal recess 1537 for receiving the compression spring 1538 which normally urges the breech bolt to the latched position shown. A plate 1539 (Fig. 60) secured to the breech block 1038 in any suitable manner has its upper end shaped to enter the longitudinal recess 1537 and engage the compression spring 1538. The plate 1539 thus retains the spring in the breech block and makes possible a compression of the spring 1538 as the breech bolt 1508 is withdrawn. The remaining side of the breech bolt 1508 has a rack 1540 (Figs. 54 and 55) integral therewith meshing with the pinion 1541 (Fig. 55) freely rotatable on the pin 1542 of the breech block. The breech block unlatching mechanism includes the rack 1543 also meshing with the pinion 1541 and the push rod 1544 for actuating the same. The rack 1543 is disposed substantially normally to the breech bolt 1508 and moves to engage a slot 1545 (Fig. 54) of the breech bolt with its free end as the push rod 1544 urges the rack 1543 inwardly to retract the bolt. It should be carefully noted that the rack 1543 is slidably mounted in the breech block 1038, while the push rod 1544 is arranged for reciprocating movement in the gun housing 1020.

A pawl (Fig. 55) identified in general by the reference character 1546 is integral with the rack 1543 and is directly engaged by the push rod 1544 in the closed position of the breech block shown. The pawl 1546 is comprised of fixed and movable complementary members 1547 and 1548 which are urged out of contact with each other by the interposed spring 1549 when the breech bolt 1508 is withdrawn. The movable pawl member 1548 is pivotally mounted on the rack 1543 by the pin 1550 and cooperates with a fixed cam 1551 of the housing in a manner which will now be described. When the push rod 1544 urges the rack 1543 to the left to retract the bolt 1508 and unlatch the breech block, the compression spring 1549 separates the movable and fixed pawl members 1547 and 1548 and causes the terminal surface 1552 of the movable pawl member 1548 to engage the surface 1553 of the cam 1551. The terminal surfaces 1552 and 1554 of the pawl members 1548 and 1547 respectively are now aligned with the groove 1555 in the gun housing; and the breech bolt 1508 is held in its retracted position with the breech block unlatched. In its retracted position a slight clearance exists between the terminal surface of the breech bolt and the cam surface of the bolt cam plate 1659 (Fig. 54), the details of which will be noted hereinafter.

As the breech block 1038 commences opening the fixed pawl member 1547 enters the groove 1555 but does not engage the wall of the groove with its terminal surface 1554 inasmuch as the pawl 1546 moves to the left for a distance sufficient to prevent the terminal surface 1554 of the pawl member 1547 from contacting the wall of the groove. When the terminal surface 1552 (Fig. 55) of the movable pawl member 1548 has moved to disengage the cam surface 1553, the spring 1538 of the breech bolt moves the breech bolt into contact with the cam surface of the bolt cam plate 1659 (Fig. 54) where it is held retracted. Simultaneously with this inward movement of the breech bolt to take up the clearance previously described, the pawl 1546 moves to the right due to the fact that the rack 1543 slidably moves to the right in the breech block 1038 upon movement of the breech bolt. In so doing, however, the terminal surface 1554 of the fixed pawl member 1547 does not engage the wall of the groove 1555 since the bolt cam plate 1659 alone is operative in holding the breech bolt retracted in all open positions of the breech block. The lateral surface 1556 of the movable pawl member 1548 is now in a position to contact the remaining surface 1557 of the cam 1551 and cause the movable pawl member 1548 to re-engage the fixed pawl member 1547 with attendant compression of the spring 1549 when the breech block 1038 again moves to its closed position. When, therefore, the breech block is again in its closed position the rack 1543 and pawl 1546 are urged by the bolt spring 1538 to occupy the position shown in Fig. 55, while at the same time the breech block is latched. A depending lug 1558 prevents rotation of the push rod 1544, while a terminal lug 1559 of the push rod movable in the longitudinal slot 1560 of the slide attending the recoil and counter-recoil of the gun housing provides an abutment for actuating the breech block unlatching mechanism.

Automatic withdrawal of the breech bolt 1508 is accomplished by the breech block unlatching cam 1561 (Fig. 62) during the counter-recoil of the gun and housing. This cam is pivotally mounted by the pin 1562 in the slot 1560 of the slide within the recoil distance of the housing and is normally urged by the spring 1563 (Fig. 62) to engage the lower surface 1564 (Fig. 55) of the slot 1560. On the assumption that the breech block 1038 is locked in the closed position indicated in Fig. 55, the lug 1559 of the push rod 1544 will engage the lower surface 1565 (Fig. 62) of the unlatching cam 1561 during recoil of the gun and will move the cam upwardly out of the path of the lug 1559. When the gun completes its recoil the lug 1559 will have disengaged the lower surface 1565 of the cam 1561, thus permitting the spring 1563 to move the cam into the path of the lug 1559 and again into contact with the lower surface 1564 of the slot 1560. In the counter-recoil of the gun therefore the lug 1559 of the push rod momentarily contacts the lateral cam surface 1566 of the unlatching cam 1561 which has the effect of shifting the push rod 1544 to the left to retract the breech bolt 1508 and unlatch the breech block as previously explained. The breech block 1038 may now be opened.

Provision is made for withdrawing the breech bolt manually when this becomes necessary. Thus, as shown in Figs. 4, 5, 55 and 62, a rod 1567 is rotatably mounted in the slide bifurcation 1018 in a position substantially opposite that occupied by the push rod 1544 when the gun is in battery. To one end of the rod 1567 there is secured the handle 1568, while to the remaining end there is secured the cam 1569 (Figs. 55 and 62) which is adapted to engage the lug 1559 of the push rod 1544. A spring 1570 secured to the rod 1567 and slide holds the cam 1569 in its normally inoperative position. When, therefore, the gun is in battery and it is desired to unlatch the breech block manually, the handle 1568 is moved in a forward direction to cause a shifting of the push rod 1544 to the left through the engagement of the cam surface 1571 with the terminal lug 1559. The shifting of the push rod 1544 to the far left retracts the breech bolt 1508 and unlatches the breech block 1034 as previously explained.

Auxiliary mechanism is preferably provided for insuring positive latching of the breech block by means of the breech bolt. Although the breech bolt 1508 will normally be latched by action of its spring 1538, it is considered desirable to provide a more positive means of moving the breech bolt forward to its latching position. This auxiliary mechanism, as shown in Figs. 54, 55 and 60 to 62, includes a lever identified in general by the reference character 1572 rotatably supported in a bearing 1573 secured to the lower side of the gun housing 1020. The lever 1572 includes a shaft 1574 to which there are rigidly secured the arms 1575 and 1576. A pin 1577 integral with the lever arm 1575 engages a slot 1578 of a depending lateral rearward extension 1579 integral with the breech bolt 1508, while the remaining lever arm 1576 cooperates with the lever arm 1580 of the rod 1581 rotatably mounted in the slide bifurcation 1019. The engagement of the pin 1577 with the slot 1578 only takes place when the breech block is either closed or near its closed position. The handle 1582 (Figs. 4, 7 and 62) makes it possible to impart rotation to the rod 1581 which is held in its normally inoperative position by the spring 1583 secured to the rod and slide.

When, therefore, the gun is in battery shifting of the handle 1582 in the forward direction will cause the lever arm 1580 to engage and rotate the arm 1576 of the lever 1572 and through the breech bolt slot 1578 and lever pin 1577 move the breech bolt 1508 to positively latch the breech block. It is desirable that an indicator be provided for indicating the position of the breech bolt. This indicator consists of a rod 1584 (Figs. 54 and 62) slidable within the gun housing and actuated by a lever arm 1585 also secured to the rotatable shaft 1574. The arrangement is such that when the breech bolt 1508 is positioned to latch the breech block 1038 the upper portion of the indicator rod 1584 will become visible to the operator of the traverse carriage and rammer control lever 1139. Thus, provision is made for indicating when the breech bolt is in a posiiton to positively latch the breech block.

THE EMPTY CASE EXTRACTORS

A pair of extractors 1586 (Figs. 9 and 62 to 65) operated by cam surfaces on the breech block 1038 extract the empty case automatically when the breech block opens. Each of the extractors 1586 is fashioned as a plate and is mounted for pivotal movement between the gun housing 1020 and the breech block 1038. A slot 1587 in each of the opposed walls 1588 of the guide strips 1040 receives a pin 1589 integral with each extractor plate, while a cam follower 1590 on the other side of each plate engages one of a pair of grooves 1591 (Figs. 54 and 63) in the breech block 1038 for rotating the extractors 1586. The upper end of each extractor plate 1586 is provided with an extractor lug 1592 for engaging the flange 1370 of the cartridge case and is seated in a recess 1593 of the breech face 1043 when each extractor 1586 is in the inoperative position of Fig. 63. The extractor pin 1589 and inclined housing slot 1587 make it possible for each of the extractor lugs 1592 to move in a substantially rectilinear path as the extractor plate 1586 is rotated attending the extraction of the cartridge case 1174. This insures adequate contact between the extractor lugs 1592 and the cartridge case flange 1370 during the extracting operation and thus precludes any shearing of the cartridge case flange which might otherwise occur.

Each extractor lug recess 1593 merges with a vertical recess in the breech face 1043 for receiving the side 1594 of the extractor plate 1586. This side of the plate has a portion thereof at all times in contact with the breech face, the point of contact shifting progressively downward from the position shown in Fig. 63 to that shown in Fig. 65 as the breech block opens to extract the empty case. This point of contact is actually the fulcrum point of the extractor 1586 and its shifting characteristic provides the proper leverage for the extractors in their various phases of operation. Thus, in the closed position of the breech block (Fig. 63) the fulcrum point of each of the extractors 1586 is in close proximity to the extractor lug 1592 to provide the large force necessary for breaking the seal between the cartridge case flange 1370 and the breech face 1043. When, however, the breech block has opened to the position of Fig. 65 corresponding to its maximum downward travel, the fulcrum point will be spaced a maximum distance from the extractor lug 1592. This positioning of the fulcrum point in the final phase of operation of the extractors makes it possible to impart a high velocity to the extractor lugs 1592 and in consequence thereof a high kinetic energy to the extracted cartridge case 1174. The kinetic energy of the empty case when it leaves the extractor lugs is derived from the decrease in kinetic energy of the breech block, as will become apparent from the statement of operation which now follows.

During the first nine inches of travel of the breech block from the closed position of Fig. 63 there is no motion of the extractors 1586, the substantially vertical portions of the grooves 1591 in this downward travel moving relative to the stationary cam followers 1590. At the nine inch or loading position, however, the cam surface 1595 of each of the grooves 1591 strikes it cam follower 1590 and commences rotating the extractor plate 1586 about the upper fulcrum point described to break the seal between the cartridge case flange 1370 and the breech face 1043. At the same time, the pins 1589 begin moving downwardly in the inclined housing slots 1587 from the position shown in Fig. 63 and continue this movement during the extraction to confine the extractor lugs 1592 to substantially rectilinear paths. The relative positions of the cam followers 1590 and cam surfaces 1595 and of the extractor pins 1589 and housing slots 1587 shortly after the breech block has passed beyond the nine inch or loading position are shown in Fig. 64.

As the breech block 1038 travels from the nine inch position to the 10.3 inch position, the extractors 1586 withdraw the empty cartridge case 1174 from the gun and in so doing progressively rotate about the downwardly shifting fulcrum point previously described. When the breech block reaches the 10.3 inch position, the cam surface 1595 disengages the cam follower 1590 so that the breech block is no longer active in rotating the extractor plates 1586. This disengagement is made possible by the flat surface 1596 of each of the cam followers 1590 which cooperates with a corresponding surface 1597 of the breech block grooves 1591. The position momentarily occupied by each of the extractors 1586 in the 10.3 inch position of the breech block is shown by the broken lines in Fig. 65. During the remaining downward travel of the breech block 1038 to its 10.5 inch position, however, the extractors 1586 move to the position indicated in solid line because of the high velocity of the extractor lugs 1592 attending their disengagement from the cartridge case flange 1370. The return of the breech block from its 10.5 inch position to its nine inch or loading position under the action of the spring 1509 returns the extractors 1586 to substantially the position of Fig. 63 through the engagement of the cam followers 1590 with the lower cam surfaces 1598 of the grooves 1591. The ammunition may now be rammed into the gun as previously described.

INTERLOCK C

An interlock is provided which prevents the withdrawal of the projectile tray and fuse setter from the projectile unless the breench block is open. This interlock is designated interlock C and consists of a three-way valve 1599, the details of which will be described hereinafter.

The mounting of the interlock valve with reference to the breech block and the construction of the linkage for actuating the valve by the breech block are clearly shown in Figs. 10, 55, 57 to 59 and 62 of the drawings. As there indicated, the projectile tray breech block interlock valve 1599 is secured to the slide body member 1010 beneath the same in any suitable manner and is provided with a piston rod 1600 terminating in an abutment block 1601 longitudinally adjustable with reference to the piston rod to enable the shifting of the valve 1599 at the proper time by the linkage.

The linkage for operating the valve 1599 is mounted on the gun housing 1020 to recoil with the same and consists of the slidable member 1602 aligned with the abutment block 1601 and the bell crank 1603 engaging the member 1602 for actuating the same. A plate 1604 secured to the gun housing has a sleeve 1605 integral therewith for rotatably supporting the bell crank 1603 and is provided with a depending channel 1606 for receiving the slidable member 1602. A spring biased plunger 1607 secured to the arm 1608 of the bell crank cooperates with a stop 1609 associated with the plate 1604 to hold the bell crank 1603 and slidable member 1602 in their inoperative positions when the cam follower 1610 of the bell crank arm 1611 is not engaged by the breech block.

The cam follower 1610 is so arranged with respect to the breech block that when the breech block opens the lateral projection or shoulder 1044 thereof will engage the cam follower 1610 and rotate the bell crank 1603. When the breech block is fully opened and the gun is in battery or substantially in battery the slidable member 1602 by engagement with the abutment block 1601 will operate to shift the interlock valve 1599 to its open position. When the breech block is closed the linkage is returned to its inoperative position by the spring pressed plunger 1607 and the interlock valve 1599 is automatically closed by spring action, as will be pointed out more in detail hereinafter. The shifting of the interlock valve to its open position permits porting of the desired control pressure.

THE FIRING PIN MECHANISM

The firing pin mechanism is arranged for percussion or electrical firing and is shown in Figs. 66 to 69 of the drawings. As there depicted, the mechanism includes the conventional firing pin 1612, the head 1613 of which is designed to detonate the primer of the cartridge case 1174 either electrically or by percussion action. Concentric insulating and metallic sleeves 1614 and 1615 respectively are secured to the firing pin 1612 in any suitable manner and project through an aperture in the transverse wall 1616 of the stationary sleeve 1617 to receive the cocking handle 1618. The sleeve 1617 is fixedly mounted on the breech block in any convenient manner. The cocking handle 1618 is held in place on the firing pin sleeve 1615 by the nut 1619 in the end of the firing pin 1612 to cooperate with the lock washer 1620 and the electrically insulating washer 1621 which contacts one end of the cocking handle 1618 to hold it in position between said member and the stationary sleeve 1617 (Fig. 70). The rearward extension 1622 of the stationary sleeve 1617 and the cocking handle 1618 are in sliding contact and thus support the firing pin 1612 at its rear for reciprocating movement. A compression spring 1623 is interposed between the transverse apertured wall 1616 of the stationary sleeve and a shoulder 1624 of the firing pin sleeve 1615 for urging the firing pin 1612 into contact with the primer when the cocking handle 1618 is released.

A striker plate 1625 securely fixed to the metallic sleeve 1615 and insulated from the firing pin head 1613 by the washer 1626 is arranged for cooperation with the hammer or plunger 1627 threaded or otherwise affixed to the cocking sleeve 1628. The cocking sleeve 1628 slidably receives the metallic sleeve 1615 of the firing pin and is in slidable contact with the forward extension 1629 of the stationary sleeve 1617 to provide additional support for the firing pin 1612 in its reciprocating movements. A compression spring 1630 is interposed between a flange 1631 of the hammer 1627 and an annular member 1632 loosely surrounding the cocking sleeve 1628, the annular member 1632 engaging the terminal surface of the stationary sleeve extension 1629 to make possible a compression of the spring 1630 as the firing pin 1612 is withdrawn. The cocking sleeve 1628 has integral therewith a lug 1633 which moves in the slot 1634 of the stationary sleeve 1617 and cooperates with the sear 1635 in a manner to be presently described. An apertured flanged conical member 1636 of any suitable insulating material is supported in a complementary recessed block 1637 and is held in position by the washer 1638 and the sleeve 1639 threaded to the breech block 1038. The sleeve 1639 slidably engages the peripheral surface of the hammer or plunger 1627 and thus provides additional support for the cocking sleeve 1628.

When the firing pin 1612 is withdrawn from the firing position shown in Fig. 66 to the cocked position shown in Fig. 68, the striker plate 1625 in contact with the plunger 1627 moves the cocking sleeve 1628 to the rear until it is latched by the sear 1635 engaging the lug 1633 of the sleeve. In the cocked position of the firing pin mechanism shown in Fig. 68 the springs 1623 and 1630 will have been further compressed and the striker plate 1625 will still be in contact with the hammer 1627. The gun cannot be fired electrically or by percussion until the firing pin 1612 has been released from its position shown in Fig. 68 to recontact the primer as shown in Fig. 66. When released, the spring 1623 (Fig. 70) urges the head 1613 of the firing pin into contact with the primer without percussive action; and in so doing the firing pin 1612 moves relatively to the cocking sleeve 1628, which remains latched by the sear 1635. The hammer 1627 and striker plate 1625 are now separated; and the energy stored in the spring 1630 is sufficient to denote the primer when the sear 1635 is released to cause the hammer 1627 to strike the plate 1625. When percussion firing is not employed the gun may be fired electrically by completing an electrical circuit through the firing pin 1612 to the primer, an electrical conductor being secured to the firing pin 1612 for this purpose by the nut 1619. Since the firing pin 1612 is effectively insulated from other parts of the firing pin mechanism and the breech block by the insulating sleeve 1614, washers 1621 and 1626 and the conical member 1636, the necessary current can be supplied to the primer for effecting its detonation.

The sear 1635 (Figs. 55 and 66 to 69) is mounted for reciprocating movement in the breech block 1038 and is urged to the left to its latching position (Fig. 55) by the compression spring 1640. A transverse slot 1641 (Figs. 66 and 67) in the sear 1635 allows the passage of the lug 1633 as the cocking sleeve 1628 is moved to its cocked position, while a recess 1642 in the sear rod 1635 provides a stop 1643 which moves to engage the lug 1633 (Figs. 68 and 69) and latch the cocking sleeve 1628 when the sleeve reaches its cocked position. A safety latch 1644 moves to lock the sear 1635 when the cocking sleeve 1628 is latched in its cocked position. The latch 1644 is mounted for reciprocating movement in the breech block 1038 at right angles to the sear 1635 and is provided with an arcuate recess 1645 (Fig. 66) for allowing movement of the sear 1635 relative to the safety latch when the latch is in its inoperative position. A tongue 1646 (Fig. 55) integral with the safety latch 1644 and disposed substantially centrally of its arcuate recess 1645 is urged into locking engagement with the annular recess 1647 of the sear 1635 by the compression spring 1648 (Fig. 68) when the sear has moved to latch the cocking sleeve 1628 in its cocked position.

With the firing pin mechanism in its firing position (Fig. 66) the lug 1633 of the cocking sleeve 1628 is disposed in the transverse slot 1641 of the sear 1635 (Fig. 67) and the sear spring 1640 is in a state of compression preparatory to shifting the sear to the left. The safety latch 1644 (Fig. 66) is also in its inoperative position and is shown shifted to the right to compress the latch spring 1648. When now the firing pin 1612 is withdrawn to move the cocking sleeve 1628 to the cocked position, the lug 1633 moves rearwardly in the sear slot 1641 and when aligned with the sear recess 1642 is in its cocked position. The sear spring 1640 (Fig. 69) now shifts the sear 1635 to the left to latch the cocking sleeve 1628 in its cocked position, the latching being accomplished by the engagement of the sear stop 1643 (Figs. 67 and 68) with the cocking sleeve lug 1633. When the wall 1649 (Figs. 67 and 69) of the sear recess 1642 has moved to engage the cocking sleeve lug 1633 the tongue 1646 of the safety latch 1644 (Figs. 55 and 68) will be shifted by the spring 1648 to engage the annular recess 1647 (Fig. 69) of the sear and lock the sear 1635. Thus, it is evident that the sear 1635 cannot be moved to its unlatching position until the safety latch 1644 is released by shifting the same from the position shown in Fig. 68 to that shown in Fig. 66.

The cocking lever 1650 (Figs. 60, 66 and 70) includes a pair of spaced arms 1651 and 1652 for engaging a pair of lateral extensions 1653 of the cocking handle 1618 and is pivotally mounted in any suitable manner at its upper end between the ears 1654 integral with the breech block 1038. A spring pressed plunger 1655 (Fig. 66) in the breech block 1038 engages the upper end 1656 of the cocking lever at all times and urges the lever to the position shown in Fig. 66 when the breech block 1038 is closed and the gun is ready for firing. When in this position the arm 1652 of the cocking lever 1650 through contact with the terminal surface of the safety latch 1644 shifts the latch to compress the spring 1648 and unlock the sear 1635. The plunger spring 1657 which operates the cocking lever 1650 must, therefore, overcome not only the friction of the lever bearings, but also the friction and spring forces to which the safety latch 1644 is subjected. A pin 1658 secured to the two arms 1651 and 1652 of the cocking lever provides a means for manually rotating the cocking lever to withdraw the firing pin 1612 and cock the cocking sleeve 1628 when this is desired or becomes necessary. In the normal operation of the firing pin mechanism, however, the cocking sleeve 1628 is moved to its cocked position by the breech bolt 1508 as the breech block 1038 is opened.

The breech bolt 1508 is shown latching the breech block 1038 in Figs. 54 and 55 by engaging the upper terminal surface of the cam plate 1659 which is secured in any convenient manner to the breech face 1043 of the gun as by the screws 1660. A central rib 1661 integral with the cam plate 1659 is aligned with the breech bolt 1508 and provides a cam surface 1662 for the bolt 1508. The cam surface 1662 holds the breech bolt 1508 partially retracted, as already noted, and is also operative to fully retract the breech bolt for the purpose of cocking the firing pin mechanism as the breech block is opened. The terminal rear surface 1663 of the breech bolt 1508 (Figs. 54 and 66) engages the lower end 1664 of the cocking lever 1650 when the breech block 1038 is closed and the gun is ready for firing. When, therefore, the breech bolt 1508 is retracted either manually or automatically to unlatch the breech block as previously described, the cocking lever 1650 will rotate about its point of support to partially withdraw the firing pin 1612. The initial withdrawal of the breech bolt 1508 to unlatch the breech block 1038 is just sufficient to provide a slight clearance between the forward terminal surface 1665 of the breech bolt and the cam surface 1662 of the cam plate 1659.

This partial withdrawal of the firing pin 1612, however, is not sufficient to align the lugs 1633 (Fig. 67) of the cocking sleeve with the sear recess 1642. As the breech block opens, the breech bolt spring 1538 (Fig. 54) urges the terminal surface 1665 of the breech bolt into contact with the cam surface 1662 of the cam plate to take up the slight clearance between the breech bolt 1508 and the cam plate 1659 which exists during the unlatching of the breech block. The breech bolt 1508 is now partially retracted and is held retracted by the cam plate 1659 in all open positions of the breech block. As the breech block continues opening, the terminal surface 1665 of the breech bolt rides downwardly along the cam surface 1662 (Fig. 54) holding the firing pin 1612 partially withdrawn. Preferably, when the breech block has opened to its seven inch position the terminal surface 1665 of the breech bolt commences engagement with the beveled portion 1666 of the cam surface 1662. This portion of the cam surface fully retracts the breech bolt 1508 to complete the rotation of the cocking lever 1650, the withdrawal of the firing pin 1612 (Fig. 66) and cocking of the sleeve 1628 (Fig. 68) as the breech block opens from its seven inch position to its nine inch or loading position. Thus, when the breech block is in the loading position the sear 1635 moves to latch the cocking sleeve 1628 and the safety latch 1644 moves to lock the sear as previously described.

THE FIRING MECHANISM

The details of the mechanism for releasing the sear 1635 when firing by percussion are shown in Figs. 55 and 62 of the drawings. As indicated more particularly in Fig. 55, a sear push rod identified in general by the reference character 1667 is mounted for reciprocating movement in the gun housing 1020 and is aligned with the sear 1635 when the breech block 1038 is closed. The push rod 1667 includes the nonrotatable sleeve 1668, the plunger 1669 and the interposed spring 1670 which normally urges the plunger 1669 to assume the position shown. Relative movement between the plunger 1669 and sleeve 1668 is limited by the pair of slots 1671 in the sleeve which are engaged by the pin 1672 affixed to the plunger 1669. The spring 1670 is of sufficient strength to resist compression when the sear 1635 is unlocked and the push rod 1667 is urged to the right to release the sear 1635. When so urged, the push rod 1667 moves to the right as a unit without experiencing any relative movement between its component parts. If, however, the sear 1635 is locked by the safety latch 1644 or the breech block 1038 is open, movement of the push rod 1667 to the right will result in movement of the sleeve 1668 with attendant compression of the spring 1670, while at the same time the plunger 1669 remains stationary. A terminal lug 1673 integral with the sleeve 1668 cooperates with mechanism for actuating the push rod.

The mechanism for actuating the push rod 1667 (Figs. 55 and 62) when the gun is in battery or slightly out of battery, includes the rod 1674 rotatably mounted in the slide bifurcation 1019 in a position substantially opposite that occupied by the push rod 1667 when the gun is in battery. To one end of the rod 1674 there is secured the clutch 1675 (Figs. 4, 7 and 62) while to the other end there is secured a cam 1676 which is adapted to engage the lug 1673 of the push rod. A spring 1677 secured to the rod 1674 and the slide holds the cam 1676 in its normally inoperative position. The clutch 1675 includes the member 1678 rigid with the rod 1674 and the member 1679 which is vertically movable against the compression of the spring 1680 and rotatably mounted with respect to the rod. A lever arm 1681 integral with the clutch member 1679 is held in its normally operative position by the tooth 1682 of the clutch member 1678 in engagement with a complementary recess 1683 of the clutch member 1679. Vertical movement of the clutch member 1679 to disengage the tooth 1682 and rotation of this member in a clockwise direction through an angle of approximately 90° to cause the tooth 1682 to engage another complementary recess (not shown) moves the lever arm 1681 to an inoperative position. The firing mechanism may be operated by a lanyard secured to the lever arm 1681 or by the plunger 1684 of the cylinder 1685 mounted on the slide. The plunger 1684 is either hydraulically or electrically operated, and when operated moves to engage and rotate the lever arm 1681 when positioned as shown.

On the assumption that the breech block 1038 (Fig. 55) is closed, the cocking sleeve 1628 (Figs. 68 and 70) is latched by the sear 1635 and the cocking lever 1650 (Figs. 66 and 70) has shifted the safety latch 1644 to unlock the sear, the operation of the firing mechanism will be described when firing by percussion. When the lanyard (Figs. 55 and 62) is pulled to the rear or the plunger 1684 is operated to rotate the lever arm 1681 to the rear, the sear push rod 1667 is moved toward the breech block as a unit to engage and withdraw the sear 1635 against the compression of the spring 1640. The withdrawal of the sear 1635 (Figs. 68 and 70) releases the cocking sleeve 1628 and allows the plunger 1627 to strike the striker plate 1625 to detonate the primer. If the breech block is not closed then the rearward movement of the lever arm 1681 will result in movement of the push rod sleeve 1668 (Fig. 55) with attendant compression of the spring 1670, while at the same time the plunger 1669 remains stationary. If the lever arm 1681 of the firing mechanism is held in its rear position the gun will be fired as soon as the breech block closes. If it is desired to fire the gun electrically instead of by percussion, the clutch 1675 (Fig. 62) of the firing mechanism is disengaged as previously described to cause the lever arm 1681 to assume its inoperative position. In this position operation of either the lanyard or the cylinder plunger 1684 will not move the sear push rod 1667.

INTERLOCK K

A mechanical interlock is provided which prevents firing of the gun unless the traverse carriage is in the firing position and the rammer head has retracted sufficiently to clear the recoiling gun housing and breech block. This interlock, which is conveniently designated interlock K, includes a firing pin traverse carriage interlock mechanism and a firing pin rammer interlock mechanism, both of which preferably have certain elements in common. The interlocking of the firing pin prevents firing of the gun unless the traverse carriage and the rammer head are in the desired positions. For, as previously noted, the gun cannot be fired electrically or by percussion until the firing pin has been released to contact the primer of the cartridge case.

Interlock K is shown diagrammatically in Fig. 62 of the drawings and includes broadly the bell crank 1686 cooperating with the cocking lever 1650 and the cam 1687, the lever 1688 for directly actuating the cam 1687, the two bell cranks 1689 and 1690 and push rod 1691 for operating the lever 1688, and the lever 1692 for operating the bell crank 1690. These elements are common to the two interlock mechanisms. The firing pin and traverse carriage interlock mechanism is completed by the trigger mechanism 1693; and the firing pin and rammer interlock mechanism by the linkage 1694. For the details of the component parts of the interlock mechanisms reference is first made to Figs. 60, 66 and 70 of the drawings.

The bell crank 1686, which operates the cocking lever 1650, includes the shaft 1695 rotatably mounted in the breech block 1038, to the ends of which are splined the arms 1696 and 1697. The terminal portion of the arm 1696 is adapted to engage a lug 1698 (Figs. 66) integral with the lower end 1664 of the cocking lever 1650 to rotate this lever, while a cam follower 1699 secured to the end of the remaining arm 1697 is operable to engage the cam surface 1700 of the cam 1687 and rotate the bell crank 1686. A plunger 1701 mounted for reciprocating movement in the breech block is urged by the spring 1702 to contact the extension 1703 integral with the bell crank arm 1697 and thus maintains the bell crank 1686 in its inoperative position when the cam 1687 assumes the position shown in Fig. 66. When the breech block 1038 is closed, however, and the cam 1687 is moved from the position shown in Fig. 66 to the solid line position in Fig. 68, the cam follower 1699 rides along the inclined portion of the cam surface 1700 and comes to rest against the vertical portion thereof. At the same time, the bell crank 1686 is rotated in a counterclockwise direction against the action of the spring pressed plunger 1701 to rotate the cocking lever 1650 and withdraw the firing pin 1612. The withdrawal of the firing pin prevents the firing of the gun, as previously noted.

The cam 1687 (Figs. 60 and 70) is mounted for limited vertical reciprocating movement on the wall 1704 of the rearwardly extending housing portion 1035 and to the accomplishment of this end is provided with an elongated slot 1705 in its shank 1706 to receive the bolts 1707 extending through the retaining plate 1708 into the rearward housing portion 1035. The bolts 1707 are so adjusted that the shank 1706 of the cam may freely slide between the wall 1704 of the housing and the retaining plate 1708. A U-shaped bracket 1709 also secured to the wall 1704 of the housing, as by the bolts 1710, pivotally supports the lever 1688 on the pin 1711. One end of the lever 1688 is provided with a cylindrical terminal portion 1712 for engaging a complementary recess 1713 in the shank 1706 of the cam, while the remaining end of the lever is provided with the curved terminal portion 1714 for insuring proper engagement of the lever with the bell crank 1689 (Fig. 70) in the counter-recoil of the gun housing. A spring pressed plunger 1715 mounted in the bracket 1709 normally urges the lever 1688 to the position shown in Fig. 60, the spring associated with the plunger being identified in Fig. 62 by the reference character 1716. When the lever 1688 is positioned as indicated in Fig. 60, the cam 1687 is shifted to the upper position shown in Figs. 66 and 70.

The bell crank 1689 (Figs. 60 and 70) is rotatably mounted in a recess of the slide bifurcation 1018 by the bolt 1717 secured to the bifurcation wall and has a cylindrical terminal portion 1718 of its arm 1719 positioned to engage the lower surface of the curved terminal portion 1714 integral with the lever 1688. A cylindrical terminal portion 1720 of the remaining arm 1721 of the bell crank at all times engages a complementary recess 1722 of the push rod 1691. The lower right arm 1021 of the slide bifurcation 1018 is provided with the longitudinal T-shaped slot 1723 (Figs. 3, 23, 70, 71 and 73) for slidably supporting the rod 1691 of similar cross-sectional configuration. The rod 1691 is urged in a forward direction by the compression spring 1724 engaging the slide stop 1725, as clearly indicated in Fig. 62. A second bell crank 1690 (Figs. 70 and 73) is pivotally mounted on the lower right arm 1021 of the slide bifurcation 1018 by the bolt 1726 and extends into a recess of the slide centerpiece 1011. A cylindrical terminal portion 1727 of the bell crank arm 1728 at all times engages a bifurcation 1729 at the rear end of the push rod 1691. The end of the other bell crank arm 1730 is provided with the bifurcation 1731 which engages the terminal portion 1732 of the lever 1692 splined to the shaft 1733. The shaft 1733 is rotatably mounted in any suitable manner in the slide centerpiece 1011 as by the bearing sleeve 1734.

*The carriage firing pin interlock mechanism.*—The elements detailed to this point are common to both the firing pin and traverse carriage interlock mechanism and to the firing pin and rammer interlock mechanism. If, therefore, either the trigger mechanism 1693 (Fig. 62) or the linkage 1694 is operated by the traverse carriage 1077 or the rammer head 1108 respectively to cause a counterclockwise rotation of the lever 1692, it is evident that the push rod 1691 will be shifted to the rear by the bell crank 1690 with the attendant compression of the spring 1724. This rearward shifting of the rod 1691 will, through the bell crank 1689 and lever 1688, in turn shift the cam 1687 to its lower solid line position (Fig. 68) where it will cause the firing pin 1612 to be withdrawn by action of the bell crank 1686 and cocking lever 1650, provided the breech block 1038 is closed. The shifting of the cam 1687 to its lower position is accompanied by the compression of the spring 1716 (Fig. 62) because of the rotation of the lever 1688. When, therefore, the lever 1692 is released by both the trigger mechanism 1693 and the linkage 1694, the spring 1724 will urge the rod 1691 to its normal forward position, while at the same time the spring 1716 will restore the cam 1687 to its upper and inoperative position, as shown in Fig. 66.

The trigger mechanism 1693 (Figs. 62, 70 and 73) is shown in the solid line position corresponding to the firing position of the traverse carriage and, as indicated in these figures, includes the fork 1735 pivotally mounted by the pin 1736 between the arms 1737 of the bracket 1738, which is secured to the slide centerpiece 1011 in a recess thereof. The arms 1739 of the fork 1735 merge at their upper ends in the bifurcation 1740 which is adapted to be engaged by the lug 1741 integral with the plate 1742 (Figs. 9, 70 and 73) fastened to the traverse carriage 1077 in any suitable manner, as by the bolts 1743. A spring pressed plunger 1744 (Figs. 70 and 73) mounted in the bracket 1738 engages the fork extension 1745 at all times and together with the carriage 1077 urges the fork 1735 to the broken line position shown as the traverse carriage 1077 moves from the firing position to the ramming position. In the broken line position the side 1746 of the fork is contacted by the stop 1747 of the bracket; and the bifurcation 1740 of the fork is then held in a position to re-engage the lug 1741 as the traverse carriage returns from the ramming position to the firing position.

A trigger 1748 is pivotally mounted on the pin 1736 between the arms 1739 of the fork, and incorporates a spring pressed plunger 1749 which engages another extension 1750 integral with the fork 1735, at all times. In the solid line position of the fork shown, the plunger 1749 urges the side 1751 of the trigger 1748 into contact with the stop 1752 of the fork 1735. A detent 1753 splined to the lever shaft 1733 has its terminal portion disposed between the arms 1739 of the fork and in a position to contact the trigger side 1751 with the terminal surface 1754 when the traverse carriage 1077 is in the firing position. A pair of cam surfaces 1755 of substantially S-shaped configuration is integral with the fork arms 1739 and these surfaces engage the lower surface 1756 of the detent 1753. The upper portions 1757 of the cam surfaces 1755 extend above the terminal surface 1758 of the trigger 1748 to permit disengagement of the terminal detent surface 1754 with the side 1751 of the trigger 1748 as the fork 1735 is shifted from the solid line position to the broken line position shown in Fig. 73. The lower surface 1756 of the detent 1753 is shaped to conform with the terminal surface 1758 of the trigger 1748 to facilitate engagement of these surfaces as the fork 1735 is again shifted from the broken line position to the solid line position.

The operation of the firing pin and traverse carriage interlock mechanism will now be described on the assumption that the traverse cariage is initially in the firing position. Under these circumstances the trigger mechanism 1693 will be in the solid line position of Fig. 73, the lever arm 1692 splined to the shaft 1733 will be in the position shown in Figs. 62 and 73 and the cam 1687 will be shifted to its upper position shown in Fig. 66. As the traverse carriage 1077 begins moving toward the ramming position to rotate the fork 1735 (Fig. 73) in a counterclockwise direction, the detent 1753 and lever 1692 rigidly secured to the shaft 1733 commence a counterclockwise rotation, since the detent 1753 begins riding upwardly along the cam surfaces 1755. At the same time the terminal detent surface 1754 slides along the side 1751 of the trigger but holds the trigger 1748 substantially in its solid line position, while the fork extension 1750 in the rotation of the fork 1735 urges the plunger 1749 inwardly of the trigger to further compress the spring associated with the plunger. The counterclockwise rotation of the lever 1692 commences shifting the cam 1687 (Figs. 62 and 66) to its lower position as previously explained.

When the fork 1735 has rotated to cause the terminal portion of the detent 1753 to engage the upper cam surfaces 1757, the terminal detent surface 1754 will disengage the side 1751 of the trigger and release the trigger 1748. The spring pressed plunger 1749 will then rotate the trigger 1748 in a counterclockwise direction until the side 1751 again contacts the stop 1752 of the fork. As soon as the detent 1753 moves to a position to release the trigger 1748, the lever 1692 will have shifted the cam 1687 (Fig. 62) from the position shown in Fig. 66 to the lower position shown in Fig. 68. The lower position of the cam 1687 is maintained until the traverse carriage 1077 again returns to its firing position. Thus, as the traverse carriage approaches the firing position to receive a new round of ammunition, the lug 1741 (Fig. 73) re-engages the bifurcation 1740 of the fork in its broken line position and begins rotating the fork 1735 and the trigger 1748 as a unit in a clockwise direction. In so doing the terminal surface 1758 of the trigger slides lengthwise of the lower detent surface 1756 and thus prevents clockwise rotation of the detent 1753 and the lever 1692. When the traverse carriage 1077 reaches the firing position the trigger 1748 releases detent 1753 and also the lever 1692 splined to the common shaft 1733. If the rammer interlock permits, the spring 1724 (Fig. 62) will then urge the rod 1691 to its normal forward position, while at the same time the spring 1716 restores the cam 1687 to its upper and inoperative position shown in Fig. 66.

*The rammer firing pin interlock mechanism.*—The details of the linkage 1694 (Fig. 62) forming a part of the firing pin and rammer interlock mechanism are shown in Figs. 70 to 72 of the drawings. In these figures the linkage 1694 is shown in its inoperative position to which it has been moved by the rammer head 1108 as the rammer head has cleared the recoiling gun housing and breech block. The linkage 1694 includes the bell crank 1759 (Figs. 70 and 71) pivotally mounted on the pin 1760 supported by the bearing plates 1761. The plates 1761 are secured to the slide centerpiece 1011 by the bolts 1762 and extend into a recess of the centerpiece, thus making engagement possible between the bell crank arm 1763 and the lever 1764 splined to the shaft 1733. A push rod 1765 (Figs. 71 and 72) operable to engage the remaining arm 1766 of the bell crank is slidable in the sleeve 1767 which is pivotally supported on the bearing plate 1768 also secured to the slide centerpiece 1011 by the bolts 1769. To the other end of the push rod 1765 there is fixed a bifurcation 1770 which is pivotally connected with a lever 1771 of the shaft 1772 in any suitable manner, as by the bolt 1773. A compression spring 1774 surrounds the rod 1765 and has one end engaging a shoulder 1775 integral with the rod, while the other end of the spring contacts the sleeve 1767. The shaft 1772 (Figs. 23 and 71) is rotatably mounted on the slide upright 1028 by suitable bearings 1776 and 1777 and has a bifurcated lever 1778 secured to the upper end for cooperation with the rammer head 1108. A lug 1779 (Fig. 8) integral with the flange 1423 of the rammer head is adapted to engage the bifurcation 1780 of the lever arm 1778 and rotate the shaft 1772. A stop 1781 secured to the upright 1028 cooperates with the bifurcated lever 1778 to limit its forward and rearward movements.

In order to study the operation of the firing pin and rammer interlock mechanism it will be assumed that the traverse carriage 1077 is in the firing position shown in Fig. 62 and that the rammer head 1108 has moved forwardly from its fully retracted position to cause its lug 1779 (Fig. 71) to enter and initially contact the bifurcation 1780 of the lever 1778. As the rammer head 1108 continues its forward movement it rotates the lever 1778 in a forward direction, thereby shifting the push rod 1765 to the right and compressing the spring 1774. The push rod 1765, through the bell crank 1759, lever 1764 and shaft 1733, imparts counterclockwise rotation to the lever 1692 which commences shifting the cam 1687 (Figs. 62 and 66) to its lower position as previously described. When the rammer head 1108 has moved forwardly a sufficient distance to disengage the bifurcation 1780, the lever 1771 will have been rotated forwardly to a position slightly beyond the dead center of the lever 1771 and push rod 1765. The lever 1771 and push rod 1765 are then held in this position by the compression of the spring 1774 and the stop 1781 (Fig. 72) engaging the bifurcated lever 1778.

In this position of the push rod 1765 the lever 1692 will have shifted the cam 1687 from the position shown in Fig. 66 to the lower solid line position shown in Fig. 68. After the rammer head 1108 has disengaged the bifurcation 1780 in its forward movement, the rammer head will subsequently be in a position where it can be struck by the recoiling housing and breech block, should the gun be fired. Firing of the gun, however, is not possible if the cam 1687 is shifted to its lower position for reasons already noted. As the rammer head 1108 is withdrawn and is well clear of the recoiling housing and breech block, the lug 1779 of the rammer head 1108 re-engages the bifurcation 1780 and rotates the lever 1771 and push rod 1765 beyond their dead center position, from whence the lever and push rod are urged by the rammer head 1108 and compression spring 1774 to occupy the position shown in Fig. 62. Further rearward rotation of the lever 1771 and rod 1765 is prevented by the stop 1781 (Fig. 72) on the upright engaging the bifurcated lever 1778. The gradual shifting of the push rod 1765 from its dead center position to the position shown in Fig. 62 gradually releases the bell crank 1759 and lever 1764 and hence the lever 1692 splined to the common shaft 1733. This results in gradual release of the compression spring 1724 to shift the rod 1691 to its normal forward position. At the same time, the spring 1716 gradually restores the cam 1687 to its upper and inoperative position shown in Fig. 66.

THE OPERATION OF THE INTERLOCK K IN THE LOADING CYCLE

The operation of interlock K in the loading cycle will now be described starting with firing, particular reference in this connection being made to Figs. 62 and 66 to 69 of the drawings. With the gun in condition to be fired the breech block 1038 (Fig. 66) is closed, the cam 1687 is in its upper and inoperative position, the traverse carriage 1077 is in the firing position and the rammer head 1108 is fully retracted. When the gun is fired the breech bolt 1508 is partially retracted during counter-recoil to unlock the breech block 1038, rotate the cocking lever 1650 and partially withdraw the firing pin 1612. After the breech block finally reaches its nine inch or loading position in its opening movement and is detented in place by the spring loaded wedges 1491 and 1492, the breech bolt 1508 will have been fully retracted by the cam plate 1659 to complete the rotation of the cocking lever 1650, the withdrawal of the firing pin 1612 and cocking of the sleeve 1628. The sear 1635 (Fig. 69) now moves to latch the cocking sleeve 1628, and the safety latch 1644 (Fig. 68) moves to lock the sear, as previously described. With the breech block in its loading position the bell crank 1686 carried thereby remains in its inoperative position shown in Fig. 66 and the cam follower 1699 will have moved to disengage the cam surface 1700 of the cam 1687. At the same time the fully retracted breech bolt 1508 holds the lug 1698 of the cocking lever 1650 out of contact with the arm 1696 of the bell crank and maintains the firing pin 1612 fully withdrawn.

As the traverse carriage 1077 (Fig. 62) moves away from the firing position toward the ramming position in the loading cycle, the trigger mechanism 1693 is operated to cause the firing pin and carriage interlock mechanism to shift the cam 1687 from the position shown in Fig. 66 to the lower position shown in Fig. 68. Since, however, the breech block is in its loading position and rotatably supports the bell crank 1686, the cam surface 1700 of the cam 1687 cannot engage the cam follower 1699 of the bell crank. After the traverse carriage reaches the ramming position, the rammer head 1108 moves forward to ram the ammunition into the gun and during the ramming stroke operates the linkage 1694 to shift the same to a position slightly beyond its dead center, as previously described. The operation of the linkage 1694 would cause the firing pin and rammer interlock mechanism to shift the cam 1687 to its lower position had it not already been shifted to this position by the firing pin and carriage interlock mechanism. After the ammunition has been loaded into the gun the traverse carriage 1077 is shifted to the firing position, the rammer head 1108 is retracted and the breech block 1038 is closed. The breech block through its hydraulic unit is adjustable to close at varying speeds and may be adjusted to close either before, after or at the same time the rammer is fully retracted and the traverse carriage reaches the firing position. These three cases will be considered separately in the order enumerated.

To study the operation of the interlock K it will be assumed that the breech block 1038 closes first, then the rammer head 1108 retracts sufficiently to operate the firing pin and rammer interlock mechanism, and finally the traverse carriage 1077 reaches the firing position to operate the firing pin and traverse carriage interlock mechanism. As the breech block closes, the breech bolt 1508 moves forward on the cam surface 1662 of the cam plate 1659. The cocking lever 1650 and firing pin 1612 follow the motion of the breech bolt 1508 but the cocking sleeve 1628 is held in its cocked position by the sear 1635. When the breech block 1038 is about 0.7 inch from its closed position in the embodiment shown in the drawings, the cam follower 1699 (Fig. 68) of the bell crank 1686 commences contact with the cam surface 1700 of the cam 1687 which, as previously noted, has been shifted to its lower position. As the breech block moves to its closed position in the last 0.7 inch of travel, the cam follower 1699 rides along the inclined portion of the cam surface 1700 and comes to rest against the vertical portion thereof. During the movement of the cam follower 1699 along the inclined portion of the cam surface 1700, the bell crank 1686 is rotated in a counterclockwise direction against the action of the spring pressed plunger 1701 to rotate the cocking lever 1650 and withdraw the firing pin 1612. When, therefore, the breech block is closed, the breech bolt 1508 moves forward to latch the breech block, but the firing pin 1612 is held fully withdrawn by the cocking lever 1650, as clearly shown in Fig. 68 of the drawings. Under these circumstances the gun cannot be fired.

The rammer head 1108 withdraws and before it is fully retracted operates the linkage 1694 to shift the same from its position slightly beyond dead center to the position shown in Fig. 62. When this occurs the rammer head 1108 has withdrawn more than enough to clear the gun housing and breech block during recoil. However, the firing pin 1612 is still held in its fully withdrawn position by the firing pin and traverse carriage interlock mechanism. As the traverse carriage approaches the firing position, the trigger mechanism 1693 of the traverse carriage firing pin interlock mechanism prevents the upward shifting of the cam 1687 until the traverse carriage 1077 is substantially at the end of its travel. When the traverse carriage is again in its firing position the trigger mechanism 1693 is operated to release the traverse carriage firing pin interlock mechanism and permit the shifting of the cam 1687 to its upper broken line position of Fig. 68. This upward shifting of the cam 1687 in turn allows clockwise rotation of the bell crank 1686 by the spring pressed plunger 1701, which has the effect of releasing the cocking lever 1650. At the end of the cocking lever travel the safety latch 1644 is moved forward by an arm of the lever 1650, as clearly indicated in Fig. 66. This frees the sear 1635 which may now be moved to release the cocking sleeve 1628 for firing the gun by percussion. The gun, however, may alternatively be fired electrically as soon as the firing pin contacts the primer of the cartridge case. This occurs before the safety latch 1644 is released, but after the traverse carriage reaches the firing position and the rammer head 1108 has shifted the linkage 1694 to the position shown in Fig. 62.

If the traverse carriage 1077 reaches the firing position before the rammer head 1108 operates its firing pin interlock on the supposition that the breech block still closes first, then the upward movement of the cam 1687 will be somewhat slower than its movement under the conditions described in the preceding paragraph. The speed of the upward movement of the cam 1687 under these circumstances will depend upon the speed of withdrawal of the rammer head 1108 and the speed with which the linkage 1694 is returned to the position shown in Fig. 62. The speed with which the cam 1687 is shifted from its lower position to its upper broken line position in Fig. 68 will in turn determine the speed at which the cocking lever 1650 is released. The fact, however, that the cocking lever 1650 is released slowly does not affect the percussion action of the firing pin mechanism. For the sear 1635 cannot be withdrawn until the safety latch 1644 is released, and the safety latch will not be released until the cocking lever 1650 has released the firing pin 1612. Thus, there is no danger of misfire due to slow release of the firing pin and rammer interlock mechanism.

If the breech block closes after the rammer head is fully retracted and the traverse carriage reaches the firing position, the cam 1687 will be shifted to its upper and inoperative position before the breech block 1038 reaches a position 0.7 inch from its closed position. The firing pin 1612, therefore, will be held partially withdrawn until the breech bolt 1508 moves to latch the breech block. When the breech block is latched the firing pin 1612 through release of the cocking lever engages the primer of the cartridge case, the cocking lever 1650 moves to release the safety latch 1644 and the sear 1635 may be withdrawn. If the breech block closes at the same time that the rammer head is fully retracted and the traverse carriage reaches the firing position, the operation of the interlock K will be substantially the same as in the case where the breech block closed first, the rammer head then retracted sufficiently to operate its interlock mechanism, and finally the traverse carriage reached the firing position to operate its interlock mechanism. Thus, regardless of the sequence of closing of the breech block, misfire cannot occur when firing by percussion, since this is effectively prevented by the safety latch which is arranged to be released only by the cocking lever and not by the breech bolt.

THE POWER PLANT

A single power plant or source of hydraulic energy serves for the operation of all the units on the gun. As shown more particularly in Fig. 74 it consists in general of a supply tank 1132 from which a suitable hydraulic fluid medium such as oil is pumped through the conduit 2 into a manifold 1133. The manifold 1133 communicates through the valve 4 with an accumulator 1135 for storing energy to be used in the subsequent operation of the units. The hydraulic fluid pressure in the manifold 1133 and that in the accumulator 1135 when the valve 4 is open are impressed upon a pilot valve 1136, the function of which will be described hereinafter. Pipe lines 7, 8, 9 and 10 are provided for supplying the accumulator pressure to the drive control units and the breech operating valve block in a manner to be described in detail hereinafter. Separate pipes 11, 12, 13 and 14 are provided for the return flow from each of the hydraulic units to the supply tank 1132. The pipe lines described are the main operating lines of the apparatus.

The supply tank 1132 as shown in Fig. 74 of the drawings has secured thereto an electric motor 1134 which connects directly to a positive displacement constant discharge type of pump 16 of suitable prior art construction. The output line from this pump is connected to supply the hydraulic medium to a valve block 17 mounted in any suitable manner on the upper inner wall of the supply tank. This valve block incorporates three valves, namely, a pressure relief valve 18, a bypass valve 19 for the pump, and a check valve 20.

The pressure relief valve 18 is held in its normally closed position by a spring 21 disposed within a central recess of the same and engaging a terminal wall of the recess and a wall of the valve block 17. In order to insure an opening of the relief valve 18 and in consequence thereof an unloading of the pump output line to the tank when the pressure rises above the setting of the valve, the valve 18 is longitudinally apertured at 22 adjacent its periphery to provide a passageway which connects with a passageway 23 in the valve block normally closed at its end by the spring pressed ball 24. The pressure at which the valve 18 is to open is set by adjusting the compression of the spring 25 through the screw 26 which is held in fixed position by the lock washer 27 after the adjustment. When the pressure setting of the valve 18 is exceeded the ball 24 is depressed and fluid is vented through the valve passageways 22, 23, the valve recess that seats the spring 21 and the central valve aperture 28 to the tank with attendant opening of the valve 18. The relief valve is now in a position where the output line of the pump unloads directly to the tank through the passageway of the valve block in alignment with the valve.

The pressure relief valve 18 is incorporated for the protection of the hydraulic pump 16 and the hydraulic system when operating without the accumulator 1135 or when unintentionally starting the electric motor 1134 with the shutoff valve 4 between the manifold 1133 and the accumulator 1135 in the closed position.

With the pressure relief valve 18 in the closed position shown the fluid from the pump will pass around the same and from thence into and through the bypass valve 19. The bypass valve 19 which in the position shown permits the supply of the medium to the manifold 1133 and accumulator 1135, consists of a spring biased piston which is movable to the left under the control of the fluid conduits 29 and 30 communicating with the pilot valve 1136. When the bypass valve 19 is moved to its left hand position in a manner to be described hereinafter, the fluid from the output line of the pump will be bypassed through the passageways of the valve block 17 indicated by the dash line to thus unload the pump and return the fluid directly to the tank. The check valve 20 is incorporated in the fluid circuit to prevent loss of oil from the accumulator 1135 when the pump 16 is bypassed or to prevent leakage through the pump when the electric motor is not operating.

The function of the pilot valve 1136 is to insure the movement of the bypass valve 19 to its bypass position when the accumulator 1135 is fully charged; and to insure the movement of the bypass valve 19 to the initial position indicated in Fig. 74 when the accumulator 1135 is partially discharged. To this end it will be observed that the pilot valve 1136 includes a piston 31 provided at one end with a plurality of beveled grooves in one of which a spring pressed ball 32 is adapted to be selectively seated, depending upon the position of the piston. This spring pressed ball 32 serves as a nonpositive detent to hold the pilot valve temporarily in either of its adjusted positions until manually or automatically actuated by the piston rod. Fluid pressure in the manifold 1133 and accumulator 1135 is applied to the pilot valve 1136 through the passageway 33 and is transmitted through the valve to either of the conduits 29 and 30 depending upon the position of its piston 31, to thus move the bypass valve 19 in either one direction or another. In the position shown in Fig. 74, pressure from the manifold 1133 is transmitted through the passageway 33, the pilot valve 1136 and conduit 29 to hold the bypass valve 19 in the position indicated, the conduit 30 under these circumstances exhausting through the valve block exhaust passage 34 and exhaust line 35 to the tank. Whether the pilot valve 1136 be positioned as shown or moved to the left, the passage 34 and line 35 provide a suitable exhaust to the tank.

The shutoff valve 4 is for the purpose of manually shutting off accumulator pressure from the hydraulic system. It should be closed tightly whenever the equipment is not in use. It is best to close this valve just before shutting off the electric motor 1134 in order to have the accumulator filled with oil. This is particularly desirable if the equipment is to be idle for a considerable period of time.

The accumulator 1135 consists of a stationary cylinder which is separated into two chambers 36 and 37 by means of a movable piston 38. The chamber 36 is for the storage of oil which is supplied to the same from the manifold 1133; and the other chamber 37 is for a charge of compressed air which through its action on the movable piston 38 maintains oil pressure in the pressure lines 7, 8, 9 and 10 to the hydraulic equipment.

An air vent may optionally be provided for removing air from the oil chamber 36 and an oil drain may be provided for removing oil from the air chamber 37. Provision is made for adding compressed air to the air chamber 37 by means of the air plug 39 which may be removed to permit the attachment of a compressed air line. After the air line is attached, the air valve plug 40 is backed off to its open position to allow the supply of compressed air to the chamber 37 and remains open until the desired pressure is built up in the chamber. The opening of the valve 40 places the pressure gauge 41 in communication with the accumulator chamber 37 to thus indicate when the pressure therein has reached the desired value. When the equipment is installed the air side of the accumulator 1135 is charged with compressed air from an outside source as described until the required operating pressure in the oil chamber 36 is reached.

The pilot valve 1136 is automatically actuated by the peripherally beveled cam 42 (Figs. 74 and 75) secured to the accumulator piston rod 43 and the cam follower 44 (Figs. 74 to 76) mounted on the composite lever structure 45 for pivotal movement about its common axis or shaft 46 (Fig. 76). The cam follower 44 is rigidly secured by the shaft 46 to the auxiliary lever 47 of the composite structure which in turn is held in releasable engagement with the principal lever 48 thereof by a conventional spring biased detent 49. The lever 48, it should be noted, is freely rotatable on the shaft 46. Thus when the detent 49 is disengaged automatic operation of the pilot valve 1136 is no longer possible, the valve then being manually actuated by the principal level 48.

The cam follower 44 (Fig. 75) is fashioned as a bell crank with its arm 50, in the phase of operation depicted, positioned to permit unobstructed movement of the cam 42 to the right but with its remaining arm 51 positioned for engagement by the cam. When the cam 42 in its movement to the right engages and depresses the arm 51 of the bell crank to a nonobstructing position, the piston 31 of the pilot valve will be moved to the left and the other arm 50 of the bell crank will be moved to a position for engagement with the cam 42 when it moves to its left on the reverse cycle. When the cam 42 engages and depresses the arm 50 of the bell crank to a nonobstructing position on the reverse cycle of movement the piston 31 of the pilot valve is moved to the right hand position indicated in the drawings.

From the description of the operation of the cam 42 and cam follower 44 it should be clear that the piston 38 of the accumulator moves substantially to its fully charged position at the right before shifting the pilot valve 1136 to cutoff and bypassing the pump 16. When the accumulator discharges from its full capacity position, however, the accumulator piston 38 in first moving a predetermined distance to the left provides the sole source of energy for the operation of the units, leaving the major portion of the accumulator energy for subsequent utilization in the apparatus after the initial piston traverse. Upon completing the preliminary piston traverse the pilot valve 1136 will be moved from its position of cutoff to the position shown in the drawing where the pump supplies fluid to the manifold 1133. This has the very beneficial result of making the residual energy of the accumulator available for addition to that being supplied by the pump when the load on the power plant reaches its peak value due to the simultaneous operation of a number of the units, as will be pointed out in detail hereinafter.

The accumulator 1135 when fully charged has sufficient capacity to supply hydraulic energy for operating all the units on the gun through one complete cycle of operation. The pump 16 is designed to recharge the accumulator during operating cycles. In this manner a large volume of oil under pressure is instantly available for rapid operation of the equipment under maximum demands without running the pump continuously under pressure. This arrangement permits the use of a smaller pump and electric motor, reducing the power consumption to a minimum. Although under normal conditions the pump operates under pressure only at intermittent intervals, it may, however, be used for continuous and direct operation in case of accumulator failure.

When the electric motor 1134 is started the pump 16 delivers oil to the accumulator along the path indicated by the dot and dash line. The flow of the oil is from the pump 16 around the relief valve 18, through the bypass valve 19 and check valve 20, and finally along the conduit 2 to the manifold 1133 which is connected to the accumulator oil chamber 36, all in a manner hereinbefore described. In consequence thereof the accumulator piston 38 is gradually moved to the right to its fully charged position against the compressed air in the pressure chamber 37. When this point is reached the piston 31 of the pilot valve 1136, which is cam operated by the piston rod 43, is shifted to the left. The movement of the pilot valve piston 31 to this position admits accumulator pressure through the passageway 33 and conduit 30 to the right end of the bypass valve 19 and at the same time vents the left end of the bypass valve 19 through the conduit 29, exhaust passage 34 and conduit 35 to the tank. In consequence thereof the bypass valve 19 shifts to the left and unloads the pump output line to the tank as previously described, thus reducing the pump pressure to a low idling value and lowering the power consumption of the electric motor accordingly.

The idling condition of the pump will prevail until a predetermined volume of accumulator oil has been removed from the accumulator chamber 36, after which the pilot valve piston 31 will be shifted to the right by the cam operation of the piston rod 43 as described in detail hereinbefore. This connects the accumulator pressure through the passageway 33 and conduit 29 to the left end of the bypass valve 19 and vents the right end of the valve through the conduit 30, exhaust passageway 34 and conduit 35 to the tank. The bypass valve 19 therefore moves to the right closing off the bypass and the pump 16 again begins delivering oil to the manifold 1133.

If for any reason the air pressure in the accumulator chamber 37 should drop appreciably below normal, the equipment may be operated directly from the pump 16. The power plant is converted for this method of operation by breaking the interconnection between the piston rod 43 of the accumulator and the piston 31 of the pilot valve 1136. This is accomplished by moving the spring biased detent 49 to its inoperative position so that movement of the auxiliary lever 47 will no longer affect the position of the pilot valve. The piston 31 of the pilot valve 1136 should then be shifted to the right through manual operation of the principal lever 48; and it will remain in the position shown in Fig. 74 regardless of the position of the accumulator piston 38. When the pilot valve 1136 is shifted to the right, the bypass valve 19 will also be shifted to the right for reasons noted and thus will prevent unloading of the pump.

The pump 16 then delivers oil to the accumulator 1135 until the piston 38 is fully retracted to and engages a positive stop 52, after which it continues to deliver oil to the system for operating purposes at continuous full pressure with no idling. When the pump 16 delivers more oil than is required by the operating units, the excess oil will be discharged through the relief valve 18. The pressure setting of the relief valve is slightly higher than the normal operating pressure which is maintained by the air pressure in the accumulator. The higher pressure setting of the relief valve is needed to make an accelerating force available when the bypass valve 19 functions to fill the accumulator and thus reverses the direction of movement of the accumulator piston. The shutoff valve 4 may optionally be closed without altering these operating conditions.

THE DRIVE UNITS

The drive units for the projectile tray, the case stop, the traverse carriage and the rammer and empty case ejector each consist of a drive control unit and a hydraulic motor. In Fig. 77 the projectile tray motor and the projectile tray drive control unit are identified by the reference characters 1121 and 1122 respectively, the pipe line 10 supplying accumulator pressure to this drive control unit and the pipe line 14 providing for the return flow of the fluid medium to the supply tank 1132. The case stop motor and the case stop drive control unit are shown in Fig. 74 and are designated there by the reference characters 1119 and 1120, respectively, the pipe line 10 also supplying accumulator pressure to this drive control unit and the pipe line 14 again providing for the return flow of the fluid medium to the supply tank 1132.

Fig. 78 depicts the traverse carriage motor 1124 and the traverse carriage drive control unit 1123, accumulator pressure being supplied to the control unit in this case by the pipe line 7 and the return flow of the fluid medium to the supply tank being provided for by the pipe line 11. The rammer and case ejector motor 1126 and the rammer and case ejector drive control unit 1125 are shown in Fig. 79 of the drawings wherein accumulator pressure is supplied to the drive control unit by the pipe line 8 and the return flow of the fluid medium to the supply tank is provided for by the pipe line 12.

The hydraulic motors 1119, 1121, 1124 and 1126 of the four drive units described above may be of the gear type or piston type or of any other conventional prior art construction and are reversible in response to the operation of the appropriate controls. As clearly shown in Figs. 74, 77, 78 and 79 the motors 1119, 1121, 1124 and 1126 are geared in any suitable manner to their respective sprocket wheels 1103, 1128, 1082 and 1109 and 1115 that drive the chains 1195, 1156, 1081, 1406 and 1437 connected respectively to the case stop head 1102, the projectile tray 1070, the traverse carriage 1077 and the rammer and empty case ejector heads 1108 and 1114. The drive control units 1120, 1122, 1123 and 1125 for the case stop, the projectile tray, the traverse carriage and the rammer and empty case ejector are mounted in any suitable manner upon the gun slide and are provided with cam shafts which are driven from their respective motors in a manner to be pointed out in detail hereinafter.

THE PROJECTILE TRAY DRIVE CONTROL UNIT

The projectile tray drive unit, which consists of the projectile tray motor 1121 and the projectile tray drive control unit 1122, operates the projectile tray for the purpose of transferring ammunition from the loading tray to the traverse carriage and also for returning unfired ammunition from the traverse carriage to the loading tray. This drive unit at the proper time also withdraws the projectile tray and the fuse setter mounted thereon from the ammunition and moves the projectile tray with the fuse setter to its forward position.

The projectile tray drive control unit 1122 includes the valve block 65 and the housing 66 secured thereto in which the cam shaft 67 and associated instrumentalities are mounted and oil immersed. The cam shaft 67 is driven by the motor 1121 through the reduction gear 68 and pair of bevel gears 53, the gear ratio being chosen by way of example to cause the cam shaft 67 to rotate through an angle of 270° as the projectile tray 1070 moves from the forward position indicated in Fig. 77 to its rear position in the traverse carriage or vice versa. In the valve block 65 there are positioned three principal valves, namely, a blocking valve 69 for stopping the motion of the hydraulic motor 1121, a reversing valve 70 for controlling its direction of rotation and an acceleration valve 71 for controlling the acceleration and deceleration of the hydraulic motor and its associated equipment. Two adjustable orifices controllable by the valves 72 and 73 and two check valves 74 and 75 operate in conjunction with the acceleration valve 71. The maximum speed of the hydraulic motor 1121 is controlled by the valve 76 which provides an adjustable orifice in the pressure line 10 from the accumulator. The drive connection 1127 between the control unit 1122 and the projectile tray sprocket 1128 is shown diagrammatically in Fig. 77 and includes the drive shaft 1188, the pair of bevel gears 1183 and 1181 and the shaft 1179. Suitable gearing 57 interconnects the motor 1121 with the drive shaft 1188.

*The blocking valve.*—The blocking valve 69 is of the piston type and is urged to the closed position shown by the compression spring 86 at one end thereof while fluid pressure applied to the piston rod end thereof moves the same to an open position. Thus, in initiating movement of the projectile tray from the forward position shown, auxiliary pressure is ported from the pressure line 77 around the blocking valve 69, along the passageway 78 to and through the acceleration valve 71 and finally along the passageway 79 to the piston rod end of the blocking valve 69 to shift this valve to its open position against the compression of the spring 86. When initiating movement of the projectile tray from its rear position, however, auxiliary pressure is ported instead from the line 80, which serves as a pressure line when the control 1137 is shifted to the left to move the valve 248 to the left and port pressure from the traverse carriage control unit 1123 (Fig. 78) through the auxiliary pressure line 207, along the projectile tray control valve 248 and through the passageway 80, around the blocking valve 69, along the passageway 81 to and through the acceleration valve 71 which is now shifted to the left and then again along the passageway 79 to the piston rod end of the blocking valve 69 to shift the same to its open position. When operated to its open position in either manner described above, oil at the spring end of the blocking valve 69 is vented along the common exhaust passageway 82 to the cam housing 66 which communicates with the accumulator supply tank 1132 through the auxiliary exhaust lines 83 (Fig. 77) and 84 (Fig. 74).

To the free end of the piston rod of the blocking valve 69 there is pivotally secured a detent 85 which is urged by the compression spring 86 to engage either of the slots 87 or 88 of the cam disc 89 on the shaft 67 when the valve is in the closed position shown or to engage the peripheral portion 90 thereof intermediate the slots 87 and 88 when the valve is in its open position. In order to insure peripheral engagement of the detent 85 with the cam disc 89 to hold the valve 69 in its open position, the detent is pivotally connected to the valve block 65 by the link 91 in the manner shown. A lug 92 is secured to the cam disc 89 for cooperation with the fixed stop 93 on the cam housing and is mounted on the disc for unobstructed movement relative to the detent 85 and link 91 as the cam disc rotates. Since as previously noted the cam shaft 67 is geared to the motor 1121 to cause a rotation of the shaft through an angle of 270° as the projectile tray 1070 moves from its forward position to the rear or vice versa, the cam slots 87 and 88 are separated by an arc of 270° to insure closing of the blocking valve 69 when the projectile tray reaches either of its terminal positions. It should be carefully noted that the slots 87 and 88 of the cam disc 89 are of sufficient width to prevent contact between the lateral surfaces of the detent 85 and side walls of the slot when the disc lug 92 abuts either end of the fixed stop 93. The reason for this construction will be pointed out in detail hereinafter.

In its closed position the blocking valve 69 blocks the pressure line 10 from the accumulator, vents one end of the hydraulic motor 1121 from the passageway 124, through passageway 240 (Fig. 74), through the blocking valve 169, through the passageway 128, through the passageway 113, across the acceleration valve 71, through passageway 114, along reversing valve 70, through passageway 127, across blocking valve 69, through the passageway 114 to the cam housing 144 to cam housing 66 which is connected to the accumulator supply tank 1132, thence the other end of the hydraulic motor through the passageway 123, through passageway 112, across the acceleration valve 71, through passageway 111, along the reversing valve 70, through passageway 130, across blocking valve 69 and through the passageway 129 which connects with the return line 14 to the accumulator 1132, and also mechanically locks the hydraulic motor by means of the detent 85 when this locking function is not accomplished by engagement of the disc lug 92 with the fixed stop 93. The detent engages either of the slots 87 or 88 in the cam disc when the driven unit reaches a terminal position in its travel. The blocking valve is shifted to its closed position by the compression spring 86 and is opened by pressure ported to its piston rod end when operating hydraulically. The blocking valve is held in its open position against the compression of the spring 86 through contact of the detent 85 with the peripheral portion 90 of the cam disc as already noted. When operating the projectile tray manually, however, release of the detent 85 is effected through the slotted push rod 54 engaging a pin 55 of the link 91 and operable by the bell crank lever 56. Counterclockwise rotation of the lever 56 in either of the terminal positions of the projectile tray 1070 causes the detent 85 to disengage one of the disc slots 87 and 88 and unlock the projectile tray.

*The reversing valve.*—The reversing valve 70 which controls the direction of rotation of the hydraulic motor 1121 is also of the piston type and is pilot pressure operated through the blocking valve 69. This valve is held in either of two positions by the nonpositive spring loaded detent 94 operable to engage the beveled grooves in the right end of the valve body 70. In the position shown the reversing valve 70 is operable to cause rotation of the hydraulic motor 1121 in a direction to move the projectile tray to its forward position by application of hydraulic pressure from the pressure line 10, along the open blocking valve 69, through the passageway 127, along the reversing valve 70, through passageway 114, across the acceleration valve 71, through the passageway 113, through passageway 128, along the case stop blocking valve 169 (Fig. 74), through passageway 240, and through passageway 124 which connects directly to one side of the hydraulic motor 1121; while a shifting of this valve to the left will result in a reverse rotation of the motor to move the projectile tray to its rear position an application of hydraulic pressure from the pressure line 10, along the open reversing valve 70, through the passageway 111, across the acceleration valve 71, through the passageway 112, and through the passageway 123 which connects directly to the other side of the hydraulic motor 1121.

In order that it may be clear how the reversing valve 70 is pilot pressure operated through the blocking valve 69 when opening the latter valve to initiate movement of the projectile tray from the forward position shown, it will be observed that when the blocking valve 69 is approximately half open accumulator pressure will be ported to the motor 1121 from its pressure main 10. Not until the blocking valve 69 is approximately three-quarters open, however, will accumulator pressure be ported from the pressure line 77 through the blocking valve and passageway 95 to shift the reversing valve 70 to the left. As pressure is admitted at the right end of the reversing valve 70 to shift the same, oil is simultaneously vented at the left end of the valve through the passageway 96 and blocking valve 69 to the line 80 which, with the control lever 1137 in the position shown or in the left hand position, serves as an auxiliary exhaust line along the control valve 248, through the passageway 212, along the selector valve 177, through the passageway 179 connected to the cam housing 166 which connects directly to the supply tank 1132.

When opening the blocking valve 69 to initiate movement of the projectile tray from its rear position the reversing valve 70 at the outset will be shifted to the left. When the blocking valve 69 is again approximately half open accumulator pressure will be ported to the motor 1121 as before. Not until the blocking valve 69 is approximately three-quarters open, however, will accumulator pressure be ported from the line 80 which is now a pressure line through the blocking valve and passageway 96 to shift the reversing valve to the right. As pressure is admitted at the left end of the reversing valve 70 to shift the same, oil is simultaneously vented at the right end of the valve through the passageway 95 and blocking valve 69 to the line 77 which now serves as an auxiliary exhaust line.

When either of the lines 77 or 80 serves as an auxiliary exhaust line for the reversing valve 70 oil is vented through the control selector valve 177 of the case stop drive control unit 1120 (Fig. 74) and from thence along the common exhaust passageway 179 in the valve block to the oil filled cam housing 166 secured thereto. This housing communicates with the supply tank 1132 through the auxiliary exhaust lines 97 and 84. It should be carefully noted that in both cases described above the shifting of the reversing valve 70 to either of its two positions is delayed until the blocking valve 69 is approximately three-quarters open. The reason for this delayed shift will be noted hereinafter.

*The acceleration valve.*—The acceleration valve 71 is a three position cam actuated valve for controlling the acceleration and deceleration of the hydraulic motor 1121. As the valve moves from its initial position to its intermediate position the acceleration of the motor is controlled. In its intermediate position, which is maintained for the greater portion of the operating cycle, the motor rotates at constant speed. As the valve continues to shift in the same direction from its intermediate position to its final position the deceleration of the motor is controlled. The desired movement of the acceleration valve 71 is obtained through the cam 98 on the shaft 67, the bell crank 99 pivotally mounted on the cam housing at 100 and the spring 101 associated with the piston rod 102 which is connected to the bell crank 99 by the link 103. As the acceleration valve 71 moves from the initial position shown to its final position at the left in the intermittent fashion described, oil at the left end of the valve is vented through the common exhaust passageway 82 to the cam housing 66. A detailed description of the valve actuating mechanism and its mode of operation follows.

As clearly shown in Fig. 77 two metallic washers 104 and 105 loosely surround the piston rod 102 to permit relative movement therebetween and continuously engage the compression spring 101 disposed therebetween. Each of the washers 104 and 105 in certain phases of operation of the valve engages the adjacent terminal wall of the spring recess to allow compression or decompression of the spring. In the initial position of the valve 71 shown, the washer 105 engages a terminal recess wall and the spring 101 under substantial compression seeks to urge the valve to the left but is prevented from doing so by the engagement of the cam follower 106 with the peripheral surface 107 of the cam 98.

As the cam 98 begins clockwise rotation through an angle of 270° a small clockwise movement of the bell crank 99 is permitted, thus allowing the spring 101 to move the valve 71 from the position shown to its intermediate position. In this latter position the washer 104 engages its adjacent terminal recess wall and the pin 108 on the piston rod contacts the washer 105 without disengaging this washer from its terminal recess wall. The intermediate position of the valve is reached after the cam 98 has rotated through an angle of approximately 15° at which point both cam followers 106 and 109 are disengaged from the cam surface due to the fact that the bell crank 99 is restricted to a slight clockwise movement which is insufficient to permit continued contact of the cam followers 106 and 109 with the side 107 of the cam 98. The cam followers 106 and 109 remain disengaged from the cam 98 for the following 240° of rotation during which time the acceleration valve 71 is held in an intermediate and balanced position by the residual compression of the spring 101 which urges both washers 104 and 105 into intimate engagement with the terminal recess walls.

Upon the completion of the 240° movement of the cam 98 its side 110 commences engagement with the cam follower 109 to begin shifting the valve 71 from its intermediate position to its final position at the left. This shift is completed in approximately the last 15° of rotation of the cam 98 when the cam will have turned through an angle of 270°. As the piston rod 102 and valve 71 move in response to engagement of the cam 98 with the follower 109 the washer 104 remains in fixed engagement with its terminal recess wall and the spring 101 is compressed by the washer 105 which is urged to the left by the pin 108 in engagement therewith. When the valve 71 has been shifted to its final position at the left after a 270° clockwise rotation of the cam 98, the cam follower 109 will have moved along the side 110 of the cam and come to rest adjacent but short of the cam nose. The spring 101 will now be under substantial compression to return the valve 71 to its intermediate position when the cam 98 starts rotating in a counterclockwise direction through 270°. In the reverse cycle of movement of the valve and cam 98 to the position shown in the drawings, the valve 71 shifts in the identical manner described above, the cam and spring action in this connection being apparent from the description already given.

The acceleration valve 71 is designed to provide a relatively low acceleration and a high deceleration when moving the projectile tray from the forward position shown to the rear. A low acceleration of the projectile tray is necessary in order to insure a nondestructive engagement of the fuse setter socket with the nose of the shell while a high deceleration is desired so that ammunition may be moved to the rear at an optimum speed. How the foregoing is achieved will become apparent from a consideration of the structural details of the valve body 71 as it is shifted to the left from the position shown in a cycle of its operation.

With the acceleration valve 71 in the position shown and with the reversing valve 70 in its left position, accumulator pressure is transmitted from the pressure line 10 through the blocking valve 69, which has been shifted to its operating position at the left, and then along the passageway 127 through the reversing valve 70, along the passageways 111, 112 around the acceleration valve and through the check valve 75 to the hydraulic motor 1121, this path of fluid flow to the motor being maintained in all positions of the acceleration valve 71 as it shifts from the position shown to the final position at the left. As the acceleration valve shifts from the initial position shown to its intermediate position, oil is discharged from the motor through the restricted orifice under the control of the valve 72 along the passageway 113 around the acceleration valve to the passageway 114. Simultaneously with this discharge, oil also discharges through the passageway 115 and the peripheral notches of the cylindrical valve portion 116 through the acceleration valve to the passageway 114. The restricted orifice under the control of the valve 72 and the peripheral notches in the cylindrical valve portion 116 produce a throttling action and thus insure the desired acceleration as movement of the projectile tray to the rear is initiated.

As the acceleration valve 71 continues its shift to the left and arrives at its intermediate position the right face of the cylindrical valve portion 116 will have moved to uncover the passageway 115 causing the adjustable orifice under the control of the valve 72 to be bypassed. The oil now discharges solely through the passageway 115 and the acceleration valve to the passageway 114 without any throttling action in consequence of which the motor 1121 will now rotate at a constant speed. With the acceleration valve 71 in its intermediate position, the taper of the cylindrical valve portion 117 will be in substantial alignment with the passageways 113 and 114.

As the acceleration valve 71 recommences and continues its shift from the intermediate position to its final position at the left the progressive movement of the taper on the cylindrical valve portion 117 in relation to the circumferential recess communicating with the passageways 113 and 114 provides a progressively decreasing annular throttling area for the discharge of the oil through the passageway 115 and acceleration valve to the passageway 114. When the acceleration valve 71 reaches its terminal position at the left the cylindrical portion 117 of the valve will have completely blocked the passageway 115. Simultaneously with this oil discharge as the valve moves from its intermediate position to the final position at the left oil will again be discharged through the restricted orifice under the control of the valve 72 along the passageway 113 around the acceleration valve to the passageway 114. The rapidly increasing throttling action of the diminishing annular area produced by the taper of the cylindrical valve portion 117 as contrasted with the substantially constant throttling action produced by the peripheral notches of the cylindrical valve portion 116 provides a higher rate of deceleration when shifting the valve from its intermediate position to the final position than the acceleration produced when shifting the valve 71 from its initial to its intermediate position. By appropriate adjustment of the valve 72 the absolute magnitudes of the acceleration and deceleration can be controlled.

The acceleration valve design is such, however, that a very high acceleration is produced when initiating movement of the projectile tray from its rear position since it is desired to remove the projectile tray from the traverse carriage as rapidly as possible. Near the end of the projectile tray travel in its forward direction the acceleration valve produces a relatively high deceleration which is comparable to the deceleration of the tray experienced in its movement to the rear, thus insuring a rapid forward movement of the tray. The foregoing will become apparent from a further consideration of the structural details of the valve body in a cycle of its operation as it is shifted from its far left position to the position shown in the drawings.

With the acceleration valve 71 in its far left position accumulator pressure is transmitted through the passageways 114, 113 around the acceleration valve and through the check valve 74 to impart a reverse rotation to the hydraulic motor 1121, this path of fluid flow to the motor being maintained in all positions of the acceleration valve as its shifts from its far left position to the position shown in the drawings. As the acceleration valve 71 shifts from its far left position to its intermediate position, the restricted orifice under the control of the adjustable valve 73 is bypassed and oil is discharged from the motor solely through the passageways 118 and 111 and the acceleration valve. This follows from the fact that with the acceleration valve in its far left position the taper of the cylindrical valve portion 119 is out of alignment and to the left of the passageways 111 and 112 and only moves into a position of alignment with these passageways as the acceleration valve moves to the right to assume its intermediate position. Thus, in moving the acceleration valve 71 from its far left position to its intermediate position the hydraulic medium is not subjected to any throttling action thereby insuring an extremely high acceleration of the projectile tray as movement in the forward direction is initiated.

With the acceleration valve 71 in its intermediate position the motor 1121 will rotate at a constant speed. As the acceleration valve, however, recommences and continues its shift from the intermediate position to its final position at the right the progressive movement of the taper on the cylindrical valve portion 119 in relation to the circumferential recess communicating with the passageways 111 and 112 provides a progressively decreasing annular throttling area for the discharge of the oil through the passageway 118 and the acceleration valve to the passageway 111. Simultaneously with this oil discharge oil is also discharged through the restricted orifice under the control of the valve 73 along the passageway 112 around the acceleration valve to the passageway 111. The oil discharge through the restricted orifice takes place while the valve shifts from its intermediate position to its position at the far right but discontinues through the annular throttling area during this shift when the cylindrical valve portion 119 moves to block the passageway 118. By means of the throttling action produced at the restricted orifice under the control of the valve 73 and at the taper of the cylindrical valve portion 119 a relatively high deceleration is produced as the valve shifts from its intermediate position to the position shown at the right. By appropriate adjustment of the valve 73 the magnitude of the deceleration may be controlled.

*The pressure regulator.*—In order to maintain a substantially constant difference of fluid pressure across the projectile tray motor 1121 and in consequence thereof a substantially constant motor torque and force exerted by the projectile tray fuse setter head without damage to the cartridge case cork plug 1286, a conventional pressure regulator 120 (Fig. 77) is employed. This regulator is connected directly by the auxiliary passageways 121 and 122 across the lines 123 and 124 which serve alternately as pressure and exhaust lines for the hydraulic motor and is provided with an auxiliary exhaust line 125 (Figs. 74 and 77) which vents to the supply tank 1132 through the passageway 214, along the selector valve 177, through the passageway 215, along the blocking valve 169 in its left hand position, through the passageway 179 to the cam housing 166 which connects directly to the supply tank 1132 when the regulator 120 is moved to the far right. The force exerted by the regulator compression spring 126 in all of its positions is equal to the difference of fluid pressure desired across the hydraulic motor 1121.

With the blocking valve 69 of the projectile tray drive control unit closed both ends of the hydraulic motor 1121 are vented to the supply tank 1132 so that the pressure regulator 120 is moved to the far right by the compression of the spring 126. As normal accumulator pressure is admitted to the line 123 in moving the projectile tray to the rear, the regulator 120 will assume the normal operating position shown in the drawings. Fluctuations of the accumulator pressure in the pressure line 123 will be transmitted through the pressure regulator 120 to move the same to either the right or left of its normal position to cause equal pressure fluctuations in the exhaust line 124 thereby maintaining a substantially constant difference of fluid pressure across the hydraulic motor 1121. If for any reason excessive pressure is built up in the line 124 to move the regulator 120 to the far right, the excess pressure will be vented through the auxiliary exhaust line 125, the control selector valve 177 (Fig. 74) of the case stop control unit 1120, the case stop blocking valve 169 which is now open and the common exhaust passageway 179 to the cam housing 166. This arrangement thus insures that even under abnormal operating conditions the desired pressure difference across the hydraulic motor will be maintained.

THE OPERATION OF THE PROJECTILE TRAY DRIVE UNIT

*Rearward operation.*—With the blocking, reversing and acceleration valves 69, 70 and 71 of the projectile tray drive control unit 1122 (Fig. 77) positioned as shown, the operation of the projectile tray drive unit will be described in moving the projectile tray 1070 to the rear from the position shown. If conditions permit, auxiliary pressure will be ported from the auxiliary accumulator pressure line 77, around the blocking valve 69, along passageway 78, through the acceleration valve 71 and passageway 79 to the piston rod end of the blocking valve 69. This pressure will cause the blocking valve 69 to shift to its open position. When the blocking valve is open accumulator pressure will be ported from the auxiliary line 77 through the blocking valve 69 and the passageway 95 to the reversing valve 70 and will shift the reversing valve to the left.

Accumulator pressure will then pass from the line 10 through the blocking valve 69, along passageway 127 through the reversing valve 70 shifted to the left, passageway 111, around the acceleration valve 71, through the passageway 112, check valve 75 and pipe line 123 to the hydraulic motor 1121. The hydraulic motor through the drive connection shown diagrammatically at 1127 will rotate to initiate movement of the projectile tray 1070 to the rear; and the oil discharged from the motor will pass through the pipe line 124 to the case stop drive control unit 1120 (Fig. 74), through the case stop blocking valve 169 and pipe line 128 (Figs. 74 and 77) to the projectile tray drive control unit 1122. In the projectile tray drive control unit the hydraulic fluid continues its flow along the passageways 113 and 115, around and through the acceleration valve 71, through passageway 114 and the reversing valve 70 shifted to the left to the passageway 129, from whence it passes through the main exhaust line 14 to the accumulator supply tank 1132.

As the hydraulic motor 1121 rotates to move the projectile tray 1070 in a rearward direction the acceleration valve 71 gradually shifts from the position shown to its intermediate position where it bypasses the adjustable orifice under the control of the valve 72 all as previously described. When the adjustable orifice is bypassed the hydraulic motor 1121 will rotate at a constant speed, controlled by the adjustable orifice of the valve 76 in the main pressure line 10 from the accumulator to the drive control unit. Near the end of the travel of the projectile tray the acceleration valve 71 of the drive control unit will be gradually shifted by its cam 98 from its intermediate position to its final position at the left to control the deceleration of the motor. At the end of the travel of the projectile tray the blocking valve disc 89 will rotate into a position in which the slot 88 in the disc is aligned with the blocking valve detent 85. This detent will then enter the slot 88, thus closing the blocking valve 69 and stopping the drive control unit.

*Forward operation.*—With the projectile tray in its rear position it will be noted that the reversing and acceleration valves 70 and 71 are shifted to their far left positions. Thus, when starting the drive unit to shift the projectile tray from the rear position in a forward direction, auxiliary accumulator pressure is ported from the auxiliary pressure line 80, around the blocking valve 69, through the passageway 81 and acceleration valve 71 along the passageway 79 to the piston rod end of the blocking valve 69. This pressure will cause the blocking valve 69 to shift to its open position. When the blocking valve is open accumulator pressure will be ported from the auxiliary pressure line 80 through the blocking valve 69 and passageway 96 to shift the reversing valve 70 to the right.

Accumulator pressure from the main pressure line 10 will then pass through the blocking valve 69, passageway 127 and reversing valve 70 shifted to the right, along the passageway 114, around the acceleration valve 71 through the passageway 113 and check valve 74 to the pipe line 128. The hydraulic medium continues its flow from the pressure line 128 (Fig. 74) through the passageway 221, control selector valve 177 in its lower position and passageway 243 of the case stop drive control unit 1120 and from thence along the pipe line 124 to the hydraulic motor 1121 (Fig. 77). The hydraulic motor will then rotate in a reverse direction to initiate movement of the projectile tray in its forward direction and the oil discharged from the motor will pass along the pipe line 123, through the passageway 118, acceleration valve 71, passageway 111, through the reversing valve 70 to the passageway 130, around the reversing valve 70 through the passageway 129 to the main exhaust line 14 returning to the accumulator supply tank 1132.

As the hydraulic motor rotates in the reverse direction the acceleration valve is gradually shifted from its far left position toward the right to assume its intermediate position in which the hydraulic motor rotates at a constant speed. In this position the speed of the motor is again controlled by the main adjustable orifice in the pressure line 10 leading from the accumulator to the drive control unit. Near the end of the travel of the projectile tray in its forward direction, the acceleration valve 71 is gradually shifted by the cam 98 from its intermediate position to the far right position shown in the drawings. This causes the oil to discharge through the passageways 112 and 118, through and around the acceleration valve 71 to the passageway 111 to control the deceleration of the motor. At the end of the travel of the projectile tray 1070 the blocking valve disc 89 rotates into a position in which the slot 87 in the disc is aligned with the blocking valve detent 85. This detent enters the slot 87, thus closing the blocking valve and stopping the drive control unit.

*The transient operation.*—A transient condition occurs in the operation of the projectile tray drive control unit 1122 which is important when the gun is either elevated or depressed. When the gun is elevated and the projectile tray is in its forward position the hydraulic motor 1121 is locked by the detent 85, the lateral surface of which engages the side wall 131 of the slot 87. At the same time a small clearance exists between the disc lug 92 and the terminal surface 132 of the fixed stop 93.

When the blocking valve 69 is closed, both ends of the hydraulic motor 1121 will be vented to the tank and the hydraulic motor is locked by the detent 85 engaged in the slot 87 of the disc. The load on this detent is that caused by the component of the weight of the driven unit acting through the chain 1156, the sprocket wheel 1128 and drive connection 1127 and in turn on the slotted disc 89 which as previously noted is geared to the motor 1121. With the parts positioned as shown only a slight movement of the cam disc 89 in a counterclockwise direction is possible until the disc lug 92 engages the terminal surface 132 of the case stop. Movement in the other direction is prevented by the detent 85 engaged in the slot 87. Therefore the accumulator pressure which opens the blocking valve 69 must overcome not only the force of the blocking valve spring 86 but also the friction between the lateral surface of the detent and the side wall 131 of the disc slot 87.

The transient condition occurs as the blocking valve 69 opens. Thus, as the blocking valve moves to its open position the first port to be uncovered will be the pressure line 10 from the accumulator. The auxiliary pressure line 77 which is adapted to communicate with the passageway 95 to the reversing valve is still closed and therefore the reversing valve position will be that shown in Fig. 77 and will be such as to port pressure to the hydraulic motor 1121 to move it in the direction opposite to the desired motion. The direction of rotation of the hydraulic motor 1121 will therefore be such as to move the slotted disc 89 in a counterclockwise direction until the disc lug 92 abuts the terminal surface 132 of the fixed stop 93 to take up the clearance. When this occurs the rotation of the motor will be momentarily stopped and the slight movement of the slotted disc 89 will relieve the frictional forces acting between the lateral surface of the detent 85 and the slot side 131. This follows from the design of the slot 87 which has such a width that when the disc lug 92 engages the fixed stop 93 the slot sides will be free of contact from the lateral surfaces of the detent.

As the blocking valve 69 continues to open and reaches approximately its three-quarters open position, accumulator pressure is ported from the auxiliary pressure line 77 through the blocking valve 69 and passageway 95 to the reversing valve 70 which is then shifted to the left causing the drive control unit to operate in the desired direction all as previously described herein. The detent 85 now engages the peripheral surface 90 of the cam disc 89 and continues this engagement until the projectile tray reaches its rear position when the detent engages slot 88. With the gun elevated as previously described the hydraulic motor is now locked by the abutment of the disc lug 92 with the terminal surface 133 of the fixed stop 93, the lateral surfaces of the detent in this position being free from engagement with the side walls of the slot 88. When initiating movement of the projectile tray from its rear position with the gun elevated, the delayed shift of the reversing valve 70 from its left position occurs as previously described, tending momentarily to urge the disc 89 in a clockwise direction. This, however, is not possible by reason of the engagement of the lug 92 with the terminal surface 133 of the fixed stop, thus permitting a frictionless withdrawal of the detent 85 from the slot 88.

When the gun is depressed and the projectile tray is in its forward position, the hydraulic motor is locked by the abutment of the disc lug 92 with the terminal surface 132 of the fixed stop 93 and the lateral surfaces of the detent 85 are out of contact with the side walls of the slot 87 thus permitting a frictionless withdrawal of the detent from the slot as described when initiating movement of the projectile tray to the rear. With the projectile tray in its rear position, however, and the gun depressed, the hydraulic motor is locked by the detent engaging the side wall 134 of the slot 88 leaving at the same time a small clearance between the disc lug 92 and the terminal surface 133 of the fixed stop. This clearance, as previously described, allows a slight transitory movement of the disc 89 attending the delayed reversal of the reversing valve 70, thereby facilitating withdrawal of the detent from the slot as movement of the projectile tray in the forward direction is initiated.

The transitory movement of the slotted disc 89, when the gun is either elevated or depressed, to cause the slot in the disc to move away from the detent and the delay in operation of the motor in the desired direction caused by the delayed shifting of the reversing valve provide a number of advantages. The wear due to the frictional forces acting between the lateral surfaces of the detent and the side walls of the disc slot will be reduced. Furthermore, the necessity for rounding off a corner of each of the slots will be eliminated since such a modification of the slot would be necessary if the reversing valve were shifted before pressure was ported to the hydraulic motor. Finally, the accuracy of stopping is increased since the detent is able to enter the slot almost instantaneously without first throttling the flow of oil through the blocking valve as it closes.

THE INTERLOCKS OF THE PROJECTILE TRAY DRIVE CONTROL UNIT

The projectile tray drive control unit 1122 incorporates four interlocks which are designated interlock A, interlock L, interlock D and interlock E respectively. These interlocks insure proper engagement of the projectile nose with the fuse setter, prevent withdrawal of the fuse setter from the projectile nose until the fuse has been set and the projectile tray has completed its rearward travel, and prevent movement of the traverse carriage until it has been cleared by the projectile tray in its forward travel.

Thus, interlock A releases the case stop and starts the fuse setting motor when the nose of the projectile is engaged in the fuse setter socket and the cartridge case is being pushed against the case stop by the projectile; interlock L prevents the withdrawal of the projectile tray and fuse setter from the projectile until the fuse setter socket has made one complete revolution to engage the fuse pins and set the fuse; interlock D prevents the withdrawal of the projectile tray and fuse setter from the projectile until the projectile tray has completed its rearward travel and thereby moved the ammunition into the traverse carriage; and interlock E prevents the movement of the traverse carriage from the firing position to the ramming position unless the projectile tray is moving forward and is clear of the traverse carriage.

*Interlock A.*—The interlock A in the projectile tray drive control unit 1122 consists of the case stop release valve 1896 (Figs. 33 and 77) which is movale to the left against the compression of the spring 1900 by the rigidly connected levers 1898 and 1258 pivoted on the valve block 65 and engaging the valve piston rod 1899. A linkage 1259 including a case stop drive starting rod 1265 and a fuse setting indicator control rod 1264 both operable by the case stop drive starting lever 1261 interconnects the free end of the lever 1258 and the lever 1260 of fuse setting indicator-regulator 1076. When the projectile tray 1070 has moved to the rear sufficiently to cause the projectile nose to engage the fuse setter socket 1223 the bell crank 1262 on the fuse setter 1072 will be rotated by the pin 1263 to shift the lever 1261 to its start position and operate the linkage 1259 interconnecting the case stop release valve 1896 and the fuse setting indicator-regulator 1076.

Movement of the linkage 1259 withdraws a detent from a slotted disc in the fuse setting indicator-regulator 1076 and shifts the case stop release valve 1896 to the left against the compression of the spring 1900. The valve is held in its shifted position by the linkage 1259 and the fuse setting indicator-regulator 1076 until the movable socket member 1225 has made one complete revolution, as noted in detail in the description of the fuse setting indicator-regulator. As the case stop release valve 1896 is shifted oil is vented through the common exhaust passageway 144 to the cam housing 66. When the movable socket member 1225 has made one complete revolution to set the projectile fuse time ring, the case stop release valve 1896 will be shifted to the right by the spring 1900 causing the linkage 1259 and hence the starting lever 1261 to return to its stop position.

The movable socket member 1225 as previously noted is driven through appropriate gearing either manually or by an electric motor in the fuse setting indicator-regulator 1076, the motor circuit including a suitable hydraulically actuated starting switch 1901 (Figs. 33 and 77) operable to be closed by the fuse setting motor starting valve 1909. The switch blade 1907 of the switch 1901 is mounted in an insulating manner on the valve piston rod of the valve 1909 and will engage the stationary switch contacts 1903 and 1904 to close the motor circuit when the valve piston is urged by fluid pressure from the auxiliary pressure line 151 to the left against the compression of the spring 1910. When the fuse setting motor starting valve 1909 moves in the manner described oil is vented through the common exhaust passageway 82 of the valve block to the cam housing 66. After the movable fuse setter socket member 1225 has completed one revolution to set the fuse, the spring 1910 will move the fuse setting motor starting valve 1909 to the positon shown to open the switch 1901 at which time pressure is vented through passageway 150, reversing valve 70, passageway 149 and case stop release valve 1896 to the common exhaust passageway 144.

When the case stop drive starting lever 1261 (Fig. 77) is shifted to its start position in moving the projectile tray to the rear, the case stop release valve 1896 in the projectile tray drive control unit 1122 will be shifted to the left. Accumulator pressure will then be ported from the auxiliary passageway 148 communicating with the main pressure line 10 through the case stop release valve 1896 and passageway 149 to the reversing valve 70. Since the projectile tray is moving to the rear, the reversing valve 70 will have ben shifted to the left by pressure from the line 77 through the passageway 95 in the manner previously described. Therefore, accumulator pressure will be ported from passageway 149 through the reversing valve 70, passageway 150 and auxiliary pressure line 151 to the fuse setting motor starting valve 1909 and to the blocking valve 169 (Fig. 74) in the case stop drive control unit 1120. The fuse setting motor starting valve 1909 will be shifted to the left, thus closing the switch 1901 in the fuse setting motor starting circuit. The case stop blocking valve 169 will be shifted to the left, thus releasing the case stop which will then move to the rear with the projectile tray and the ammunition.

When the movable fuse setter socket member 1225 has made one complete revolution to set the projectile fuse time ring, the case stop release valve 1896 will be shifted to the right by the spring 1900 causing the linkage 1259 and hence the starting lever 1261 to return to the stop position all as previously noted. The case stop, however, continues to move to the rear with the projectile tray. When the case stop release valve 1896 has been shifted to the right, the spring 1910 will shift the fuse setting motor starting valve 1909 to the right to open the switch 1901, the electric motor in the fuse setting indicator-regulator 1076 having been previously de-energized by the opening of the switch 1877 (Fig. 33). In so doing oil will be vented from the right end of the fuse setting motor starting valve 1909 through the passageway 150, reversing valve 70, passageway 149 and case stop release valve 1896 to the common exhaust passageway 144 which communicates with the cam housing 66. A delayed opening of the hydraulic switch 1901 occurs which is caused by the time required to vent the hydraulic fluid as aforesaid, thus making the use of the switch 1877 (Fig. 33) necessary as previously explained.

When the projectile tray and case stop move forward to return unfired ammunition, the case stop drive starting lever 1261 will be shifted to its start position as the case stop approaches its forward position. The operation of the interlock A when the projectile tray and case stop are moving forward does not prevent the stopping and locking of the case stop in its forward position nor does it cause a closing of the hydraulic switch 1901 in the fuse setting motor circuit. For when the projectile tray is moving forward the projectile tray reversing valve 70 will be shifted to the right, thus blocking the pressure passageway 149 from the case stop release valve 1896 and preventing the operation of the fuse setting motor starting valve 1909 and the case stop drive control unit blocking valve 169.

*Interlock L.*—Interlock L as previously noted prevents the withdrawal of the projectile tray and fuse setter from the projectile until the movable socket member 1225 of the fuse setter has made one complete revolution to engage a projectile fuse pin and rotate the fuse time ring to the proper setting. This interlock is combined with the case stop release valve 1896 in the projectile tray drive control unit 1122 (Fig. 77) and hence is operated by the same linkage which operates interlock A. While the fuse setter socket is rotating to set the fuse in the projectile, the case stop release valve 1896 is shifted to the left and in this position prevents withdrawal of the projectile tray and fuse setter from the projectile since control pressure from the traverse carriage control valve 1479 (Fig. 78) through the empty case interlcok valve 1379, the open breech block interlcok valve 1599 and pressure line 152 (Figs. 78, 79 and 77) to the case stop release valve 1896 is blocked by the case stop release valve.

When the movable fuse setter socket member 1225 has rotated one complete revolution in the movement of the projectile tray to the rear, the operating linkage associated with the case stop release valve 1896 and the fuse setting indicator regulator 1076 will be released and will be shifted by the spring 1900 of the case stop release valve to the stop position, thus simultaneously shifting the case stop release valve 1896 to the right. In this position control pressure from the traverse carriage contral valve 1479 (Fig. 78) will be ported through the empty case interlock valve 1379, the open breech block interlock valve 1599, pressure line 152 (Figs. 78, 79 and 77) through the case stop release valve 1896 and passageway 153 to the projectile tray acceleration valve 71. When the projectile tray has completed its rearward travel the acceleration valve 71 will be shifted to its far left position and the projectile tray blocking valve 69 will have the position shown in Fig. 77. Control pressure will then be ported from the traverse carriage control valve 1479, the empty case interlock valve 3179, the open breech block interlock valve 1599, the pressure line 152, to the case stop release valve 1896 through the passageway 153, through the acceleration valve 71, passageway 154, blocking valve 69 and pressure line 155 (Figs. 77 and 74) to the control selector valve 177 in the case stop drive control unit 1120.

The control selector valve 177 in the case stop drive control unit 1120 (Fig. 74) will then be shifted to its lower position, thus porting accumulator pressure from the main pressure line 10 of the case stop drive control unit through the passageway 211, the control selector valve 177, auxiliary pressure line 212 (Figs. 74 and 77), projectile tray control valve 248 and auxiliary pressure line 80 to the projectile tray drive control unit 1122. The porting of pressure through the auxiliary pressure line 80 to the projectile tray drive control unit will open the blocking valve 69 and shift the reversing valve 70 of this control unit to cause the projectile tray to move to its forward position as described in detail hereinbefore.

*Interlock D.*—Interlock D as previously noted prevents the withdrawal of the projectile tray and fuse setter from the projectile until the projectile tray has completed its rearward travel and thereby moved the ammunition into the traverse carriage. This interlock is required in order to insure sufficient clearance between the projectile nose and the gun housing when the cartridge case and projectile are moved transversely to the ramming position.

In order to withdraw the projectile tray and fuse setter from the ammunition, the control selector valve 177 (Fig. 74) in the case stop drive control unit 1120 must be shifted to its lower position. The pressure which shifts the control selector valve is ported from the traverse carriage control valve 1479 (Fig. 78) through the empty case interlock valve 1379, the open breech block interlock valve 1599 and the pressure line 152 (Figs. 78, 79 and 77) to the projectile tray drive control unit 1122.

In this control unit the pressure is ported through the case stop release valve 1896, passageway 153, through the acceleration valve 71 only when the projectile tray is near the end of its rearward travel, through the passageway 154, through the blocking valve 69, only when the projectile tray is locked and finally along the pressure line 155 to the control selector valve 177 (Fig. 74) in the case stop drive control unit 1120. Interlock D therefore consists of the blocking valve and acceleration valve ports mentioned above.

*Interlock E.*—Interlock E as previously stated prevents movement of the traverse carriage from the firing position to the ramming position except when the projectile tray is withdrawing from the ammunition and has moved forward sufficiently to clear the traverse carriage. As shown in Fig. 77 this interlock consists of the cam operated valve 156 operable by the bell crank 157 pivoted on the valve block 65 under the control of the cam 158 secured to the cam shaft 67. The projectile tray traverse carriage interlock valve 156 is urged to the closed position shown by the compression spring 159 and when opening vents oil to the cam housing 66 through the exhaust passageway 160.

When movement of the projectile tray to the rear is initiated the cam 158 will begin to move in a clockwise direction to engage the lower surface of the cam follower 161 and move the bell crank 157 in a counter-clockwise direction against the compression of the spring 162 and out of contact with the piston rod of the valve 156. The cam follower 161 remains in contact with the cam surface 163 for approximately 180° of rotation of the cam after which the follower will again engage the cam surface 164 for the ensuing final 90° of rotation. When so engaged the bell crank 157 again contacts the piston rod of the valve 156 but does not move the valve to an open position. Upon completion of the final 90° of clockwise rotation, the cam 158 will have turned through a total angle of 270° thus placing the projectile tray in its rear position. When the projectile tray is moving forward, however, and is clear of the traverse carriage, the cam 158 will have rotated approximately 90° in a counterclockwise direction to cause the cam follower 161 to ride from the cam surface 164 onto the cam surface 163. In consequence thereof the cam 158 will now rotate the bell crank 157 in a clockwise direction and thus shift the interlock valve 156 to the left with attendant compression of the spring 159. This position of the valve is maintained until the cam 158 has rotated through an angle which is just short of 270° at which time the cam follower 161 will ride off of the cam surface 163 and assume the position on the cam surface 164 shown in the drawings. When this position is assumed by the cam follower 161 and bell crank 157 the interlock valve 156 will be shifted to its closed position by the compression spring 159.

If the projectile tray is withdrawing from the ammunition under the control of the traverse carriage and rammer control lever, the control selector valve 177 (Fig. 74) in the case stop drive control unit 1120 will be shifted to its lower position. Pressure from the accumulator will thus be ported from the main pressure line 10 through the passageway 211, the control selector valve 177, pressure line 212 (Figs. 74 and 77) and pressure line 429 to the projectile tray traverse carriage interlock valve 156 (Fig. 77).

When the projectile tray has moved a sufficient distance in the forward direction to clear the traverse carriage the interlock valve 156 will be shifted to the left as previously described, thus allowing accumulator pressure to be ported from the pressure line 429 (Fig. 77) through this valve and pressure line 267 (Figs. 77, 79 and 78) to the traverse carriage control unit 1123, thus supply and control pressure for initiating the movement of the traverse carriage to the ramming position in a manner to be described more fully hereinafter.

When the projectile tray completes its forward travel the bell crank 157 (Fig. 77) will be released by the cam 158 and the interlock valve 156 will be shifted to the right by the action of the spring 159. With this arrangement during normal operation it will not be possible to move the traverse carriage from the firing position to the ramming position unless the ammunition has been moved into the traverse carriage.

If the projectile tray is moving forward with the case stop to return unfired ammunition, the operation of this interlock will not cause the traverse carriage to unlock or move from the firing position. For when moving the projectile tray in a forward direction with the case stop and the ammunition the interlock will also cause the valve 156 (Fig. 77) to be shifted to the left. However, during this operation the control selector valve 177 in the case stop drive control unit 1120 (Fig. 74) will be shifted to the upper position, thus blocking the pressure line from the accumulator and therefore preventing movement of the traverse carriage.

THE CASE STOP DRIVE CONTROL UNIT

The case stop drive unit (Fig. 74) which consists of the case stop motor 1119 and the case stop drive control unit 1120 operates in conjunction with the projectile tray drive unit and the projectile tray for transferring ammunition from the loading tray to the traverse carriage. At the proper time the case stop drive unit also operates independently to allow the ammunition to be moved to the extreme rearward position in the traverse carriage at high angles of elevation and to return the case stop to its forward position when the traverse carriage and the ammunition are shifted to the ramming position.

The case stop drive control unit 1120 includes the valve block 165 and the housing 166 secured thereto in which the cam shaft 167 and associated instrumentalities are mounted and oil immersed. The cam shaft 167 is driven by the motor 1119 through the reduction gears 135, 136 and the pairs of bevel gears 137, the gear ratio being chosen by way of illustration to cause the cam shaft 167 to rotate through an angle of 270° as the case stop moves from its forward position to its extreme rear position or vice versa. In the valve block 165 there are positioned four principal valves, namely, a blocking valve 169 for stopping the motion of the hydraulic motor 1119, a reversing valve 170 for controlling its direction of rotation, an acceleration valve 171 for controlling the acceleration and deceleration of the hydraulic motor and its associated equipment in certain phases of its operation and a control selector valve 177 which operates in conjunction with the foregoing valves. Two adjustable orifices controllable by the valves 172 and 173 and two check valves 174 and 175 operate in conjunction with the acceleration valve 171. The maximum speed of the hydraulic motor 1119 in certain phases of its operation is controlled by the valve 176 which provides an adjustable orifice in the pressure line 10 from the accumulator. The drive connection 1130 between the case stop drive control unit 1120 and the sprocket wheel 1103 includes the output shaft 1203 splined to the sprocket wheel. Suitable gearing 135 interconnects the motor 1119 and the shaft 1203.

*The blocking valve.*—The blocking valve 169 is of the piston type and is urged to the closed position shown by the compression spring 178 at one end thereof while fluid pressure applied to the piston rod end thereof moves the valve to an open position. Thus, when initiating movement of the case stop from its forward position auxiliary pressure is ported from the accumulator pressure line 10 (Fig. 77), through the interlock and reversing valves 1896 and 70 respectively of the projectile tray drive control unit 1122 and the interconnecting auxiliary pressure line 151 (Figs. 77 and 74) to the piston rod end of the case stop blocking valve 169 to shift this valve to its open position against the compression of the spring 178. When operated to its open position in the manner described oil at the spring end of the blocking valve 169 is vented along the common exhaust passageway 179 in the valve block to the cam housing 166 which communicates with the accumulator supply tank 1132 through the exhaust lines 97 and 84.

To the free end of the piston rod of the blocking valve 169 there is pivotally secured to a detent 180 which is urged by the compression spring 178 to engage the slot 181 of the cam disc 182 on the shaft 167 or to engage the peripheral portion 183 thereof throughout the extent indicated when the valve is in its open position. In order to insure peripheral engagement of the detent 180 with the cam disc 182 to hold the valve 169 in its open position, the detent 180 is pivotally connected to the valve block 165 by the link 184 in the manner shown. A lug 185 is secured to the cam disc 182 for cooperation with the fixed stop 186 on the cam housing and is mounted on the disc for unobstructed movement relative to the detent 180 and the link 184 as the cam disc rotates. It should be noted that the slot 181 of the cam disc is of sufficient width to prevent contact between the lateral surfaces of the detent 180 and the side walls of the slot when the disc lug 185 abuts the terminal surface 187 of the fixed stop 186.

In the closed position shown the blocking valve 169 blocks the pressure line 10 from the accumulator, vents both ends of the hydraulic motor 1119 to the accumulator supply tank 1132 and also mechanically locks the hydraulic motor 1119 by means of the detent 180 when this locking function is not accomplished by the engagement of the disc lug 185 with the terminal surface 187 of the fixed stop 186. The detent 180 engages the slot 181 of the cam disc only when the case stop is in its forward position and contacts the peripheral surface 183 of the cam disc in all other positions of the case stop. In its extreme rear position the case stop is locked by the abutment of the disc lug 185 with the terminal surface 188 of the fixed stop 186 since the case stop in moving to its extreme rear position will have caused the cam shaft 167 and the cam disc 182 secured thereto to rotate through an angle of 270°.

When operating the case stop manually release of the detent 180 is effected through the slotted push rod 138 engaging a pin 139 of the link 184 operable by the lever 1216. This lever, as previously noted, is operated by the bell crank 1218 (Fig. 5) and shaft 1217 supported from the slide platform. Counterclockwise rotation of the lever 1216 causes the detent 180 to disengage the disc slot 181 and unlock the case stop. The detent release described above is operated only during manual operation of the case stop.

*The reversing valve.*—The reversing valve 170 which controls the direction of rotation of the hydraulic motor 1119 is also of the piston type and is pilot pressure operated through the blocking valve 169. This valve is held in either of two positions by the nonpositive spring loaded detent 189 operable to engage the beveled grooves in the right end of the valve body 170. In the position shown the reversing valve 170 is operable to cause rotation of the hydraulic motor 1119 in a direction to move the case stop to its forward position while the shifting of this valve to the left will result in a reverse rotation of the motor to move the case stop to its extreme rear position.

In order that it may be clear how the reversing valve 170 is pilot pressure operated through the blocking valve 169 when opening the latter valve to initiate movement of the case stop from its forward position, it will be observed that when the blocking valve 169 is approximately three-quarters open auxiliary pressure will be ported from the auxiliary pressure line 151, through the passageway 190, blocking valve 169 and passageway 191 to shift the reversing valve 170 to the left. As pressure is admitted at the right end of the reversing valve 170 to shift the same, oil is simultaneously vented at the left end of this valve through the passageway 192 and blocking valve 169 to the auxiliary line 193 which now serves as an auxiliary exhaust line. This exhaust line vents the oil through the closed case stop traverse carriage interlock valve 327 (Fig. 78) and common exhaust passageway 273 of the traverse carriage drive control unit 1123 to the cam housing 258 which communicates with the accumulator supply tank 1132 through the auxiliary exhaust line 84 (Figs. 78 and 74).

When initiating movement of the case stop from its rear position the reversing valve 170 (Fig. 74) at the outset will be shifted to the left, the blocking valve 169 will have remained open and the case stop traverse carriage interlock valve 327 (Fig. 78) of the traverse carriage drive control unit 1123 will have opened. Auxiliary pressure will therefore be ported from the accumulator pressure line 7 of the traverse carriage drive control unit 1123, through the case stop traverse carriage interlock valve 327, the line 193 (Figs. 78 and 74) which now serves as a pressure line, through the blocking valve 169 of the case stop drive control unit 1120 and passageway 192 to shift the reversing valve 170 to the right. As pressure is admitted at the left end of the reversing valve 170 to shift the same, oil is simultaneously vented at the right end of the valve through the passageway 191, blocking valve 169 and passageway 190 to the auxiliary line 151 which now serves as an auxiliary exhaust line not only for the reversing valve 170 but also for oil vented from the piston rod end of the blocking valve 169 when it is ready to close. In the projectile tray drive control unit 1122 (Fig. 77) oil from the auxiliary exhaust line 151 is vented through the passageway 150, the reversing valve 70 which is now shifted to the right and passageway 194 to the common exhaust passageway 82 discharging into the housing 66.

*The acceleration valve.*—The acceleration valve 171 is a three position cam actuated valve for controlling the acceleration and deceleration of the hydraulic motor 1119. During the simultaneous movement of the projectile tray and case stop to the rear to transfer ammunition, the acceleration valve 171 moves from the initial position shown to its intermediate position and remains there for the greater portion of the operating cycle. In these initial and intermediate stages of operation, however, the acceleration valve 171 has no control over the speed of rotation of the case stop motor 1119. As the valve 171 continues to shift in the same direction from its intermediate position to its final position at the left, however, the deceleration of the motor 1119 is controlled. For during this final valve shift at high angles of elevation of the gun the case stop is completing its rearward movement independently of the projectile tray.

In the reverse operating cycle of the acceleration valve 171 the case stop is moved to its forward position independently of the projectile tray. As the valve 171 moves from its initial position at the far left to its intermediate position the acceleration of the case stop motor 1119 is controlled. In its intermediate position which is maintained for the greater portion of the operating cycle, the case stop motor 1119 rotates at a constant speed. As the acceleration valve 171 continues to shift to the right in the same direction from its intermediate position to its final position the deceleration of the motor 1119 is controlled.

The desired movement of the acceleration valve 171 is obtained through the cam 598 on the shaft 167, the bell crank 599 pivotally mounted on the valve block 165 at 600 and the spring 601 associated with the piston rod 602 connected to the bell crank 599 by the link 603. As the acceleration valve 171 moves from the initial position shown to its final position at the left in the intermittent fashion described, oil at the left end of the valve is vented through the common exhaust passageway 179 to the housing 166. The mode of operation and details of construction of the valve actuating mechanism broadly outlined above are identical with those of the projectile tray acceleration valve in Fig. 77.

The acceleration valve 171 is designed to provide a relatively high deceleration as the case stop and ammunition complete their final movement to the rear at high angles of elevation of the gun. This deceleration is desired to eliminate excessive impact as the ammunition strikes the rear buffer 1329 (Figs. 5 and 23) in the ammunition receiving tray 1079 of the traverse carriage. How the foregoing is achieved will be apparent from a consideration of the structural details of the valve body as it is shifted to the left from the position shown in a cycle of its operation.

As the acceleration valve 171 (Fig. 74) shifts from the position shown to its intermediate position and remains in the latter position, accumulator pressure from the main line 10 of the case stop drive control unit 1120 is blocked at the control selector valve 177 which is in its upper position. When, however, the acceleration valve 171 recommences its shift from the intermediate position to the final position at the left the control selector valve 177 has been moved to its lower position by pressure through the interlock D of the projectile tray control unit 1122 which has previously been described and the passageway 155, thus unblocking the accumulator pressure from the pressure line 10 to the hydraulic motor 1119. Accumulator pressure is then transmitted along blocking valve 169 through passageway 242, along the reversing valve 170 in its left position, along the passageway 195, around the acceleration valve 171, along passageway 196, through the check valve 175, along passageway 197, again around the acceleration valve 171 and along passageway 198 to the control selector valve 177 from whence the hydraulic fluid proceeds to the case stop motor 1119 through the passageway 244. This path of fluid flow to the motor is maintained in all positions of the acceleration valve 171 as it shifts from its intermediate position to its final position at the left.

With the acceleration valve 171 in its intermediate position the taper of the cylindrical valve portion 199 will be in substantial alignment with the passageways 200 and 201, and the right face of the cylindrical valve portion 202 will have moved to uncover the passageway 203 which receives the oil discharged from the motor through the passageway 204 communicating with the control selector valve 177. As the acceleration valve 171 recommences and continues its shift from the intermediate position to its final position at the left the progressive movement of the taper on the cylindrical valve portion 199 in relation to the circumferential recess communicating with the passageways 200 and 201 provides a progressively decreasing annular throttling area for the discharge of the oil through the passageway 203 and acceleration valve to the passageway 201. When the acceleration valve 171 reaches its terminal position at the left the cylindrical portion 199 of the valve will have completely blocked the passageway 203. Simultaneously with this oil discharge as the valve moves from its intermediate position to the final position at the left oil will be discharged through the restricted orifice under the control of the valve 172 along the passageway 200 and around the acceleration valve to the passageway 201. In this manner a rapid deceleration is produced as the case stop and ammunition complete their final movement to the rear at high angles of elevation of the gun. By appropriate adjustment of the valve 172 the magnitude of the deceleration can be controlled.

The acceleration valve design is such, however, that a very high acceleration is produced when initiating movement of the case stop from the extreme rear position independently of the projectile tray. Such a high acceleration is possible since no force is being exerted on the case stop as it returns to its forward position to receive the next round of ammunition. Near the end of the case stop travel in its forward direction the acceleration valve 171 produces a relatively high deceleration which is comparable to the deceleration of the case stop experienced in its movement to the extreme rear, thus insuring a rapid forward movement of the case stop. The foregoing will become apparent from a further consideration of the structural details of the valve body in a cycle of its operation as it is shifted from its far left position to the position shown in the drawings.

With the acceleration valve 171 in its far left position accumulator pressure is transmitted through the passageway 10, along the blocking valve 169, through the passageway 242, along the reversing valve 170, through the passageway 201, around the acceleration valve 171, along the passageway 200, through the check valve 174, passageway 203 and passageway 204 to the control selector valve 177 from whence the hydraulic fluid proceeds to the case stop motor 1119 to impart a reverse rotation thereto. This path of fluid flow to the motor is maintained in all positions of the acceleration valve as it shifts from its far left position to the position shown in the drawings. As the acceleration valve 171 shifts from its far left position to its intermediate position, the restricted orifice under the control of the adjustable valve 173 is bypassed and oil is discharged from the case stop motor solely through the passageway 198, acceleration valve 171 and passageway 195. This follows from the fact that with the acceleration valve 171 in its far left position the taper of the cylindrical valve portion 205 is out of alignment and to the left of the passageways 195 and 196 and only moves into a position of alignment with these passageways as the acceleration valve shifts to the right to assume its intermediate position. Thus, in moving the acceleration valve 171 from its far left position to its intermediate position the hydraulic fluid is not subjected to any throttling action, thereby insuring an extremely high acceleration of the case stop as movement in the forward direction is initiated.

With the acceleration valve 171 in its intermediate position the case stop motor 1119 will rotate at a constant speed. As the acceleration valve, however, recommences and continues its shift from the intermediate position to its final position at the right the progressive movement of the taper on the cylindrical valve portion 205 in relation to the circumferential recess communicating with the passageways 195 and 196 provides a progressively decreasing annular throttling area for the discharge of the oil from the passageway 198 through the acceleration valve to the passageway 195. Simultaneously with this oil discharge, oil is also discharged from the passageway 198 around the acceleration valve 171, through the passageway 197 and the restricted orifice under the control of the valve 173 along the passageway 196 and around the acceleration valve 171 to the passageway 195. The oil discharge through the restricted orifice takes place while the acceleration valve shifts from its intermediate position to its position at the far right but discontinues through the annular throttling area during this shift when the cylindrical valve portion 205 moves to block the passageway 198. By means of the throttling action produced at the restricted orifice under the control of the valve 173 and at the taper of the cylindrical valve portion 205 a relatively high deceleration is produced as the valve shifts from its intermediate position to the position shown at the right. By appropriate adjustment of the valve 173 the magnitude of the deceleration may be controlled.

*The control selector valve.*—The function of the control selector valve 177 is to connect the projectile tray and case stop motors either separately or serially in the hydraulic circuit, to supply auxiliary pressure to the projectile tray drive control unit for initiating forward movement of the projectile tray and to vent certain auxiliary exhaust lines to the accumulator supply tank. As shown in Fig. 74 of the drawings this valve is of the piston type and is held in either of two positions by the non-positive spring loaded detent 206 operable to engage the beveled grooves in the upper end of the valve body 177. The control selector valve is pilot pressure operated through the traverse carriage drive control unit 1123 (Fig. 78) to move the same to its upper position and is pilot pressure operated through the projectile tray drive control unit 1122 (Fig. 77) to move the same to its lower position.

In order that it may be clear how the control selector valve 177 is pilot pressure operated through the traverse carriage control unit 1123 when moving the selector valve to its upper position, it will be observed that when the projectile tray control valve 248 (Fig. 77) is moved to the left and the traverse carriage is locked in the firing position accumulator pressure will be transmitted from the traverse carriage control unit 1123 (Fig. 78), through the auxiliary pressure line 207 (Figs. 78, 79, 77), projectile tray control valve 248 (Fig. 77) and auxiliary pressure line 208 (Figs. 77 and 74) to shift the control selector valve 177 to its upper position. As pressure is admitted at the lower end of the control selector valve 177 (Fig. 74) to shift the same to its upper position, oil is simultaneously vented through the line 155 (Figs. 74 and 77) which now serves as an auxiliary exhaust line, the projectile tray blocking valve 69 (Fig. 77) and passageway 154 to the end of the acceleration valve 71 from whence the oil proceeds through the common exhaust passageway 82 to the housing 66.

When the control selector valve 177 is pilot pressure operated through the projectile tray drive control unit 1122 (Fig. 77) to shift the same to its lower position, accumulator pressure is transmitted through the interlock D of the projectile tray drive control unit previously described and the auxiliary line 155 (Figs. 77 and 74) which now serves as a pressure line to the upper end of the control selector valve 177 to shift the same to its lower position. As pressure is admitted at the upper end of the control selector valve 177 to shift the same, oil is simultaneously vented through the line 208 (Figs.

74 and 77) which now serves as an auxiliary exhaust line, through the projectile tray control valve 248 (Fig. 77) in its neutral position, the common exhaust passageway 256 thereof and through the auxiliary exhaust line 209 to the common exhaust line 83 which communicates with the accumulator supply tank.

In order to initiate movement of the projectile tray to its forward position the control selector valve 177 must be shifted to its lower position. In its lower position accumulator pressure is ported from the main pressure line 10 (Fig. 74) of the case stop drive control unit 1120 under the control of the valve 210, through passageway 211, the control selector valve 177, auxiliary pressure line 212 (Figs. 74 and 77), the projectile tray control valve 248 in its neutral position and the pressure line 80 to the projectile tray drive control unit 1122. The porting of pressure through the auxiliary pressure line 80 to the projectile tray drive control unit opens the blocking valve 69 and shifts the reversing valve 70 of this control unit to the right to cause the projectile tray to move to its forward position as described in detail hereinbefore.

When either of the lines 77 or 80 of the projectile tray drive control unit 1122 (Fig. 77) serves as an auxiliary exhaust line for the projectile tray reversing valve 70, it was pointed out generally that oil was vented through the control selector valve 177 (Fig. 74). In detail it may be noted that when moving the projectile tray to the rear the control selector valve 177 is in its upper position and the line 80 (Fig. 77) now serves as an auxiliary exhaust line for oil vented from the left end of the projectile tray reversing valve 70. Oil under these circumstances is vented through the auxiliary exhaust line 80, the projectile tray control valve 248, auxiliary line 212 (Figs. 77 and 74), the control selector valve 177 and common exhaust passageway 179 in the valve block to the housing 166. When moving the projectile tray to its forward position, however, the control selector valve 177 is in its lower position and the line 77 (Figs. 77 and 74) now serves as an exhaust line for oil vented from the right end of the projectile tray reversing valve 70 and from the piston rod end of the blocking valve 69 when the projectile tray reaches its forward position. Oil is then vented through the auxiliary exhaust line 77, the control selector valve 177 and the common exhaust passageway 179 to the housing 166.

If when moving the projectile tray to the rear, excessive pressure in the projectile tray motor exhaust line 124 (Fig. 77) causes the pressure regulator 120 of the projectile tray drive control unit 1122 to move to the far right, the excess pressure will be vented through the auxiliary exhaust line 125 (Figs. 77 and 74) around the foot valve 213 (Fig. 74) of the case stop drive control unit 1120, along the passageway 214 through the control selector valve 177, along the passageway 215, and through the case stop blocking valve 169 which is now open to the common exhaust passageway 179 leading to the housing. The circuit traced above is also operative to relieve excessive pressure in the line 124 when the projectile tray and case stop move forward to return unfired ammunition.

*The foot valve.*—The function of the foot valve 213 (Fig. 74) is to cause the case stop motor 1119 to act as a pump and thus prevent the ammunition from falling into the traverse carriage at high angles of elevation when moving the ammunition to the rear. This valve accomplishes its function by introducing a counter force into the hydraulic circuit which is slightly less than the component of the weight of the ammunition and is operative only when moving the ammunition to the rear particularly at high angles of elevation. When moving the projectile tray forward with the case stop to return unfired ammunition or when moving the case stop forward independently this valve is bypassed.

The body of the foot valve 213 is provided with a reduced portion at its left end to bypass the hydraulic fluid when the valve is urged to the left by the spring 216. This spring is designed so that the component of the weight of the ammunition will cause the case stop motor 1119 to move to the rear slowly when the gun is elevated and both ends of the case stop motor are vented to the tank 1132. Thus, the spring 216 is operable to introduce a counter force into the hydraulic circuit which is slightly less than the component of the weight of the ammunition. By connecting the spring side of the foot valve 213 through the passageway 217 with the control selector valve 177 in the manner shown, the fluid pressure at this side of the foot valve and at the inlet side of the case stop motor 1119 will at all times be equal when moving the ammunition to the rear. Thus, it follows that when moving the ammunition to the rear the case stop motor will act as a pump; that the discharge pressure of the case stop motor 1119 will be greater than the pressure at the inlet side thereof; and that the difference of pressure across the case stop motor acting as a pump must be sufficiently great to overcome the force of the spring 216 if the foot valve 213 is to open. If the foot valve 213 is not opened completely throttling action will occur through this valve.

When moving the projectile tray with the case stop to the rear to deposit ammunition in the traverse carriage, hydraulic fluid from the discharge side of the case stop motor 1119 will pass along the pipe line 218, through the foot valve 213 which is urged to its open position against the compression of the spring 216, through the passageway 219, through the control selector valve 177 in its upper position and through the passageways 220 and 221 to the pipe line 128 which returns the fluid medium to the projectile tray drive control unit.

When the case stop completes its rearward movement at high angles of elevation the control selector valve 177 will be in its lower position. The hydraulic fluid from the discharge side of the case stop motor 1119 will then pass along the pipe line 218, through the foot valve 213 which is again urged to its open position against the compression of the spring 216 by fluid pressure, through the passageway 219 and control selector valve 177 to the passageway 204 leading to the case stop acceleration valve 171. At high angles of elevation the driving torque causing the case stop motor 1119 to act as a pump and to open the foot valve 213 is applied through the chain 1195 and sprocket wheel 1103 by the component of the weight of the ammunition.

At low angles of elevation there will not be sufficient force available to cause the ammunition and the case stop to complete its rearward movement. However, at low angles of elevation the completion of this rearward movement is not necessary. The purpose of the final rearward travel is to eliminate excessive impact forces at high angles of elevation when the traverse carriage is shifted to the ramming position and the ammunition slides off the case stop and falls rearwardly striking the rear buffer 1329 (Figs. 5 and 23) in the ammunition receiving tray 1079 of the traverse carriage. The foot valve spring 216 is therefore designed so that the impact forces will be limited to a set value at all angles of elevation of the gun.

When moving the projectile tray forward with the case stop to return unfired ammunition or when moving the case stop forward independently, the foot valve 213 is closed and is urged by the spring 216 to the far left where it is bypassed by the hydraulic medium. Thus, when returning unfired ammunition the hydraulic medium enters the case stop drive control unit 1120 by the pipe line 128 and flows through the passageways 221 and 220, the control selector valve 177 in its upper position, passageway 219, the check valve 222 and around the reduced portion of the foot valve 213 to the pipe line 218 from whence it proceeds to the case stop motor 1119. When moving the case stop forward independently, however, accumulator pressure is ported from the case stop acceleration valve 171 through the passageway 204, the control selector valve 177 in its lower position, passageway 219, through the check valve 222 and around the reduced body portion of the foot valve 213 to the pipe line 218 from whence it proceeds again to the case stop motor.

*The case stop brake.*—A spring operated hydraulically released brake within the cam housing 166 (Fig. 74) is identified in general by the reference character 223 and is associated with the cam shaft 167 of the case stop drive control unit 1120 for locking the case stop when the projectile tray stops in its rear position. As shown in the drawings the brake includes a brake drum 224 integral with or otherwise secured to rotate with the cam shaft 167 and has associated therewith a pair of brake shoes 225 for braking engagement with the drum. The brake shoes 225 are mounted on the arcuate members 226 pivoted at 227 and 228 on the cam housing 166 and are movable out of frictional engagement with the brake drum to release the brake by the spring 229 secured to the free ends of the arcuate members 226.

Through clockwise movement of a cam 230 pivotally mounted on the cam housing at 231 and engaging the terminal surfaces of the arcuate members 226, the brake shoes 225 are urged into frictional engagement with the brake drum 224 to apply the brake in the manner shown in the drawings. The cam 230 is actuated by a lever 232 pivotally connected to a piston rod of the spring biased piston 233 in the brake operating cylinder of the valve block 165. In the position shown the compression spring 234 engaging the piston 233 and a terminal surface of the brake operating cylinder is operative to apply the brake. When hydraulic fluid pressure is applied at the left end of the piston 233 the spring 234 is compressed to cause counter-clockwise rotation of the cam 230 and release of the brake. Upon movement of the piston 233 to the right attending the compression of the spring 234 oil is vented through the passageway 235 and common exhaust passageway 179 to the cam housing 166.

With the projectile tray and case stop locked in their forward positions by their respective drive control units as shown in Figs. 74 and 77 the case stop brake 223 is released. This is accomplished by porting auxiliary pressure from the main pressure line 10 of the projectile tray drive control unit 1122 (Fig. 77) through the passageway 236, around the projectile tray blocking valve 69, along passageway 237, through the acceleration valve 71, along passageway 238 through the blocking valve 69 and along the auxiliary pressure line 239 (Figs. 77 and 74) to the brake operating cylinder in the case stop drive control unit 1120 (Fig. 74). This pressure compresses the brake operating cylinder spring 234 and thus releases the brake. During the rearward travel of the projectile tray, however, after projectile tray blocking valve 69 has shifted to the left, the pressure which releases the case stop brake will be ported from the auxiliary passageway 236 in the projectile tray drive control unit 1122 through the blocking valve 69 and then directly along the auxiliary pressure line 239 to the brake operating cylinder in the case stop drive control unit 1120.

When the projectile tray is locked in its rear position the projectile tray blocking valve 69 (Fig. 77) will be in the closed position shown and the projectile tray acceleration valve 71 will have shifted to its far left position. Under these circumstances an auxiliary exhaust circuit will be established from the brake operating cylinder of the case stop drive control unit 1120 (Fig. 74) to permit decompression of the spring 234 and venting of oil therefrom by the piston 233, thus applying the brake and locking the case stop. The small travel of the case stop after the projectile tray is locked is not great enough to permit disengagement of the projectile fuse pins from the fuse setter socket. The auxiliary exhaust circuit for venting the oil from the brake operating cylinder extends from the brake operating cylinder in the case stop drive control unit 1120 (Fig. 74), along the auxiliary line 239 (Figs. 74 and 77) which now serves as an exhaust line, through the projectile tray blocking valve 69 in its closed position, the passageway 238, through the acceleration valve 71 in its far left position and common exhaust passageway 82 to the cam housing 66. When oil is vented from the brake operating cylinder through this auxiliary circuit the spring 234 (Fig. 74) in the operating cylinder applies the brake. The ammunition is now held between the case stop and the fuse setter and it is possible to continue setting the fuse until the fuse setter and projectile tray are withdrawn for the next operation.

As soon as the projectile tray blocking valve 69 (Fig. 77) reopens to initiate movement of the projectile tray to its forward position pressure is ported from the auxiliary pressure passageway 236 in the projectile tray drive control unit 1122, through the blocking valve 69 and then directly along the auxiliary line 239 (Figs. 77 and 74) which again serves as a pressure line to the brake operating cylinder in the case stop drive control unit 1120 (Fig. 74). The brake 223 is released and the case stop with the ammunition completes its rearward movement at high angles of elevation as previously described.

When operating the case stop manually, release of the brake 223 (Fig. 74) is effected through the lever 140 operable to engage a pin 141 of the cam lever 232. The lever 140 is rigidly secured to the rotatable shaft 142 which extends in a fluid tight manner through a wall of the housing 166 and is actuated by the control lever 143 securely affixed thereto. The control lever 143 has a neutral position and a release position and is releasably detented in each of its two positions by the detent 145 on the lever cooperating with the locking plate 146 on the cam housing. In the neutral position of the control lever 143 shown the lever 140 is disengaged from the pin 141 of the cam lever 232. In the manual operation of the case stop, however, the control lever 143 is shifted to the release position which causes a counterclockwise rotation of the cam lever 232 and release of the brake through engagement of the lever 140 with the pin 141 of the cam lever.

THE OPERATION OF THE CASE STOP DRIVE UNIT

*Rearward operation of case stop and projectile tray.*—With the blocking valve 169, the reversing valve 170, the acceleration valve 171 and the control selector valve 177 positioned as shown in Fig. 74 the operation of the case stop drive unit will be described in moving the case stop and projectile tray with ammunition to the rear at high angles of elevation. Prior to the engagement of the projectile nose with the fuse setter socket to shift the case stop release valve 1896 (Fig. 77) to the left, the hydraulic circuit for the projectile tray motor 1121 in moving the projectile tray to the rear will be from the pressure line 10 of the projectile tray drive control unit 1122 (Fig. 77), through the blocking valve 69, along passageway 127 through the reversing valve 70 shifted to the left, passageway 111, around the acceleration valve 71, through the passageway 112, check valve 75 and pipe line 123 to the hydraulic motor 1121. Oil discharged from this motor passes through the pipe line 124 (Figs. 77 and 74) to the case stop drive control unit 1120 (Fig. 74) where it is bypassed around the case stop hydraulic motor 1119. This bypass extends from the pipe line 124 through passageway 240, through the closed blocking valve 169 and passageway 241 to pipe line 128 (Figs. 74 and 77) returning to the projectile tray drive control unit 1122 (Fig. 77). In the projectile tray drive control unit the hydraulic fluid continues its flow along the passageways 113 and 115, around and through the acceleration valve 71, through passageway 114 and the reversing valve 70 shifted to the left to the passageway 129 from whence it passes through the main exhaust line 14 to the accumulator supply tank.

As the fuse setter socket on the projectile tray moves to engage the projectile nose the case stop is locked by the detent 180 (Fig. 74) of the case stop blocking valve 169 engaged in the slot 181 of the cam disc 182. The case stop brake 223, however, is released during the rearward travel of the projectile tray, the auxiliary pressure for this purpose being ported from the auxiliary pressure passageway 236 (Fig. 77) in the projectile tray drive control unit 1122, through the blocking valve 69 and auxiliary pressure line 239 (Figs. 77 and 74) to the brake operating cylinder in the case stop drive control unit.

When the projectile nose engages the fuse setter socket to shift the case stop release valve 1896 (Fig. 77) to the left, accumulator pressure is ported from the auxiliary passageway 148 in the projectile tray drive control unit, through the case stop release valve 1896, passageway 149, reversing valve 70 shifted to the left, passageway 150 and auxiliary pressure line 151 (Figs. 77 and 74) to the case stop blocking valve 169 (Fig. 74) to shift the same to the left and open the blocking valve.

Upon opening the blocking valve 169 accumulator pressure is ported from the auxiliary pressure line 151, through the passageway 190, the blocking valve 169 and passageway 191 to shift the reversing valve 170 to the left. Pressure from the accumulator to the case stop drive control unit 1120 will then pass from the main pressure line 10 under the control of the valve 176, through the blocking valve 169, passageway 242, through the reversing valve 170, passageway 195, around the acceleration valve 171 through passageway 196, the check valve 175, passageway 197, again around the acceleration valve 171 and along the passageway 198 to the control selector valve 177 where it is blocked by the control selector valve in its upper position.

However, when the case stop blocking valve 169 is open the bypass around the case stop motor 1119 formerly established through the passageway 240, the case stop blocking valve 169 and passageway 241 is now blocked. Therefore, the oil discharged from the projectile tray motor 1121 passes from the pipe line 124 (Fig. 74) along the passageway 243 through the control selector valve 177 in its upper position and the pipe line 244 to the case stop motor 1119. The case stop motor 1119 will rotate and the oil discharged therefrom passes along the pipe line 218 through the foot valve 213, passageway 219, through the control selector valve 177 and passageways 220 and 221 to the pipe line 128 which returns to the projectile tray drive control unit. The case stop foot valve 213 as previously noted causes the case stop motor 1119 to act as a pump; and this motor is now connected in series with the projectile tray motor 1121 through the control selector valve 177.

The motion of the projectile tray and the case stop carry the ammunition to the rear and into the traverse carriage, the constant velocity and deceleration periods being controlled by the cam operated acceleration valve 71 in the projectile tray drive control unit 1122. During the movement of the projectile tray and the case stop to deposit the ammunition in the traverse carriage the case stop detent 180 engages the peripheral surface 183 of the cam disc 182 to maintain the blocking valve 169 in its open position and the case stop acceleration valve 171 shifts from the position shown to its intermediate position which is maintained for the greater portion of the operating cycle. The initial shift of the case stop acceleration valve 171 and its arrested movement in the intermediate position have no effect upon the case stop motor 1119 since as previously noted the accumulator pressure from the main pressure line 10 is blocked at the control selector valve 177 in this phase of the operation.

The rearward movement of the projectile tray, ammunition and case stop continues until the projectile tray blocking valve 69 closes locking the projectile tray at the rear of its travel. Since no slot is provided in the case stop cam disc 182 for the rear position of the case stop, the case stop blocking valve 169 remains open. However, when the projectile tray is locked in the rear position the case stop brake 223 is applied through an auxiliary exhaust circuit. This circuit as previously described extends from the brake operating cylinder along the auxiliary exhaust line 239 through the projectile tray blocking valve 69, passageway 238 and acceleration valve 71 to the common exhaust passageway 82 leading to the housing. The ammunition is now held between the case stop and the fuse setter and it is possible to continue setting the fuse until the fuse setter and projectile tray are withdrawn for the next operation.

*Rearward operation of the case stop at high angles of elevation.*—With the projectile tray and case stop locked in their rear positions as described the control selector valve 177 (Fig. 74) is in its upper position to block the accumulator pressure to the case stop motor 1119; and the case stop acceleration valve 171 is ready to commence its final shift to the left from its intermediate position. In order to withdraw the projectile tray and fuse setter from the ammunition and initiate the final rearward movement of the case stop and ammunition at high angles of elevation, the control selector valve 177 in the case stop drive control unit 1120 must be shifted to its lower position. The shift of this valve as previously described is accomplished by accumulator pressure transmitted through the interlocks L and D of the projectile tray drive control unit 1122 (Fig. 77) and through the auxiliary pressure line 155 interconnecting this unit with the case stop drive control unit 1120 (Fig. 74).

When accumulator pressure is transmitted through the auxiliary pressure line 155 to shift the control selector valve 177 to its lower position accumulator pressure to the case stop motor 1119 will be unblocked. Movement of the case stop, however, cannot begin until the case stop brake 223 is released. As soon as the projectile tray blocking valve 69 opens by virtue of accumulator pressure ported through the case stop passageway 211 (Fig. 74) control selector valve 177, pressure line 212 (Figs. 74 and 77), projectile tray control valve 248 and pressure line 80 to initiate forward movement of the projectile tray, auxiliary pressure will be ported from the main pressure line 10 and passageway 236 through the projectile tray blocking valve 69 and pressure line 239 (Figs. 77 and 74) to the brake operating cylinder to release the brake 223. The case stop with the ammunition at high angles of elevation will then begin to move to the extreme rear, the case stop motor 1119 being driven as a pump by the component of the weight of the ammunition.

In so doing pressure from the accumulator to the case stop drive control unit 1120 (Fig. 74) will pass from the main pressure line 10 under the control of the valve 176, through the open blocking valve 169, passageway 242, through the reversing valve 170 shifted to the left, passageway 195, around the acceleration valve 171, through passageway 196, check valve 175, passageway 197, again around the acceleration valve 171, along the passageway 198 and through the control selector valve 177 and pipe line 244 to the case stop motor 1119. The oil discharged from the motor passes along the pipe line 218, through the foot valve 213 which is urged to its open position against the compression of the spring 216 by the fluid pressure, through the passageway 219 and control selector valve 177 to the passageway 204 returning to the acceleration valve 171. The hydraulic fluid continues its flow from the passageway 204 along the passageways 200 and 203, around and through the acceleration valve 171, through passageway 201 and the reversing valve 170 to the passageway 245 from whence it passes through the main exhaust line 14 to the accumulator supply tank.

As the case stop and ammunition complete their rearward movement at high angles of elevation the case stop acceleration valve 171 is gradually shifted by its cam 598 from the intermediate position to its final position at the left to produce a rapid deceleration as previously described. Movement of the case stop is finally arrested in its rear position by the engagement of the disc lug 185 in the case stop drive control unit 1120 with the terminal surface 188 of the fixed stop 186 in the housing. It should be carefully noted that by shifting the control selector valve 177 to its lower position the case stop motor 1119 is connected separately in the hydraulic circuit and now operates independently of the projectile tray motor 1121. Thus when the case stop has completed its rearward movement at high angles of elevation, the case stop blocking valve 169 will be open, the reversing valve 170 and acceleration valve 171 will be shifted to the left, the control selector valve 177 will be in its lower position and the case stop brake 223 will be released preparatory to initiating movement of the case stop to its forward position when the traverse carriage and the ammunition are shifted to the ramming position.

*Forward operation of the case stop.*—When initiating movement of the case stop in a forward direction independently of the projectile tray after the traverse carriage has moved towards the ramming position sufficiently to prevent interference of the case stop with the ammunition, auxiliary pressure will be ported from the traverse carriage drive control unit 1123 (Fig. 78), through the auxiliary pressure line 193 (Figs. 78 and 74), the open case stop blocking valve 169 and passageway 192 to shift the reversing valve 170 to the right as previously described.

Oil from the accumulator under the control of the valve 176 (Fig. 74) will then flow from the main pressure line 10, through the case stop blocking valve 169, passageway 242, reversing valve 170, passageway 201, around the acceleration valve 171, through the check valve 174, passageways 203 and 204, control selector valve 177, passageway 219, through the check valve 222 which bypasses the foot valve 213 and then to the pipe line 218 leading to the case stop motor 1119. The motor will rotate moving the case stop forward and the oil discharged from the case stop motor will flow from the exhaust line 244, through the control selector valve 177, passageway 198, through the acceleration valve 171, passageway 195, through the reversing valve 170, passageway 246 and around the reversing valve 170 to the passageway 245 from whence the fluid proceeds to the main exhaust pressure line 14.

As the hydraulic motor 1119 rotates in the reverse direction the case stop acceleration valve 171 is gradually shifted from its far left position toward the right to assume its intermediate position in which the hydraulic motor rotates at a constant speed. In this position of the valve the speed of the motor is controlled by the main adjustable orifice under the control of the valve 176 in the main pressure line 10 leading from the accumulator to the case stop drive control unit. Near the end of the travel of the case stop in its forward direction, the acceleration valve 171 is gradually shifted by the cam 98 from its intermediate position to the far right position shown in Fig. 74. This causes the oil to discharge through the passageways 198, 197, valve 173 and passageway 196, through and around the acceleration valve 171 to the passageway 195 to control the deceleration of the motor. At the end of the travel of the case stop in its forward direction the blocking valve disc 182 rotates into a position in which the slot 181 in the disc is aligned with the blocking valve detent 180. This detent enters the slot 181 thus closing the blocking valve and stopping the drive control unit. When this occurs the next round of ammunition will be placed in the loading tray.

*The absence of any transient operation.*—In the case stop drive control unit no transient operation occurs as described in connection with the projectile tray drive control unit. When the gun is elevated and the case stop is in its forward position the hydraulic motor 1119 (Fig. 74) is locked by the detent 180, the lateral surface of which engages the side wall 247 of the slot. As the case stop blocking valve 169 moves to its open position, however, to connect the projectile tray motor 1121 and the case stop motor 1119 in series relation, the accumulator pressure from the main pressure line 10 (Fig. 74) is blocked at the control selector valve 177 in its upper position as previously described. This blocking action makes a transient rotation of the case stop member 1119 in a direction to take up the clearance between the fixed stop 186 and disc lug 185 impossible.

Thus, the frictional forces between the detent 180 and the cam disc slot 181 are not relieved when moving the case stop blocking valve 169 to its open position with the gun elevated. When the gun is depressed, however, and the case stop is locked in its forward position, the hydraulic motor 1119 is locked by the abutment of the disc lug 185 with the terminal surface 187 of the fixed stop 186. When this occurs the lateral surfaces of the detent 180 are out of contact with the side walls of the slot 181, thus permitting a frictionless withdrawal of the detent from the slot when moving the blocking valve to its open position.

THE PROJECTILE TRAY CONTROL VALVE

*The valve construction and control lever.*—The projectile tray control valve 248 (Fig. 77) starts the operation of the projectile tray drive unit and controls the operation of this unit in returning unfired ammunition. The valve 248 is a three position valve shifted by means of the control lever 1137 and spring returned to neutral when the control lever is released. The valve 248 is shown in its neutral position and when shifted to the left will cause the projectile tray to move to the rear if the traverse carriage is locked in the firing position. When shifted from its neutral position to the right the valve will cause the case stop, the ammunition, and/or the projectile tray to move forward. From either of its positions to the left or the right of neutral the projectile tray control valve 248 is returned by spring action to its neutral position when released. While the valve 248 is preferably mounted in the projectile tray drive control unit 1122 as previously described, it is shown exteriorly of but immediately adjacent the projectile tray drive control unit in Fig. 77 to illustrate an alternative mode of mounting. With this arrangement the projectile tray control valve is to be understood as being secured in any suitable manner to the exterior wall of the projectile tray drive control unit and as being actuated by the linkage 1138 previously described.

The desired movement of the projectile tray control valve 248 is obtained through the lever 1137 pivotally mounted on the tray housing 1071 and gear housing 1176 (Figs. 5 and 11) and connected by the linkage 1138 (Fig. 7) with the projectile tray control valve. In order to simplify the showing in Fig. 77, however, the mounting and connection of the control lever 1137 have been indicated diagrammatically, the lever being pivoted at 60 and pivotally connected at 250 with the piston rod 251 of the valve. The pin 252 secured to the piston rod and the spring 253 and washers 254 and 255 associated therewith make an automatic return of the control lever to neutral possible. As clearly shown in Fig. 77 the two metallic washers 254 and 255 loosely surround the piston rod 251 to permit relative movement therebetween and continuously engage the compression spring 253 disposed therebetween. Each of the washers 254 and 255 in certain phases of operation of the valve engages the adjacent terminal wall of the spring recess to allow compression or decompression of the spring 253. In the neutral position of the valve shown the washer 254 engages its adjacent terminal recess wall; and the pin 252 on the piston rod contacts this washer without disengaging the same from its terminal recess wall. Thus, the valve is held in its neutral or balanced position by the residual compression of the spring 253 which urges both of the washers 254 and 255 into intimate engagement with the terminal recess walls.

When moving the lever 1137 to the left to shift the valve 248 to the left the washer 254 remains in fixed contact with its terminal recess wall while the washer 255 moves with the valve body to compress the spring. Simultaneously with this movement of the valve body, oil is vented from the left end of the valve body into the common exhaust passageway 256. The energy stored in the spring 253 with the valve shifted to the left is sufficient to restore the valve to its neutral position when the lever is released. When shifting the projectile tray control valve 248 from its neutral position to the right, however, the washer 255 remains in fixed engagement with its terminal recess wall and the spring 253 is compressed by the washer 254 which is urged to the right by the pin 252 in engagement therewith. The spring is now under substantial compression to return the valve to its neutral position when the lever is released. As the valve 248 is moved to the right, oil is vented through the auxiliary exhaust line 209 to the common exhaust line 83 which communicates with the accumulator supply tank. The auxiliary exhaust line 209, as shown in the drawings, connects with the common exhaust passageway 256 of the projectile tray control valve.

In its neutral position the projectile tray control valve 248 allows the venting of oil from the lower end of the control selector valve 177 of Fig. 74 as this valve is shifted from the upper position shown to its lower position. Specifically the circuit for venting oil from the lower end of the control selector valve 177 extends through the auxiliary exhaust line 208 (Figs. 74 and 77), through the projectile tray control valve 248 in its neutral position, the common exhaust passageway 256 and auxiliary exhaust line 209 to the common exhaust line 83 which communicates with the accumulator supply tank.

*The rearward movement of the control lever.*—When initiating movement of the projectile tray to the rear the control lever 1137 is shifted to the rear, thus shifting the projectile tray control valve 248 to the left. If the traverse carriage is locked in the firing position, accumulator pressure will be ported from the traverse carriage drive control unit 1123 (Fig. 78) through the auxiliary pressure line 207 (Figs. 78, 79 and 77) to the projectile tray control valve 248. This pressure will then be ported through the projectile tray control valve and the auxiliary pressure line 208 (Figs. 77 and 74) to the control selector valve 177 (Fig. 74) to shift the same to its upper position where it will be detented in place. Auxiliary pressure is then ported through the control selector valve 177 and the auxiliary pressure line 77 (Figs. 74 and 77) to the projectile tray drive control unit 1122 (Fig. 77). In the projectile tray drive control unit, the pressure will be ported around the blocking valve 69 through passageway 78 and acceleration valve 71 along the passageway 79 to the piston rod end of the blocking valve 69. The blocking valve will open, thus porting pressure to the reversing valve 70 which will then be shifted to the left.

In consequence of the foregoing, movement of the projectile tray to the rear will be initiated. It is not necessary to hold the projectile tray control lever 1137 in its rear position to complete the travel of the projectile tray. For once the projectile tray blocking valve detent 85 has engaged the peripheral surface 90 of the cam disc 89, the blocking valve 69 will be held in its open position against the compression of the spring 86 by the cam disc 89. Hence the control lever 1137 may be released as soon as the projectile tray has moved a short distance to the rear. Should the projectile tray control lever, however, be held in its rear position during the entire projectile tray travel, the projectile tray is not prevented from locking in place at the end of its travel. This follows from the fact that pilot pressure is prevented from reaching the right end of the projectile tray blocking valve 69 by the projectile tray acceleration valve 71 which blocks the pilot circuit of the preceding paragraph shortly after movement of the projectile tray to the rear is initiated.

*The forward movement of the control lever.*—Movement of the projectile tray control lever 1137 to its forward position shifts the valve 248 to the right and causes the projectile tray to move forward if the projectile tray fuse setter has not contacted the projectile nose to operate the interlock A, or causes the projectile tray and case stop to move forward with unfired ammunition if the interlock A has been operated to release the case stop. When the projectile tray control valve is shifted to the right accumulator pressure is ported from the traverse carriage drive control unit 1123 (Fig. 78) through the auxiliary pressure line 207 (Figs. 78, 79 and 77), the projectile tray control valve 248, auxiliary line 80, through the projectile tray blocking valve 69 which is open since the projectile tray is moving to the rear and through the auxiliary passageway 96 to shift the reversing valve 70 to the right. As the reversing valve 70 is gradually shifted to the right the projectile tray motor 1121 gradually comes to a stop and then recommences rotation in a reverse direction to move the projectile tray to its forward position.

If the reversing valve 70 is shifted to the right before the projectile tray fuse setter has moved to contact the projectile nose and operate interlock A, the case stop blocking valve 169 (Fig. 74) will remain closed, thus making the bypass through this valve effective. Accumulator pressure from the main pressure line 10 of the projectile tray drive control unit 1122 (Fig. 77) will then pass through the projectile tray blocking valve 69, passageway 127 and reversing valve 70, along the passageway 114, around the acceleration valve 71 through the passageway 113 and check valve 74 to the pipe line 128. The hydraulic medium continues its flow from the pressure line 128 (Figs. 77 and 74) through the passageway 241 of the case stop drive control unit 1120 (Fig. 74), the case stop blocking valve 169 and passageway 240 to the pipe line 124 (Figs. 74 and 77) which returns to the projectile tray motor 1121. The hydraulic motor 1121 will then rotate in a reverse direction to initiate movement of the projectile tray in its forward direction and the oil discharged from the motor will pass along the pipe line 123 through the passageways 112 and 118, around and through the acceleration valve 71, passageway 111, through the reversing valve 70 to the passageway 130, around the reversing valve 70 and through the passageway 129 to the main exhaust line 14 returning to the accumulator supply tank.

If, however, the projectile tray reversing valve 70 is shifted to the right after the projectile tray fuse setter has moved to contact the projectile nose and operate interlock A, the case stop blocking valve 169 will then be open and the control selector valve 177 will be in its upper position. The projectile tray motor 1121 and the case stop motor 1119 are now connected in series relation and will rotate to move the case stop and projectile tray forward to return unfired ammunition. In so doing accumulator pressure from the main pressure line 10 (Fig. 77) will then pass through the projectile tray blocking valve 69, passsageway 127 and reversing valve 70, along passageway 114, around the acceleration valve 71 through the passageway 113 and check valve 74 to the pipe line 128. The hydraulic medium continues its flow from the pressure line 128 (Figs. 77 and 74) along the passageways 221 and 220 of the case stop drive control unit 1120 (Fig. 74), through the control selector valve 177 in its upper position, passageway 219, the check valve 222 and around the reduced body portion of the foot valve 213 to the line 218 from whence it proceeds to the case stop motor 1119. The oil discharged from the motor flows along the pipe line 244 through the control selector valve 177 and passageway 243 to the pipe line 124 (Figs. 74 and 77) returning to the projectile tray motor 1121 (Fig. 77). The projectile tray motor 1121 and the case stop motor 1119 together rotate in a reverse direction to initiate movement of the case stop and the projectile tray with the unfired ammunition in the forward direction; and the oil discharged from the projectile tray motor 1121 passes along the pipe line 123 through the passageway 118, acceleration valve 71, passageway 111, through the reversing valve 70 to the passageway 130, around the reversing valve 70 through the passageway 129 to the main exhaust line 14 which returns to the accumulator supply tank.

As soon as the case stop, the ammunition and/or the projectile tray have moved forward a short distance, the projectile tray control lever 1137 may be released without stopping the movement of the drive units since the projectile tray reversing valve 70 will have shifted to the right where it is detented in place. If the projectile tray is withdrawing from the ammunition as a preliminary movement to the shifting of the traverse carriage to the ramming position, movement of the projectile tray control lever 1137 to its forward position will not interfere with the normal operation of the projectile tray under the control of the traverse carriage and rammer control lever 1139, thus allowing the projectile tray to complete its forward movement to a locked position. For in this case the reversing valve 70 is already shifted to the right, this shift being caused by the shift of the control selector valve 177 to its lower position.

THE TRAVERSE CARRIAGE DRIVE CONTROL UNIT

The traverse carriage drive unit, which consists of the hydraulic motor 1124 (Fig. 78) and the traverse carriage drive control unit 1123, operates to move the traverse carriage with the ammunition and the empty case from the firing position to the ramming position. After the ammunition has been rammed into the gun and the empty case ejected into the empty case tray, the traverse carriage drive unit will operate to move the traverse carriage from the ramming position to the firing position.

The traverse carriage drive control unit 1123 (Fig. 78) includes the valve block 257 and the housing 258 secured thereto in which the cam shafts 259, 260 and associated instrumentalities are mounted and oil immersed. The cam shaft 259 is driven by the motor 1124 through the reduction gear 261, the gear ratio being chosen by way of example to cause the cam shaft 259 to rotate through an angle of 270° as the traverse carriage moves from its firing position to its ramming position or vice versa. The cam shaft 260 on the other hand is a high speed shaft and is driven directly from the motor through a 1:1 gear ratio as indicated. In the valve block 257 there are positioned four principal valves, namely, a blocking valve 262 for stopping the motion of the hydraulic motor 1124, a reversing valve 263 for controlling its direction of rotation, an acceleration valve 264 for controlling the acceleration and deceleration of the hydraulic motor and its associated equipment and a venting valve 265 for venting the piston rod end of the blocking valve 262 directly to the drain line. Two adjustable orifices controllable by the valves 311 and 318 and two check valves 308 and 317 operate in conjunction with the acceleration valve 264. The maximum speed of the hydraulic motor 1124 is controlled by the valve 800 which provides an adjustable orifice in the pressure line 7 from the accumulator. The drive connection 1129 between the control unit 1123 and its sprocket 1082 includes the gears 1315 and 1314 (Figs. 20 and 78) connected to the output shaft 1310 of the traverse carriage drive control unit. The reduction gears 62 and 63 (Fig. 78) within the drive control unit interconnect the motor 1124 with the output shaft 1310.

*The blocking valve.*—The blocking valve 262 is of the piston type and is urged to the closed position shown by the compression spring 266 at one end thereof while fluid pressure applied to the piston rod end thereof moves the same to an open position. Thus, in initiating movement of the traverse carriage from its firing position, auxiliary pressure is ported from the pressure line 10 through passageway 211 in the case stop drive control unit 1120 (Fig. 74), along the selective valve 177 in its lower position, through the passageway 212, through the passageway 429, along the projectile tray traverse carriage interlock valve 156 in its left position, through the pressure line 267 around the blocking valve 262, along the passageway 268, through the acceleration valve 264 and thence along the passageway 269 to shift the venting valve 265 to its open position. Pressure is then transmitted through the open venting valve and the passageway 270 to the piston rod end of the blocking valve 262 to shift this valve to its open position against the compression of the spring 266. When initiating movement of the traverse carriage from its ramming position to its firing position, however, auxiliary pressure is ported instead from the pressure line 271 around the blocking valve 262 along the passageway 272 and through the acceleration valve 264 which is now shifted to the left and again through the passageway 269 to shift the venting valve 265 to its open position. Pressure then continues through the venting valve and passageway 270 to the piston rod end of the blocking valve 262 to shift the same to its open position. When operated to its open position in either manner described above, oil at the spring end of the blocking valve 262 is vented along the common exhaust passageway 273 to the cam housing 258 which communicates with the accumulator supply tank 1132 through the auxiliary exhaust line 84 (Figs. 78 and 74).

To the free end of the piston rod of the blocking valve 262 there is pivotally secured a link 274 which is pivotally mounted at 275 on the cam housing and has a detent 276 integral therewith. The detent 276 and link 274 operate in conjunction with a pair of high speed discs 277 and 278 on the shaft 260, the linkage identified in general by the reference character 279 and the low speed disc 280 on the shaft 259 to insure a more accurate positioning of the traverse carriage in either of its locked positions than would be possible with a single low speed slotted disc. It is important that the traverse carriage be accurately positioned and locked in either its firing or ramming positions, since a failure to do so may, among other things, seriously interfere with the recoil of the gun or the ramming of the ammunition into the same. A detailed description of the above mechanism and its mode of operation follows.

The linkage 279 consists of two levers 281 and 282 pivotally mounted at 283 and 284 on the cam housing and connected by the link 285 for joint movement against the compression of the spring 286 when moving the linkage to the left. A cam follower 287 secured to the lever 281 urges the linkage to the left as the follower rides from the position shown to engage the peripheral surface 288 of the slow speed cam disc 280. To the free end of the other lever 282 there is rigidly and nonpivotally secured a bell crank 289 the arm 290 of which serves as a detent for cooperation with the high speed disc 277 and the other arm 291 of which operates in conjunction with the link 274 which carries the detent 276 for cooperation with the high speed disc 278. The high speed discs 277 and 278 are provided respectively with a lug 292 and a slot 293 that extend over an arc of approximately 90° and cooperate with their respective detents 290 and 276 to lock the drive unit in either its firing or ramming positions.

The high speed discs 277 and 278 turn through any desired number of whole revolutions plus 270° in moving the traverse carriage from its firing position to its ramming position or vice versa. The greater the number of whole revolutions of the high speed discs 277 and 278 the greater will be the accuracy with which the traverse carriage will be positioned in either of its terminal positions. The reason for this will be pointed out hereinafter. In order to impart the desired number of revolutions to the high speed shaft 260 it will be observed that this shaft is driven directly from the motor 1124 through a 1:1 gear ratio, while a suitable reduction gear 261 interposed between the motor and the slow speed shaft 259 insures the desired rotation of this latter shaft.

The design of the slow speed cam 280 is such that the initial clockwise rotation of the same, during which the follower 287 moves from the cam surface 294 to engage the peripheral cam surface 288, will cause the detent 290 to shift out of the path of movement of the high speed cam face 295 after this cam face has rotated through an angle of approximately 250° in a clockwise direction from the position shown. Similarly, the design of the slow speed cam 280 is such that the final clockwise rotation of this cam, during which the follower 287 moves from the peripheral cam surface 288 to engage the cam surface 296, will permit the shift of the detent 290 into the path of movement of the high speed cam face 295 to occupy the position shown in approximately the last 250° of rotation of the cam face 295 in a clockwise direction.

When the blocking valve 262 has moved to its open position against the compression of the spring 266 by porting pressure to its piston rod end, the detent 276 will be removed from contact with the slot face 297 of the high speed cam disc 278 to unlock the drive unit and initiate movement of the traverse carriage from its firing position toward its ramming position. After approximately 250° of rotation of the high speed cam discs 277 and 278, the low speed cam disc 280 will have moved the detent 290 out of the path of movement of the high speed cam face 295 and the rigidly secured arm 291 of the bell crank 289 will have moved to contact the link 274 to prevent the blocking valve detent 276 from engaging the cam disc 278 until the desired number of revolutions has elapsed. The detents 290 and 276 are not permitted to engage their respective high speed discs 277 and 278 in their rotation while the cam follower 287 rides upon and engages the peripheral surface 288 of the low speed cam disc 280.

As the follower 287 commences leaving the peripheral surface 288 of the slow speed cam disc to engage the cam surface 296 near the end of the travel of the traverse carriage toward its ramming position, the high speed cam discs 277 and 278 will be beginning their last 250° of rotation in a clockwise direction. The spring urged linkage 279 therefore starts moving to the right to begin moving the detent 290 into the path of the cam face 295 and to release the blocking valve detent 276 by disengagement of the bell crank arm 291 with the link 274, thus allowing the blocking valve detent 276 to engage the peripheral surface 298 of the high speed cam 278. The blocking valve detent 276 is maintained in intimate engagement with the peripheral surface 298 of the high speed disc 278 in its last 250° of rotation by the blocking valve spring 266. When the traverse carriage is accurately positioned in the ramming position, movement of the drive unit will be stopped by engagement of the cam face 295 with the detent 290 and the blocking valve 262 will be moved to its closed position by movement of the blocking valve detent 276 into the disc slot 293. The drive unit will now be locked.

The reverse operation of the mechanism when moving the traverse carriage from the ramming position to the firing position is believed to be obvious from the description already given and requires no further comment. The design of the high speed discs 277 and 278 is such that when the drive unit is locked in either its firing or its ramming position, a slight clearance will exist between either the face 299 or the face 295 of the disc lug 292 and the detent 290 when either the face 297 or the face 300 of the disc slot 293 contacts the blocking valve detent 276. This clearance makes possible a transient operation, thus facilitating the withdrawal of the blocking valve detent 276 from the disc slot 293. Accurate positioning of the traverse carriage and locking of the same by the mechanism described above is due to the large angles of rotation of the high speed discs per unit distance of travel of the traverse carriage. Thus, when the high speed discs 277 and 278 are moving through their final 250° angle preparatory to locking the traverse carriage in either the ramming or firing position, the traverse carriage is actually moving through a very small distance, thus permitting an accurate positioning and locking of the same.

In its closed position the blocking valve 262 blocks the pressure line 7 from the accumulator, vents both ends of the hydraulic motor 1124 to the accumulator supply tank 1132 and assists in mechanically locking the hydraulic motor by means of the detent 276 engaged in the disc slot 293. As previously noted the blocking valve 262 is shifted to its closed position by the compression of the spring 266 and is opened by pressure ported to its piston rod end when operated hydraulically. The blocking valve 262 is held in its open position against the compression of the spring 266 either through the engagement of the bell crank arm 291 with the link 274 or through contact of the detent 276 with the peripheral surface 298 of the cam disc 278.

When operating the traverse carriage manually, however, release of the detents 276 and 290 is effected through the slotted control 1324 engaging a pin 61 of the lever 64 which is rigidly secured to the lever 282 of the linkage 279. The control rod 1324, as previously noted, is operated by the lever 1326 (Fig. 20) and the link 1327 connected to the manual control lever 1328 pivoted on the loading tray 1066. Movement of the control rod 1324 inwardly of the cam housing 258 causes the detent 290 to disengage the disc 277 and through simultaneous movement of the bell crank arm 291 releases the detent 276 from engagement with the disc 278 to unlock the traverse carriage. The detent release is thus operable to release the traverse carriage 1077 from each of its two locked positions and is operated only during manual operation of the traverse carriage.

*The reversing valve.*—The reversing valve 263 which controls the direction of rotation of the hydraulic motor 1124 is also of the piston type and is pilot pressure operated through the blocking valve 262. This valve is held in either of two positions by the non-positive spring loaded detent 301 operable to engage the beveled grooves in the right end of the valve body. In the position shown the reversing valve 263 is operable to cause rotation of the hydraulic motor 1124 in a direction to move the traverse carriage to its firing position, while a shifting of this valve to the left will result in a reverse rotation of the motor to move the traverse carriage to its ramming position.

In order that it may be clear how the reversing valve 263 is pilot pressure operated through the blocking valve 262 when opening the latter to initiate movement of the traverse carriage from its firing position, it will be observed that when the blocking valve 262 is approximately half open accumulator pressure will be ported to the motor 1124 from the pressure main 7. Not until the blocking valve 262 is approximately three-quarters open, however, will accumulator pressure be ported from the auxiliary pressure line 267 through the blocking valve 262 and passageway 302 to shift the reversing valve 263 to the left. As pressure is admitted at the right end of the reversing valve to shift the same, oil is simultaneously vented at the left end of the valve through the passageway 303 and blocking valve 262 to the line 271 which now serves as an auxiliary exhaust line. From thence the oil is vented through the auxiliary line 304, the traverse carriage control valve 1479, the common exhaust passageway 405 thereof and common auxiliary exhaust line 305 (Figs. 78 and 74) to the accumulator supply tank 1132.

When opening the blocking valve 262 to initiate movement of the traverse carriage from its ramming position, the reversing valve 263 at the outset will be shifted to the left. When the blocking valve 262 is again approximately half open pressure will be ported to the motor 1124 as before. Not until the blocking valve 262 is approximately three-quarters open, however, will accumulator pressure be ported from the line 271 which is now a pressure line through the blocking valve 262 and passageway 303 to shift the reversing valve to the right. As pressure is admitted at the left end of the reversing valve 263 to shift the same, oil is simultaneously vented at the right end of the valve through the passageway 302 and blocking valve 262 to the line 267 (Figs. 78, 79 and 77) which now serves as an auxiliary exhaust line. This line connects with the projectile tray drive control unit 1122 (Fig. 77) and vents the oil through the projectile tray traverse carriage interlock valve 156 in the closed position shown and the common exhaust passageway 160 to the cam housing 66. It should be carefully noted that in both cases described above the shifting of the reversing valve 263 to either of its two positions is delayed until the blocking valve 262 is approximately three-quarters open. The reason for this delayed shift will be noted hereinafter in connection with the transient operation.

*The acceleration valve.*—The acceleration valve 264 is a three position cam actuated valve for controlling the acceleration and deceleration of the hydraulic motor 1124. As the valve moves from its initial position to its intermediate position the acceleration of the motor is controlled. In its intermediate position which is maintained for the greater portion of the operating cycle the motor rotates at constant speed. As the valve continues to shift in the same direction from its intermediate position to its final position the deceleration of the motor is controlled. The desired movement of the acceleration valve 264 is obtained through the cam 698 on the shaft 259, the bell crank 699 pivotally mounted on the valve block at 700 and the spring 701 associated with the piston rod 102 which is connected to the bell crank 699 by the link 703. As the acceleration valve 264 moves from the initial position shown to its final position at the left in the intermittent fashion described, oil at the left end of the valve is vented through the common exhaust passageway 273 to the cam housing 258. The mode of operation and details of construction of the valve actuating mechanism broadly outlined above are identical with those of the projectile tray acceleration valve 71 in Fig. 77.

The acceleration valve 264 is designed to provide a relatively low acceleration and a high deceleration when moving the traverse carriage from the firing position to the ramming position. A low acceleration of the traverse carriage is obviously desired when initiating movement of the carriage and ammunition to the ramming position, while a high deceleration is desired so that the ammunition may be moved to the ramming position at an optimum speed. How the foregoing is achieved will become apparent from a consideration of the structural details of the acceleration valve body as it is shifted to the left from the position shown in a cycle of its operation.

With the acceleration valve 264 in the position shown, accumulator pressure is transmitted along the passageway 306, around the acceleration valve 264, along the passageway 307 and through the check valve 308 along the pipe line 309 to the hydraulic motor 1124, this path of fluid flow to the motor being maintained in all positions of the acceleration valve 264 as it shifts from the position shown to the final position at the left. As the acceleration valve shifts from the initial position shown to its intermediate position oil is discharged from the motor along the pipe line 310 through the restricted orifice under the control of the valve 311 along the passageway 312 and around the acceleration valve 264 to the passageway 313. Simultaneously with this discharge, oil also discharges through the passageway 315 and the peripheral notches of the cylindrical valve portion 314 through the acceleration valve to the passageway 313. The restricted orifice under the control of the valve 311 and the peripheral notches in the cylindrical valve portion 314 produce a throttling action and thus insure the desired acceleration as movement of the traverse carriage from its firing position is initiated.

As the acceleration valve 264 continues its shift to the left and arrives at its intermediate position the right face of the cylindrical valve portion 314 will have moved to uncover the passageway 315 causing the adjustable orifice under the control of the valve 311 to be bypassed. The oil now discharges solely through the passageway 315 and the acceleration valve to the passageway 313 without any throttling action in consequence of which the motor 1124 now rotates at a constant speed. With the acceleration valve 264 in its intermediate position, the taper of the cylindrical valve portion 316 will be in substantial alignment with the passageways 312 and 313.

As the acceleration valve 264 recommences and continues its shift from the intermediate position to its final position at the left the progressive movement of the taper on the cylindrical valve portion 316 in relation to the circumferential recess communicating with the passageways 312 and 313 provides a progressively decreasing annular throttling area for the discharge of the oil through the passageway 315 and the acceleration valve to the passageway 313. Shortly before the acceleration valve 264 reaches its terminal position at the left the cylindrical valve portion 316 will have completely blocked the passageway 315. Simultaneously with this oil discharge as the valve moves from its intermediate position to the final position at the left, oil will again be discharged through the restricted orifice under the control of the valve 311 along the passageway 312 around the acceleration valve to the passageway 313. The rapidly increasing throttling action of the diminishing annular area produced by the taper of the cylindrical valve portion 316 as contrasted with the substantially constant throttling action produced by the peripheral notches of the cylindrical valve portion 314 provides a higher rate of deceleration when shifting the valve from its intermediate position to the final position than the acceleration produced when shifting the valve 264 from its initial to its intermediate position. By appropriate adjustment of the valve 311 the absolute magnitudes of the acceleration and deceleration can be controlled.

The acceleration valve design is such, however, that a very high acceleration is produced when initiating movement of the traverse carriage from its ramming position since it is desired to move the traverse carriage to its firing position as rapidly as possible. Near the end of the traverse carriage travel toward its firing position the acceleration valve produces a relatively high deceleration which is comparable to the deceleration of the carriage experienced in its movement to the ramming position, thus insuring a rapid movement of the traverse carriage to the firing position. The foregoing will become apparent from a further consideration of the structural details of the valve body in a cycle of its operation as it is shifted from its far left position to the position shown in the drawings.

With the acceleration valve 264 in its far left position accumulator pressure is transmitted through the passageway 313 around the acceleration valve, along the passageway 312 and through the check valve 317 along the pipe 310 to impart a reverse rotation to the hydraulic motor 1124, this path of fluid flow being maintained in all positions of the acceleration valve as it shifts from its far left position to the position shown in the drawings. As the acceleration valve 264 shifts from its far left position to its intermediate position, the restricted orifice under the control of the valve 318 is bypassed and oil is discharged from the motor along the pipe line 309 solely through the passageway 319 and acceleration valve to the passageway 306. This follows from the fact that with the acceleration valve in its far left position the taper of the cylindrical valve portion 320 is out of alignment and to the left of the passageways 306 and 307 and only moves into a position of alignment with these passageways as the acceleration valve moves to the right to assume its intermediate position. Thus, in moving the acceleration valve 264 from its far left position to its intermediate position the hydraulic medium is not subjected to any throttling action thereby insuring an extremely high acceleration of the traverse carriage as movement toward the firing position is initiated.

With the acceleration valve 264 in its intermediate position the motor 1124 now rotates at a constant speed. As the acceleration valve, however, recommences and continues its shift from the intermediate position to its final position at the right the progressive movement of the taper on the cylindrical valve portion 320 in relation to the circumferential recess communicating with the passageways 306 and 307 provides a progressively decreasing annular throttling area for the discharge of the oil through the passageway 319 and the acceleration valve to the passageway 306. Simultaneously with this oil discharge oil is also discharged through the restricted orifice under the control of the valve 318 along the passageway 307 around the acceleration valve to the passageway 306. The oil discharge through the restricted orifice takes place while the valve shifts from its intermediate position to its position at the far right but discontinues through the annular throttling area during this shift when the cylindrical valve portion 320 moves to block the passageway 319. By means of the throttling action produced at the restricted orifice under the control of the valve 318 and at the taper of the cylindrical valve portion 320, a relatively high deceleration is produced as the valve shifts from its intermediate position to the position shown at the right. By appropriate adjustment of the valve 318 the magnitude of the deceleration may be controlled.

*The venting valve.*—In order to permit a rapid movement of the traverse carriage blocking valve 262 to its closed position at the end of the traverse carriage movement in either of its directions, the venting valve 265 is provided. In operation this valve will be in a position to vent the piston rod end of the blocking valve 262 directly to the drain line before the blocking valve 262 is ready to close. The venting valve 265 is of the piston type and is held in the venting position shown by the compression spring 321. When pressure is admitted at the right end of this valve to shift the same to the left against the compression of the spring 321 oil is vented from the spring end of the valve through the common exhaust passageway 273 to the cam housing 258. In its shifted position to the left the venting valve 265 operates to admit pressure to the piston rod end of the blocking valve 262 to move the same to an open position. In order that it may be clear how the venting valve 265 is moved to the venting position shown before the blocking valve 262 is ready to close the following auxiliary circuits are considered.

When initiating movement of the traverse carriage from the firing position auxiliary pressure is ported from the pressure line 267 around the blocking valve 262 along the passageway 268 through the acceleration valve 264, through the passageway 269 to shift the venting valve 265 to the left and through the venting valve and passageway 270 to the piston rod end of the blocking valve 262 to move the same to its open position. Shortly after movement of the traverse carriage is initiated auxiliary pressure in the passageway 268 is blocked by the cylindrical valve portion 320 of the acceleration valve 264; and shortly before the traverse carriage arrives at its ramming position the cylindrical portion 322 of the acceleration valve 264 has moved to uncover the passageway 272, thus establishing an exhaust circuit for the venting valve. The venting valve 265 is now moved by the spring 321 from its position at the left to the venting position shown. In so moving oil is vented from the right end of the venting valve 265 through the passageway 269, through the acceleration valve 264, passageway 272, around the blocking valve 262 and through the auxiliary lines 271, 304, traverse carriage control valve 1479, the common exhaust passageway 405 thereof and exhaust line 305 (Figs. 78 and 74) to the accumulator supply tank 1132. Thus, before the blocking valve 262 is ready to close the venting valve 265 has assumed the venting position shown in Fig. 78.

When initiating movement of the traverse carriage from its ramming position, however, auxiliary pressure is ported instead from the pressure line 271 around the blocking valve 262 along passageway 272 through acceleration valve 264 which is now shifted to the far left through passageway 269 to shift the venting valve to the left and through the venting valve 265 and passageway 270 to the piston rod end of the blocking valve 262 to move the same to its open position. Shortly after movement of the traverse carriage toward its firing position is initiated, auxiliary pressure in the passageway 272 is blocked by the cylindrical portion 322 of the acceleration valve 264; and shortly before the traverse carriage arrives at its firing position the cylindrical valve portion 320 has moved to uncover the passageway 268 to establish an exhaust circuit for the venting valve 265. The venting valve is then again moved by the spring 321 from its position at the left to the venting position shown. In so doing oil is vented from the right end of the venting valve through the passageway 269, acceleration valve 264, passageway 268 around the blocking valve 262 and through the line 267 (Figs. 78, 79 and 77) which now serves as an auxiliary exhaust line to the projectile tray drive control unit 1122 (Fig. 77). In this unit the oil is finally vented through the projectile tray traverse carriage interlock valve 156 and the common exhaust passageway 160 to the cam housing 66. Thus, again before the traverse carriage blocking valve 262 (Fig. 78) is ready to close the venting valve 265 has assumed the venting position shown in the drawings.

In the venting position shown which is assumed by the venting valve 265 shortly before the traverse carriage arrives at either its ramming or firing positions and hence shortly before the blocking valve 262 is ready to close, the venting valve is in a position to vent the piston rod end of the blocking valve 262 directly to the drain line. When, therefore, the traverse carriage arrives at either of its terminal positions and the blocking valve 262 begins closing, oil is vented from the piston rod end thereof through the passageway 270, venting valve 265 and common exhaust passageway 273 to the cam housing 258 which connects with the accumulator supply tank through the drain line 84 (Figs. 78 and 74). Since the venting valve 265 permits the venting of oil from the piston rod end of the blocking valve 262 to take place through a comparatively short length of pipe line, the blocking valve 262 will close rapidly. This is important, since certain parts of the blocking valve 262 constitute portions of interlocks which permit operation of the projectile tray drive unit and the rammer and empty case ejector drive unit. Rapid closing of the traverse carriage blocking valve 262

THE OPERATION OF THE TRAVERSE CARRIAGE DRIVE UNIT

*Movement of the traverse carriage to ramming position.*—With the blocking valve 262, reversing valve 263 and acceleration valve 264 of the traverse carriage drive control unit 1123 (Fig. 78) positioned as shown, the operation of the traverse carriage drive unit will be described in moving the traverse carriage from the firing position to the ramming position. If conditions permit, auxiliary pressure will be ported from the auxiliary pressure line 267, around the blocking valve 262, along passageway 268, through the acceleration valve 264, through the passageway 269 to shift the venting valve 265 to an open position, through the venting valve 265 and the passageway 270 to the piston rod end of the blocking valve 262. This pressure will cause the blocking valve 262 to shift to its open position. When the blocking valve 262 is open, auxiliary pressure will be ported from the auxiliary line 267 through the blocking valve 262 and the passageway 302 to shift the reversing valve 263 to the left.

Accumulator pressure will then pass from the main pressure line 7 through the blocking valve 262, along passageway 323, through the reversing valve 263 shifted to the left, passageway 306, around the acceleration valve 264, through the passageway 307, check valve 308 and pipe line 309 to the hydraulic motor 1124. The hydraulic motor will rotate to initiate movement of the traverse carriage to its ramming position and the oil discharged from the motor will pass through the pipe line 310, passageway 315, the restricted orifice under the control of the valve 311, passageway 312, through and around the acceleration valve 264, passageway 313, through the reversing valve and passageway 324 to the main exhaust line 11 which returns to the accumulator supply tank.

As the hydraulic motor 1124 rotates to move the traverse carriage from its firing position toward its ramming position, the acceleration valve 264 gradually shifts from the position shown to its intermediate position where it bypasses the adjustable orifice under the control of the valve 311, all as previously described. When the adjustable orifice is bypassed the hydraulic motor 1124 will rotate at a constant speed, controlled by the adjustable orifice of the valve 800 in the main pressure line 7 from the accumulator to the drive control unit. Near the end of the travel of the traverse carriage the acceleration valve 264 will be gradually shifted by its cam 98 from its intermediate position to its final position at the left to control the deceleration of the motor. At the end of the travel of the traverse carriage, the high speed disc 278 will rotate into a position in which the disc slot 293 is aligned with the blocking valve detent 276. This detent will then enter the slot 293, thus closing the blocking valve 262 and stopping the drive control unit.

*Movement of the traverse carriage to firing position.*—With the traverse carriage locked in the ramming position it will be noted that the reversing and acceleration valves 263 and 264 are shifted to their far left positions. Thus, when starting the drive unit to shift the traverse carriage from its ramming position toward its firing position, auxiliary pressure is ported from the auxiliary pressure line 271 around the blocking valve 262 through passageway 272, through the acceleration valve 264 and passageway 269 to shift the venting valve 265 to its open position, and through the venting valve and passageway 270 to the piston rod end of the blocking valve 262. This pressure will cause the blocking valve 262 to shift to its open position. When the blocking valve is open auxiliary pressure will be ported from the auxiliary pressure line 271 through the blocking valve 262 and passageway 303 to shift the reversing valve 263 to the right. Accumulator pressure from the main pressure line 7 will then pass through the blocking valve 262, passageway 323, reversing valve 263, along the passageway 313 around the acceleration valve 264 through the passageway 312 and check valve 317 to the pipe line 310 leading to the hydraulic motor 1124. The hydraulic motor will now rotate in a reverse direction to initiate movement of the traverse carriage toward its firing position and the oil discharged from the motor will pass along the pipe line 309 through passageway 319, acceleration valve 264, passageway 306, through reversing valve 263 and passageway 325 to the main exhaust line 11 returning to the accumulator supply tank. As the hydraulic motor 1124 rotates in the reverse direction the acceleration valve 264 is gradually shifted from its far left position toward the right to assume its intermediate position in which the hydraulic motor rotates at a constant speed. In this position of the valve the speed of the motor is again controlled by the main adjustable orifice in the pressure line 7 leading from the accumulator to the drive control unit. Near the end of the travel of the traverse carriage toward its firing position, the acceleration valve 264 is gradually shifted by the cam 98 from its intermediate position to the far right position shown in the drawings. This causes the oil to discharge through the passageway 319, through valve 318 and passageway 307, through and around the acceleration valve 264 to the passageway 306 to control the deceleration of the motor. At the end of the travel of the traverse carriage the high speed disc 278 again rotates into a position in which the slot 293 in the disc is aligned with the blocking valve detent 276. This detent enters the slot 293, thus closing the blocking valve and stopping the drive control unit.

*The transient operation.*—A transient condition occurs in the operation of the traverse carriage drive control unit 1123 which has all the advantages described in connection with a similar condition in the projectile tray drive control unit 1122. With the traverse carriage blocking valve 262 closed both ends of the hydraulic motor 1124 are vented to the tank and the hydraulic motor is locked by the detents 290 and 276 cooperating respectively with the disc lug 292 and disc slot 293. If the traverse carriage is locked in the firing position and gravity seeks to urge the same toward the ramming position, as by roll of the ship, the hydraulic motor 1124 will be locked by the detent 276, the lateral surface of which engages the side wall 297 of the slot 293. At the same time a small clearance will exist between the lug face 299 and the detent 290 for, as previously noted, the design of the high speed discs 277 and 278 is such that when the drive unit is locked in either its firing position or ramming position a slight clearance will exist between either face 299 or 295 of the disc lug 292 and the detent 290 when either the face 297 or 300 of the disc slot 293 contacts the blocking valve detent 276. The load on the blocking valve detent 276 is that caused by the component of the weight of the driven unit acting through the chain 1081 and sprocket wheel 1082 and in turn on the slotted disc 278 which is geared to the sprocket wheel 1082. Therefore, the accumulator pressure which opens the blocking valve 262 must overcome not only the force of the blocking valve spring 266 but also the friction between the lateral surface of the blocking valve detent 276 and the side wall 297 of the disc slot. With the parts positioned as shown only a slight movement of the high speed disc 277 in a counterclockwise direction is possible until the face 299 of the disc lug engages the detent 290. Movement in the other direction is prevented by the detent 276 engaged in the slot 293.

The transient condition occurs as the blocking valve 262 opens. Thus, as the blocking valve moves to its open position the first port to be uncovered will be the pressure line 7 from the accumulator. The auxiliary pressure line 267 which is adapted to communicate with the passageway 302 to the reversing valve 263 is still closed and therefore the reversing valve position will be that shown in Fig. 78 and will be such as to port pressure to the hydraulic motor 1124 to move it in a direction opposite to that desired. The direction of rotation of the hydraulic motor 1124 will therefore be such as to move the slotted disc 278 in a counterclockwise direction until the face 299 of the disc lug 292 abuts the detent 290 to take up the clearance existing therebetween. When this occurs the rotation of the motor will be momentarily stopped and the slight movement of the slotted disc 278 will relieve the frictional forces acting between the lateral surface of the detent 276 and the slot side 297.

As the blocking valve 262 continues to open and reaches approximately its three-quarters open position, accumulator pressure is ported from the auxiliary pressure line 267 through the blocking valve 262 and passageway 302 to the reversing valve 263 which is then shifted to the left causing the drive control unit to move in the desired direction, all as previously described. The detents 276 and 290 are now held free from engagement with their respective discs 278 and 277 and move to engage the disc slot and lug when the traverse carriage reaches its ramming position. With the traverse carriage in its ramming position the hydraulic motor is now locked by the abutment of the lug face 295 with the detent 289, the lateral surface of the detent 276 in this position of the unit being free from engagement with the side wall 300 of the disc slot 293.

When initiating movement of the traverse carriage from the ramming position to the firing position on the assumption that gravity still seeks to urge the traverse carriage to the ramming position, the delayed shift of the reversing valve 263 from its left position occurs as previously described, tending momentarily to urge the high speed disc 277 in a clockwise direction. This, however, is not possible by reason of the engagement of the lug face 295 with the lateral surface of the detent 290, thus permitting a frictionless withdrawal of the detent 276 from the disc slot 293. Where, however, gravity seeks to move the traverse carriage toward the firing position and the carriage is in the ramming position, there will be a slight transitory movement of the disc lug 292 in a clockwise direction attending the delayed reversal of the reversing valve 263. For, under these circumstances, the blocking valve detent 276 contacts the slot face 300 to lock the unit and a clearance exists between the lug face 295 and the detent 290.

THE INTERLOCKS OF THE TRAVERSE CARRIAGE DRIVE CONTROL UNIT

The traverse carriage drive control unit 1123 incorporates three interlocks which are designated interlock B, interlock H and interlock I, respectively. These interlocks control the rearward movement of the projectile tray, the forward movement of the case stop and the ramming of the ammunition, all in relation to positions of the traverse carriage. Thus, interlock B prevents the rearward movement of the projectile tray unless the traverse carriage is locked in the firing position. Interlock H prevents the forward movement of the case stop until the traverse carriage has moved from the firing position towards the ramming position sufficiently to prevent any interference between a forward moving case stop and the ammunition in the traverse carriage; and interlock I prevents ramming unless the traverse carriage is locked in the ramming position.

*Interlock B.*—The rearward movement of the projectile tray is started by the porting of pressure through the projectile tray control valve 248 (Fig. 77) along the auxiliary line 208 (Figs. 77 and 74) to the case stop drive control unit 1120 (Fig. 74) and from thence by the auxiliary line 77 (Figs. 74 and 77) to the projectile tray drive control unit 1122 (Fig. 77). The control pressure, however, to the projectile tray control valve 248 is ported from the traverse carriage drive control unit 1123 (Fig. 78) through the auxiliary pressure line 207 (Figs. 78, 79 and 77). Pressure to the auxiliary line 207 through the traverse carriage drive control unit 1123 (Fig. 78) is ported from the main pressure line 7 along passageway 801, through blocking valve 262, along passageway 326 and through the acceleration valve 264 to the auxiliary line 207. This pressure will be blocked except when the traverse carriage is locked in the firing position. As soon as the blocking valve 262 opens and thereby unlocks the traverse carriage, the auxiliary pressure line 207 will be blocked. If the traverse carriage is locked in the ramming position, the control pressure will be ported through the blocking valve 262 and along passageway 326 but will be blocked by the acceleration valve 264. Thus, the interlock B consists of ports in the blocking and acceleration valves of the traverse carriage drive control unit. In this manner, the combination of the blocking valve 262 and the acceleration valve 264 will determine whether or not the traverse carriage drive unit is locked and also in which of its two stopping positions the unit is locked.

*Interlock H.*—Interlock H as previously noted prevents the forward movement of the case stop until the traverse carriage has moved away from the firing position towards the ramming position sufficiently to prevent an interference between a forward moving case stop and the ammunition in the traverse carriage.

As shown in Fig. 78 this interlock consists of the traverse carriage case stop interlock valve 327 which is moved to the right to occupy the position shown by the compression of the spring 328 and is moved to the left against the compression of this spring by the cam 329 in engagement with the cam follower 330. When moved to the left oil at the spring end of the valve 327 is vented through the common exhaust passageway 273 to the housing 258. The cam 329 is mounted on the slow speed shaft 259 and thus rotates in a clockwise direction through an angle of 270° as the traverse carriage moves from the firing position to the ramming position and in a counterclockwise direction through the same angle as the traverse carriage returns from the ramming position to the firing position.

When the traverse carriage is moving toward the ramming position and has moved the proper distance away from the firing position to prevent interference of the case stop with the ammunition, the cam follower 330 in contact with the cam surface 332 will move to engage the cam surface 333 thus shifting the interlock valve 327 to the left. Auxiliary pressure will then be ported from the main pressure line 7 of the traverse carriage drive control unit, along the passageway 334, through the traverse carriage case stop interlock valve 327, along the auxiliary line 193 (Figs. 78 and 74) and through the case stop blocking valve 169 (Fig. 74) and passageway 192 to shift the case stop reversing valve 170 to the right. The case stop will now move forward, as previously described. If the traverse carriage is too close to the firing position, the interlock valve 327 (Fig. 78) will block the pressure line from the accumulator.

*Interlock I.*—Interlock I prevents ramming unless the traverse carriage is locked in the ramming position. This interlock consists of ports in the traverse carriage drive control unit blocking valve 262 (Fig. 78) and the acceleration valve 264. When the traverse carriage and rammer control lever 1139 is shifted to the ram position, pressure from the accumulator will be ported through the rammer control valve 1486 (Fig. 78) along the auxiliary pressure line 335 to the traverse carriage drive control unit 1123. In this control unit pressure from the auxiliary line 335 will be ported through the acceleration valve 264 only when the traverse carriage is near the ramming position, through the passageway 336 and then through the blocking valve 262 only when the traverse carriage is locked in the ramming position and then to the rammer and case ejector drive control unit 1125 (Fig. 79) along the auxiliary pressure line 337 (Figs. 78 and 79) to thus initiate forward movement of the rammer and case ejector.

THE RAMMER AND CASE EJECTOR DRIVE CONTROL UNIT

The rammer and case ejector drive unit, which consists of the rammer and case ejector motor 1126 and the rammer and case ejector drive control unit 1125, operates to ram the ammunition into the gun and at the same time to eject the empty case into the empty case tray. The rammer and case ejector drive unit also operates to retract the rammer and case ejector.

The rammer and case ejector drive control unit 1125 includes the valve block 338 and the housing 339 secured thereto in which the cam shaft 340 and associated instrumentalities are mounted and oil immersed. The cam shaft 340 is driven by the motor 1126 through the reduction gear 341 and pair of bevel gears 802, the gear ratio being chosen by way of illustration to cause the cam shaft to rotate through an angle of 270° as the rammer and case ejector move from their rear positions to their forward positions when ramming without ammunition. In the valve block 338 there are positioned three principal valves, namely, a blocking valve 342 for stopping the motion of the hydraulic motor 1126, a reversing valve 343 for controlling its direction of rotation and an acceleration valve 344 for controlling the acceleration and the deceleration of the hydraulic motor and its associated equipment. Two adjustable orifices controllable by the valves 345 and 346 and two check valves 347 and 348 operate in conjunction with the acceleration valve 344. The maximum speed of the hydraulic motor 1126 is controlled by the valve 349 which provides an adjustable orifice in the pressure line 8 from the accumulator. The common drive connection 1131 between the control unit 1125 and the rammer and ejector sprockets 1109 and 1115 is shown diagrammatically in Fig. 79. As there indicated, the connection includes the common drive shaft 1416 which is connected to the motor 1126 through suitable gearing 803.

*The blocking valve.*—The blocking valve 342 is of the piston type and is urged to the closed position shown by the compression spring 350 at one end thereof while fluid pressure applied to the piston rod end thereof moves the valve to an open position. Thus, when initiating movement of the rammer and case ejector from their rear positions, auxiliary pressure is ported through the interlock I of the traverse carriage drive control unit 1123 (Fig. 78) and the auxiliary pressure line 337 (Figs. 78 and 79) to the rammer and case ejector drive control unit 1125 (Fig. 79), around the blocking valve 342, along the passageway 351, through the acceleration valve 344 and along the passageway 352 to the piston rod end of the blocking valve 342 to shift this valve to its open position against the compression of the spring 350. When operated to its open position in the manner described, oil at the spring end of the blocking valve 342 is vented along the common exhaust passageway 353 in the valve block to the cam housing 339 which communicates with the accumulator supply tank 1132 (Fig. 74) through the exhaust lines 354, 355 (Figs. 79 and 77), 83 (Figs. 77 and 74) and 84.

To the free end of the piston rod of the blocking valve 342 there is pivotally secured a detent 356 which is urged by the compression spring 350 to engage the slot 357 of the cam disc 358 on the shaft 340 or to engage the peripheral portion 359 thereof when the valve is in its open position. In order to insure peripheral engagement of the detent 356 with the cam disc 358 to hold the valve 342 in its open position, the detent 356 is pivotally connected to the valve block 338 by the link 360 in the manner shown. A lug 361 is secured to the cam disc 358 for cooperation with the fixed stop 362 on the cam housing and is mounted on the disc for unobstructed movement relative to the detent 356 and the link 360 as the cam disc rotates. It should be noted that the slot 357 of the cam disc is of sufficient width to prevent contact between the lateral surfaces of the detent 356 and the side walls of the slot when the disc lug 361 abuts the terminal surface 363 of the fixed stop 362.

In the closed position shown the blocking valve 342 blocks the pressure line 8 from the accumulator, vents both ends of the hydraulic motor 1126 to the accumulator supply tank and also mechanically locks the hydraulic motor 1126 by means of the detent 356 when this locking function is not accomplished by the engagement of the disc lug 361 with the terminal surface 363 of the fixed stop 362. The detent 356 engages the slot 357 of the cam disc only when the rammer and case ejector are in their rear or retracted positions and contacts the peripheral surface 359 of the cam disc in all other positions of the rammer and case ejector. In their extreme forward positions when ramming without ammunition, the rammer and case ejector are locked by the abutment of the disc lug 361 with the terminal surface 364 of the fixed stop 362, since the rammer and case ejector in moving to their extreme forward positions will have caused the cam shaft 340 and the cam disc 358 secured thereto to rotate through an angle of approximately 270°. When ramming with ammunition, however, the rammer and case ejector are locked in their forward positions when the flange of the cartridge case contacts the breech face of the gun. Under these circumstances, a slight clearance will exist between the disc lug 361 and the terminal surface 364 of the fixed stop.

When operating the rammer and case ejector manually release of the detent 356 is effected through the slotted push rod 804 engaging a pin 805 of the link 360 and operable by the lever 1469. Rotation of the lever 1469 in the proper direction causes the detent 356 to disengage the disc slot 357 and unlock the rammer and case ejector. The detent release described above is operated only during manual operation of the rammer and case ejector.

*The reversing valve.*—The reversing valve 343, which controls the direction of rotation of the hydraulic motor 1126, is also of the piston type and is pilot pressure operated through the blocking valve 342. This valve is held in its position at the right by the non-positive spring loaded detent 365 operable to engage the beveled groove in the right end of the valve body. In the position shown the reversing valve 343 is operable to cause rotation of the hydraulic motor in a direction to move the rammer and case ejector to their rear positions. A metallic washer 366 and a compression spring 367 are arranged for cooperation with the valve body 343 when shifting the same to the left. When the reversing valve 343 has shifted to the left where the cylindrical portion 368 of the valve body contacts but does not disengage the washer 366 from its terminal recess wall, the valve will be in its neutral position where the cylindrical valve portions 369 and 370 block the main passageways 371 and 372 respectively and prevent the porting to or exhaust of pressure from the hydraulic motor 1126.

As the valve 343 completes its shift to the left from its neutral position, the washer 366 will be urged to the left by the cylindrical valve portion 368 to compress the spring 367. When shifted to the extreme left the reversing valve 343 will be in a position to cause a reverse rotation of the motor to move the rammer and case ejector to their forward positions. The reversing valve 343 can be held in its position at the left against the compression of the spring 367 only so long as fluid pressure is applied at the right end of the valve. If the fluid pressure at the right end of the reversing valve is released without porting pressure to the left end of the same, the energy stored in the spring 367 will only be sufficient to shift the valve to its neutral position where the rotation of the hydraulic motor 1126 and hence the movement of the rammer and case ejector will be stopped.

In order that it may be clear how the reversing valve 343 is pilot pressure operated through the blocking valve 342 to initiate movement of the rammer and case ejector from their rear positions, it will be observed that when the blocking valve 342 is approximately half open accumulator pressure will be ported to the motor 1126 from its pressure main 8. Not until the blocking valve 342 is approximately three-quarters open, however, will accumulator pressure be ported from the auxiliary pressure line 337 through the blocking valve 342 and passageway 373 to shift the reversing valve 343 to its extreme left position. As pressure is admitted at the right end of the reversing valve 343 to shift the same, oil is simultaneously vented at the left end of this valve through the passageway 374 and blocking valve 342 to the auxiliary line 375 (Figs. 79 and 78) which now serves as an auxiliary exhaust line. This exhaust line 375 vents the oil through the rammer and case ejector control valve 1486 (Fig. 78) which is shifted to the right and the common exhaust passageway 405' thereof to the auxiliary exhaust line 305 (Figs. 78 and 74) which communicates with the accumulator supply tank. In order to maintain the reversing valve 343 in its extreme left position it is necessary to maintain pressure on the right end of the valve since, if no pressure is admitted at the left end of the valve, the valve will be moved to its neutral position by the spring 367 to vent pressure through the passageway 373, around the blocking valve 342 through passageway 337, around the blocking valve 262 (Fig. 78), through passageway 336, around the acceleration valve 322, and through the passageway 273 to the cam housing 258.

When initiating movement of the rammer and case ejector from their forward positions toward the rear the reversing valve 343 will at the outset be shifted to the left, the blocking valve 342 will have remained open, the traverse carriage blocking valve 262 (Fig. 78) will be closed and the traverse carriage acceleration valve 264 will be shifted to the left since the traverse carriage is locked in the ramming position. Accumulator pressure will then be ported through the rammer and case ejector control valve 1486 (Fig. 78), along the auxiliary line 375 (Figs. 78 and 79) which now serves as a pressure line to the rammer and case ejector drive control unit 1125 (Fig. 79) and through the blocking valve 342 and passageway 374 to shift the reversing valve 343 to the right where it is detented in place. In shifting the reversing valve as described above the fluid pressure is primarily effective in shifting the valve from the neutral position to the right since the spring 367 alone is capable of completing a shift of the valve from the far left to its neutral position. As pressure is admitted at the left end of the reversing valve 343 to shift the same, oil is simultaneously vented at the right end of the valve through the passageway 373, the blocking valve 342 and auxiliary line 337 (Figs. 79 and 78) which now serves as an exhaust line to the traverse carriage drive control unit 1123 (Fig. 78). In the traverse carriage drive control unit oil from the auxiliary exhaust line 337 is vented through the blocking valve 262, the passageway 336 and the acceleration valve 264 to the auxiliary line 335. The line 335 connects to the rammer and case ejector control valve 1486 to vent the oil through this valve, the common exhaust passageway 405' thereof and the exhaust line 305 (Figs. 78 and 74) leading to the accumulator supply tank. If the traverse carriage blocking valve 262 should have opened before the rammer reversing valve 343 commences to shift, oil from the auxiliary line 337 will vent through the traverse carriage blocking valve 262 and the common exhaust passageway 273 to the housing 258.

The exhaust circuit for the piston rod end of the rammer and case ejector blocking valve 342 (Fig. 79) is also traced at this point since it has certain portions in common with that of the reversing valve described in the preceding paragraph. When the rammer and case ejector are being retracted and arrive at their rear positions, the rammer and case ejector blocking valve 342 will commence closing. In so doing, oil is vented from the piston rod end of this valve along the passageway 352, through the acceleration valve 344, along passageway 351 and around the blocking valve 342 to the exhaust line 337 (Figs. 79 and 78) which leads to the traverse carriage drive control unit 1123. If the traverse carriage has not arrived at the firing position, the traverse carriage blocking valve 262 will be open and oil will be vented from the exhaust line 337 through the blocking valve 262 and common exhaust passageway 273 to the housing 258. If, however, the traverse carriage is locked in its firing position, the blocking valve 262 will be closed and oil from the exhaust line 337 will be vented through the blocking valve 262, passageway 336 and acceleration valve 264 shifted to the right to the common exhaust passageway 273 leading to the cam housing 258.

*The acceleration valve.*—The acceleration valve 344 is a three position cam actuated valve for controlling the acceleration and deceleration of the hydraulic motor 1126. As the valve moves from its initial position to its intermediate position the acceleration of the motor is controlled. In its intermediate position, which is maintained for the greater portion of the operating cycle, the motor rotates at constant speed. As the valve continues to shift in the same direction from its intermediate position to its final position the deceleration of the motor is controlled. The desired movement of the acceleration valve 344 is obtained through the cam 898 on the shaft 340, the bell crank 899 pivotally mounted on the valve block at 900 and a spring 901 associated with the piston rod 902 which is connected to the bell crank 899 by the link 903. As the acceleration valve 344 moves from the initial position shown to its final position at the left in the intermittent fashion described, oil at the left end of the valve is vented through the common exhaust passageway 353 to the cam housing 339. The mode of operation and details of construction of the valve actuating mechanism broadly outlined above are identical with those of the projectile tray acceleration valve in Fig. 77.

The acceleration valve 344 is designed to provide a relatively high acceleration and a high deceleration when moving the rammer and case ejector from their rear positions to their forward positions. A high acceleration of the rammer and case ejector is possible since the rammer travels a relatively small distance before engaging the cartridge case. A high deceleration of the rammer and case ejector is desired so that the ammunition may be rammed into the gun at an optimum speed without damage to the flange of the cartridge case as it contacts the breech face of the gun. How the foregoing is achieved will become apparent from a consideration of the structural details of the valve body as it is shifted to the left from the position shown in a cycle of its operation.

With the acceleration valve 344 in the position shown, accumulator pressure is transmitted along the passageway 371, around the acceleration valve, along the passageway 376 and through the check valve 348 to the hydraulic motor 1126, this path of flow to the motor being maintained in all positions of the acceleration valve 344 as it shifts from its position to the final position at the left. As the acceleration valve shifts from the initial position shown to its intermediate position, oil is discharged from the motor through the passageway 377 and acceleration valve 344 to the passageway 372.

During the initial portion of the valve shift from the position shown to its intermediate position, a slight throttling action is produced by the cylindrical portion 378 of the acceleration valve as the oil passes from the passageway 377 through the acceleration valve. By means of this arrangement the desired acceleration is produced as movement of the rammer and case ejector to their forward positions is initiated.

As the acceleration valve 344 continues its shift to the left and arrives at its intermediate position the right face of the cylindrical valve portion 378 will have moved to uncover the passageway 377. The oil now discharges through the passageway 377 and the acceleration valve to the passageway 372 without any throttling action in consequence of which the motor 1126 will now rotate at a constant speed. With the acceleration valve 344 in its intermediate position, the taper of the cylindrical valve portion 379 will be in substantial alignment with the passageways 380 and 372.

As the acceleration valve 344 recommences and continues its shift from the intermediate position to its final position at the left the progressive movement of the taper on the cylindrical valve portion 379 in relation to the circumferential recess communicating with the passageways 380 and 372 provides a progressively decreasing annular throttling area for the discharge of the oil through the passageway 377 and acceleration valve to the passageway 372. Shortly before the acceleration valve 344 reaches its terminal position at the left the cylindrical portion 379 of the valve will have completely blocked the passageway 377. Simultaneously with this oil discharge as the valve moves from its intermediate position to the final position at the left oil will be discharged through the restricted orifice under the control of the valve 345 along the passageway 380 around the acceleration valve to the passageway 372. The rapidly increasing throttling action of the diminishing annular area produced by the taper of the cylindrical valve portion 379 together with the substantially constant throttling action produced at the restricted orifice under the control of the valve 345 provides the desired deceleration. By appropriate adjustment of the valve 345, the magnitude of the deceleration may be controlled.

The acceleration valve design is such, however, that a very high acceleration is produced when initiating movement of the rammer and case ejector toward their retracted positions since it is desired to remove the rammer from the path of the breech block as rapidly as possible. Near the end of the rammer and case ejector travel toward their retracted positions the acceleration valve produces a relatively high deceleration which is comparable to the deceleration of the rammer and case ejector experienced in their forward movement, thus insuring a rapid retraction of the rammer and case ejector. The foregoing will become apparent from a further consideration of the structural details of the valve body in a cycle of its operation as it is shifted from its far left position to the position shown in the drawings.

With the acceleration valve 344 in its left position accumulator pressure is transmitted through the passageway 372, around the acceleration valve along the passageway 380 and through the check valve 347 to impart a reverse rotation to the hydraulic motor 1126, this path of flow to the motor being maintained in all positions of the acceleration valve as it shifts from its left position to the position shown in the drawings. As the acceleration valve 344 shifts from its left position to its intermediate position, the restricted orifice under the control of the adjustable valve 346 is bypassed and oil is discharged from the motor solely through the passageway 381, unobstructed by the cylindrical valve portion 378, and the acceleration valve to the passageway 371. This follows from the fact that with the acceleration valve in its left position the taper of the cylindrical valve portion 382 is out of alignment and to the left of the passageways 371 and 376 and only moves into a position of alignment with these passageways as the acceleration valve moves to the right to assume its intermediate position. Thus, in moving the acceleration valve 344 from its left position to its intermediate position the hydraulic medium is not subjected to any throttling action thereby insuring an extremely high acceleration of the rammer and case ejector as movement toward their retracted positions is initiated.

With the acceleration valve 344 in its intermediate position the motor 1126 will rotate at a constant speed. As the acceleration valve, however, recommences and continues its shift from the intermediate position to its final position at the right the progressive movement of the taper on the cylindrical valve portion 382 in relation to the circumferential recess communicating with the passageways 371 and 376 provides a progressively decreasing annular throttling area for the discharge of the oil through the passageway 381 and the acceleration valve to the passageway 371. Simultaneously with this oil discharge, oil is also discharged through the restricted orifice under the control of the valve 346 along the passageway 376 and around the acceleration valve to the passageway 371. The oil discharge through the restricted orifice takes place while the valve shifts from its intermediate position to its position at the far right but discontinues through the annular throttling area during this shift when the cylindrical valve portion 382 moves to block the passageway 381. By means of the throttling action produced at the restricted orifice under the control of the valve 346 and at the taper of the cylindrical valve portion 382, a relatively high deceleration is produced as the valve shifts from its intermediate position to the position shown at the right. By appropriate adjustment of the valve 346 the magnitude of the deceleration may be controlled.

THE OPERATION OF THE RAMMER AND CASE EJECTOR DRIVE UNIT

*Forward operation.*—With the blocking valve 342, the reversing valve 343 and the acceleration valve 344 of the rammer and case ejector drive control unit 1125 positioned as shown, the operation of the rammer and case ejector drive unit will be described in moving the rammer and case ejector to their forward positions. If conditions permit, auxiliary pressure will be ported from the auxiliary pressure line 337, around the blocking valve 342, along the passageway 351 through the acceleration valve 344 and passageway 352 to the piston rod end of the blocking valve to shift the same to its open position. When the blocking valve is open, accumulator pressure will be ported from the auxiliary line 337 through the blocking valve 342 and the passageway 373 to shift the reversing valve 343 to the extreme left against the compression of the spring 367. As previously noted, the reversing valve 343 can be held in its extreme left position only so long as fluid pressure is applied at the right end of the valve. Accumulator pressure will then pass from the line 8 through the blocking valve 342, along passageway 383, through the reversing valve 343 shifted to the left, passageway 371, around the acceleration valve 344, through the passageway 376, check valve 348 and pipe line 384 to the hydraulic motor 1126. The hydraulic motor will rotate to initiate movement of the rammer and case ejector in a forward direction and the oil discharged from the motor will pass through the pipe line 385 along the passageway 377, through the acceleration valve 344, through the passageway 372 and reversing valve 343 to the passageway 386 from whence it passes through the main exhaust line 12 to the accumulator supply tank.

As the hydraulic motor 1126 rotates to move the rammer and case ejector in a forward direction the acceleration valve 344 gradually shifts from the position shown to its intermediate position to fully unblock the passageway 377. When the passageway 377 is completely unblocked the hydraulic motor 1126 will rotate at a constant speed controlled by the adjustable orifice of the valve 349 in the main pressure line 8 leading from the accumulator to the drive control unit. Near the end of the operation of the drive control unit 1125 the acceleration valve 344 will be gradually shifted by its cam 98 from its intermediate position to its final position at the left to control the deceleration of the motor. The blocking valve 342 will remain open during and at the end of the operation of the drive control unit since the blocking valve detent 356 engages the peripheral surface 359 of the cam disc in all forward positions of the rammer and case ejector. At the end of the operation of the drive control unit when ramming without ammunition, the rammer and case ejector will be locked in their extreme forward positions by the abutment of the disc lug 361 with the terminal surface 364 of the fixed stop. When ramming with ammunition, however, the rammer and case ejector will be locked in their forward positions when the flange of the cartridge case contacts the breech face of the gun. Under these circumstances, as previously noted, a slight clearance will exist between the disc lug 361 and the terminal surface 364 of the fixed stop.

If during the travel of the rammer and case ejector in a forward direction the traverse carriage and rammer control lever 1139 is released from the ram position, the rammer and case ejector will stop when the lever has returned to its neutral position. For, under these circumstances, accumulator pressure will no longer be ported through the rammer and case ejector control valve 1486 (Fig. 78), the auxiliary pressure line 335, the interlock I of the traverse carriage control unit 1123, the pressure line 337 (Figs. 78 and 79) and passageway 373 (Fig. 79) to the right end of the reversing valve 343. When the auxiliary pressure is blocked, therefore, the spring 367 associated with the reversing valve 343 will shift the reversing valve from its far left position to its neutral position where the cylindrical valve portions 369 and 370 block their respective passageways 371 and 372 and prevent the porting to or exhaust of pressure from the hydraulic motor 1126. The rotation of the motor and hence the movement of the rammer and case ejector will be stopped. The arrangement described above thus makes it necessary for the operator to hold the traverse carriage and rammer control lever 1139 in the ram position in order to complete the ramming stroke. This is important since it prevents loss of time in the loading cycle which might otherwise occur if the ramming stroke were automatically carried to completion once it had been initiated.

*Rearward operation.*—With the rammer and case ejector in their forward positions, the reversing valve 343 and the acceleration valve 344 will be shifted to the left and the blocking valve 342 will have remained open. Thus, when initiating movement of the rammer and case ejector from their forward positions toward the rear, accumulator pressure will be ported through the rammer and case ejector control valve 1486 (Fig. 78) along the auxiliary line 375 (Figs. 78 and 79), through the blocking valve 342 and passageway 374 to shift the reversing valve 343 to the right where it is detented in place.

Accumulator pressure from the main pressure line 8 will then pass through the blocking valve 342, passageway 383 and reversing valve 343 along the passageway 372, around the acceleration valve 344 through the passageway 380 and check valve 347 to the pipe line 385 leading to the hydraulic motor 1126. The hydraulic motor will now rotate in a reverse direction to initiate movement of the rammer and case ejector to the rear. The oil discharged from the motor will pass along the pipe line 384 through the passageway 381, acceleration valve 344, passageway 371 and through the reversing valve 343 to the passageway 387 which communicates with the passageway 386 connected with the main exhaust line 12.

As the hydraulic motor rotates in the reverse direction the acceleration valve 344 is gradually shifted from its left position toward the right to assume its intermediate position in which the hydraulic motor rotates at a constant speed. In this position of the valve the speed of the motor is again controlled by the main adjustable orifice in the pressure line 8 leading from the accumulator to the drive control unit. Near the end of the travel of the rammer and case ejector toward the rear, the acceleration valve 344 is gradually shifted by the cam 98 from its intermediate position to the far right position shown in the drawings. This causes the oil to discharge from the passageway 381, valve 346 and passageway 376 through and around the acceleration valve to the passageway 371 to control the deceleration of the motor. At the end of the travel of the drive control unit the blocking valve disc 358 rotates into a position in which the slot 357 is aligned with the blocking valve detent 356. This detent enters the slot 357, thus closing the blocking valve 342 and stopping the drive unit.

*The transient operation.*—A transient condition occurs in the operation of the rammer and case ejector drive control unit but only when the gun is depressed and the rammer and case ejector are locked in their retracted positions. This transient condition has all the advantages described in connection with the projectile tray drive control unit. When the gun is depressed and the rammer and case ejector are in their retracted positions the hydraulic motor is locked by the detent 356, the lateral surface of which engages the side wall 388 of the slot 357. At the same time a small clearance exists between the disc lug 361 and the terminal surface 363 of the fixed stop.

When the blocking valve 342 is closed, both ends of the hydraulic motor 1126 will be vented to the tank and the hydraulic motor is locked by the detent 356 engaged in the slot 357 of the cam disc. The load on this detent is that caused by the component of the weight of the driven unit acting through the chains, sprockets 1109 and 1115 and drive connection 1131 and in turn on the slotted disc 358 which, as previously noted, is geared to the motor 1126. With the parts positioned as shown, only a slight movement of the cam disc 358 in a counterclockwise direction is possible, until the disc lug 361 engages the terminal surface 363 of the case stop. Movement in the other direction is prevented by the detent 356 engaged in the slot 357. Therefore, the accumulator pressure which opens the blocking valve 342 must overcome not only the force of the blocking valve spring 350 but also the friction between the lateral surface of the detent and the side wall 388 of the disc slot 357.

The transient condition occurs as the blocking valve 342 opens. Thus, as the blocking valve moves to its open position the first port to be uncovered will be the pressure line 8 from the accumulator. The auxiliary pressure line 337 which is adapted to communicate with the passageway 373 to the reversing valve 343 is still closed and therefore the reversing valve position will be that shown in the drawings and will be such as to port pressure to the hydraulic motor 1126 to move it in the direction opposite to the desired motion. The direction of rotation of the hydraulic motor 1126 will therefore be such as to move the slotted disc 358 in a counterclockwise direction until the disc lug 361 abuts the terminal surface 363 of the fixed stop 362 to take up the clearance. When this occurs the rotation of the motor will be momentarily stopped and the slight movement of the slotted disc 358 will relieve the frictional forces acting between the lateral surface of the detent 356 and the slot wall 388. This follows from the design of the slot 357 which has such a width that when the disc lug 361 engages the fixed stop 362 the slot sides will be free of contact from the lateral surfaces of the detent.

As the blocking valve 342 continues to open and reaches approximately its three-quarters open position, accumulator pressure is ported from the auxiliary pressure line 337 through the blocking valve 342 and passageway 373 to shift the reversing valve 343 to its extreme left position and cause the drive unit to move in the desired direction, all as previously described. The detent 356 now engages the peripheral surface 359 of the cam disc 358 and continues this engagement until the rammer and case ejector return again to their retracted positions.

When the gun is elevated, however, and the rammer and case ejector are in their retracted positions, the hydraulic motor 1126 is locked by the abutment of the disc lug 361 with the terminal surface 363 of the fixed stop 362. When this occurs the lateral surfaces of the blocking valve detent 356 are out of contact with the side walls of the slot 357, thus permitting a frictionless withdrawal of the detent from the slot when moving the blocking valve 342 to its open position.

THE INTERLOCK OF THE RAMMER AND CASE EJECTOR DRIVE CONTROL UNIT

The rammer and case ejector drive control unit 1125 incorporates only one interlock which is designated interlock J. This interlock consists of a cam operated valve in the rammer and case ejector valve block and operates to prevent closing of the breech block until the rammer is clear of the breech block path.

As shown in Fig. 79 this interlock consists of the breech block rammer interlock valve 389 which is moved to the right to occupy the positon shown by the compression spring 390 and is moved to the left against the compression of this spring by the cam 391 in engagement with the cam follower 392. When moved either to the right or to the left oil at the ends of the interlock valve 389 is vented through the common exhaust passageway 353 to the cam housing 339. The cam 391 is mounted on the shaft 340 and rotates in a clockwise direction through an angle of approximately 270° as the rammer moves from its retracted position to complete its ramming stroke and in a counterclockwise direction through the same angle as the rammer moves from the forward position to its retracted position.

When the rammer has completed its forward stroke to ram the ammunition into the gun, the cam 391 will have rotated through an angle of approximately 270° to shift the breech block rammer interlock valve 389 to the left by the engagement of the cam follower 392 with the cam surface 393. When, therefore, the traverse carriage and rammer control lever 1139 is operated to move the traverse carriage to the firing position and retract the rammer, the traverse carriage control valve 1479 (Fig. 78) will be shifted to port accumulator pressure from this valve along the auxiliary lines 304 and 394 (Figs. 78 and 79) to the breech block rammer interlock valve 389 (Fig. 79) where the pressure is blocked.

As soon as the rammer head is withdrawn sufficiently to clear the breech block path, the cam 391 will have rotated in a counterclockwise direction a sufficient amount to permit the compression spring 390 to shift the interlock valve 389 to the right to occupy the position shown. When this occurs the cam follower 392 will have engaged the peripheral surface 395 of the cam. Control pressure from the traverse carriage control valve 1479 will then be ported through the breech block rammer interlock valve 389 and along the auxiliary pressure line 396 (Figs. 79 and 78) to the valve resetting cylinder 1065. This cylinder sets the breech valve block into operation to close the breech block.

THE TRAVERSE CARRIAGE AND RAMMER CONTROL VALVES

*The valve construction.*—The traverse carriage control valve 1479 shown in Fig. 78 starts the operation of the traverse carriage drive unit. This valve is a three-position valve shifted by means of the control lever 1139 and spring returned to neutral when the control lever is released. The valve 1479 is shown in its neutral position and when shifted to its lower position will cause the traverse carriage to move to the ramming position, provided the projectile tray has moved forward sufficiently to clear the traverse carriage. When shifted from its neutral position to its upper position the valve will cause the traverse carriage to move toward the firing position. From either its upper or lower position the traverse carriage control valve 1479 is returned by spring action to its neutral position when released.

The rammer and case ejector control valve 1486 (Fig. 78) starts the operation of the rammer and case ejector drive unit. This valve is also a three-position valve shifted by the same control lever 1139 and spring returned to neutral when the control lever is released. The valve 1486 is shown in its neutral position and when shifted to the right will cause the rammer and case ejector to move to their forward positions provided the traverse carriage is locked in the ramming position. When shifted from its neutral position to the left the valve 1486 will cause the rammer and case ejector to move toward their retracted positions. From either of its positions to the left or right of neutral, the rammer and case ejector control valve 1486 when released is returned by spring action to its neutral position.

The desired movement of the traverse carriage control valve 1479 and of the rammer and case ejector control valve 1486 is obtained through the lever 1139 and a linkage to be detailed hereinafter, the pins 400 and 400' secured to the piston rods 1478 and 1485, the springs 402 and 402' and the washers 403 and 404 and 403' and 404' associated therewith. As clearly shown in Fig. 78 of the drawings the pairs of metallic washers 403, 404 and 403', 404' loosely surround their respective piston rods 1478 and 1485 to permit relative movement therebetween and continuously engage their respective compression springs 402 and 402' disposed therebetween. Each of the washers 403, 404 and 403', 404' in certain phases of operation of the valves engages the adjacent terminal wall of their respective recesses to allow compression or decompression of their respective springs 402 and 402'. In the neutral positions of the valves shown the washers 403 and 403' engage their respective terminal recess walls; and the pins 400 and 400' on the piston rods contact these washers without disengaging the same from their terminal recess walls. Thus, the valves 1479 and 1486 are held in their neutral or balanced positions by the residual compression of the springs 402 and 402' which urge their respective pairs of washers 403, 404 and 403', 404' into intimate engagement with the terminal recess walls.

When moving the lever 1139 to shift the traverse carriage control valve 1479 from its neutral position to its lower position the washer 404 remains in fixed engagement with its terminal recess wall and the spring 402 is compressed by the washer 403 which is urged downwardly by the pin 400 in engagement therewith. The spring is now under substantial compression to return the valve to its neutral position when the control lever 1139 is released. As the valve 1479 is moved to its lower position, oil is vented through the common exhaust line 305 (Figs. 78 and 74) which communicates with the accumulator supply tank 1132. When shifting the traverse carriage control valve 1479 from its neutral position to its upper position, however, the washer 403 remains in fixed contact with its terminal recess wall while the washer 404 moves with the valve body to compress the spring 402. Simultaneously with this movement of the valve body oil is vented from the upper end of the valve body into the common exhaust passageway 405. The energy stored in the spring 402 with the valve shifted to its upper position is sufficient to restore the valve to its neutral position when the lever 1139 is released. The auxiliary exhaust line 305, as shown in the drawings, connects with the common exhaust passageway 405 of the traverse carriage control valve.

When moving the lever 1139 to shift the rammer and case ejector control valve 1486 from its neutral position to the right, the washer 404' remains in fixed engagement with its terminal recess wall and the spring 402' is compressed by the washer 403' which is urged to the right by the pin 400' in engagement therewith. The spring 402' is now under substantial compression to return the valve to its neutral position when the lever 1139 is released. As the valve 1486 is moved to the right oil is vented through the common exhaust line 305 (Figs. 78 and 74) which, as previously noted, communicates with the accumulator supply tank. When shifting the rammer and case ejector control valve 1486 from its neutral position to the left, however, the washer 403' remains in fixed contact with its terminal recess wall while the washer 404' moves with the valve body to compress the spring. Simultaneously with this movement of the valve body oil is vented from the left end of the valve body into the common exhaust passageway 405'. The energy stored in the spring with the valve shifted to the left is sufficient to restore the valve to its neutral position when the lever is released. The auxiliary exhaust line 305 also connects with the common exhaust passageway 405' of the rammer and case ejector control valve 1486 as indicated in the drawings.

*The lever and linkage for operating the two valves.*—The manually operated traverse carriage and rammer control lever 1139 is mounted on the rammer and case ejector drive control unit and is connected by a suitable linkage with the traverse carriage control valve 1479 and the rammer and case ejector control valve 1486 previously described. As shown more particularly in Figs. 80–84 a bearing 1470 secured in any suitable manner to the rammer and case ejector drive control unit 1125 slidably and rotatably supports a rod 1471 to one end of which there is rigidly secured the lug 1472 for cooperation with the slotted guide plate 1473 mounted on the bearing 1470. A link 1474 is mounted on the rod 1471 by the bearings 411 and 412 which engage the lateral surfaces of the bearing 1470 on the rammer and case ejector drive control unit. Thus, movement of the link 1474 longitudinally of the bearing 1470 is prevented while permitting sliding movement of the rod 1471 through this bearing and those of the link. The manually operated traverse carriage and rammer control lever 1139 is pivotally connected to the ends of the rod 1471 and the link 1474 by bifurcations in the manner shown. When rotation of the lever 1139 is therefore permitted, this bifurcated construction insures that the lever 1139, link 1474 and rod 1471 will rotate as a unit about the bearing 1470.

The plate 1473 serves to guide and limit the movement of the traverse carriage and rammer control lever 1139 and to this end is provided with a longitudinal slot 1475 which terminates in two transverse slots 1476 and 1477. The transverse slot 1476 it will be noted extends to both sides of the longitudinal slot 1475. The lug 1472 which slides in the slots of the plate makes it possible for the control lever 1139 to occupy six different positions. Thus, when the traverse carriage and rammer control lever 1139 is in the neutral position the lug 1472 is centrally positioned along the longitudinal slot 1475 and the lever cannot be rotated about the bearing 1470. The central position and other positions of the lug corresponding to the neutral position and other positions of the control lever are shown diagrammatically in Fig. 85.

When the control lever 1139, however, is moved from its neutral position to the position "move traverse carriage to ramming position," the lug 1472 moves to the right from its neutral position along the longitudinal slot 1475 and is stopped with the lever when the lug abuts the wall portion of the transverse slot 1476 in alignment with the longitudinal slot. With the control lever in its position "move traverse carriage to ramming position" it is possible to rotate the lever 1139 about the bearing 1470 to occupy either the "ram" position or the "retract" position. In the "ram" position the lug 1472 abuts the upper terminal wall surface of the transverse slot 1476 to limit the upward rotation of the lever; and in its "retract" position lug 1472 abuts the lower terminal wall surface of the transverse slot 1476 to limit the downward rotation of the lever.

When the control lever 1139 is moved from its neutral position to the position "move traverse carriage to firing position," the lug 1472 moves to the left from its neutral position along the longitudinal slot 1475 and is stopped with the lever when the lug abuts the wall portion of the transverse slot 1477 in alignment with the longitudinal slot. With the control lever in its position "move traverse carriage to firing position" it is only possible to rotate the lever downwardly about the bearing 1470 to occupy the "retract" position. In the "retract" position the lug 1472 abuts the lower terminal wall surface of the transverse slot 1477 to limit the rotation of the lever 1139.

A linkage interconnects the rod 1471 and the piston rod 1478 of the traverse carriage control valve 1479 to shift the valve to the desired positions through proper manipulation of the control lever 1139. This linkage consists of a rotatably mounted rod 1480 to one end of which there is rigidly secured a bifurcated lever 1481 that engages a peripherally recessed portion of the rod 1471. To the other end of the rotatably mounted rod 1480 there is also rigidly secured a lever 1482 that is pivotally connected with the link 1483. A bell crank 1484 connects with the other end of the link 1483 and with the free end of the piston rod 1478 of the traverse carriage control valve 1479 to impart the desired movement to the same.

When the control lever 1139 is moved to the position "move traverse carriage to ramming position," the rod 1471 (Fig. 80) is shifted to the right from its neutral position to cause clockwise rotation of the bifurcated lever 1481 and movement of the traverse carriage piston rod 1478 into the valve casing. This, as previously noted, causes compression of the valve spring 402 (Fig. 78) in the traverse carriage control valve 1479 so that when the control lever 1139 is released it will automatically return to its neutral or balanced position. If, on the other hand, the control lever 1139 is moved to the position "move traverse carriage to firing position," the rod 1471 (Fig. 80) will be shifted to the left from its neutral position to cause counterclockwise rotation of the bifurcated lever 1481 and movement of the traverse carriage piston rod 1478 further out of the valve casing. This movement of the piston rod also causes compression of the traverse carriage valve spring 402 (Fig. 78) and permits automatic return of the valve to its neutral position upon release of the control lever 1139.

A linkage also interconnects the link 1474 and the piston rod 1485 of the rammer and case ejector control valve 1486 to shift this valve to the desired position when the control lever 1139, link 1474 and rod 1471 are rotated as a unit about the bearing 1470. This linkage consists of the link 1487 pivotally connected at one end with the bifurcated lever 422 integral with the link 1474 and connected at the other end with the bifurcated lever 1488 rigid with the rotatable shaft 1489. Another lever 1490 rigidly secured to the rotatable shaft 1489 connects to the free end of the piston rod 1485 of the rammer and case ejector control valve 1486 to impart the desired movement to the same.

When the control lever 1139 is moved to the "ram" position the rod 1471 (Fig. 80) is first shifted to the right from its neutral position until the lug 1472 enters the transverse slot 1476 in the plate 1473. The control lever 1139, link 1474 and rod 1471 are then rotated upwardly as a unit about the bearing 1470 to cause clockwise rotation of the bifurcated lever 422 and movement of the rammer piston rod 1485 into the valve casing. This causes compression of the valve spring 402' (Fig. 78) of the rammer and case ejector control valve 1486 so that when the control lever 1139 is released it will return to a position where the lug 1472 (Fig. 80) is aligned with the longitudinal slot 1475 of the plate 1473. The spring 402 (Fig. 78) of the traverse carriage control valve 1479, which is also compressed, will then return the lever 1139 to its neutral position.

When the control lever 1139 is moved to the "retract" position the rod 1471 (Fig. 80) is first shifted to the left from its neutral position until the lug 1472 enters the transverse slot 1477 in the guide plate 1473, it being assumed that it is also desired to move the traverse carriage to the firing position. The control lever 1139, linkage 1474 and rod 1471 are then rotated downwardly as a unit about the bearing 1470 to cause counterclockwise rotation of the bifurcated lever 422 and movement of the rammer piston rod 1485 further out of the valve casing. This also causes compression of the valve spring 402' (Fig. 78) in the rammer and case ejector control valve 1486 so that when the lever is released it will return to a position where the lug 1472 is aligned with the longitudinal slot 1475 of the plate 1473. The spring 402 of the traverse carriage control valve 1479 which is also compressed will then return the lever to its neutral position.

*The normal upward movement of the control lever.*—In normal operation the control lever 1139 is moved at the proper time first to the position "move traverse carriage to ramming position" and then immediately to the "ram" position where it is held until the ramming stroke has been completed. This upward movement of the control lever 1139 (Fig. 80) shifts the traverse carriage control valve 1479 (Fig. 78) to its lower position and the rammer and case ejector control valve 1486 (Fig. 78) to the right. The shifting of the control valves to these positions causes the projectile tray to withdraw from its rear position and the traverse carriage to move to the ramming position as soon as the projectile tray is clear of the traverse carriage. When the traverse carriage is locked in the ramming position the rammer and case ejector will then move to their forward positions to ram the ammunition into the gun and eject the empty case into the empty case tray.

With the traverse carriage control valve 1479 (Fig. 78) shifted to its lower position accumulator pressure is transmitted from the pressure line 7 (Fig. 78), along the auxiliary line 426 through the traverse carriage control valve 1479 to the auxiliary pressure line 427, through the empty case interlock valve 1379, along the auxiliary line 428 and through the open breech block interlock valve 1599 to the pressure line 152 (Figs. 78, 79 and 77) leading to the projectile tray drive control unit 1122. In the projectile tray drive control unit the control pressure is ported through the interlock L of the case stop release valve 1896 shifted to the right, along passageway 153, through acceleration valve 71 shifted to the left, passageway 154 and through blocking valve 69 in its closed position to the auxiliary pressure line 155 (Figs. 77 and 74). This pressure line connects with the case stop drive control unit 1120 to shift the control selector valve 177 to its lower position.

With the control selector valve 177 in its lower position accumulator pressure from the main pressure line 10 (Fig. 74) and passageway 211 of the case stop drive control unit 1120 is ported through the control selector valve 177 along auxiliary pressure line 212 (Figs. 74 and 77), through the projectile tray control valve 248 (Fig. 77) in its neutral position and the auxiliary line 80 to the projectile tray drive control unit 1122 to open the blocking valve 69 and shift the reversing valve 70 to the right. When the projectile tray has moved a sufficient distance in the forward direction to clear the traverse carriage, accumulator pressure from the main pressure line 10 (Fig. 74) and passageway 211 of the case stop drive control unit 1120 will then be ported through the control selector valve 177 along auxiliary pressure lines 212 (Figs. 74 and 77) and 429 (Fig. 77) to the projectile tray drive control unit 1122. In the projectile tray drive control unit pressure will be ported through the interlock E which is the valve 156 shifted to the left and then along the auxiliary pressure line 267 (Figs. 77, 79 and 78) to the traverse carriage drive control unit 1123 where the blocking valve 262 is opened and the reversing valve 263 is shifted to the left.

When the traverse carriage has moved to the ramming position and is locked in place, accumulator pressure is transmitted from the pressure line 8 (Fig. 74) along the auxiliary line 430 (Figs. 74 and 78) through the rammer and case ejector control valve 1486 shifted to the right to the auxiliary pressure line 335 leading to the traverse carriage drive control unit 1123. In this unit the control pressure is ported through the acceleration valve 264 shifted to the left, the passageway 336 and blocking valve 262 in its closed position to the auxiliary pressure line 337 (Figs. 78 and 79). This pressure line connects with the rammer and case ejector drive control unit 1125 where the blocking valve 342 and reversing valve 343 are shifted to the left to initiate movement of the rammer and case ejector in their forward directions. Upon completion of the ramming stroke the traverse carriage and rammer control lever 1139 is released and is then automatically returned to its neutral position as previously described.

*The normal downward movement of the control lever.*—In order to complete a normal loading operation the control lever 1139 (Fig. 80) will next be moved from its neutral position to the position "move traverse carriage to firing position" and then immediately to the "retract" position. This downward movement of the control lever shifts the traverse carriage control valve 1479 (Fig. 78) to its upper position and the rammer and case ejector control valve 1486 (Fig. 78) to the left. The shifting of the valves to these positions causes the traverse carriage to move to the firing position and the rammer and case ejector to move to the rear. The breech block will then close when the rammer head has retracted sufficiently to clear the breech block path.

With the traverse carriage control valve 1479 (Fig. 78) shifted to its upper position, accumulator pressure is transmitted from the pressure line 7 (Fig. 78) along the auxiliary line 426 through the traverse carriage control valve 1479 and thence along the auxiliary lines 304 and 271 to the traverse carriage drive control unit 1123 where the blocking valve 262 is opened and the reversing valve 263 is shifted to the right. Movement of the traverse carriage toward the firing position is thus initiated. Simultaneously with the porting of control pressure to the traverse carriage drive control unit 1123, control pressure is also transmitted from the pressure line 8 (Fig. 74) along the auxiliary line 430 (Figs. 74 and 78) through the rammer and case ejector control valve 1486 shifted to the left to the auxiliary line 375 (Figs. 78 and 79) leading to the rammer and case ejector drive control unit 1125 where the reversing valve 343 is shifted to the right to retract the rammer and case ejector.

As soon as the rammer head has withdrawn sufficiently to clear the breech block path, accumulator pressure is transmitted from the pressure line 7 (Fig. 78) along the auxiliary line 426 through the traverse carriage control valve 1479 in its upper position and thence along the pressure lines 304 and 394 (Figs. 78 and 79) to the rammer and case ejector drive control unit 1125. In this unit pressure is ported through the interlock J which is the valve 389 shifted to the right and thence along the auxiliary pressure line 396 (Figs. 79 and 78) to the valve resetting cylinder 1065 (Fig. 78). This cylinder, as previously noted, sets the breech valve block into operation to close the breech block. When the rammer and case ejector have moved a short distance to the rear to render the interlock J inoperative, the traverse carriage and rammer control lever 1139 may be released and is then automatically returned to its neutral position as previously described.

*The operation of the control lever to release jammed ammunition.*—It occasionally happens that an over-size cork plug in the cartridge case will cause the ammunition to jam in the breech of the gun during the ramming operation. When this occurs provision is made to move the rammer to its fully retracted position and then to reinitiate movement of the rammer in a forward direction. The impact force of the forwardly moving rammer head against the cartridge case will then be sufficient to release the jammed ammunition and to seat the same properly in the breech of the gun preparatory to closing the breech block.

In order that the foregoing may be accomplished, it will be observed that when the traverse carriage and rammer control lever 1139 (Figs. 80 and 85) is in the "ram" position it may be moved directly downward to the "retract" position without removing the lever from its position "move traverse carriage to ramming position." When this occurs the traverse carriage control valve 1479 (Fig. 78) will remain in its lower position to prevent movement of the traverse carriage from the ramming position; and the rammer and case ejector control valve 1486 will be shifted to the left to retract the rammer. When the rammer head has moved to its retracted position the control lever 1139 is again moved to its "ram" position to cause the rammer to release the jammed ammunition and is held there until the ramming stroke is completed. From this point on the loading operation is then completed in the manner previously described.

*Miscellaneous features of operation of the control lever.*—It is not necessary to hold the traverse carriage and rammer control lever 1139 in the position "move traverse carriage to ramming position" in order to complete the withdrawal of the projectile tray and the movement of the traverse carriage from the firing position to the ramming position. As soon as the projectile tray has withdrawn from the ammunition and traveled a short distance forward, the traverse carriage and rammer control lever 1139 may be released. For, then the traverse carriage control valve 1479 (Fig. 78) will have accomplished its control function by shifting the control selector valve 177 (Fig. 74) of the case stop drive control unit 1120 to its lower position; and through this valve will have caused the projectile tray blocking valve 69 (Fig. 77) to open and the projectile tray reversing valve 70 to shift to the right. The projectile tray will, therefore, continue to move forward regardless of whether the control lever 1139 is held in the position "move traverse carriage to ramming position". As soon as the projectile tray clears the traverse carriage, the latter will move to the ramming position, all as previously described.

It is necessary to hold the traverse carriage and rammer control lever 1139 in the "ram" position to complete the ramming stroke. The control lever, however, need only be held long enough in either of its retracted positions to shift the rammer reversing valve 343 (Fig. 79) to the right. When this occurs the rammer and case ejector will complete their rearward movement regardless of whether the traverse carriage and rammer control lever 1139 is held in the "retract" position. As soon as the rammer and case ejector have moved a short distance to the rear, the traverse carriage and rammer control lever may be released from its ram position.

When the traverse carriage has moved a short distance toward the firing position and the breech block has started to move in the closing direction, the control lever 1139 may be released from its position "move traverse carriage to firing position." For, then the traverse carriage control valve 1479 will have accomplished its control function by opening the traverse carriage blocking valve 262 (Fig. 78), shifting the reversing valve 263 to the right and operating the valve resetting cylinder 1065 (Fig. 78) to close the breech block. The traverse carriage will then continue moving to the firing position where it will lock in place and the breech block will close completely. The same action will occur, however, even if the control lever 1139 is held in the position "move traverse carriage to firing position" during the entire movement of the traverse carriage and breech block.

THE BREECH BLOCK OPERATING MECHANISM

A hydraulic breech block operating mechanism is preferably provided for automatically opening and closing the breech block at the proper time. As shown in Figs. 54–56 of the drawings this mechanism consists essentially of the breech block operating cylinder assembly 1059, the breech operating valve block 1063 which supplies hydraulic fluid to the cylinder assembly and the valve resetting cylinder 1065 which operates to reset one of the valves in the breech operating valve block to initiate closing of the breech block. The breech block operating cylinder assembly 1059 is connected to the breech operating valve block 1063 by the pipe lines 434 (Fig. 54) and 435 (Fig. 55) while an accumulator pressure line 436 (Fig. 54) and an exhaust pressure line 437 (Fig. 54) are connected to the breech operating valve block 1063 to provide for the supply and return of the hydraulic medium. These pressure and exhaust lines 436 and 437 as indicated in Fig. 54 are connected to the sliding joint assembly 1064 which receives oil through a main accumulator pressure line and exhausts oil to the accumulator supply tank through a main exhaust line.

The mounting of the breech block operating cylinder assembly 1059, the breech operating valve block 1063, the valve resetting cylinder 1065 and the sliding joint assembly 1064 with reference to each other and the parts of the gun is clearly shown in Figs. 54 and 55 of the drawings. As there indicated the cylinder 1060 of the breech block operating cylinder assembly 1059 is mounted beneath the gun housing 1020 and is rigidly secured thereto substantially centrally thereof by the bracket 1061 so that the upper end of the cylinder piston rod 1062 may be properly attached to the bottom of the breech block. The breech operating valve block 1063 is also mounted on the gun housing beneath the same and is aligned with the sliding joint assembly 1064 on the gun slide 1001 so that the two may be readily interconnected.

It should be carefully noted that the breech operating valve block 1063, which serves as a control unit, is mounted on the gun housing in such a manner that a head 442 of a piston rod in the valve block is in the path of movement of the breech block. The arrangement is such that near the end of the travel of the breech block 1038 in its opening movement the head 442 of the piston rod will be contacted by the bottom of the breech block to shift the valve secured thereto to its lower position. The valve resetting cylinder 1065 (Figs. 7, 54 and 55) is mounted on the gun slide in any suitable manner and is so positioned with reference to the breech operating valve block 1063 that the plunger 443 (Fig. 56) of the resetting cylinder at the proper time may operate to engage and shift the lever 444 of the breech operating valve block. From the foregoing, it should be clear that only the breech block operating cylinder assembly 1059 and the breech operating valve block 1063 are mounted on the recoiling part of the gun.

For the operation of these recoiling units a hydraulic circuit must be maintained between them and the fixed hydraulic assemblies associated with the non-recoiling parts of the gun. This function is accomplished by the sliding joint assembly 1064 the details of which are shown in Fig. 79 of the drawings. As there indicated the assembly consists of two sliding joints 445 and 446 which are identical in construction, the joint 445 providing for the flow of oil from the accumulator pressure line 9 Figs. 74, 78 and 79) to the breech operating valve block 1063 (Fig. 78) and the joint 446 providing for the return flow of the oil from the breech operating valve block 1063 (Fig. 78) to the exhaust line 13 (Figs. 79, 78 and 74) leading to the accumulator supply tank. For convenience the two joints 445 and 446 are mounted as a unit with their axes parallel.

Each of the joints 445 and 446 consists of a stationary cylindrical member 447 and a reciprocating tube 448. The cylindrical member 447 is sealed at one end by the cap 449 and is secured at the other end in a fluid tight manner to the block 450 which is bolted to the gun slide, as shown in Fig. 54 of the drawings. The reciprocating tube 448 of the joint slides in the high pressure packing 451 which is maintained in a state of compression by the gland nut 452 acting through the metallic washers 453 and 454. Thus, leakage from either the pressure main 9 or the exhaust main 13 is substantially prevented. Any slight leakage that does occur is bled to the auxiliary exhaust line 355 (Figs. 79 and 77) which, as previously noted, connects with the accumulator supply tank through the auxiliary exhaust lines 83 (Figs. 77 and 74) and 84. Leakage from the auxiliary exhaust line 355 is prevented by the packing 455 in the gland nut 452. From the foregoing, it should be clear that as the gun recoils and counter-recoils each tube 448 will reciprocate with respect to its stationary cylindrical member 447 while maintaining a fluid tight joint for the flow of oil.

THE BREECH BLOCK OPERATING CYLINDER ASSEMBLY

The breech block operating cylinder assembly 1059 as shown more particularly in Figs. 54 and 55 of the drawings consists essentially of the fixed cylinder 1060 and the movable piston rod 1062 to which is secured the composite piston identified in general by the reference character 456. The cylinder 1060 is mounted beneath the gun housing and the flanged end of the piston rod 1062 is attached to the breech block in any suitable manner as by nut 457. Suitable fluid ports 458 (Fig. 54) and 459 (Fig. 55) are provided in the cylinder for the ingress and egress of oil. A conventional packing 460 and gland nut 461 at the upper end of the cylinder prevent any leakage of oil from the cylinder during the movement of the piston rod.

The composite piston 456 (Fig. 54) consists of the part 462 integral with the piston rod 1062, the sleeve 463 in threaded engagement therewith and the concentric sleeve 464. The concentric sleeve 464 is operable to engage a shoulder 465 of the piston part 462 and to have its movement arrested by engagement with a shoulder 466 on the cylinder wall. The comparatively large effective pressure area provided by the upper end of the concentric sleeve 464 insures the development of a high starting force at the beginning of the opening stroke to separate the breech block from a tight cartridge case. For reasons of oil economy, however, the movement of the concentric sleeve 464 is limited to the initial portion of the piston stroke during the opening of the breech block. During the initial starting movement, therefore, the concentric sleeve 464 moves with the piston rod 1062 by reason of its engagement with the piston shoulder or face 465. When the initial starting motion is completed, however, movement of the sleeve 464 is arrested by engagement of the same with the cylinder wall shoulder 466. The piston now moves downwardly under a force caused by the pressure of the oil exerted on the piston shoulder or face 465. Passage of oil to the piston face 465 is made possible by the clearance existing between the concentric sleeve 464 and the piston rod 1062. On the upward stroke the effective pressure area of the piston 456 is constituted by the face of the threaded sleeve 463 and the exposed lower face of the piston part 462 between the sleeve 463 and the cylinder wall.

A longitudinally apertured plunger 467 is mounted for reciprocating movement in the threaded sleeve 463 and in position shown is urged with its flange 468 into contact with the upper end of the threaded sleeve 463 by the compression of the spring 1509 in the hollow piston rod 1062. The initial compression of the spring 1509 with the flange 468 in contact with the threaded sleeve 463 is approximately equal to the weight of the breech block for reasons to be presently noted. The lower end of the plunger 467 is shaped to engage the cylinder valve seat 470 (Fig. 55) and is provided with diametrical apertures 471 adjacent its end through which oil from the cylinder is vented to the fluid port 459 immediately after the engagement of the plunger with the valve seat. After engagement of the plunger 467 with the valve seat 470 an adjustable orifice under the control of the valve 472 (Fig. 55) provides an alternative path for venting the oil from the cylinder when the threaded piston sleeve 463 has moved relatively to the plunger 467 to cover the diametrical apertures 471 thereof. During the downward movement of the piston rod 1062 after engagement of the plunger 467 with the valve seat 470 the spring 1509 is being further compressed while oil from the piston rod recess is being vented through the longitudinal aperture of the plunger 467 to the lower fluid port 459.

In operation when the breech block has reached the nine inch or loading position in its downward movement, the piston plunger 467 will contact the valve seat 470, thus interrupting the direct venting path for the oil through the valve seat and establishing instead an indirect venting path through the valve seat which leads from the cylinder through the diametrical and longitudinal apertures of the plunger 467. As the breech block continues its downward movement beyond the nine ich or loading position to actuate the empty case extractors 1586 in the manner previously described, the spring 1509 will be further compressed and the diametrical apertures 471 in the plunger will finally be closed by the threaded sleeve 463 moving relatively thereto. When this occurs oil in the lower end of the cylinder will be vented through the adjustable orifice under the control of the valve 472 to produce a buffing action during the remaining downward travel of the breech block.

After the breech block has completed its downward travel beyond the loading position, the energy stored in the piston rod spring 1509 will move the breech block upwardly to its loading position where it will be detented in place preparatory to ramming operation all as previously noted. When moving the breech block upwardly to its loading position the plunger 467 remains in contact with the valve seat 470 while the spring moves the threaded sleeve 463 and piston rod 1062 upwardly relatively thereto. After the breech block again reaches the nine inch or loading position the spring 1509 is no longer operative to urge the breech block in an upward direction, since in this position the compression of the spring 1509 is approximately equal to the weight of the breech block, as previously noted. Towards the end of the closing stroke after the ammunition has been rammed into the gun, the breech block 1038 will be decelerated by the buffing action of the concentric piston sleeve 464 operating in conjunction with the cylinder wall adjacent the piston packing 460.

THE BREECH OPERATING VALVE BLOCK AND THE VALVE RESETTING CYLINDER

The breech operating valve block 1063 as shown more particularly in Fig. 78 incorporates four principal valves, three adjustable orifices and three check valves. The four principal valves are designated by the reference characters A, B, C and D respectively. Valve A is a blocking valve and operates to control the passage of the hydraulic medium from the valve block 1063 to the breech block operating cylinder 1060. The valves B and C control the direction of flow of the hydraulic medium from the pressure and exhaust lines 436 and 437 to the breech block operating cylinder 1060 and also operate to vent both ends of the breech block operating cylinder to the tank when the breech block has completed its downward travel in its opening movement.

Adjustable orifices under the control of the valves 473 and 474 are associated with the tank ports of the valves B and C respectively to regulate the speed of the breech block. Thus, the valve 473 controls the downward speed of the breech block in its opening movement and the valve 474 the upward speed of the breech block in its closing movement. A check valve 475 is provided between the tank ports of the valves B and C and the reciprocating tube 448 (Fig. 79) of the sliding joint 446 connecting with the tank. During counter-recoil of the gun the telescoping tube 448 displaces the oil in the sliding joint 446 causing a pressure surge in the tank line 437 connecting with the valve block 1063. The check valve 475 prevents this pressure surge from affecting the tank ports in the valve block and thus precludes the possibility of an unintended shift of valves B and C.

Valve D at the proper time operates to port accumulator pressure through the check valve 476 to the upper end of the valve C to shift the same from its upper position to its lower position. The other check valve 477 permits the venting of oil from the upper end of the valve C as it is shifted from its lower position to its upper position. An adjustable orifice under the control of the valve 478 regulates the accumulator pressure which is ported through the valve D to shift the valve C. The valve resetting cylinder 1065 at the proper time shifts the valve B from its upper position to its lower position.

*The valves B and C.*—Valves B and C which control the direction of flow of the hydraulic medium to the breech block operating cylinder 1060 are identical in construction. As clearly indicated in Fig. 78, each of the valves is a two-position three-way valve, the valves being detented in place in either their upper or lower positions by the non-positive spring detents 479 cooperating with grooves in the valve bodies. The valves B and C are shifted to their upper positions by levers secured to their respective piston rods 480 and 481 and in their upper positions will port pressure to the blocking valve A in a direction to open the breech block.

Passageways 482 and 483 connecting with the pressure line 436 transmit accumulator pressure to the valves B and C respectively while exhaust passageways 484 and 485 incorporating the adjustable orifices lead respectively from the valves B and C through the check valve 475 to the exhaust line 437. From the center ports of the valves B and C passageways 486 and 487 extend to the valve A. In their upper positions valve C connects the upper end of the breech block operating cylinder 1060 to the pressure line 436 while valve B vents the lower end of the breech block operating cylinder to the exhaust line 437 or tank provided valve A is open. In their lower positions valve B connects the lower end of the breech block operating cylinder 1060 to the pressure line 436 while valve C vents the upper end of the cylinder to the exhaust line 437 or tank if the valve A is open. In this manner the direction of flow of the hydraulic medium to the breech block operating cylinder is controlled.

When shifted to their upper positions oil is vented from the upper ends of the valves B and C to the tank. Thus, from the upper end of valve B oil is vented along the auxiliary passageway 488 to the common exhaust passageway 489 which connects with the exhaust line 437 through the check valve 475. In the case of the valve C oil is vented from the upper end thereof through the check valve 477, the passageway 490 and the valve D in its upper position to the common exhaust passageway 489. The spring of the check valve 477 exerts a sufficiently low force to permit shifting the valve C to its upper position. When shifting valves B and C to their lower positions oil is vented from their lower ends directly to the common exhaust passageway 489.

As shown more particularly in Figs. 55, 56 and 62 bearings 491 and 492 (Fig. 55) are fashioned integral with the valve block 1063. These bearings rotatably support a shaft 493 to which there is rigidly secured a sleeve 494 with a bifurcation engaging the piston rod 481 of the valve C. To the free end of the shaft 493 there is secured a lever 495 provided with a roller 496 which is operable to engage the lower surface of the valve setting cam 497 in the recoil of the gun. As clearly indicated in Figs. 7 and 55 the cam 497 is secured in any suitable manner to the lower arm 1022 of the slide bifurcation 1019 and is positioned to be engaged by the roller 496 of the lever arm 495 in the recoil of the gun. When so engaged the lever 495 is rotated in a direction to shift the valve C to its upper position. A sleeve 498 is rotatably mounted on the shaft 493 as a bearing and is provided at one end with a bifurcation 499 engaging the piston rod 480 of the valve B and at the other end with a lever 444 having a lateral extension 500 operable to be engaged by the lever 495 on the shaft 493. The levers 444 and 495 are dynamically balanced by the counter weights 501 and 502 respectively in order to prevent unintended shifting of the valves B and C by acceleration and deceleration forces during recoil and counter-recoil.

The arrangement of the levers 444 and 495 is such that in the recoil of the gun both of the valves B and C will be shifted to their upper positions. For, as the lever 495 is rotated by the valve setting cam 497 in the recoil of the gun, the lever 444 will be simultaneously rotated therewith through the engagement of the lateral extension 500 of the lever 444 with the lever 495. With the valves B and C in their upper positions valve C may be shifted to its lower position without disturbing the setting of the valve B. When valve B is shifted to its lower position by the valve resetting cylinder 1065, however, valve C will also be in its lower position.

*The valve D.*—The function of the valve D as previously noted is to permit the venting of oil from the upper end of the valve C and the porting of pressure thereto at the proper time to shift the valve C from its upper position to its lower position. As indicated in Fig. 78 the valve D is a two-position three-way valve which is held in its upper position by the spring 503. When urged to either its upper or lower positions oil is vented from the ends of the valve D to the common exhaust passageway 489.

To the body of the valve D there is secured a piston rod 504 provided with the head 442 adapted to be engaged by the bottom of the breech block. Near the end of the travel of the breech block 1038 in its opening movement the head 442 will be contacted by the bottom of the breech block to shift the valve D to its lower position and compress the spring 503. When the breech block moves upwardly to its loading position after it has completed its downward travel, the spring 503 will shift the valve D to its upper position.

When the valve D is shifted to its lower position by the breech block, accumulator pressure is ported from the main passageway 482 through the adjustable orifice under control of the valve 478 and auxiliary passageway 505 to the valve D. This pressure, after being ported through the valve D, is transmitted along the auxiliary passageway 490 and through check valve 476 to the upper end of valve C to shift this valve to its lower position. The spring force of the check valve 476 is set high enough to prevent any pressure surges in the tank line from shifting valve C. However, when valve D is shifted to its lower position and accumulator pressure is available, the check valve 476 will open. It should be carefully noted that the two check valves 476 and 477 effectively prevent premature shifting of valve C due to pressure surges in the tank line when the breech block is opening.

129

*The valve resetting cylinder.*—The valve resetting cylinder 1065 in Figs. 55, 56 and 78 as previously noted is positioned with reference to the breech operating valve block 1063 so that the plunger 443 may at the proper time engage and shift the lever 444 and thus shift the valve B to its lower position. When valve B is shifted to its lower position valve C will also be in its lower position. The valves B and C will then port pressure to the blocking valve A in a direction to close the breech block.

As noted hereinbefore as soon as the rammer head has withdrawn sufficiently to clear the breech block path, accumulator pressure is ported from the traverse carriage control valve 1479 (Fig. 78) in its upper position along the pressure lines 304 and 394 (Figs. 78 and 79) to the rammer and case ejector drive control unit 1125. In this unit pressure is ported through the interlock J which is valve 389 shifted to the right and then along the auxiliary pressure line 396 (Figs. 79 and 78) to the valve resetting cylinder 1065 (Fig. 78) where the piston 507 is urged to the right to shift the valve B to its lower position. The movement of the piston 507 to the right causes oil to be vented to the common exhaust line 84 and the spring 508 surrounding the plunger 443 to be compressed.

When the traverse carriage control valve 1479 returns to its neutral position the piston 507 and plunger 443 of the valve resetting cylinder will be shifted to the left by the compression spring 508 to occupy the position shown in Fig. 78. When this occurs oil will be vented from the left end of the piston 507 through the auxiliary line 396 (Figs. 78 and 79) and interlock valve 389 (Fig. 79) to the auxiliary lines 394 (Figs. 79 and 78) and 304 connecting with the traverse carriage control valve 1479 (Fig. 78). In this valve the oil will be vented to the common exhaust passageway 405 which, as previously noted, communicates with the accumulator supply tank through the auxiliary exhaust line 305.

*The valve A.*—Valve A is the blocking valve and is operated by the breech bolt in a manner that will be pointed out presently. When the breech bolt latches the breech block, valve A will be in the closed position shown in Fig. 78 and both ends of the breech block operating cylinder 1060 will be vented to the tank through the pipe lines 434 and 435 and the common exhaust passageway 489 of the breech operating valve block 1063. When the breech bolt is withdrawn, however, valve A is shifted to the right and is then opened. In its open position this valve connects the upper end of the breech block operating cylinder 1060 to the center port of valve C through the pipe line 434 and passageway 487 and the lower end of the breech block operating cylinder 1060 to the center port of the valve B through the pipe line 435 and the passageway 486. When shifted either to the right or left oil from the ends of the valve body A is vented to the common exhaust passageway 489.

The mechanism through which the valve A is operated by the breech bolt is shown in greater detail in Figs. 54, 55 and 60–62 of the drawings. As there indicated a bearing 1573 secured to the lower side of the gun housing rotatably supports a lever identified in general by the reference character 1572. This lever includes a shaft 1574 to which there are rigidly secured the lever arms 1575 and 513 (Figs. 54 and 55). The lever arm 1575 is provided with a pin 1577 which engages a slot 1578 in the breech bolt 1508 when the breech block is either closed or near its closed position; and the lever arm 513 is bifurcated at its end to engage the piston rod 516 of the valve A. As the breech bolt 1508 is withdrawn to unlatch the breech block the pin 1577 will move with the breech bolt causing the connecting lever 1572 to shift valve A to its open position. While the breech bolt is withdrawing and moving to its retracted position it will operate to compress the breech bolt spring 1538.

Automatic withdrawal of the breech bolt occurs during counter-recoil of the gun and housing. As clearly indicated in Fig. 62 a short distance from battery during

130 counter-recoil of the gun and housing the lateral surface 1566 of the breech block unlatching cam 1561 momentarily contacts the push rod 1544 of the breech block unlatching mechanism and withdraws the breech bolt 1508, thus opening the valve A. After a short travel of the breech block 1038 in its opening movement the pin 1577 as indicated in Figs. 60 and 61 disengages the slot 1578 of the breech bolt. As the pin disengages the breech bolt slot, however, the cam plate 520 secured to the breech block engages the substantially horizontal portion 521 of the lever arm 1575 to hold the lever 1572 and hence the valve A in the open position. The valve A thus remains open as long as the breech block is in any of its open positions. In the closing movement of the breech block the cam plate 520 secured thereto moves to disengage the horizontal lever arm portion 521 and the pin 1577 enters the slot 1578 of the breech bolt which has been held in a retracted position by the cam plate 1659 (Fig. 54) as already noted. When the breech block is finally closed the breech bolt is moved forwardly by the action of the spring 1538 latching the breech block and at the same time closing the valve A.

As noted above, while the breech bolt is withdrawing and moving to its retracted position the breech bolt spring 1538 is being compressed. When the breech bolt is retracted to unlatch the breech block the spring 1538 is compressed sufficiently to perform the bolt latching and valve shifting functions described above. As long as the breech block is in any of its open positions the breech bolt will be held in its retracted position to compress the spring 1538 by the cam plate 1659 secured to the breech face of the housing as shown in Fig. 54. For, as soon as the breech block opens the end 1665 of the breech bolt moves to engage the cam surface of the plate 1659 and maintains engagement therewith until the breech block is again closed.

The energy of compression of the breech bolt spring 1538 is normally enough to move the breech bolt to latching position and simultaneously therewith close the valve A through the lever 1572 connected therewith. In order to assist the closing of the valve A, however, and insure the latching of the breech bolt when the breech block has reached its closed position, the valve A as indicated in Fig. 78 is provided with a plunger 523 for cooperation with an auxiliary fluid chamber 524 in the valve block 1063. The chamber 524 is connected by the auxiliary passageway 525 to the main passageway 486 so that a force may be applied to the plunger 523 to urge the valve A to the left when the valve B is shifted to its lower position.

When the valve B is in its lower position it is evident that accumulator pressure will be transmitted from the passageway 482 through the valve B to the passageway 486 and around the valve A along the auxiliary passageway 525 to the auxiliary chamber 524 where the force exerted against the plunger 523 seeks to urge the valve A to its closed position. It should be carefully noted, however, that the valve A cannot close until the cam plate 520 (Fig. 60) has moved to disengage the lever arm 1575, the slot 1578 of the breech bolt to engage the pin 1577 and the breech bolt 1508 (Fig. 54) to disengage the cam plate 1659 on the breech face of the gun. When this occurs the valve A is shifted to its closed position and the breech bolt spring 1538 is assisted in moving the breech bolt to its latching position by the fluid pressure exerted against the plunger 523 of the valve A.

When valve A is shifted to its open position during the counter-recoil of the gun and housing, valves B and C will both be in their upper positions having previously been shifted to these positions in the recoil of the gun. As valve A is moved to its open position, therefore, and the plunger 523 moves into the auxiliary chamber 524, the oil so displaced will be vented along the auxiliary passageway 525 around the valve A to the main passageway 486 and from thence through the valve B to the exhaust passageway 484 leading to the tank.

THE OPERATION OF THE BREECH BLOCK MECHANISM TO OPEN THE BREECH BLOCK

The operation of the breech block mechanism when opening the breech block automatically will now be described with particular reference to Figs. 62 and 78 of the drawings. In order to clarify the statement of operation it will be assumed that the maximum travel of the breech block 1038 in its opening movement is approximately 10.5 inches. It is to be distinctly understood, however, that the distance of 10.5 inches is in nowise deemed critical and that it is employed for illustrative purposes only. Other maximum distances of travel for the breech block are clearly within the purview of the present invention and will readily suggest themselves to those skilled in the art in the light of the teachings herein.

The opening of the breech block proceeds as follows. After a short distance of travel of the gun and housing during recoil, the under surface of the valve setting cam 497 (Fig. 62) on the slide arm 1022 will contact the valve setting roller 496 of the lever 496 connected to the valve C. This lever, as previously noted, engages the lateral extension 500 of the lever 444 connected to the valve B. Further travel of the gun in recoil will thus shift valves B and C to their upper positions where they will be detented in place by the non-positive detents 479 (Fig. 78). With the valves B and C in their upper positions, accumulator pressure from the pressure line 436 will be transmitted through the passageway 483 and valve C to the passageway 487 where it is blocked by the valve A in its closed position.

During counter-recoil of the gun and housing at a short distance from battery the lateral surface 1566 (Fig. 62) of the breech block unlatching cam 1561 momentarily contacts the push rod 1544 of the breech block unlatching mechanism and withdraws the breech bolt 1508, thus opening the valve A through the lever 1572. Accumulator pressure is then transmitted from the pressure line 436 (Fig. 78) along the passageway 483 and through the valve C, passageway 487, valve A and pipe line 434 to the upper end of the breech block operating cylinder 1060. The lower end of the breech block operating cylinder is connected to the exhaust pressure line 437 through the valve B. This connection extends along the pipe line 435 through valve A, passageway 486 and valve B to passageway 484. Oil thus flows into the breech block operating cylinder 1060 along the pipe line 434 and is exhausted from the cylinder along the pipe line 435. The breech block thus opens, its speed being controlled by the adjustable orifice under the control of the valve 473 in the passageway 484.

During the first nine inches of travel of the breech block 1038 there will be no motion of the extractors 1586 (Figs. 63–65). At the nine-inch or loading position, however, the cam surface 1595 of each of the breech block grooves 1591 will strike its cam follower 1590. At the same time the piston plunger 467 (Fig. 54) contacts the cylinder valve seat 470 (Fig. 55). However, the region at the lower end of the breech block operating cylinder 1060 will be connected to the main discharge line 435 through the diametrical apertures 471 in the piston plunger 467.

As the breech block travels from the nine-inch position to approximately the 10.3 inch position, the extractors 1586 (Figs. 63–65) withdraw the empty cartridge case from the gun. However, when the breech block reaches approximately the ten-inch position, the apertures 471 (Fig. 54) in the piston plunger 467 will be closed by the threaded piston sleeve 463 which moves relative thereto. The oil in the region at the lower end of the operating cylinder will then be vented to the main discharge line 435 (Fig. 55) through the adjustable orifice under the control of the valve 472. This adjustable orifice will produce a buffing action during the remaining .5 inch of breech block travel. As the breech block opens beyond the 10.3 inch position, there will be no further positive travel of the extractors 1586 (Figs. 63–65) due to the disengagement of the cam surfaces 1595 with the cam followers 1590. However, during this travel the lower end of the breech block 1038 (Fig. 54) by contact with the piston head 442 will shaft the valve D to its lower position. When valve D (Fig. 78) is in its lower position accumulator pressure is ported to the upper end of the valve C thus shifting valve C to its lower position. Valve B remains in its upper position.

With this arrangement of valves B and C both ends of the breech block operating cylinder 1060 are vented to the tank and the energy stored in the piston rod spring 1509 will move the breech block to the nine-inch or loading position. At the loading position of the breech block the piston rod spring 1509 becomes inactive and the spring loaded wedges 1491 and 1492 (Fig. 55) in the gun housing contact the beveled surfaces 1502 on the breech block to detent the same in place preparatory to the ramming operation. The breech block will therefore remain in the loading position until the valve B is shifted to close the breech block.

The kinetic energy of the empty cartridge case when it leaves the extractor lugs 1592 (Fig. 65) as the extractors decelerate must be sufficient to move the empty case completely back into the reciprocating tray 1080 (Fig. 43) of the traverse carriage at all angles of elevation. At the end of its travel the empty case 1174 will operate the empty case latching lever 1091 and in turn the empty case interlock valve 1379 through the operating linkage previously described. Since the kinetic energy of the empty case 1174 when it leaves the extractor lugs is derived from the decrease in kinetic energy of the breech block, the adjustable orifice in the passageway 484 (Fig. 78) associated with the valve B which controls the speed and therefore the kinetic energy of the breech block will be set to obtain satisfactory extraction rather than meet any fixed time for opening of the breech block.

THE OPERATION OF THE BREECH BLOCK MECHANISM TO CLOSE THE BREECH BLOCK

The breech block closing operation is initiated by the traverse carriage and rammer control lever 1139. When this control lever is shifted to move the traverse carriage to the firing position, pressure is ported to the valve resetting cylinder 1065 (Fig. 78) provided that the rammer has withdrawn sufficiently to clear the breech block. The valve resetting cylinder plunger 443 moves and by engagement with the lever 444 shifts valve B to its lower position. In its lower position accumulator pressure is ported from the pressure line 436 to the lower end of the breech block operating cylinder 1060 along the passageway 482 through the valve B to passageway 486 and from thence through valve A along the pipe line 435 connected with the operating cylinder. Since valve C is already in its lower position, the upper end of the breech block operating cylinder 1060 is connected to the exhaust pressure line 437 along the pipe line 434 through the valve A along the passageway 487 and through the valve C connecting with the passageway 485. Oil at accumulator pressure will now flow into the lower end of the breech block operating cylinder 1060 and will be exhausted from the upper end thereof. The breech block will, therefore, close and in so doing its speed will be controlled by the adjustable orifice in the passageway 485 leading to the exhaust pressure line 437.

Towards the end of the closing stroke the breech block will be decelerated by the buffing action of the concentric piston sleeve 464 (Fig. 54) and the operating cylinder wall adjacent the piston packing 460. Finally the breech block will strike the stopping lug 1507 (Fig. 55) on the housing. The breech bolt 1508 will be moved forward by the action of its spring 1538 and the fluid pressure applied at the plunger 523 (Fig. 78) of the valve A thus latching the breech block and at the same time closing valve A. When valve A is closed both ends of the breech block operating cylinder will be vented to the tank and the spring loaded wedges 1491 and 1492 (Fig. 55) in the housing will contact the beveled surfaces 1493 and 1494 on the breech block.

If the breech block jams while closing or if for any reason it is desired to open the breech block after it has started to close, valves B and C are shifted to their upper positions by means of a valve setting handle 526 (Figs. 4, 7 and 62). This handle is connected by the rod 527 (Fig. 62) with a lug 528 operable to engage and depress the valve setting roller 496 of the lever 495 and is normally held out of engagement with the roller by a spring 529 which urges the handle 526 to its inoperative position. When the valves B and C are shifted to their upper positions the breech block will then open. If the breech bolt has shifted to close the valve A the breech bolt may be withdrawn by means of the breech block unlatching handle 1568 (Fig. 62). This handle, as previously noted, is connected by the rod 1567 to the cam 1569 which is normally held out of contact with the push rod 1544 of the breech block unlatching mechanism by the spring 1570 when the gun is in battery. When the breech block unlatching handle 1568 is moved to actuate the push rod 1544 of the breech block unlatching mechanism the breech bolt 1508 is withdrawn to open the valve A and thus open the breech block if valves B and C are in their upper positions.

THE INTERLOCKS BETWEEN THE PROJECTILE TRAY, THE BREECH BLOCK, AND THE TRAVERSE CARRIAGE

Two interlocks are incorporated in the control circuit extending between the traverse carriage control valve 1479 (Fig. 78) and the projectile tray drive control unit 1122 (Fig. 77). One of these interlocks designated interlock C prevents the withdrawal of the projectile tray and fuse setter from the projectile unless the breech block is open. The other interlock designated interlock F prevents the withdrawal of the projectile tray and fuse setter from the projectile unless the empty case has been extracted into the reciprocating tray of the traverse carriage and locked in the rear position.

As shown more particularly in Fig. 78 of the drawings the interlocks C and F consist of the three-way valves 1599 and 1379 respectively. The projectile tray breech block interlock valve 1599 (Fig. 78) is connected to the projectile tray drive control unit 1122 (Fig. 77) by the pressure line 152 (Figs. 78, 79 and 77) while the empty case traverse carriage interlock valve 1379 (Fig. 78) connects directly to the traverse carriage control valve 1479 through the pressure line 427. The two interlock valves as already noted are interconnected by the pressure line 428. By virtue of these connections a control circuit is established at the proper time through the interlock valves 1379 and 1599 which circuit extends between the traverse carriage control valve 1479 (Fig. 78) and the projectile tray drive control unit 1122 (Fig. 77).

*Interlock C.*—The projectile tray breech block interlock valve 1599 (Fig. 78) as noted above prevents the withdrawal of the projectile tray and fuse setter from the projectile unless the breech block is open. This interlock valve is necessary because of the possibility that the operator in loading the gun may inadvertently shift the traverse carriage and rammer control lever 1139 to the position "move traverse carriage to firing position." This would have the effect of first closing the breech block. If then the projectile tray breech block interlock valve 1599 were not provided, the subsequent shifting of the traverse carriage and rammer control lever 1139 to the position "move traverse carriage to ramming position" and from this position to the "ram" position would result in an attempted loading of the gun with a closed breech block. The interlock valve 1599 is also necessary because of the fact that the empty case traverse carriage interlock valve 1379 may be manually operated to render the interlock F inoperative.

As indicated in Fig. 78 the projectile tray breech block interlock valve 1599 is of the piston type being urged to the upper position by the compression spring 536 when the breech block is closed. In the upper position shown the valve 1599 blocks the control pressure in the auxiliary line 428 and thus prevents the withdrawal of the projectile tray and fuse setter from the projectile. When the breech block is open and the gun is substantially in battery, however, the valve 1599 is shifted to its lower position against the compression of the spring 536 by a linkage previously described. In its lower position the projectile tray breech block interlock valve 1599 will port control pressure from the traverse carriage control valve 1479 (Fig. 78) to the projectile tray drive control unit 1122 (Fig. 77), thus moving the projectile tray forward provided that all other appropriate interlocks are in the correct position. When shifted to either its upper or lower position oil is vented from the ends of the valve 1599 through the common exhaust passageway 537 to the auxiliary exhaust line 84 (Figs. 78 and 74) which is connected to the accumulator supply tank 1132. The mounting of the interlock valve 1599 with reference to the breech block and the construction of the linkage for actuating the valve by the breech block are shown in Figs. 55 and 57–59 and have been previously described.

*Interlock F.*—The empty case traverse carriage interlock valve 1379 (Fig. 78) as already noted prevents the withdrawal of the projectile tray and fuse setter from the projectile unless the empty case has been extracted into the reciprocating tray of the traverse carriage and locked in the rear position. This interlock valve prevents a possible jam which would occur if the empty case remained partly in the traverse carriage tray and partly in the housing. It also provides a fixed time between the withdrawal of the projectile tray and fuse setter from the projectile and the loading of the ammunition into the gun. This fixed time interval will determine a constant correction factor to be applied to the fuse setter, thereby insuring a more accurate firing of the gun as an anti-aircraft gun.

As indicated in Fig. 78 the empty case traverse carriage interlock valve 1379 is of the piston type and is urged to the right by the compression spring 551 when the empty case is not locked in the reciprocating tray of the traverse carriage. When urged to the right the valve will block the control pressure in the pressure line 427 and prevent the withdrawal of the projectile tray and fuse setter from the projectile. When the empty case is latched in its rear position in the reciprocating tray of the traverse carriage, however, the interlock valve 1379 is shifted to the left against the compression of the spring 551 by the linkage shown in Fig. 43 and previously described. In its position at the left the valve ports control pressure from the traverse carriage control valve 1479 (Fig. 78) to the projectile tray drive control unit 1122 (Fig. 77) thus moving the projectile tray forward provided all other appropriate interlocks are in the correct position. When shifted to either the right or left oil is vented from the ends of the valve 1379 through the common exhaust passageway 552 to the auxiliary exhaust line 305 (Figs. 78 and 74) connected to the accumulator supply tank 1132.

THE CONTROL CIRCUIT SEQUENCE AND THE HYDRAULIC INTERLOCKS

The sequence in which the control circuits operate in a normal cycle of operation of the gun and the hydraulic interlocks in relation to the control circuits are clearly shown in Figs. 86, 87, 88 and 89 of the drawings. As there indicated each control circuit together with its function is separately identified by a suitable legend, The hydraulic interlocks, the nature of which is also indicated by suitable legend, are shown associated with their appropriate hydraulic units and are connected in the proper control circuits. As will be observed there are nine control circuits which accomplish nine separate functions. The sequence in which these control circuits operate follows the numercial order of the circuit legends.

It is important to note that the control circuits operate in three distinct groups designated A, B and C respectively; that the first circuit of each group is completed by movement of its control lever to the proper position provided the appropriate interlocks are rendered inoperative; and that the remaining circiuts of each group are automatically completed at the proper time in the sequence indicated.

Thus on the assumption that the appropriate interlocks have been rendered inoperative control circuit I of group A is completed by movement of the projectile tray control lever to the rear, control circuit III of group B by movement of the traverse carriage and rammer control lever to the "ram" position, and control circuit VII of group C by movement of the traverse carriage and rammer control lever to its "retract" position. Upon completion of the first circuit of each group the closure of the remaining circuits follows automatically at the proper time.

*Circuit group A.*—Control circuit I of this group initiates movement of the projectile tray to the rear when the projectile tray control lever 1137 (Fig. 86) is shifted to the rear provided the traverse carriage is locked in the firing position. When the traverse carriage is locked in the firing position the interlock B (Fig. 88) is rendered inoperative and the control circuit can be completed. Upon completing this circuit control pressure is ported from the pressure main 7 (Fig. 88) of the traverse carriage drive control unit 1123 through the interlock B and projectile tray control valve 248 (Fig. 86) to the case stop drive control unit 1120 (Fig. 87) to shift the control selector valve 177 to its upper position; and from thence to the projectile tray drive control unit 1122 (Fig. 86) where the projectile tray blocking and reversing valves are shifted to their appropriate positions to initiate movement of the projectile tray to the rear.

Control circuit II operates to start the fuse setting motor and release the case stop when the projectile tray has moved to the rear sufficiently to cause the projectile nose to engage the fuse setter socket. When this occurs interlock A is rendered inoperative and the control circuit is automatically completed. Upon completing this circuit control pressure is ported from the pressure main 10 (Fig. 86) of the projectile tray drive control unit 1122 through the interlock A to the fuse setting motor starting valve and to the blocking valve in the case stop drive control unit 1120 (Fig. 87) to start the fuse setting motor and release the case stop.

*Circuit group B.*—Control circuit III of this group initiates movement of the projectile tray to its forward position when the traverse carriage and rammer control lever 1139 is moved to the "ram" position provided the breech block is open, the empty case has been extracted into the traverse carriage and locked in the rear position, the fuse setter socket has made one complete revolution and the projectile tray has completed its rearward travel to move the ammunition into the traverse carriage. When this occurs interlocks C, F, L and D are rendered inoperative and the control circuit can be completed. Upon completing the circuit control pressure is ported from the main pressure line 7 (Fig. 88) of the traverse carriage drive control unit 1123 through the traverse carriage control valve 1479 and the interlocks F and C to the projectile tray drive control unit 1122 (Fig. 86). In this unit the control pressure is ported through the interlocks L and D and from thence to the case stop drive control unit 1120 (Fig. 87) where the control selector valve 177 is shifted to its lower position. With the control selector valve in its lower position control pressure is ported from the pressure main 10, through the control selector valve 177 and the projectile tray control valve 248 (Fig. 86) to the projectile tray control unit 1122 where the projectile tray blocking and reversing valves are shifted to their appropriate positions to initiate movement of the projectile tray in a forward direction.

Control circuit IV operates to initiate movement of the traverse carriage to the ramming position when the projectile tray has moved a sufficient distance in the forward direction to clear the traverse carriage. When this occurs interlock E is rendered inoperative and the control circuit is automatically completed. Upon completing this circuit control pressure is ported from the pressure main 10 (Fig. 87) of the case stop drive control unit 1120 through the control selector valve 177 and the interlock E of the projectile tray drive control unit 1122 (Fig. 86) to the traverse carriage drive control unit 1123 (Fig. 88) where the traverse carriage blocking and reversing valves are shifted to their appropriate positions to initiate movement of the traverse carriage to the ramming position.

Control circuit V initiates forward movement of the case stop when the traverse carriage has moved away from the firing position towards the ramming position a sufficient distance to prevent interference between a forward moving case stop and the ammunition in the traverse carriage. When this occurs the interlock H is rendered inoperative and the control circuit is automatically completed. Upon completing this circuit control pressure is ported from the pressure main 7 (Fig. 88) of the traverse carriage drive control unit 1123 through the interlock H to the case stop drive control unit 1120 (Fig. 87) where the case stop reversing valve is shifted to the right to initiate forward movement of the case stop.

Control circuit VI initiates forward movement of the rammer and case ejector when the traverse carriage is locked in the ramming position. When this occurs the interlock I is rendered inoperative and the control circuit is automatically completed. Upon completing this circuit control pressure is ported from the pressure main 8 (Fig. 88) through the rammer and case ejector control valve 1486 and the interlock I of the traverse carriage drive control unit 1123 to the rammer and case ejector drive control unit 1125 (Fig. 89) where the blocking and reversing valves are shifted to their appropriate positions to initiate forward movement of the rammer and case ejector.

*Circuit group C.*—Control circuit VII of this group initiates movement of the traverse carriage to the firing position when the traverse carriage and rammer control lever 1139 is shifted to the position "retract" and "move traverse carriage to firing position." When this occurs control pressure is ported from the pressure main 7 (Fig. 88) through the traverse carriage control valve 1479 to the traverse carriage drive control unit 1123 where the traverse carriage blocking and reversing valves are shifted to their appropriate positions to initiate movement of the traverse carriage to the firing position.

Control circuit VIII causes the rammer and case ejector to retract when the traverse carriage and rammer control lever is shifted to the position described in the preceding paragraph. When this occurs control pressure is ported from the pressure main 8 (Fig. 88) through the rammer and case ejector control valve 1486 to the rammer and case ejector drive control unit 1125 (Fig. 89) where the reversing valve is shifted to the right to initiate movement of the rammer and case ejector toward their retracted positions.

Control circuit IX initiates closing movement of the breech block when the traverse carriage and rammer control lever is in the position "move traverse carriage to firing position" provided the rammer has retracted a sufficient distance to clear the path of the breech block. When this occurs interlock J is rendered inoperative and the control circuit is automatically completed. Upon completing this circuit control pressure is ported from the main 7 (Fig. 88) through the traverse carriage control valve 1479 and the interlock J of the rammer and case ejector drive control unit 1125 (Fig. 89) to the valve resetting cylinder 1065 where the cylinder plunger is operated to reset the valve B of the breech operating valve block and initiate closing movement of the breech block.

THE NORMAL CYCLE OF OPERATION

The normal cycle of operation of the gun will now be described starting with firing, reference in this connection being made to Figs. 74, 77, 78 and 79 of the drawings showing the details of the hydraulic circuit and certain parts of the gun schematically. Reference is also made to Figs. 86, 87, 88 and 89 of the drawings showing the control circuits and the hydraulic interlocks associated therewith. In describing the normal cycle of operation of the gun the sequence in which the interlocks are rendered inoperative will be noted.

*Before firing.*—Before the gun can be fired the traverse carriage must be locked in the firing position for if the carriage is not in the firing position the traverse carriage firing pin interlock mechanism will prevent firing of the gun. When the traverse carriage is in the firing position, however, interlock B (Fig. 88) in control circuit I is rendered inoperative. The gun is then fired.

*Breech block opening.*—During the recoil of the gun, valves B and C (Fig. 78) in the breech operating valve block 1063 are shifted automatically by the valve setting cam on the gun slide. During the counter-recoil of the gun the breech bolt, which locks the breech block in its closed position, will be retracted automatically by the breech block unlatching mechanism. The retraction of the breech bolt shifts the valve A (Fig. 78) in the breech operating valve block 1063. The combination of the three valves A, B and C admits pressure to the upper end of the breech operating cylinder 1060 and vents the lower end of the cylinder to the tank. The breech block then opens. When the breech block is opened to its loading position the interlock C (Fig. 88) is rendered inoperative through a suitable linkage actuated by the breech block as previously described.

*Extraction.*—During the last part of its opening movement, the breech block operates the mechanical extractors which extract the empty case from the gun. The empty case is extracted into the reciprocating tray of the traverse carriage where the case is locked in place. The locking action actuates the interlock F (Fig. 88) and renders the same inoperative.

*Registering the breech block.*—During the last part of its opening movement the breech block shifts the valve D (Fig. 78) in the breech operating valve block 1063. The shifting of valve D causes valve C to shift and vent the upper end of the breech operating cylinder to the tank allowing the breech block to be raised by spring action to a point where its upper surface is even and in registry with the traverse carriage. The breech block is now in its loading position.

*Extractor return.*—The spring-impelled movement of the breech block to the loading position returns the mechanical extractors to their normal positions.

*Loading ammunition.*—Before the gun is fired the projectile tray and case stop are in their forward positions. As soon as the case stop reaches its forward position, the cartridge case is loaded into the loading tray with the base of the cartridge case in contact with the case stop. Then the projectile is loaded into the projectile tray so that the base of the projectile is in contact with the cartridge case cork plug and the fuse setting pin is in an approximately vertical position.

*Moving ammunition into traverse carriage.*—When the ammunition has been loaded as described above the projectile tray operator moves the projectile tray control lever 1137 (Fig. 86) to its rear position, thus completing control circuit I through the interlock B (Fig. 88) and initiating movement of the projectile tray to the rear. The projectile tray operator may release the projectile tray control lever as soon as the projectile tray has moved a short distance to the rear. During the initial distance of travel of the projectile tray the ammunition will not move due to the clearance between the projectile nose and the fuse setter mounted on the projectile tray and also because the ammunition is supported at the rear by the case stop.

*Release of case stop and starting of fuse setting motor.*—When the fuse setter contacts the projectile nose interlock A (Fig. 86) is rendered inoperative, thus completing control circuit II through this interlock to start the fuse setting motor and release the case stop. The projectile tray now pushes the ammunition and the case stop to the rear and the fuse setting motor rotates the movable fuse setter socket member to start setting the fuse time ring. During the rearward movement the ammunition is held firmly between the case stop and the fuse setter to permit the fuse to be set as the ammunition and projectile tray travel to the rear into the traverse carriage. This is made possible through the gears and the long splined shaft previously described. The fuse setting motor will remain energized until the movable fuse setter socket member has made one complete revolution to set the fuse time ring to the desired position.

*Stopping of projectile tray and case stop.*—When the projectile tray has moved a definite distance to the rear and thereby transferred the ammunition into the traverse carriage the projectile tray drive control unit stops and locks the projectile tray. At the same time movement of the case stop is arrested by the projectile tray and case stop drive control units. Since the overall length of the different types of amunition may vary slightly, the hydraulic circuit is so designed that the case stop stops at the same time that the projectile tray is stopped even though the case stop has not been pushed to its extreme rear position. When the projectile tray is locked in its rear position and the movable fuse setter socket member has made one complete revolution to set the fuse, interlocks D and L (Fig. 86) will be rendered inoperative.

*Withdrawing projectile tray and fuse setter from projectile.*—Before the ammunition reaches its forward position in the traverse carriage, the traverse carriage and rammer control lever 1139 (Fig. 88) will be shifted to its "ram" position. When, therefore, the projectile tray is locked in its rear position and the movable fuse setter socket member has made one complete revolution to set the fuse, control circuit III will be completed through the interlocks F, C (Fig. 88), L and D (Fig. 86) since the interlocks F and C have previously been rendered inoperative. The projectile tray and fuse setter will then withdraw from the ammunition and move to the forward position where the projectile tray is locked in place. Projectile holding pawls prevent the projectile from moving forward with the projectile tray. When the projectile tray with the fuse setter withdraws from the ammunition, the case stop is released and moves to its rearmost position at high angles of elevation, thus allowing the ammunition to strike and rest against the resilient buffer at the rear of the ammunition receiving carriage tray.

*Moving traverse carriage to ramming position.*—When the projectile tray has moved forward sufficiently to clear the traverse carriage the interlock E (Fig. 86) is rendered inoperative, thus completing control circuit IV to initiate movement of the traverse carriage to the ramming position.

*Moving case stop forward.*—When the traverse carriage has moved away from the firing position sufficiently to prevent any interference between a forward moved case stop and the ammunition, interlock H (Fig. 88) is rendered inoperative, thus completing control circuit V to move the case stop to its forward position and lock the same in place.

*Ramming ammunition and ejecting empty case.*—When the traverse carriage reaches the ramming position and is locked in place interlock I (Fig. 88) is rendered inoperative, thus completing control circuit VI. The rammer then moves the ammunition into the gun and the case ejector moves the empty case into the empty case tray if the traverse carriage and rammer control lever 1139 is in the "ram" position. As previously noted it is necessary for the operator to hold the control lever in the ram position in order to complete the ramming stroke.

*Moving traverse carriage to firing position.*—When the traverse carriage and rammer control lever is shifted to the position "retract" and "move traverse carriage to firing position" upon completion of the ramming stroke, control circuit VII is completed. The traverse carriage thus moves to the firing position and is automatically locked in place.

*Retraction of rammer and case ejector.*—With the traverse carriage and rammer control lever 1139 in the position "retract" and "move traverse carriage to firing position" control circuit VIII is completed. This causes the rammer and case ejector to retract and automatically lock in their rear positions.

*Breech block closing.*—When the rammer has retracted sufficiently to prevent any interference between the rammer head and the breech block, interlock J (Fig. 89) is rendered inoperative, thus completing control circuit IX to operate the valve resetting cylinder 1065 (Fig. 89). Valve B (Fig. 78) of the breech operating valve block is then shifted and the breech block closes.

*Breech block locking.*—When the breech block has closed completely the breech bolt is moved forward automatically to lock the breech block. This movement of the breech bolt is accompanied by a shifting of the valve A (Fig. 78) of the breech operating valve block to its closed position, thus venting both ends of the breech block operating cylinder to the tank.

*Removing empty case.*—As soon as the breech block begins to close while the rammer is retracting and the traverse carriage is moving to the firing position, the operator will release the traverse carriage and rammer control lever 1139. The operator will then remove the empty case from the empty case tray. Although the traverse carriage and rammer control lever returns to neutral position, the movements of the breech block, rammer and traverse carriage continue to completion, as previously noted.

*The preparation of the gun for firing.*—When the breech block is closed, the rammer is retracted and the traverse carriage is in the firing position, the gun will be ready for firing.

THE TIME CYCLE

It is important that the normal cycle of operation of the gun be carried out in the smallest practicable time if the gun is to be effective for anti-aircraft purposes. As previously noted each gun requires two operators who are positioned on opposite sides of the gun. One operator manipulates the projectile tray control lever and when this is not required loads the ammunition into the appropriate trays at the proper time. The other operator manipulates the traverse carriage and rammer control lever and when this is no longer required removes the empty cartridge case from the empty case tray and disposes of the same. The control manipulations, loading and removal operations occur simultaneously with the operation of certain units of the gun, many of which also operate simultaneously. This simultaneity of operation makes it possible to complete the normal cycle of operation of the gun in a very short time and is an important feature of the present invention.

How the foregoing is achieved will become clear from Fig. 90 of the drawings which shows the time cycle for the normal cycle of operation of the gun starting with firing, it being assumed for illustrative purposes that the component parts of the hydraulic circuit are adjusted to complete the time cycle in five seconds. It is to be distinctly understood, however, that the total time specified or the apportionment illustrated is not deemed critical and that other total times and apportionments for the cycle may be employed if desired by appropriate adjustment of the hydraulic circuit.

A study of the time cycle diagram of Fig. 90 shows that as soon as the case stop reaches its forward position the operator of the projectile tray control lever commences loading the ammunition into the appropriate trays and completes this loading operation within the allotted period of 2.7 seconds. At the end of the loading operation, which occurs when the breech block has opened, this operator manipulates the projectile tray control lever to initiate movement of the projectile tray to the rear; and releases the lever as soon as the projectile tray has moved a short distance to the rear. It is important to note that the loading operation and the manipulation of the control lever occur simultaneously with the operation of certain units of the gun, many of which also operate simultaneously.

When the projectile tray with the ammunition has moved to its rear position to deposit the ammunition in the traverse carriage the operator of the traverse carriage and rammer control lever will have shifted this lever to the "ram" position to move the projectile tray forward. This control lever will be held in the "ram" position until the ramming stroke is completed and then will be immediately shifted to the "retract" position, where it is held until the breech block begins to close. This operator will then remove the empty case from the empty case tray and dispose of the same within the allotted period of 2.25 seconds. Again it is important to note that the manipulation of this control lever and the removal and disposal operation occur simultaneously with the operation of certain units of the gun, many of which operate simultaneously.

The operation of the units of the gun begins with the firing, the recoil and counter-recoil of the gun which occur in 0.5 second. This is followed by the opening of the breech block within the allotted period of 0.2 second. Next in the sequence of events, the empty cartridge case is extracted and simultaneously therewith the projectile tray with the ammunition is moved to the rear, the fuse of the projectile being set during this movement. The simultaneous extraction and movement of the projectile tray takes place in 1.0 second.

The movement of the projectile tray to the rear to deposit the ammunition in the traverse carriage is immediately followed by forward movement of the projectile tray shortly thereafter by movement of the traverse carriage to the ramming position and then by forward movement of the case stop. The movements of these three units are in part simultaneous, as clearly indicated by the time cycle diagram of Fig. 90. The time allotted for the movements of the projectile tray and traverse carriage is 1.0 second each, while the forward movement of the case stop occurs in 0.75 second. The arrangement is such that the traverse carriage arrives at the ramming position at the same time that the case stop reaches its forward position.

Next in the order of events, the rammer moves to ram the ammunition into the gun and simultaneously therewith the empty cartridge case is ejected forwardly into the empty case tray. The allotted period for these operations is 1.0 second. Upon the completion of these operations the rammer is retracted and simultaneously therewith the traverse carriage is shifted to the firing position all in a period of 1.0 second. After the rammer has retracted sufficiently to clear the path of the breech block, the breech block commences closing simultaneously with the movements of the rammer and traverse carriage and completes its closing operation in 0.80 second. The time cycle is thus completed in 5.0 seconds and the gun is ready for firing to recommence another cycle of operation.

The simultaneous operation of certain units of the gun places certain peak demands on the power plant which are effectively met by the accumulator. As previously noted, the accumulator 1135 (Fig. 74) when fully charged has sufficient capacity to supply hydraulic energy for operating the units of the gun through one cycle of operation and is charged during the operating cycle. In order that it may be clear how the pump 16 and accumulator 1135 of the power plant operate during the time cycle to supply the needed hydraulic energy, reference is again made to the time cycle diagram of Fig. 90.

Charging of the accumulator 1135 commences with the firing of the gun and terminates substantially at the end of two seconds, at which time the pump 16 unloads momentarily to the supply tank 1132. During the charging period the pump has sufficient extra capacity to open the breech block, move the projectile tray with the ammunition to the rear and commence forward movement of the projectile tray. At the end of the two second period, however, the accumulator comes into operation to meet the peak load imposed upon the system by the simultaneous movement of the traverse carriage, projectile tray and case stop. In operating these units over the period extending from the second to the third second, the accumulator is partially discharged. At the end of the third second the pump comes into operation again and supplies sufficient energy to ram the ammunition into the gun and eject the empty cartridge case into the empty case tray. The last peak load imposed upon the system attending the simultaneous retraction of the rammer, the closing of the breech block and the shifting of the traverse carriage to the firing position is met by the joint action of the pump and accumulator. During this period extending from the fourth to the fifth second the remaining charge of the accumulator is dissipated.

THE MOVEMENT OF THE AMMUNITION AND THE EMPTY CARTRIDGE CASE IN THE GUN CYCLE

In the gun of the present invention a substantially normal or conventional position of the trunnions is maintained in order to keep the weight of the gun at a minimum in effecting a proper gun balance. In view of the excessive lengths of the ammunition employed in the larger caliber guns, which in the case of a six-inch gun approximates an over-all length of six feet, difficulties have heretofore been encountered in effectively loading such guns and disposing of the empty cartridge case. In accordance with the present invention these difficulties are overcome by commencing the loading cycle at and ejecting the empty cartridge case to positions adjacent the trunnion axis. The initiation of the loading cycle at and the ejection of the empty cartridge case to positions adjacent the trunnion axis make it desirable to move the ammunition and the empty case along U-shaped paths in the gun cycle, thus insuring effective loading and ejection at all angles essential to anti-aircraft fire. The foregoing will become apparent from a consideration of Figs. 91–101 of the drawings in which Figs. 91–96 show the loading of the first round of ammunition and Figs. 97–101 the movement of the ammunition and empty cartridge case in a normal cycle of operation.

*The loading of the first round of ammunition.*—In Fig. 91 the traverse carriage 1077 is shown in the firing position, it being assumed that the case stop and projectile tray are locked in their forward positions to receive the first round of ammunition and that the breech block has been opened to the nine-inch or loading position. The cartridge case 1174, as indicated in Fig. 92, is then loaded into the loading tray 1066 with the base of the cartridge case in contact with the case stop; and is followed by loading of the projectile 1171 into the projectile tray with the base of the projectile in contact with the cartridge case cork plug. With the ammunition loaded as described the projectile tray operator moves the projectile tray control lever to its rear position to initiate movement of the projectile tray to the rear and the transfer of the ammunition into the carriage tray 1079 as shown in Fig. 93. Before the ammunition reaches its rearward position in the traverse carriage, the traverse carriage and rammer control lever will be shifted to its "ram" position by the remaining gun operator and the projectile tray operator will have manually shifted interlock F to its inoperative position since there is no empty case in the carriage tray 1080.

When, therefore, the projectile tray is locked in its rear position and the movable fuse setter socket member has made one complete revolution to set the fuse, the projectile tray and fuse setter will withdraw from the ammunition and move to the forward position where the projectile tray is locked in place. After sufficient movement of the projectile tray in a forward direction to clear the traverse carriage movement of the traverse carriage to the ramming position is initiated. When the traverse carriage has moved away from the firing position a sufficient distance to prevent any interference between a forward moving case stop and the ammunition, the case stop is moved to its forward position and locked in place. The arrangement is preferably such that the traverse carriage 1077 arrives at the ramming position at the same time that the case stop reaches its forward position as indicated in Fig. 94. As soon as the case stop reaches its forward position the operator of the projectile tray control lever commences loading the second round of ammunition into the appropriate trays.

When the traverse carriage reaches the ramming position and is locked in place the rammer moves the ammunition into the gun as shown in Fig. 95, it being necessary for the operator to hold the control lever in the "ram" position in order to complete the ramming stroke as previously noted. Upon completion of the ramming stroke the traverse carriage and rammer control lever is shifted to the position "retract" and "move traverse carriage to firing position" causing the traverse carriage 1077 to move to the firing position shown in Fig. 96 where it is locked in place and causing the rammer and case ejector to retract and lock in their rear positions. Upon retraction of the rammer a sufficient distance to prevent any interference between the rammer and the breech block, the breech block commences closing. When the breech block is closed, the rammer is retracted and the traverse carriage is in the firing position, the loading of the first round of ammunition will have been completed and the gun is ready for firing as indicated in Fig. 96. Thus in loading the first round of ammunition it is clear that the ammunition has moved in a U-shaped path from a position adjacent the trunnion axis into the breech of the gun.

*The normal gun cycle.*—The normal cycle of operation of the gun begins with the firing, the recoil and counter-recoil of the gun followed by opening of the breech block. When the breech block has opened, the loading of the second round of ammunition into the appropriate trays by the projectile tray operator will have been completed as indicated in Fig. 97. Next in the sequence of events, the empty cartridge case is extracted and jointly or simultaneously therewith the projectile tray with the second round of ammunition is moved to the rear through manipulation of the projectile tray control lever, the fuse of the projectile being set during the movement. The simultaneous or joint extraction of the empty cartridge case and movement of the second round of ammunition into the respective trays 1080 and 1079 of the traverse carriage is indicated in Fig. 98. Before the ammunition reaches its rearward position in the traverse carriage, the traverse carriage and rammer control lever will again be shifted to the "ram" position by the remaining gun operator. In this case, however, manual operation of the interlock F is no longer necessary since this interlock is automatically actuated by the ejected cartridge case.

The movement of projectile tray to the rear to deposit the second round of ammunition in the traverse carriage is immediately followed by forward movement of the projectile tray, followed shortly thereafter by movement of the traverse carriage to the ramming position and then by forward movement of the case stop. As previously noted the arrangement is preferably such that the traverse carriage arrives at the ramming position at the same time that the case stop reaches its forward position as indicated in Fig. 99. As soon as the case stop reaches its forward position the operator of the projectile tray control lever commences loading the third round of ammunition into the appropriate trays. When the traverse carriage reaches the ramming position and is locked in place the rammer moves to ram the second round of ammunition into the gun and simultaneously therewith the empty cartridge case is ejected forwardly into the empty case tray 1090 as clearly shown in Fig. 100.

Upon the completion of these operations the traverse carriage and rammer control lever is again manipulated as previously described to cause the simultaneous retraction of the rammer and case ejector and movement of the traverse carriage to the firing position indicated in Fig. 101. After the rammer has retracted sufficiently to clear the path of the breech block, the breech block commences closing and the operator of the traverse carriage and rammer control lever begins removing the empty case from the empty case tray 1090. When the breech block is closed, the rammer is retracted and the traverse carriage is in the firing position, the loading of the second round of ammunition will have been completed and the gun is ready for firing as indicated in Fig. 101. In the normal cycle of operation of the gun, therefore, both the ammunition and the empty cartridge case move along U-shaped paths. In so doing the ammunition moves from a position adjacent the trunnion axis into the breech of the gun, while the ejected cartridge case moves from the breech of the gun to a position adjacent the trunnion axis.

According to the provisions of the patent statutes, we have set forth the principle and mode of operation of our invention and have illustrated and described what we now consider to represent its best embodiment. However, we desire to have it understood that within the scope of the appended claims, the invention may be practiced otherwise than as specifically illustrated and described.

The invention described herein may be manufactured and used by or for the Government of the United States of America for governmental purposes without the payment of any royalties thereon or therefor.

We claim:

1. A gun, including a slide and a barrel cooperable therewith for movement therein in recoil and counter-recoil, a loading tray secured to said slide for receiving a cartridge case, a projectile tray for receiving a projectile and mounted for movement longitudinally of the loading tray, a socket secured to the projectile tray for engaging the nose of the projectile, a case stop mounted on said slide for engaging the cartridge case, means for moving said case stop longitudinally of the slide, the socket and case stop being positioned to engage and hold the ammunition disposed therebetween, and means for effecting movement of the projectile tray and hence the ammunition engaged thereby to a predetermined position at the rear of the loading tray.

2. In a gun, including a slide and a barrel cooperable therewith for movement therein in recoil and counter-recoil, a loading tray secured to said slide for receiving a cartridge case, a projectile tray for receiving a projectile and being disposed within said loading tray for sliding movement longitudinally thereof, a socket secured to the projectile tray for engaging the nose of a projectile, a case stop mounted on said slide for engaging a cartridge case, the socket and case stop being positioned to engage and hold the ammunition disposed therebetween, means for moving the case stop longitudinally of the slide, means for moving the projectile tray longitudinally of the slide, means for moving the projectile tray longitudinally within the loading tray so that movement of the projectile tray and movement of the case stop moves the ammunition held therebetween to a predetermined position at the rear of the loading tray, and means for moving the ammunition from said predetermined position transversely into alignment with the barrel of the gun.

3. In a gun, including a slide and a barrel cooperable therewith for movement therein in recoil and counter-recoil, a loading tray secured to said slide for receiving a cartridge case, a projectile tray for receiving a projectile and being mounted for movement longitudinally of the loading tray, a socket secured to the projectile tray for engaging the nose of the projectile, a case stop mounted on said slide for engaging the cartridge case, separate driving means for moving the projectile tray and case stop longitudinally of the loading tray, the socket and case stop being positioned so as to engage and hold the ammunition disposed therebetween, a source of hydraulic power for energizing each of said driving means, and hydraulic control means interconnecting said separate driving means and said source so as to provide joint movement of the projectile tray and case stop whereby the ammunition engaged thereby is moved to a predetermined position at the rear of said loading tray.

4. In a gun, including a slide, having trunnions thereon, and a barrel cooperable therewith for movement therein in recoil and counter-recoil, a loading tray secured to a trunnion of said slide for receiving a cartridge case, a projectile tray for receiving a projectile and mounted for movement longitudinally of the loading tray, a socket secured to the projectile tray for engaging the nose of the projectile, a case stop movably mounted on said slide for engaging the cartridge case so that the cartridge case and the projectile are held in alined position between said socket and said case stop, a plurality of hydraulic units including each a motor, a source of hydraulic power for energizing said hydraulic units, means connecting one of said hydraulic units to the case stop so that the case stop is moved longitudinally of the loading tray when the case stop hydraulic unit is energized by said source, means connecting another of said hydraulic units to the projectile tray so that the projectile tray is moved longitudinally of the loading tray when the projectile tray hydraulic unit is energized by said source, a series hydraulic circuit for energizing both of said connecting means to simultaneously move the cartridge case and the projectile longitudinally of the loading tray, including the source, the projectile tray motor, the case stop motor and a spring actuated valve the spring side of which is hydraulically connected to the inlet side of the case stop motor, means including the spring actuated valve for causing the case stop motor to act as a pump during the movement of the engaged ammunition to a rear position in the loading tray, means for receiving said cartridge case and said projectile at the rear position, and means including said receiving means for simultaneously moving the cartridge case and the projectile transversely of the slide to a position in alinement with the bore of the gun barrel.

5. In a gun, a slide, having trunnions thereon, and a barrel cooperable therewith for movement therein in recoil and counter-recoil, a loading tray secured to a trunnion of said slide for receiving a cartridge case, a projectile tray for receiving a projectile and being disposed within said loading tray for sliding movement longitudinally thereof, a socket secured to the projectile tray for engaging the nose of the projectile, a case stop mounted on said slide for engaging the cartridge case so that the projectile and the cartridge case are held in alined position between said socket and said case stop, a first drive means including a motor and control unit connected to the projectile tray, a second drive means including a motor and control unit connected to the case stop, both of said motors and control units being mounted on the slide, a spring actuated valve disposed in the case stop control unit with its spring side hydraulically connected to the inlet side of the case stop motor, a source of hydraulic power for energizing both of the drive means to thereby move the projectile tray and the case stop, a series hydraulic circuit including the source, the projectile tray motor, the case stop motor and the spring actuated valve, means including the spring actuated valve for causing the case stop motor to act as a pump during the rearward movement of the engaged ammunition, and means including a valve disposed in the projectile tray control unit and in the series hydraulic circuit for controlling the deceleration of the projectile tray, the case stop and interposed ammunition as the ammunition approaches a predetermined position at the rear of said loading tray.

6. In a gun the combination of a barrel and slide adapted to receive the barrel for movement in recoil and counter-recoil, said slide having trunnions thereof for permitting movement of the gun in elevation, a tray secured to said slide in opposed relation to a trunnion thereof for receiving a round of ammunition, projected tray means movable longitudinally of the tray including a socket fixed to said projectile tray for engaging and applying a force at one end of the ammunition resting in the tray to move the same rearwardly from a position adjacent the trunnion to a position at the rear of the slide, and means including a movable stop for applying an opposing force at the remaining end of the ammunition to prevent disengagement of the socket from the ammunition in its rearward movement.

7. In a gun, the combination of a barrel and a slide adapted to receive the barrel for movement in recoil and counter-recoil, a tray secured to the forward portion of the slide for receiving a cartridge case and a projectile in contact with the cartridge case, a source of power, means movable longitudinally of the tray including a socket secured thereto for engaging and applying a substantially constant force from said source to the nose of the projectile resting in the tray, and means including a movable stop for applying an opposing force from said source to the base of the cartridge case to prevent disengagement of the socket from the projectile during the rearward movement of the ammunition.

8. In a gun, the combination of a barrel and a slide adapted to receive the barrel for movement in recoil and counter-recoil, said slide having trunnions thereon for permitting movement of the gun in elevation, a tray secured to the forward portion of the slide for receiving a round of ammunition, a first member movable longitudinally of the tray operable to engage one end of the tray supported ammunition for driving the ammunition to the rear, a second member movable longitudinally of the tray to engage the remaining end of the ammunition and to be driven by said first mentioned member through the interposed ammunition, a source of hydraulic power, a hydraulic motor connected to said first mentioned member and driven from said source, a pump connected to be driven by said second mentioned member and a spring actuated valve for loading said pump, the motor, pump and valve being serially connected in a hydraulic circuit and the design of the valve being such as to prevent disengagement of the first mentioned member from the ammunition during its rearward movement.

9. In a gun, the combination of a barrel and a slide adapted to receive the barrel for movement in recoil and counter-recoil, a tray secured to said slide for receiving a round of ammunition, a first member movable longitudinally of the tray to engage one end of the tray supported ammunition, a source of power, means actuated by said source for moving the first member and the ammunition to the rear, a second member movable longitudinally of the tray to engage the remaining end of the ammunition and to be driven by said first mentioned member through the interposed ammunition, and means including a hydraulic circuit for applying an opposing force to the second mentioned member during the rearward movement of the ammunition.

10. In a gun, the combination of a barrel and a slide adapted to receive the barrel for movement in recoil and counter-recoil, a tray secured to said slide for receiving a round of ammunition, fuse setting means movable longitudinally of the tray for engaging one end of the ammunition, means for moving said fuse setting means longitudinally of said tray, a stop movably supported from said slide for engaging the remaining end of the ammunition, said stop being normally resistant to the effect of gravity on the ammunition at high angles of elevation, but being driven by the fuse setting means through the interposed ammunition whereby disengagement of the fuse setting means from the ammunition is prevented.

11. In a gun, the combination of a barrel and a slide adapted to receive the barrel for movement in recoil and counter-recoil, a loading tray secured to the forward portion of the slide for receiving a cartridge case, a carriage mounted on the rearward portion on the slide and including a tray, said carriage being movable laterally from a position in which said tray is in alignment with the loading tray to a position in which the said tray is in alignment with the bore of the barrel, a projectile tray movable lengthwise of the loading and carriage trays for supporting a projectile, means for moving said projectile tray and the projectile lengthwise of said loading and carriage trays, means for withdrawing said projectile tray from said carriage tray, a pair of pawls mounted on said carriage tray for holding the projectile in the carriage tray upon withdrawal of the projectile tray therefrom, fuse setting means secured to the projectile tray for engaging the nose of the projectile, and a case stop movably mounted on said slide for engaging a cartridge case, the said stop being normally resistant to the effect of gravity on the ammunition at high angles of elevation but being driven by the fuse setting means through the interposed ammunition, and means for automatically releasing the pawls from the projectile upon alignment of the carriage tray with the gun barrel.

12. In a gun, the combination of a barrel and a slide adapted to receive the barrel for movement in recoil and counter-recoil, a tray secured to said slide for receiving a round of ammunition, a movable stop engageable with one end of the tray supported ammunition, fuse setting means engageable with the remaining end of the ammunition, means for moving said fuse setting means longitudinally of said tray so as to drive said stop to the rear through the interposed ammunition, and means operative upon engagement of the fuse setting means with the ammunition for setting the fuse setting means in operation.

13. In a gun, the combination of a barrel and a slide adapted to receive the barrel for movement in recoil and counter-recoil, a tray secured to said slide for receiving a round of ammunition, a forwardly positioned stop engageable with one end of the tray supported ammunition, means for locking said stop in the forward position, a fuse setting means engageable with the remaining end of the ammunition, means for moving said fuse setting means and said ammunition longitudinally of the tray so as to drive said stop to the rear through the interposed ammunition, and means operative upon engagement of the fuse setting means with the ammunition for releasing the stop locking means whereby the stop is free to move from its normally locked forward position.

14. In a gun, the combination of a barrel and a slide adapted to receive the barrel for movement in recoil and counter-recoil, said slide having trunnions thereon for permitting movement of the gun in elevation, a tray secured to the forward portion of the slide for receiving a round of ammunition, a stop movably mounted on said slide for engaging one end of the tray supported ammunition, means for locking said stop in a forward position on said slide, a fuse setting means movable lengthwise of the tray for engaging the remaining end of the ammunition means for moving said fuse setting means lengthwise of the tray, means operative upon engagement of the fuse setting means with the ammunition for releasing the stop locking means and setting the fuse setting means in operation, and means for moving the stop lengthwise along the slide as the fuse setting means moves lengthwise of the tray.

15. In a gun, the combination of a barrel and a slide adapted to receive the barrel for movement in recoil and counter-recoil, a tray secured to said slide for receiving a round of ammunition, a stop mounted on said slide for engaging one end of the ammunition, a fuse setting means movable lengthwise of the tray for engaging the remaining end of the ammunition, means including a source of hydraulic power for moving said fuse setting means lengthwise of the tray, a slotted rotatable disc connected with said stop, a detent normally engageable in the slot of said disc for locking the stop in a forward position, a piston operable by said source of power connected with said detent for withdrawing the detent from the slot, a release valve for said stop, a lever pivotally mounted on said tray with one of its arms arranged to be depressed by the movable fuse setting means upon engagement of the ammunition therewith and with its remaining arm connected to open the valve upon depression of the first mentioned arm, and a hydraulic control circuit including said source, the piston and valve, the valve in its open position being arranged to port control pressure from the source to the piston to cause the piston to withdraw the detent from the slotted disc and release the stop.

16. In a gun, the combination of a barrel and a slide adapted to receive the barrel for movement in recoil and counter-recoil, a tray secured to said slide for receiving a round of ammunition, a stop mounted on said slide for engaging one end of the ammunition, means for moving said stop longitudinally of the slide, a fuse setting means movable lengthwise of the tray for engaging tne remaining end of the ammunition, means for moving said fuse setting means lengthwise of the tray, a slotted rotatable disc connected with said fuse setting means, a detent normally engageable in the slot of said disc for locking the fuse setting means against any setting operation and a lever pivotally mounted on said tray, one arm of said lever being arranged to be depressed by the movable fuse setting means upon the engagement of the ammunition therewith and the remaining arm of said lever being connected to withdraw the detent from the slotted disc and unlock the fuse setting means upon depression of the first mentioned arm.

17. In a gun, the combination of a barrel and a slide adapted to receive the barrel for movement in recoil and counter-recoil, a tray secured to said slide for receiving a round of ammunition, a stop mounted on said slide for engaging one end of the tray supported ammunition, means for locking said stop in a forward position on said slide, a fuse setting means movable lengthwise of the tray for engaging the remaining end of the ammunition, means for moving said fuse setting means lengthwise of the tray so as to drive the stop to the rear through the interposed ammunition, and means operative upon engagement of the fuse setting means with the ammunition for releasing the locking means to unlock the stop and setting the fuse setting means in operation, said releasing and setting means including a control circuit and a lever actuatable by the fuse setting means for rendering the control circuit operative to initiate the fuse setting operation.

18. In a gun, the combination of a barrel and a slide adapted to receive the barrel for movement in recoil and counter-recoil, a loading tray secured to said slide for receiving a cartridge case, a stop engageable with one end of the cartridge case, means for locking said stop in a predetermined position, a projectile tray movable longitudinally of said loading tray for receiving a projectile to contact with the cartridge case, means for locking set projectile tray in its forward position, a fuse setting means secured to the projectile tray for driving the stop to the rear through the interposed ammunition and engageable with the projectile nose after release of the tray, a source of hydraulic power, a hydraulic motor connected to the projectile tray, a loaded pump connected to be driven by said stop, control units for said motor and pump, means including valves in the respective control units for releasing the projectile tray locking means and the stop locking means from their locked positions, means for shifting the valve in the motor control unit to release the projectile tray and port fluid pressure from the source to the motor, and means operative upon engagement of the fuse setting means with the projectile for shifting the valve of the pump control unit to release the stop locking means and connect the pump in circuit with the motor.

19. In a gun, the combination of a barrel and a slide adapted to receive the barrel for movement in recoil and counter-recoil, a tray secured to said slide for receiving a round of ammunition, a stop and fuse setting means engageable with the respective ends of the ammunition for moving the same to the rear, means for locking the fuse setting means in a forward position, means including a source of hydraulic power for releasing the fuse setting means from its locked position and for moving the same to the rear to engage the ammunition, means for locking the stop at a forward position, and means operative upon engagement of the fuse setting means with the ammunition for releasing the stop from its locked position so that the stop is moved to the rear through movement of the fuse setting means and the ammunition by said releasing and moving means, said last mentioned means including a hydraulic control circuit, a valve in said control circuit and a lever connected to shift the valve to a pressure porting position to actuate the fuse setting means from said source, the lever being mounted on said tray and arranged for actuation by engagement with the fuse setting means.

20. In a gun, the combination of a barrel and a slide adapted to receive the barrel for movement in recoil and counter-recoil, said slide having trunnions thereon for permitting movement of the gun in elevation, a loading tray secured to said slide for receiving a cartridge case, a stop engageable with one end of the cartridge case, a projectile tray movable lengthwise of said loading tray for receiving a projectile for contact with the cartridge case, a housing integral with said loading tray, a chain and sprocket within said housing for imparting movement to the projectile tray, means for driving said chain and sprocket to move the projectile tray, a fuse setting means secured to the projectile tray so that the fuse setting means and the ammunition moves to the rear with the projectile tray to thereby move the stop to the rear through the interposed cartridge case and projectile, a rotatable shaft supported longitudinally of the loading tray for driving the fuse setting means to set the fuse of the projectile, and means for rotating the shaft, the shaft being in continuous engagement with the fuse setting means in its positions lengthwise of the loading tray.

21. In a gun, the combination of a barrel and a slide adapted to receive the barrel for movement in recoil and counter-recoil, said slide having trunnions thereon for permitting movement of the gun in elevation, a loading tray secured to said slide for receiving a round of ammunition, a transversely movable tray mounted on said slide for receiving ammunition from the loading tray, at a position at the rear thereof, means for moving the transversely movable tray and the ammunition transversely of the gun to a ramming position in alignment with the bore of the barrel, a stop engageable with one end of the ammunition, a fuse setting means engageable with the remaining end of the ammunition, means for moving the fuse setting means and the ammunition engaged thereby to the rear of said loading tray to thus move the stop to the rear through the interposed ammunition, and a shaft supported by and extending longitudinally of the loading tray for driving the fuse setting means to set the fuse of the projectile as the ammunition moves to the rear of the loading tray, means for rotating the shaft as the ammunition is moved to the rear, and means for continuing the fuse setting operation after the ammunition has been moved into the transversely movable tray.

22. In a gun, the combination of a barrel and a slide adapted to receive the barrel for movement in recoil and counter-recoil, a loading tray secured to said slide for receiving a round of ammunition, a transversely movable tray mounted on said slide for receiving ammunition from the loading tray at a position at the rear thereof, means for moving said transversely movable tray from said position transversely of the gun to a ramming position in alignment with the bore of the barrel, a stop engageable with one end of the ammunition, a member engageable with the remaining end of the ammunition, projectile tray means for moving said member and the ammunition engaged thereby to the rear to thus move the stop to the rear through the interposed ammunition, said member being secured to said last-mentioned means, means operable to lock the stop when the member has moved to a rear position to deposit the ammunition in the transversely movable tray, means for withdrawing the member from the ammunition and moving the member forward, and means operable upon withdrawal of the member from the ammunition for releasing the stop.

23. In a gun, the combination of a barrel and a slide adapted to receive the barrel for movement in recoil and counter-recoil, a loading tray secured to said slide for receiving a round of ammunition, a transversely movable tray mounted on said slide for receiving ammunition from the loading tray at a position at the rear thereof, means for moving said transversely movable tray from said position transversely of the gun to a ramming position in alignment with the bore of the barrel, a stop engageable with one end of the ammunition, a member engageable with the remaining end of the ammunition, projectile tray means for moving said member and the ammunition engaged thereby to the rear to thus move the stop to the rear through the interposed ammunition, said member being secured to said last-mentioned means, means operable to withdraw said member from the ammunition and to move the member forward, and means for preventing withdrawal of the member from the ammunition until after said member has moved forward sufficiently to deposit the ammunition in the transversely movable tray.

24. In a gun, the combination of a barrel and a slide adapted to receive the barrel for movement in recoil and counter-recoil, said slide having trunnions for permitting elevation of the gun, a loading tray secured to said slide for receiving a round of ammunition, a plurality of transversely movable trays mounted on said slide for receiving ammunition from the loading tray and an ejected cartridge case from the gun, means for moving said trays as a unit laterally of the gun from a position in which a first of said trays is aligned with said loading tray to receive a round of ammunition therefrom to a ramming position in which said first tray is in alinement with the bore of the barrel, a stop engageable with one end of the ammunition, a member engageable with the remaining end of the ammunition, projectile tray means for moving the member and the ammunition engaged thereby to the rear to thus move the stop to the rear through the interposed ammunition to deposit the ammunition in said first tray, said member being secured to said last-mentioned means, means operable to withdraw said member from the ammunition and to move the member forward, and means for ramming said ammunition into the bore, means for firing said ammunition, means for ejecting the empty cartridge case into a second of said transversely movable trays, and means for preventing withdrawal of said member until the cartridge case has been ejected into the second of said transversely movable trays.

25. In a gun, the combination of a barrel and a slide adapted to receive the barrel for movement in recoil and counter-recoil, said slide being provided with trunnions for permitting elevation of the gun, a loading tray secured to said slide for receiving a round of ammunition, a transversely movable tray mounted on said slide for receiving ammunition from the loading tray at a position at the rear thereof, means for moving said transversely movable tray from said position to a ramming position in alignment with the bore of the barrel, a stop engageable with the cartridge case of the round, a projectile tray movable longitudinally of said loading tray into the transversely movable tray for receiving the projectile of the round for contact with the cartridge case, means for moving the projectile tray and the ammunition carried thereby longitudinally of the loading tray, a member secured to the projectile tray so that said member is moved to the rear with the projectile tray thus moving the stop to the rear through the interposed ammunition, and means for withdrawing the projectile tray from said transversely movable tray and moving the projectile tray forward in the loading tray, and interlocking means for preventing movement of the transversely movable tray with the round of ammunition to the ramming position until after the projectile tray has been withdrawn from the transversely movable tray.

26. In a gun, the combination of a barrel and a slide adapted to receive the barrel for movement in recoil and counter-recoil, said slide being provided with trunnions for permitting elevation of the gun, a loading tray secured to said slide for receiving a round of ammunition, a transversely movable tray mounted on said slide for receiving ammunition from the loading tray at a position at the rear thereof, means for moving said transversely movable tray from said position to a ramming position in alignment with the bore of the barrel, a stop engageable with one end of the ammunition, a member engageable with the remaining end of the ammunition, means for moving said member and the ammunition engaged thereby to the rear to thus move the stop to the rear through the interposed ammunition, a drive unit for said member including blocking, reversing and acceleration valves, a driven unit connected to be driven by said stop and including a control selector valve for establishing a series connection between the two units, a first control circuit including portions of the blocking and acceleration valves for shifting the control selector valve to sever the series connection between the two units, a second control circuit operative upon shifting of the control selector valve for actuating the blocking and reversing valves to reverse the direction of drive of the drive unit, and interlocking means for rendering the first mentioned control circuit operative to shift the control selector valve after the member has moved to deposit the ammunition in the transversely movable tray.

27. In a gun, the combination of a barrel and a slide adapted to receive the barrel for movement in recoil and counter-recoil, a loading tray secured to said slide for receiving a round of ammunition, a carriage mounted on said slide including a tray for receiving ammunition from the loading tray and a reciprocating tray movable with said barrel for receiving an ejected cartridge case, means for moving the carriage transversely of the gun so that the ammunition receiving tray moves from a position in alignment with the loading tray to a ramming position in alignment with the bore of the barrel and the reciprocating tray moves from a position in alignment with the bore of the barrel to a position on the opposite side of the slide from the loading tray, a stop engageable with one end of the ammunition, a member engageable with the remaining end of the ammunition, a drive unit connected with said member for moving the member and the ammunition engaged thereby from the loading tray into the ammunition receiving tray of the carriage, a source of hydraulic power for said drive unit, means enabling said stop to be moved to the rear through the interposed ammunition as the stop moves to the rear, a pivotal member mounted on the reciprocating carriage tray for locking the ejected cartridge case in place, a valve secured to said slide adjacent the carriage, means actuatable by said pivotal member attending the locking of the ejected cartridge case for shifting said valve to a pressure porting position to admit pressure from the source to the drive unit, and means operable to reverse the direction from the source to drive of said unit for withdrawing said member from the ammunition, the said means including a control circuit in which the aforesaid valve is disposed.

28. In a gun, the combination of a barrel and a slide adapted to receive the barrel for movement in recoil and counter-recoil, a loading tray secured to said slide for receiving a round of ammunition, a carriage mounted on said slide including a tray for receiving ammunition from the loading tray and a reciprocating tray movable with said barrel for receiving an ejected cartridge case, means for moving the carriage transversely of the gun so that the ammunition receiving tray moves from a firing position in alignment with the loading tray to a ramming position in alignment with the bore of the barrel and the reciprocating tray moves from the firing position in alinement with the bore of the barrel to the ramming position on the opposite side of the slide from the loading tray, a stop engageable with the cartridge case of the round, a projectile tray movable longitudinally of said loading tray into the first carriage tray for receiving the projectile of the round for contact with the cartridge case, a member secured to the projectile tray for engaging the nose of the projectile, a drive unit connected with the projectile tray for moving the projectile tray and the round of ammunition from the loading tray into the first tray of the traverse carriage, means enabling the stop to be moved to the rear through the interposed ammunition as the projectile tray and the member are moved to the rear, a source of hydraulic power connected to said drive unit, a pivotal member mounted on the reciprocating carriage tray for locking the ejected cartridge case in place, a valve secured to said slide adjacent the carriage, means actuatable by said pivotal member attending the locking of an ejected cartridge case for shifting said valve to a pressure porting position to admit pressure from said source to said drive unit, means including said valve for reversing the direction from the source to drive of said unit to withdraw the projectile tray from the ammunition, interlocking means for preventing movement of the carriage from the firing position to the ramming position until after the projectile tray has withdrawn from the ammunition receiving tray.

29. In a gun, the combination of a slide, a traverse tray mounted on said slide for receiving an ejected cartridge case from the gun, hydraulic means for moving said tray and the ejected cartridge case to a predetermined position, a member pivotally secured to the tray for locking the ejected cartridge case in the tray, a hydraulic interlock valve secured to said slide adjacent the traverse tray for controlling fluid pressure to said hydraulic means, and a linkage including an energy storage mechanism actuatable by said pivotal member for shifting the interlock valve to a pressure porting position, to admit pressure to the hydraulic means to move the tray, the said mechanism including a relatively movable piston and cylinder and a spring interposed therebetween for momentarily storing some of the energy of the ejected cartridge case to aid in shifting said valve.

30. In a gun, including a barrel and a slide adapted to receive the barrel for movement in recoil and counter-recoil, a tray for receiving an ejected cartridge case from the gun, driving means for moving said tray transversely of the gun from a position in alignment with the bore of the barrel to a position laterally thereof, a member pivotally secured to the tray for locking the ejected case in the tray, a hydraulic interlock valve secured to said slide, a source of hydraulic pressure, means controlled by the interlock valve in a pressure blocking position for locking the tray in alignment with the bore of the barrel by blocking pressure from the source to said driving means, a carriage mounted lever for shifting the interlock valve to a pressure porting position to admit pressure from the source to the driving means to move the tray, a carriage mounted bell crank actuatable by the pivotal member during the locking of the ejected case, and a mechanism interconnecting said lever and bell crank for momentarily storing some of the kinetic energy of the ejected cartridge case, the said mechanism including a cylinder movable with said bell crank, a piston connected with said lever and a spring interposed between the piston and a wall of the cylinder for storing some of the energy to be used in shifting the interlock valve to the pressure porting position.

31. In a gun, the combination of a barrel and a slide adapted to receive the barrel for movement in recoil and counter-recoil, said slide being provided with trunnions to permit movement of the gun in elevation, a loading tray secured to said slide for receiving a round of ammunition, a transversely movable tray mounted on said slide for receiving ammunition from the loading tray at a position at the rear thereof, means for moving said transversely movable tray from said position to a ramming position in alignment with the bore of the barrel, the moving means including a source of hydraulic power and a first drive unit for said transversely movable tray including valves for controlling the supply of motive fluid from the source to the unit and its direction of drive, means including a tray movable longitudinally of said loading tray into the transversely movable tray for depositing the ammunition therein, a second drive unit for withdrawing said longitudinally movable tray from the ammunition, an interlock valve for controlling pressure from the source to each of said drive units, means including the interlock valve for preventing the admission of pressure from said source to the first drive unit until after withdrawal of the longitudinally movable tray from the transversely movable tray, and a control circuit including the interlock valve for shifting the valves of the first mentioned drive unit to initiate movement of the transversely movable tray towards the ramming position after the longitudinally movable tray has moved forward a predetermined distance.

32. In a gun, the combination of a barrel and a slide adapted to receive the barrel for movement in recoil and counter-recoil, said slide being provided with trunnions to permit movement of the gun in elevation, a loading tray secured to said slide for receiving a round of ammunition, a transversely movable tray mounted on said slide for receiving ammunition from the loading tray at a position at the rear thereof, means including a source of hydraulic power for moving said transversely movable tray from the position at the rear of the loading tray transversely of the gun to a ramming position in alignment with the bore of the barrel, the moving means including a first drive unit in circuit with said source, means including a tray movable longitudinally of said loading tray into the transversely movable tray for depositing the ammunition therein, a second drive unit in circuit with said source for withdrawing said longitudinally movable tray from the ammunition, an interlock valve in the circuits between the source and each of said drive units, a bell crank for shifting said valve, a cam driven by the second unit for actuating said bell crank to shift the valve, means for preventing the shifting of said valve until after the withdrawal of the longitudinally movable tray from the transversely movable tray, and a control circuit including the interlock valve for setting the first drive unit in operation to move the transversely movable tray to the ramming position after the second drive unit has moved the longitudinally movable tray forward a predetermined distance.

33. In a gun, the combination of a barrel and a slide adapted to receive the barrel for movement in recoil and counter-recoil, said slide being provided with trunnions to permit movement of the gun in elevation, a loading tray secured to the forward portion of the slide for receiving a round of ammunition, a transversely movable tray mounted on said slide for receiving ammunition from the loading tray at a position at the rear thereof, means including a source of hydraulic power for moving the ammunition from a forward position in said loading tray to the rear and depositing it in the transversely movable tray, a normally forwardly positioned stop engageable with the ammunition and movable to a rear position with the ammunition during its movement along the loading tray to the transversely movable tray, a drive unit including said source for moving said transversely movable tray and the ammunition deposited therein from the position at the rear of the loading tray to a ramming position in alignment with the bore of the barrel, an interlock valve shiftable to a pressure porting position by said drive unit, means for preventing the shifting of said interlock valve until after the said transversely movable tray has moved the ammunition toward the ramming position to prevent interference with the stop, a drive unit driven by said source for moving said stop and including a reversing valve for controlling the direction of movement of said stop, means for rendering the preventing means inoperative after the transversely movable tray has moved the ammunition laterally for a predetermined distance to remove the ammunition from the forward path of movement of the stop, and a control circuit including the interlock valve for shifting the reversing valve of the last mentioned drive unit to return the stop to its forward position.

34. In a gun, the combination of a barrel and a slide adapted to receive the barrel for movement in recoil and counter-recoil, said slide being provided with trunnions to permit movement of the gun in elevation, a loading tray secured to the forward portion of the slide for receiving a round of ammunition, a transversely movable tray mounted on said slide for receiving and moving ammunition from the loading tray at a position at the rear thereof, means including a source of hydraulic power for moving the transversely movable tray laterally of the gun from the position at the rear of the loading tray to a ramming position in alignment with the bore of the barrel, means including a tray movable longitudinally of said loading tray into the transversely movable tray for transferring the ammunition from the loading tray to the transversely movable tray, a normally forwardly positioned stop for engaging the ammunition during its movement along the loading tray to the transversely movable tray, drive units connected to said source for the transversely movable tray, the longitudinally movable tray and the stop, a first control circuit interconnecting the stop drive unit and the drive unit for the longitudinally movable tray for setting the latter unit in operation to withdraw the tray from the transversely movable tray, a second control circuit interconnecting the stop drive unit and the drive unit for the transversely movable tray for automatically setting the latter unit in operation to move the transversely movable tray to the ramming position, means for preventing the operation of said second control circuit until after the movable tray has withdrawn from the transversely movable tray, a third control circuit interconnecting the drive unit for the transversely movable tray and the stop drive unit for automatically setting the latter unit in operation to return the stop to a forward position, means for preventing operation of the third control circuit until after the transversely movable tray has moved the ammunition laterally out of the path of movement of the stop to prevent interference therewith, a valve in the stop drive unit shiftable to port control pressure from the source along said first mentioned control circuit, and a control circuit including a manually actuatable valve for shifting the valve of the stop drive unit to a pressure porting position.

35. In a gun, the combination of a barrel and a slide adapted to receive the barrel for movement in recoil and counter-recoil, said slide being provided with trunnions for permitting movement of the gun in elevation, a loading tray secured to said slide for receiving a round of ammunition, a transversely movable tray mounted on said slide for receiving ammunition from the loading tray at a position at the rear thereof, means for moving the transversely movable tray laterally of the gun from the position at the rear of the loading tray in which the transversely movable tray is in alignment with said loading tray to a ramming position in which the transversely movable tray is aligned with the bore of the barrel, means including a stop and a tray movable longitudinally of said loading tray into the transversely movable tray for transferring the ammunition from the loading tray to the transversely movable tray, a drive unit for moving said longitudinally movable tray lengthwise of the loading tray, interlock means for preventing the operation of said drive unit until the transversely movable tray is aligned with the longitudinally movable tray to permit entry of the longitudinally movable tray; and means operable to set the drive unit in operation as soon as the loading and the transversely movable trays are aligned.

36. In a gun, the combination of a barrel and a slide adapted to receive the barrel for movement in recoil and counter-recoil, said slide being provided with trunnions for permitting movement of the gun in elevation, a loading tray secured to said slide for receiving a round of ammunition, a transversely movable tray mounted on said slide for receiving ammunition from the loading tray at a position at the rear thereof in which the transversely movable tray is alined with the loading tray, means including a stop and a tray movable longitudinally of said loading tray into the transversely movable tray for transferring ammunition from the loading tray to the transversely movable tray, a first drive unit for said transversely movable tray including blocking and acceleration valves and a source of hydraulic power, said first drive unit being operable to move the transversely movable tray and the ammunition deposited therein from its position in alinement with the loading tray to a ramming position in alinement with the bore of the barrel, a second drive unit for said longitudinally movable tray including said source, a control circuit including a manually actuatable valve and portions of the blocking and acceleration valves for setting said second drive unit in operation, and interlock means for rendering the said control circuit operable by the manually actuatable valve only when the loading and the transversely movable trays are aligned to permit entry of the longitudinally movable tray into the transversely movable tray.

37. In a gun, the combination of a barrel and a slide adapted to receive the barrel for movement in recoil and counter-recoil, a loading tray secured to said slide for receiving a round of ammunition, a transversely movable tray mounted on said slide for receiving ammunition from the loading tray at a position at the rear thereof in which the transversely movable tray is alined with the loading tray, means for moving the transversely movable tray and the ammunition deposited therein from its position in alinement with the loading tray to a ramming position in alinement with the bore of the barrel, a stop engageable with one end of the ammunition, a tray longitudinally movable along said loading tray and a member engageable with the remaining end of the ammunition, a drive unit for moving said longitudinally movable tray lengthwise of the loading tray to thereby move the stop to the rear through the interposed ammunition, a unit connected to be driven by said stop, a control circuit including a manually actuatable valve for setting said drive unit in operation, interlock means for preventing said control circuit from energizing the drive unit until the loading and the transversely movable trays are aligned to permit entry of the movable tray into the said tray, and means operative upon engagement of said member with the ammunition for connecting the two units in series circuit.

38. In a gun, the combination of a barrel and a slide adapted to receive the barrel for movement in recoil and counter-recoil, a loading tray secured to the forward portion of the slide for receiving a round of ammunition, a transversely movable tray mounted on said slide for receiving ammunition from the loading tray at a terminal position at the rear thereof, a motor connected to drive said transversely movable tray between the loading tray and a second terminal position in alinement with the gun barrel, a pair of high speed discs and a low speed cam disc connected to be driven by said motor, detents arranged for engagement with said pair of high speed discs for locking the discs to thereby lock the motor and the transversely movable tray in either of its terminal positions, and a linkage operable by said low speed cam disc for holding the detents out of engagement with the pair of high speed discs to permit the motor to move the transversely movable tray until a predetermined number of revolutions of the high speed discs has elapsed.

39. In a gun, the combination of a barrel and a slide adapted to receive the barrel for movement in recoil and counter-recoil, a loading tray secured to the forward portion of the slide for receiving a round of ammunition, a transversely movable tray mounted on said slide for receiving ammunition from the loading tray at a position at the rear thereof in which the transversely movable tray is alined with the loading tray, means for moving the transversely movable tray from said position to a ramming position in alinement with the gun barrel, and means for accurately aligning and locking said transversely movable tray in place with either the loading tray or the gun barrel, the said means including a motor and a low speed disc connected to be driven by the motor and rotatable through a predetermined angle, a pair of high speed discs connected to the motor and rotatable through a predetermined number of whole revolutions in addition to said predetermined angle said discs having slots therein and a pair of detents one of which is arranged for cooperation with the slot of one of said high speed discs to lock the disc and the motor connected thereto to thereby lock the transversely movable tray in its position in alinement with the loading tray, and the other of which cooperates with the slot of the other high speed disc to lock the transversely movable tray in alinement with the barrel.

40. In a drive control unit for controlling the speed and direction of rotation of a hydraulic motor which is driven by a source of hydraulic power, a blocking valve in the circuit between the source and the motor for admitting fluid pressure to the motor, an acceleration valve for controlling the amount of fluid admitted to said motor to thereby control its speed of rotation, a venting valve operable to either port fluid to or vent fluid from one end of the blocking valve to thereby open the blocking valve or permit it to close, means for closing the blocking valve when the venting valve is in position to vent fluid from said one end, a control circuit including the acceleration valve for admitting fluid pressure from the source to shift the venting valve to a first position to port fluid to said one end of the blocking valve, and an exhaust circuit including the acceleration valve for permitting the shifting of the venting valve to a second position by fluid pressure from said source to vent fluid from the said end of the blocking valve, the exhaust circuit being established by the acceleration valve shortly before the blocking valve is ready to close to thus insure a subsequent rapid closure of the blocking valve.

41. In a drive control unit adapted to be inserted between a source of hydraulic power and a hydraulic motor for controlling the speed of the motor, a blocking valve for opening and closing the hydraulic circuit between the source and the motor to admit or block fluid pressure to the motor, a venting valve for venting fluid from one end of the blocking valve when the blocking valve is moved to its pressure admitting position, an acceleration valve for controlling the amount of fluid admitted to the motor, fluid pressure operated means for shifting the venting valve, means for shifting the blocking valve to its pressure blocking position, and an exhaust circuit including the acceleration valve for permitting the shifting of the venting valve to its venting position by the pressure operated means, the exhaust circuit being established by the acceleration valve shortly before the blocking valve is shifted to its pressure blocking position to thus insure a subsequent rapid shifting of the blocking valve.

42. In a gun, the combination of a barrel and a slide adapted to receive the barrel for movement in recoil and counter-recoil, a tray mounted on said slide for receiving and transferring ammunition from a position at one side of the gun transversely thereof to a position of alignment with the gun barrel, a source of hydraulic power a drive unit for said tray including blocking and acceleration valves for controlling the supply of fluid from the source to the unit, a rammer for said ammunition, a drive unit for said rammer including a hydraulic circuit from the source to the rammer drive unit a control circuit including a manually actuatable valve inserted in the hydraulic circuit from the source to the rammer drive unit for admitting fluid pressure thereto and portions of the blocking and acceleration valves for setting the rammer drive unit in operation to ram the ammunition into the gun, and means for preventing the actuation of said manually actuatable valve and hence for preventing the operation of the rammer drive unit until the tray is aligned with the bore of the barrel.

43. In a gun, the combination of a barrel and a slide adapted to receive the barrel for movement in recoil and counter-recoil, means including a tray mounted on said slide for receiving and transferring ammunition from a position at one side of the gun transversely thereof to a position of alignment with the gun barrel, a source of hydraulic power a rammer for ramming said ammunition into the gun, a drive unit for said rammer including a hydraulic motor and a reversing valve for controlling the direction of drive from the source to said motor, a control circuit for porting fluid pressure to one end of the reversing valve to shift the same to a position for admitting fluid pressure to the drive unit to set the motor in operation, a spring for shifting the reversing valve from said position to a neutral position upon release of the fluid pressure from the end of the valve to block fluid pressure from the source to the motor thus terminating the operation of the drive unit, and means for rendering the said control circuit operable to effect porting of the fluid pressure to the reversing valve only upon movement of the tray into a position of alignment with the gun barrel.

44. In a gun, the combination of a barrel and a slide adapted to receive the barrel for movement in recoil and counter-recoil, said slide being provided with trunnions for permitting movement of the gun in elevation, an empty case tray secured to the forward portion of the slide, a movable tray mounted on said slide for receiving an ejected cartridge case from the gun barrel means for transferring the tray and the empty case from a position in alignment with the gun barrel to a ramming position in alignment with the empty case tray, an empty case ejector mounted on said slide for ejecting the empty case from the movable tray into the empty case tray when the movable tray is in its position of alinement with the empty case tray, initiating means actuated by the movable tray transferring means for setting the ejector in operation to eject the empty case into the empty case tray, and interlocking means for preventing the actuation of said initiating means until after the tray has moved into a position of alignment with the empty case tray.

45. In a gun, the combination of a barrel and a slide adapted to receive the barrel for movement in recoil and counter-recoil, an empty case tray secured to the forward portion of the slide, a movable tray mounted on said slide for receiving and moving an ejected cartridge case from a position in alignment with the gun barrel to a position of alignment with the empty case tray, a source of hydraulic power a drive unit for said traverse tray including valves for controlling the supply of motive fluid from the source to the unit and its speed of operation, an empty case ejector mounted on said slide, a drive unit for said empty case ejector, a control circuit including a manually actuatable valve and portions of the aforesaid valves for admitting fluid pressure from the source to set the ejector drive unit in operation to eject the empty case into the empty case tray, said manually actuable valve bing operable to effect operation of said control circuit only after the movable tray occupies a position in alignment with the empty case tray, and interlocking means for rendering the manually actuatable valve ineffective to actuate said control circuit until the empty case tray and the movable tray are alined.

46. In a gun, the combination of a barrel and a slide adapted to receive the barrel for movement in recoil and counter-recoil, a carriage mounted on said slide, means including a tray mounted on the carriage for transferring a cartridge case and projectile from a loading position at one side of the gun to a position of alignment with the gun barrel, a pair of members pivotally mounted on the carriage tray for engaging opposite sides of the projectile forwardly of the rotating band and mechanism for automatically withdrawing said members to a non-obstructing position upon alignment of the carriage tray with the gun barrel, the said mechanism including a linkage interconnecting said members and provided with a cam follower on the under side of the carriage, and a cam mounted on said slide for engagement with the cam follower so that the linkage and the members interconnected thereby may be released only when the carriage tray is alined with the gun barrel.

47. In a gun, the combination of a barrel and a slide adapted to receive the barrel for movement in recoil and counter-recoil, a carriage mounted on said slide and including a tray reciprocable with said barrel for receiving an ejected cartridge case, means for moving the carriage and the tray carrying the empty case from a position of alinement with the gun barrel to a predetermined position at one side of the gun, a member pivotally secured to the tray for locking the ejected cartridge case in the tray, and mechanism for automatically releasing the locking member after the tray has moved out of the position of alignment with the gun barrel to said predetermined position, the said mechanism including a stop mounted on said slide at said predetermined position and a lever mounted on the carriage with its arms engageable respectively with the stop and locking member to release the locking member when the carriage moves to the predetermined position.

48. In a gun, the combination of a slide, a barrel and breech block mounted on said slide for reciprocating movement, means for opening the breech block, a loading tray secured to said slide for receiving a round of ammunition, trays mounted on said slide for movement laterally thereof, one of said trays being adapted to receive ammunition from the loading tray and the other to receive an ejected cartridge case from the gun barrel when the trays are in one position, means for ejecting an empty case from the barrel into said empty case receiving tray, a stop engageable with one end of the ammunition, a fuse setting means engageable with the remaining end of the ammunition so as to set the fuse thereof, means for driving the fuse setting means to the rear to thus move the stop to the rear through the interposed ammunition to deposit the ammunition in the ammunition receiving tray, a means for reversing the direction of drive of said driving means to withdraw the fuse setting means from the ammunition, and interlocking means for preventing the reversing means from withdrawing the fuse setting means until after the fuse setting means has moved to deposit the ammunition in the one tray and set the fuse, until after the cartridge case has been ejected into the empty case receiving tray and until after the breech block has moved to an open position.

49. In a gun, the combination of a slide, a barrel and breech block mounted on said slide for reciprocating movement, means for opening the breech block, a loading tray secured to said slide for receiving a round of ammunition, a carriage movable laterally of the gun barrel, said carriage being mounted on said slide and including a first tray for receiving ammunition from the loading tray and a tray reciprocable with said barrel for receiving an extracted cartridge case, means including a source of hydraulic power for moving said carriage transversely of the gun, means for ejecting an empty cartridge case from the barrel into the reciprocable tray, a member pivotally secured to said reciprocable carriage tray for locking the extracted cartridge case in place, a hydraulic interlock valve interconnecting the source and the carriage moving means secured to said slide adjacent said carriage, a linkage actuatable by said pivotal member for shifting the interlock valve to a pressure porting position to admit pressure from the source to the carriage moving means after the empty case has been received in the reciprocable tray to pivot said pivotal member and thus actuate the linkage, a stop engageable with one end of the ammunition, fuse setting means engageable with the remaining end of the ammunition for setting the fuse thereof, means for moving the fuse setting means to the rear thus moving the stop to the rear through the interposed ammunition to deposit the ammunition in said first carriage tray, a drive unit for withdrawing said fuse setting means from the ammunition including valves for controlling the supply of motive fluid from the source to the unit and to thus control its speed of operation, a hydraulic interlock valve interconnecting the source and the driving unit and mounted on said slide adjacent said breech block, a linkage actuatable by the movement of the breech block to its open position for shifting the last mentioned hydraulic interlock valve to a pressure porting position to admit pressure from the source to the drive unit, an automatically actuatable valve for continuing the hydraulic circuit through the drive unit, means for shifting said actuatable valve automatically to port control pressure therethrough upon the completion of the setting operation, a manually actuatable valve for completing the circuit from the source through the drive unit, a control circuit including the manually actuatable valve, the interlock valves, the automatically actuatable valve and portions of the drive unit valves for setting the drive unit in operation, and means for rendering the manually actuatable valve ineffective to set the drive unit in operation until after the fuse setting means has moved to deposit the ammunition in the first carriage tray and set the fuse, until after the cartridge case has been extracted into the reciprocable carriage tray and locked in place and until after the breech block has moved to an open position.

50. In a gun, the combination of a barrel and a slide adapted to receive the barrel for movement in recoil and counter-recoil provided with trunnions for permitting movement of the gun in elevation, means including a longitudinally movable tray and stop for moving a round of ammunition from a position adjacent one of said trunnions to a position at the rear of the slide, a carriage mounted on the rearward portion of said slide including a pair of spaced trays, said carriage being movable transversely of the gun from a firing position at one side of the gun in which the first of said trays receives a round of ammunition from the ammunition moving means at the rear of the slide and the second of said trays is in alinement with the gun barrel to a ramming position in which said first tray is in alinement with the gun barrel and the second tray is positioned on the other side of the gun, a rammer for moving a round of ammunition into the gun barrel when the first tray is in alinement with the barrel, means for extracting the empty case from the barrel into the second tray, a case ejector mounted on said slide for ejecting the cartridge case from said second tray to a position adjacent the other of said trunnions, hydraulic motors connected to drive the longitudinally movable tray, carriage, rammer and case ejector, a source of hydraulic energy for said motors, control units interposed between said source and motors including valves for admitting fluid pressure to and reversing the direction of drive of said motors, manually actuatable control valves for said units, and hydraulic control circuits including said manually actuatable valves for shifting the valves of the longitudinally movable tray unit to reverse the direction of drive of the longitudinally movable tray hydraulic motor to positions to withdraw the tray from the ammunition and for selectively shifting the valves of each of the remaining units to positions for driving the carriage, the rammer and case ejector in either of two directions.

51. In a gun, the combination of a barrel and slide adapted to receive the barrel for movement in recoil and counter-recoil provided with trunnions for permitting movement of the gun in elevation, means including a longitudinally movable tray and a normally forwardly positioned movable stop which retains ammunition in the movable tray for moving a round of ammunition from a position adjacent one of said trunnions to a position at the rear of the slide, a carriage mounted on the rearward portion of said slide including a pair of spaced trays, said carriage being movable transversely of the gun from a firing position in which the first of said trays is positioned on one side of the gun to receive a round of ammunition from the ammunition moving means and the second tray is alined with the barrel of the gun to a ramming position in which the first tray is alined with the gun barrel and the second tray is positioned on the other side of the gun, a rammer for moving a round of ammunition into the gun barrel when said first tray is in alinement with the barrel, means for extracting the empty case from the barrel into the second tray, a case ejector mounted on said slide for ejecting the cartridge case from said second tray to a position adjacent the other of said trunnions, hydraulic motors connected to drive said movable tray, stop, carriage, rammer and case ejector, a source of hydraulic energy for said motors, control units interposed between said source and motors including valves for admitting fluid pressure to and reversing the direction of drive of said motors, manually actuatable control valves for the movable tray, carriage, rammer and case ejector units, hydraulic control circuits including said manually actuatable valves for shifting the valves of the movable tray unit to positions to reverse the direction of drive to the movable tray motor to withdraw the tray from the ammunition and for selectively shifting the valves of the carriage, rammer and case ejector units to positions for driving the carriage, rammer and case ejector in either of two directions, and a control circuit interconnecting the control units for the carriage and stop for shifting the reversing valve of the stop unit to reverse the direction of drive to the stop motor and return the stop to its normally forward position.

52. In a gun, the combination of a barrel and slide adapted to receive the barrel for movement in recoil and counter-recoil provided with trunnions for permitting movement of gun in elevation, means including a longitudinally movable tray and a normally forwardly positioned stop which retains ammunition in the movable tray for moving a round of ammunition from a position adjacent one of said trunnions to a position at the rear of the slide, a carriage mounted on the rearward portion of said slide including a pair of spaced trays, said carriage being movable transversely of the gun from a firing position in which the first of said trays is positioned on one side of the gun to receive a round of ammunition from the ammunition moving means and the second tray is alined with the barrel of the gun to a ramming position in which the first tray is alined with the gun barrel and the second tray is positioned on the other side of the gun, a rammer for moving a round of ammunition into the gun barrel when said first tray is in alinement with the barrel, means for extracting the empty case from the barrel into the second tray, a case ejector mounted on said slide for ejecting the cartridge case from said second tray to a position adjacent the other of said trunnions, hydraulic motors connected to drive said movable tray, stop, carriage, rammer and case ejector, a source of hydraulic energy for said motors, control units interposed between said source and motors including valves for admitting fluid pressure to and reversing the direction of drive of said motors, a manually actuatable control valve for the longitudinally movable tray operable from one side of said slide, a hydraulic control circuit including said manually actuatable valve for shifting the valves of the longitudinally movable tray control unit to positions to drive the hydraulic motors for the movable tray and the stop to move the tray and stop with the interposed ammunition to the rear, manually actuatable control valves for the movable tray, carriage, rammer and case ejector units operable from the other side of said slide, hydraulic control circuits including said last-mentioned manually actuatable valves for shifting the valves of the movable tray control unit to positions to reverse the direction of drive to the movable tray motor to withdraw the tray from the ammunition and for shifting the valves of the carriage, rammer and case ejector units to positions for driving the carriage, rammer and case ejector in either of two directions, and a control circuit interconnecting the control units for the carriage and stop for shifting the reversing valve of the stop unit to reverse the direction of drive to the stop motor and return the stop to its normally forward position.

53. The combination with a pair of three position valves including each a valve body and a spring for returning the valve body to a neutral position from a position either side thereof, of a bearing rotatably and reciprocatingly supporting a rod, a guide plate mounted on said bearing provided with a pair of transverse slots interconnected by a longitudinal slot, a lug secured to said rod and movable within the slots of the guide plate for limiting the reciprocating and rotational movements of the rod, a link engaging opposite sides of said bearing and apertured to slidably receive the rod, a control lever pivotally connected with said rod and link for shifting the reciprocating rod or rotating the rod and link as a unit about the bearing, a linkage actuatable by said reciprocating rod for shifting one of said valves from its neutral position to a position either side thereof as the lug moves from the longitudinal guide slot to engage a wall of a transverse slot, and a linkage actuatable by said link in the rotation of the rod and link as a unit about the bearing for shifting the other of said valves from its neutral position to a position either side thereof as the lug moves to engage a terminal wall of a transverse slot.

54. In a gun, the combination of a barrel and a slide adapted to receive the barrel for movement in recoil and counter-recoil provided with trunnions for permitting movement of the gun in elevation, means for moving a round of ammunition from a position adjacent one of said trunnions to a position at the rear of the slide, a carriage mounted on the rearward portion of said slide including a first tray for receiving the round of ammunition and a second tray for receiving an extracted cartridge case, means for moving said carriage transversely of the gun from a firing position in which the first of said trays is positioned on one side of the gun to receive a round of ammunition from the ammunition moving means and the second tray is alined with the barrel of the gun to a ramming position in which the first tray is alined with the gun barrel and the second tray is positioned on the other side of the gun, means for extracting the empty case from the barrel into the second tray, a rammer and case ejector mounted on said slide for ramming the ammunition into the gun barrel and for ejecting the cartridge case from the second tray to a position adjacent the other of said trunnions, a hydraulic motor connected to drive said rammer and case ejector, a source of hydraulic energy for said motor, a control unit interposed between said source and motor including valves for admitting fluid pressure to and reversing the direction of drive of said motor, a manually actuatable three-position valve for said control unit including a valve body shiftable from a neutral position to a position either side thereof, a first control circuit including said manually actuatable valve operable in a position of the valve body to one side of its neutral position for shifting the valves of the control unit to cause forward movement of the rammer and case ejector, and a second control circuit including said manually actuatable valve operable in a position of the valve body to the other side of its neutral position for shifting only the reversing valve of the control unit to cause rearward movement of the rammer and case ejector.

55. In a gun, the combination of a barrel and a slide adapted to receive the barrel for movement in recoil and counter-recoil provided with trunnions for permitting movement of the gun in elevation, means for moving a round of ammunition from a position adjacent one of said trunnions to a position at the rear of the slide, a transversely movable tray mounted on the rearward portion of said slide for receiving the round of ammunition from said ammunition moving means, said tray being movable transversely of the gun from its ammunition receiving position to a ramming position in alinement with barrel of the gun, a rammer for ramming the ammunition into the gun, hydraulic motors connected to drive said tray and rammer, a source of hydraulic energy for said motors, control units interposed between said source and motors including valves for admitting fluid pressure to and reversing the direction of drive of said motors, a pair of three-position valves for shifting the valves of the control units and means for shifting said three-position valves from their neutral positions to positions either side thereof to control the direction of drive to said motors and thus control the direction of movement of said tray and said rammer, the said last-mentioned means including a rod mounted for limited reciprocating and rotational movements and a control lever for imparting reciprocating and rotational movements to said rod.

56. In a gun, the combination of a barrel and a slide adapted to receive the barrel for movement in recoil and counter-recoil provided with trunnions for permitting movement of the gun in elevation, means including a longitudinally movable tray for transferring a round of ammunition from a position adjacent one of said trunnions to a position at the rear of the slide, a transversely movable tray mounted on the rearward portion of said slide for receiving the round of ammunition from the ammunition transferring means, said transversely movable tray being movable transversely of the gun from its ammunition receiving position to a ramming position in alinement with barrel of the gun, a rammer for ramming the ammunition into the gun when the transversely movable tray is moved to the ramming position, hydraulic motors connected to drive said trays and rammer, a source of hydraulic energy for said motors, control units interposed between said source and motors including valves for admitting fluid pressure to and reversing the direction of drive of said motors, a three-position valve for shifting the valves of the longitudinally movable tray control unit, a control lever operable from one side of the slide for shifting said three-position valve from its neutral position to positions either side thereof, a pair of three-position valves for shifting the valves of the transversely movable tray and rammer control units, and means including a control lever operable from the other side of said slide for shifting the pair of three-position valves from their neutral positions to positions either side thereof to control the direction of movement of the rammer and the transversely movable tray.

57. In a gun, the combination of a barrel and slide adapted to receive the barrel for movement in recoil and counter-recoil provided with trunnions permitting movement of the gun in elevation, means including a longitudinally movable tray and a normally forwardly positioned movable stop which retains ammunition in the tray for moving a round of ammunition from a position adjacent one of said trunnions to a position at the rear of the slide, a tray mounted on the rearward portion of said slide for receiving and moving the round of ammunition from a position at the rear of said slide transversely of the gun to a ramming position in alignment with the barrel of the gun, a rammer mounted on said slide for ramming the ammunition into the gun barrel, hydraulic motors connected to drive said trays, stop and rammer, a source of hydraulic energy for said motors, control units interposed between said source and motors including valves for admitting fluid pressure to and reversing the direction of drive of said motors, manually actuatable control valves for the tray and rammer control units, hydraulic control circuits including said manually actuatable valves for shifting the valves of the longitudinally movable tray control unit to positions to withdraw the tray from the ammunition and for shifting the valves of the tray and rammer control units to positions for driving the tray to its ramming position and the rammer in a forward direction, a hydraulic control circuit interconnecting the control units for the tray and stop for shifting the reversing valve of the stop unit to return the stop to its normally forward position, and means interlocking all of said hydraulic control circuits except that for shifting the valves of the longitudinally movable tray control unit for insuring the proper sequence of operation between the longitudinally movable tray, the tray, stop and rammer.

58. A drive unit comprising in combination a hydraulic motor, a source of hydraulic energy for said motor, a control unit interposed between said source and motor including a valve for admitting fluid pressure to said motor and a valve for reversing the direction of drive of said motor, and hydraulic control circuits for shifting said valves to the desired positions, the control circuit for said reversing valve being arranged for completion through the other of said valves after it has shifted to admit fluid pressure to the motor.

59. A drive unit comprising in combination a hydraulic motor, a source of hydraulic energy for said motor, a control unit interposed between said source and motor including a valve for admitting fluid pressure from said source to said motor and a valve for controlling the speed of operation of said motor, and mechanism controllable by said motor for shifting the last-mentioned valve in an intermittent fashion from an initial position through an intermediate position to a terminal position, the said mechanism including a spring for immobilizing said valve in its intermediate position and for shifting the valve from its initial position to its intermediate position, and means including a cam driven by said motor for shifting the valve from its intermediate position to its terminal position and for compressing the spring, the said valve providing a variable speed control for the motor in its shifting periods and a substantially constant speed control for the motor in its rest period.

60. A drive unit comprising in combination a hydraulic motor, a source of hydraulic energy for said motor a control unit interposed between said source and motor including a valve for admitting fluid pressure to said motor, a valve for reversing the direction of drive of said motor and a valve for controlling the speed of operation of said motor, hydraulic control circuits for shifting the first two valves to the desired positions, the control circuit for said reversing valve being arranged for completion through the first-mentioned valve after it has shifted to admit fluid pressure to the motor, and mechanism controllable by said motor for shifting the last-mentioned valve in an intermittent fashion, the said last-mentioned valve providing a variable speed control for the motor in its shifting periods and a substantially constant speed control for the motor in its rest period.

61. A drive unit comprising in combination a hydraulic motor, a source of hydraulic energy for said motor, a control unit interposed between said source and motor including a valve for admitting fluid pressure from said source to said motor and a valve for controlling the speed of operation of said motor, a spring for momentarily immobilizing said second-mentioned valve in its intermediate position and for shifting the valve from its initial to its intermediate position, and means including a cam driven by said motor for simultaneously compressing the spring and shifting the second-mentioned valve from its intermediate position to its terminal position, the second-mentioned valve providing a variable speed control for the motor in its shifting periods and a substantially constant speed control for the motor in its rest period.

62. A drive unit comprising in combination a hydraulic motor, a source of hydraulic energy for said motor, and a control unit interposed between said source and motor, the said control unit including a valve for admitting fluid pressure from said source to said motor, a disc provided with a slot and geared to said motor for limited rotative movement, a detent secured to said valve operable to engage the slot of the disc and to be withdrawn therefrom upon shifting the valve to an open position, and means for momentarily rotating said disc to one of its limits in the opening movement of the valve to relieve the frictional forces acting between the detent and slot and thus facilitate the withdrawal of the detent from the slot.

63. A drive unit comprising in combination a hydraulic motor, a source of hydraulic energy for said motor, and a control unit interposed between said said source and motor, the said control unit including a valve for admitting fluid pressure from said source to said motor, a reversing valve for said motor initially positioned to give a direction of drive not desired, a disc provided with a slot and geared to said motor for limited rotative movement, a detent secured to said first-mentioned valve operable to engage the slot of the disc and to be withdrawn therefrom upon shifting the valve to an open position, and a hydraulic control circuit for shifting the reversing valve to a position to give the desired direction of drive, the control circuit being arranged for completion through the first-mentioned valve after it has shifted to admit fluid pressure to the motor.

64. A drive unit comprising in combination a hydraulic motor, a source of hydraulic energy for said motor, and a control unit interposed between said source and motor, the said control unit including a valve for admitting fluid pressure from said source to said motor, a reversing valve for said motor initially positioned to give a direction of drive not desired, a disc rotatable with said motor provided with a slot operable to be engaged by a detent, a stop for limiting the rotative movement of said disc in a direction of drive not desired to relieve the frictional forces between the slot and a detent engaged therein, a detent secured to said first-mentioned valve operable to engage the slot of the disc and to be withdrawn therefrom upon shifting the valve to an open position, and a hydraulic control circuit for shifting the reversing valve to a position to give the desired direction of drive, the control circuit being arranged for completion through the first-mentioned valve after it has shifted to admit fluid pressure to the motor.

65. A drive unit comprising in combination a hydraulic motor, a source of hydraulic energy for said motor, and a control unit interposed between said source and motor, the said control unit including a valve for admitting fluid pressure from said source to said motor, a reversing valve for said motor initially positioned to give a direction of drive not desired and a valve for controlling the speed of rotation of said motor, a disc provided with a slot and geared to said motor for limited rotative movement, a detent secured to said first-mentioned valve operable to engage the slot of the disc and to be withdrawn therefrom upon shifting the valve to an open position, mechanism controllable by said motor for shifting the last-mentioned valve in an intermittent fashion, the last-mentioned valve providing a variable speed control for the motor in its shifting periods and a substantially constant speed control for the motor in its rest period, a first hydraulic control circuit for shifting said first-mentioned valve to a position for admitting fluid pressure to the motor and a second hydraulic control circuit for shifting the reversing valve to a position to give the desired direction of drive, said first-mentioned circuit being arranged for completion through said last-mentioned valve when in its initial position and the second-mentioned circuit being arranged for completion through the first-mentioned valve after it has shifted to admit fluid pressure to the motor.

66. In a gun, the combination of a barrel and a slide adapted to receive barrel for movement in recoil and counter-recoil, a rammer mounted on said slide for ramming ammunition into the gun barrel, a hydraulic motor connected to drive said rammer, a source of hydraulic energy for said motor and a control unit interposed between said source and motor, the said control unit including a valve for admitting fluid pressure from said source to said motor, a reversing valve for said motor initially positioned to give a direction of drive not desired, a disc provided with a slot and geared to said motor for limited rotative movement, a detent secured to said first-mentioned valve operable to engage the slot of the disc to prevent rotation of the motor and to be withdrawn therefrom upon movement of the valve and the detent secured thereto, to an open position, a hydraulic control circuit for porting fluid pressure to one end of the reversing valve to shift the same from the initial position to a position to cause forward movement of the rammer, and a spring for shifting the reversing valve from its last-mentioned position to a neutral position upon release of the fluid pressure from said hydraulic control circuit for terminating the operation of the motor, the said control circuit being arranged for completion through the first-mentioned valve after it has shifted to admit fluid pressure to the motor.

67. A drive unit comprising in combination a hydraulic motor, a source of hydraulic energy for said motor, and a control unit interposed between said source and motor, the said control unit including a valve for admitting fluid pressure from said source to said motor, a spring in engagement with one end of the valve for normally urging the valve to a closed position, a hydraulic circuit for porting control pressure to the other end of said valve for shifting the same to an open position to compress the spring, a disc rotatable with said motor provided with a slot operable to be engaged by a detent, a stop for limiting the rotative movement of said disc and motor after the valve has been shifted to an open position, a detent secured to said valve engageable in said slot and withdrawable therefrom upon shifting the valve to an open position, the said detent being urged into engagement with the peripheral surface of the disc by the spring after its withdrawal from the slot to thus hold the valve in an open position, a valve for reversing the direction of rotation of said motor, a first control circuit for shifting the reversing valve in the opening movement of the first-mentioned valve to initiate rotation of said motor in one direction and a second control circuit for shifting the reversing valve in the open position of the first-mentioned valve to initiate rotation of said motor in the reverse direction.

68. A drive unit comprising in combination a hydraulic motor, a source of hydraulic energy for said motor, and a control unit interposed between said source and motor, the said control unit including a valve for admitting fluid pressure from said source to said motor, a spring in engagement with one end of the valve for normally urging the valve to a closed position, a hydraulic circuit for porting control pressure to the other end of said valve for shifting the same to an open position to compress the spring, a disc rotatable with said motor provided with a slot operable to be engaged by a detent, a stop for limiting the rotative movement of said disc and motor after the valve has been shifted to an open position, a detent secured to said valve engageable in said slot and withdrawable therefrom upon shifting the valve to an open position, the said detent being urged into engagement with the peripheral surface of the disc by the spring after its withdrawal from the slot to thus hold the valve in an open position, a valve for reversing the direction of rotation of said motor, a first hydraulic circuit for porting control pressure to one end of the reversing valve to shift the same to cause rotation of the motor in one direction, a second hydraulic circuit for porting control pressure to the other end of the reversing valve to shift the same to cause rotation of the motor in the reverse direction, and a spring engageable with the last-mentioned end of said reversing valve for shifting the valve to a blocking position upon release of the fluid pressure ported by the first-mentioned hydraulic circuit, both of said hydraulic circuits being arranged for completion through the first-mentioned valve after it has been moved to an open position to port fluid pressure to the motor.

69. In a gun, the combination of a barrel and a slide adapted to receive the barrel for movement in recoil and counter-recoil, a tray and a rammer mounted on said slide, said tray being movable from a position at one side of the gun laterally thereof to transfer ammunition to a position of alignment with the gun barrel and said rammer being movable to ram the same into the barrel, means including hydraulic drive units for substantially simultaneously moving the tray to a position out of alignment with the gun barrel and for retracting the rammer, and a source of hydraulic energy including a supply tank, an accumulator for storing hydraulic energy from said source and supplying it to said drive units, said source including a pump for transferring hydraulic fluid from said supply tank to said accumulator, and valve means for rendering said pump and said accumulator jointly operable when moving the tray out of alignment with the gun barrel and retracting the rammer.

70. In a gun, the combination of a barrel and a slide adapted to receive the barrel for movement in recoil and counter-recoil, a tray movable from a position at one side of the gun transversely thereof to a position in alignment with the barrel to move the ammunition into a position opposite the barrel and a rammer mounted on said slide for effecting movement of the ammunition from the tray and ramming it into the gun barrel, moving means including hydraulic drive units and a source of hydraulic energy therefor for successively moving said tray into alinement with the gun barrel and the rammer in a direction to effect ramming, means for causing said moving means to reverse direction to thereby simultaneously retract the rammer and move the tray out of alinement with the gun barrel, and control means interconnecting said source and said drive units for supplying a variable amount of energy to said units which increases with the simultaneous movement of said tray and rammer.

71. In a gun, the combination of a barrel and a slide adapted to receive the barrel for movement in recoil and counter-recoil provided with trunnions for permitting movement of the gun in elevation, means including a longitudinally movable tray and stop for moving a round of ammunition from a position adjacent one of said trunnions to a position at the rear of the slide, a transversely movable tray operable to receive and move a round of ammunition from said position at the rear of the slide transversely of the gun to a ramming position in alignment with the barrel and a rammer mounted on said slide for moving the round of ammunition from said tray when in alignment with the barrel into the gun barrel, means including a first hydraulic drive unit for withdrawing said longitudinally movable tray from the transversely movable tray, means including a second hydraulic drive unit for moving the stop to a forward position when the ammunition is moved transversely out of the path of movement of the stop by the transversely movable tray, means including a third hydraulic drive unit for moving the transversely movable tray from its position at the rear of the slide to the ramming position, means operable in succession with the transversely movable tray moving means for moving the rammer in a direction to effect ramming of the ammunition after the withdrawal of the longitudinal movable tray, control means for jointly energizing the rammer moving means and the transversely movable tray moving means so that the transversely movable tray is moved out of the ramming position and the rammer is retracted upon completion of the ramming stroke, a source of hydraulic energy common to all of said moving means and connected to the drive units thereof, and means for causing said source to supply a variable amount of energy to meet the load imposed by the joint movement of the trays and stop and by the joint movement of the traverse tray and rammer.

72. In a gun, the combination of a barrel and a slide adapted to receive the barrel for movement in recoil and counter-recoil provided with trunnions for permitting of the gun in elevation, means including a longitudinally movable tray and stop for moving a round of ammunition from a position adjacent one of said trunnions to a position at the rear of the slide, a carriage mounted on the rearward portion of said slide including a first tray for receiving said first-mentioned tray and a second tray for receiving an extracted cartridge case, said carriage being movable from a firing position in which said trays are respectively in alignment with the longitudinally movable tray and in alignment with the barrel transversely of the gun to a ramming position in which said trays are positioned respectively in alignment with the barrel and on the opposite side of the gun from the longitudinally movable tray, a rammer and a case ejector mounted on said slide for moving the ammunition from its position in the tray when in alignment with the barrel into the gun and for ejecting the empty cartridge case from the second of said trays when the carriage is in the ramming position, means for withdrawing said longitudinally movable tray from the first of said carriage trays, means for moving the stop to a forward position when the ammunition of the carriage tray has been moved transversely of the gun out of the path of movement of the stop, means for moving the carriage, means for moving the rammer, means for moving the case ejector, and control means for causing successive movement of the carriage and the rammer and case ejector in predetermined directions after withdrawal of the longitudinally movable tray and for causing joint movement of the carriage, rammer and case ejector in reverse directions upon completion of the ramming stroke.

73. In a gun, the combination of a barrel and a slide adapted to receive the barrel for movement in recoil and counter-recoil provided with trunnions for permitting movement of the gun in elevation, means including a longitudinally movable tray and stop for moving a round of ammunition from a position adjacent one of said trunnions to a position at the rear of the slide, a carriage mounted on the rearward portion of said slide including a first tray for receiving said longitudinally movable tray and a second tray for receiving an extracted cartridge case said carriage being movable from a position in which said trays are respectively opposite one trunnion and the barrel transversely of the gun to a position in which said trays are respectively opposite the barrel and the other trunnion, a rammer and a case ejector mounted on said slide for moving the ammunition from said tray when in alignment with the barrel into the gun and for ejecting the empty cartridge case from the second of said trays when the carriage is in the ramming position, means including a first hydraulic drive unit for withdrawing said longitudinally movable tray from the first carriage tray, means for moving the stop to a forward position when the ammunition of the carriage tray has been moved transversely of the gun out of the path of movement of the stop, means including a second hydraulic drive unit for moving the carriage, means including a third hydraulic unit for moving the rammer and case ejector in a predetermined direction after withdrawal of the longitudinally movable tray and control means for causing successive movement of the carriage, the rammer and case ejector in predetermined sequence and in predetermined directions, respectively, and for jointly moving the carriage, rammer and case ejector in the reverse direction upon completion of the ramming stroke, and a source of hydraulic energy common to all of said moving means and connected to the drive units thereof, and means for causing said source to supply a variable amount of energy to meet the load imposed by the joint movement of the longitudinally movable tray, carriage and stop and by the joint movement of the carriage, rammer and case ejector.

74. In a gun, the combination of a slide provided with trunnions, a barrel and breech block reciprocably disposed in relation to the slide, means including a longitudinally movable tray and stop for moving a round of ammunition from a position adjacent one of said trunnions to a position at the rear of the slide, a carriage movable laterally of the barrel said carriage being mounted on the rearward portion of said slide including a first tray for receiving said longitudinally movable tray and a second tray for receiving an extracted cartridge case, a rammer and a case ejector mounted on said slide for ramming the ammunition into the gun barrel and for ejecting the cartridge case to a position adjacent the other of said trunnions when moved by the carriage to a ramming position in which said first tray is alined with the bore of the barrel and the second tray is positioned on the opposite side of the gun from the longitudinally movable tray, means for withdrawing said longitudinally movable tray from the first carriage tray, means for moving the stop to a forward position when the ammunition of the first carriage tray has been moved transversely of the gun out of the path of movement of the stop, means for moving the carriage, means for moving the rammer and the case ejector, means for moving the breech block, and control means for causing successive movement of the carriage and the rammer and case ejector in predetermined directions and in predetermined sequence after withdrawal of the longitudinally movable tray and means for energizing the control means to cause joint movement of the carriage, rammer and case ejector in reverse directions from said predetermined directions and closing the breech block.

75. In a gun, the combination of a slide provided with trunnions, a barrel and breech block reciprocably disposed in relation to the slide, means including a longitudinally movable tray and stop for moving a round of ammunition from a position adjacent one of said trunnions to a position at the rear of the slide, a carriage movable laterally of the barrel, said carriage mounted on the rearward portion of said slide including a first tray for receiving said longitudinally movable tray and a second tray for receiving an extracted cartridge case, a rammer and a case ejector mounted on said slide for ramming the ammunition into the gun barrel and for ejecting the cartridge case from the second tray to a position adjacent the other of said trunnions when moved by the carriage to a ramming position in which the first tray is alined with the gun barrel and the second tray is positioned on the opposite side of the gun from the longitudinally movable tray, means for withdrawing said longitudinally movable tray from the first carriage tray, means for moving the stop to a forward position when the ammunition of the carriage tray is moved transversely of the gun out of the path of movement of the stop, means for moving the carriage, means for moving the rammer and case ejector, means for moving the breech block, control means for causing successive movement of the carriage and the rammer and case ejector in predetermined directions and in predetermined sequence after withdrawal of the longitudinally movable tray and means for energizing the control means to cause joint movement of the carriage, rammer and case ejector in the reverse directions from the predetermined directions and closing the breech block, the said energizing means including hydraulic units and a common source of hydraulic energy therefor, and means enabling said source to supply a variable amount of energy to meet the load imposed by the joint movement of the longitudinally movable tray, carriage, and stop and by the joint movement of the carriage, rammer, case ejector and breech block.

76. In a gun, the combination of a slide provided with trunnions, a barrel and breech block reciprocably disposed in relation to the slide, means including a longitudinally movable tray and stop for moving a round of ammunition from a position adjacent one of said trunnions to a position at the rear of the slide, a carriage movable laterally of said barrel, said carriage being mounted on the rearward portion of said slide including a first tray for receiving said longitudinally movable tray and a second tray for receiving an extracted cartridge case, a rammer and a case ejector mounted on said slide for ramming the ammunition into the gun barrel and for ejecting the cartridge case from the second tray to a position adjacent the other of said trunnions when moved by the carriage a position in which the first tray is alined with the barrel and the second tray is positioned on the opposite side of the gun from the longitudinally movable tray, means for withdrawing said longitudinally movable tray from the first carriage tray, means for moving the stop to a forward position when the ammunition of the first carriage tray transversely of the gun out of the path of movement of the stop, means for moving the carriage, means for moving the rammer and case ejector, control means for causing movement of the carriage, the rammer and case ejector in predetermined directions and predetermined sequence after withdrawal of the longitudinally movable tray and reversing means for energizing the control means to cause movement of the carriage, rammer and case ejector in the reverse directions from the predetermined directions and closing the breech block, the said reversing means including hydraulic units and a common source of hydraulic energy therefor, the said source including a tank containing a hydraulic medium, a manifold connected with said units and an accumulator chargeable through said manifold, a pump for supplying the said medium to the manifold and to the accumulator, and means for automatically by-passing the pump to the tank when the accumulator has been fully charged and for automatically reestablishing the supply of the medium by the pump to the manifold after the accumulator has been partially discharged, the said accumulator in its partial discharge supplying energy for the joint movement of the longitudinally movable tray, carriage and stop, and the said pump and accumulator after the partial discharge supplying energy for the joint movement of the carriage, rammer, case ejector and breech block.

77. In a gun, the combination of a slide, a barrel having a breech, and a breech block mounted on said slide for movement therewith in recoil and counter-recoil, said breech block being movable across the breech from a loading position in which a portion of the breech block forms a continuation of the lower portion of the breech to a closed position in which the breech is closed, then from said closed position to an open position beyond said loading position and finally to said loading position, means for extracting an empty cartridge case from the barrel, means positioned in the path of movement of the breech block for actuating said extracting means as the breech block moves beyond the loading position in opening a piston connected with said breech block, a cylinder movable with the barrel in the recoil and counter-recoil thereof for receiving the piston, a spring for normally maintaining the breech block in its loading position and being compressed by said breech block as it moves beyond its loading position in opening, a source of hydraulic energy for said cylinder and piston and a control unit interposed between said source and cylinder, the said unit including valve means which is actuated by the breech block in opening for terminating the flow of hydraulic fluid from said source to said cylinder to permit the spring to return the breech block to its loading position.

78. In a gun, the combination of a slide, a barrel having a breech, and a breech block mounted on said slide for movement therewith in recoil and counter-recoil, said breech block being movable transversely of the breech from a loading position in which a portion of the breech block forms a continuation of the lower portion of the breech to a closed position in which the breech is closed, then, from said closed position to an open position beyond said loading position and finally to said loading position, means for extracting an empty cartridge case from the barrel, means positioned in the path of movement of the breech block for actuating said extracting means as the breech block moves beyond its loading position in opening, a piston connected with said breech block, a cylinder movable with the barrel in the recoil and counter-recoil thereof for receiving the piston, a spring for normally maintaining the breech block in its loading position and being compressed by said breech block as it moves beyond its loading position in opening, a source of hydraulic energy for said cylinder and piston and a control unit interposed between said source and cylinder, the said unit including a pair of valves for controlling the direction of flow of the hydraulic fluid within the cylinder, and control means positioned adjacent the path of movement of the breech block in opening for shifting one of the pair of valves to terminate the flow of hydraulic fluid from said source to said cylinder, whereby the return of the breech block to its loading position by the action of the spring is permitted.

79. In a gun, the combination of a slide, a barrel having a breech, and a breech block mounted on said slide for movement therewith in recoil and counter-recoil, said breech block being movable transversely of the breech from a loading position in which a portion of the breech block forms a continuation of the lower portion of the breech to a closed position in which the breech is closed, then, from said closed position to an open position beyond said loading position and finally to said loading position, means for extracting an empty cartridge case from the barrel, means positioned in the path of movement of the breech block for actuating said extracting means as the breech block moves beyond its loading position in opening, a spring for normally maintaining the breech block in its loading position and being compressed by said breech block as it moves beyond its loading position in opening, hydraulic means for opening said breech block, and control means positioned adjacent the path of movement of said breech block in opening for rendering said hydraulic means inoperative to thereby release the energy stored in the spring and return the breech block to its loading position.

80. In a gun, the combination of a slide, a barrel having a breech, and a breech block mounted on said slide for movement therewith in recoil and counter-recoil, said breech block being movable transversely of the breech from a loading position in which a portion of the breech block forms a continuation on the lower portion of the breech to a closed position in which the breech is closed, then, from said closed position to an open position beyond said loading position and finally to said position, means for extracting an empty cartridge case from the barrel, means positioned in the path of movement of the breech block for actuating said extracting means as the breech block moves beyond its loading position in opening, a spring for normally maintaining the breech block in its loading position and being compressed by said breech block as it moves beyond its loading position in opening, and hydraulic means for opening said breech block, the said hydraulic means including a source of fluid pressure, fluid pressure operable means for effecting movement of the breech block, a pair of valves interposed between the source of fluid pressure and said fluid pressure operated means for controlling the direction of flow of the hydraulic fluid to said pressure operable means and a valve positioned adjacent the path of movement of the breech block in opening for shifting one of the pair of valves to terminate the flow of the hydraulic fluid to said pressure operable means, whereby the return of the breech block to its loading position by the action of the spring is permitted.

81. In a gun, the combination of a slide, a barrel having a breech, and a breech block mounted on said slide for movement therewith in recoil and counter-recoil, said breech block being movable transversely of the breech from a loading position in which a portion of the breech block forms a continuation of the lower portion of the breech to a closed position in which the breech is closed, then, from said closed position to an open position beyond said loading position and finally to said position, means for extracting an empty cartridge case from the barrel, means positioned in the path of movement of the breech block for actuating said extracting means as the breech block moves beyond its loading position in opening, a cylinder movable with the barrel in the recoil and counter-recoil thereof, a hollow piston and piston rod associated with said cylinder and connected with said breech block, an apertured plunger mounted in said hollow piston for limited outward movement, a spring disposed within said hollow piston rod for urging the plunger to its outermost position to engage the lower cylinder wall when the breech block has moved to its loading position, said spring being compressed by the downward movement of the cylinder wall of said breech block as it moves beyond its loading position in opening, a source of hydraulic energy for said cylinder and piston and a control unit interposed between said source and cylinder, the said unit including control means positioned adjacent the path of movement of the breech block in opening for terminating the flow of hydraulic fluid from said source to said cylinder to permit the spring to return to the breech block to its loading position.

82. In a gun, the combination of a slide, a barrel having a breech, and a breech block mounted on said slide for movement therewith in recoil and counter-recoil, said breech block being movable transversely of the breech from a loading position in which a portion of the breech block forms a continuation of the lower portion of the breech to a closed position in which the breech block is closed, then, from said closed position to an open position beyond said loading position and finally to said loading position, a breech bolt for locking the breech block in a closed position, means for extracting an empty cartridge case from the barrel, means positioned in the path of movement of the breech block for actuating said extracting means as the breech block moves beyond its loading position in opening, a piston connected with said breech block, a cylinder movable with the barrel in the recoil and counter-recoil thereof for receiving the piston, a spring for normally maintaining the breech block in its loading position and being compressed by said breech block as it moves beyond its loading position in opening, a source of hydraulic energy for said cylinder and piston and a control unit interposed between said source and cylinder, the said unit including a valve which is shifted by the breech bolt for admitting hydraulic fluid from said source to said cylinder as the breech block moves from its closed to its loading position, a pair of valves for controlling the direction of flow of the hydraulic fluid within the cylinder, a valve positioned adjacent the path of movement of the breech block in opening beyond its loading position for shifting one of said pair of valves to terminate the flow of the hydraulic fluid from said source through said first-mentioned valve to said cylinder, and means for venting the hydraulic pressure stored in said cylinder whereby the return of the breech block to its loading position by the action of the spring is permitted.

83. In a gun, the combination of a slide, a barrel having a breech, and a breech block mounted on said slide for movement therewith in recoil and counter-recoil, said breech block being movable transversely of the breech from a loading position in which a portion of the breech block forms a continuation of the lower portion of the breech to a closed position in which the breech is closed, then, from said closed position to an open position beyond said loading position and finally to said loading position, a breech bolt for locking the breech block in the closed position, means for automatically withdrawing said breech bolt from its locking position in the counter-recoil of the gun, means for extracting an empty cartridge case from the barrel, means positioned in the path of movement of the breech block for actuating said extracting means as the breech block moves beyond its loading position in opening, a cylinder movable with the barrel in the recoil and counter-recoil thereof, a hollow piston and piston rod associated with said cylinder and connected with said breech block, an apertured plunger mounted in said hollow piston for limited outward movement, a spring disposed within said hollow piston rod for urging the plunger to its outermost position to engage the lower cylinder wall when the breech block has moved to its loading position, said spring being compressed by the downward movement of the cylinder wall of said breech block as it moves beyond its loading position in opening, a source of hydraulic energy for said cylinder and piston, a control unit interposed between said source and cylinder and a valve setting cam supported from said slide, the said unit including a pair of valves which are shifted by said cam in the recoil of the gun for controlling the direction of flow of the hydraulic fluid within the cylinder, a valve which is shifted by the breech bolt in the counter-recoil of the gun for admitting hydraulic fluid from said source to said cylinder, a control valve positioned adjacent the path of movement of the breech block in opening for shifting one of said pair of valves to terminate the flow of the hydraulic fluid from said source through said second-mentioned valve to said cylinder, and means for venting the hydraulic fluid stored in said cylinder whereby the return of the breech block to its loading position by the action of the spring is permitted.

84. In a gun, the combination of a slide, a barrel having a breech, and a breech block mounted on said slide for movement therewith in recoil and counter-recoil, said breech block being movable transversely of the breech from a loading position in which a portion of the breech block forms a continuation of the lower portion of the breech to a closed position in which the breech is closed, then, from said closed position to an open position and finally to said loading position, and hydraulic means for imparting movement to said breech block in either of two directions, the said means including a source of hydraulic pressure, a pair of valves for controlling the direction of flow of the hydraulic fluid medium and a valve positioned adjacent the path of movement of the breech block for porting hydraulic fluid pressure from said source to said pair of valves to thereby control the movement of the breech block.

85. In a gun, the combination of a slide, a barrel having a breech, and a breech block mounted on said slide for movement therewith in recoil and counter-recoil, said breech block being movable transversely of the breech from a loading position in which a portion of the breech block forms a continuation of the lower portion of the breech to a closed position in which the breech is closed, then, from said closed position to an open position beyond said loading position and finally to said loading position, hydraulic means for opening and closing said breech block including a valve for porting hydraulic fluid pressure and a pair of valves for controlling the direction of flow of the hydraulic fluid medium, means for shifting the first-mentioned valve to a pressure porting position and for holding the same in this position in all open positions of the breech block, means for shifting the pair of valves simultaneously in one direction to admit fluid pressure to the hydraulic opening and closing means and thus open the breech block, means for shifting one of said pair of valves in a reverse direction to thus block the flow of fluid pressure to the hydraulic opening and closing means to thereby render the hydraulic means inoperative and means for shifting the other of said pair of valves in a reverse direction to admit fluid pressure to the hydraulic means in a reverse direction and thereby close the breech block.

86. In a gun, the combination of a slide, a barrel and a transversely movable breech block mounted on said slide for recoil and counter-recoil, a cylinder movable with said barrel and breech block in the recoil and counter-recoil thereof, a piston disposed within said cylinder and connected to said breech block, a source of hydraulic energy for said cylinder and piston, a control unit interposed between said source and cylinder including a valve for admitting hydraulic fluid from said source to said cylinder and a pair of valves for controlling the direction of flow of the hydraulic fluid within the cylinder, means for shifting the first-mentioned valve to a fluid porting position and for holding the same in this position in all open positions of the breech block, means for shifting the pair of valves simultaneously in one direction to cause an opening of the breech block, means including a valve actuatable by the breech block in opening for shifting one of said pair of valves in a reverse direction for terminating the flow of the hydraulic fluid from said source through said first-mentioned valve to said cylinder, and means for shifting the other of said pair of valves in a reverse direction to cause a closing of the breech block.

87. In a gun, the combination of a slide, a barrel having a breech, and a breech block mounted on said slide for movement therewith in recoil or counter-recoil said breech block being movable transversely of the breech from a loading position in which a portion of the breech block forms a continuation of the lower portion of the breech to a closed position in which the breech is closed then, from said closed position to an open position beyond said loading position and finally to said loading position, a rammer for ramming ammunition into the gun barrel, hydraulic means for opening and closing said breech block including a valve for porting hydraulic fluid pressure and a pair of valves for controlling the direction of flow of the hydraulic fluid medium, means for shifting the first-mentioned valve to a pressure porting position and for holding the same in this position in all open positions of the breech block, means for shifting the pair of valves simultaneously in one direction to admit fluid pressure to the hydraulic opening and closing means and thus open the breech block, means for shifting one of said pair of valves in a reverse direction to thus block the flow of fluid pressure to the hydraulic opening and closing means to thereby render the hydraulic means inoperative, means for shifting the other of said pair of valves in a reverse direction to admit fluid pressure to the hydraulic means in a reverse direction and thereby close the breech block, and means for rendering said last-mentioned shifting means automatically operative after the rammer has retracted sufficiently to clear the path of the breech block.

88. In a gun, the combination of a slide, a barrel and a transversely movable breech block mounted on said slide for recoil and counter-recoil, a breech bolt for locking the breech block in a closed position, a cylinder movable with the barrel in the recoil and counter-recoil thereof, a piston disposed within said cylinder and connected to said breech block, a source of hydraulic energy for said cylinder and piston, a control unit interposed between said source and cylinder including a valve for admitting hydraulic fluid from said source to said cylinder and a valve for controlling the flow of the hydraulic fluid from said source through said first-mentioned valve, means for holding the first-mentioned valve in its open position in all open positions of the breech block, means controllable by said second-mentioned valve for shifting the first-mentioned valve to a closed position upon closing the breech block, and a lever rotatable by the first-mentioned valve in its closing movement for shifting the breech bolt to a locking position.

89. In a gun, the combination of a slide, a barrel having a breech, and a breech block mounted on said slide for movement therewith in recoil and counter-recoil, said breech block being movable transversely of the breech from a loading position in which the breech is open to receive a round of ammunition to a closed position in which the breech is closed, means for opening said breech block, a breech bolt positioned in the breech block for engaging the gun barrel to thereby lock the breech block in the closed position, hydraulic means for closing said breech block including a valve for porting fluid pressure to said hydraulic means to effect closing of the breech block, hydraulic means for shifting said valve to a closed position upon closing the breech block, and a lever rotatable by said valve in its closing movement for shifting the breech bolt to a locking position.

90. In a gun, the combination of a slide, a barrel having a breech and a breech block mounted on said slide for movement therewith in recoil and counter-recoil, said breech block being movable transversely of the breech from a loading position in which the breech is open to receive a round of ammunition to a closed position in which the breech is closed, a breech bolt positioned in the breech block and movable therein to engage the gun barrel and thereby lock the breech block in the closed position, a cam mounted on said breech block, a lever mounted for recoil and counter-recoil with said barrel having one end engaged with the cam in open positions of the breech block and the same end engaged with the breech bolt in the closed position of the breech block, and hydraulic means for closing said breech block including a valve engaged by the remaining end of said lever for porting fluid pressure, said hydraulic means to effect closing of said breech block, the said lever through engagement with the cam being operable to hold the valve in an open position and through the action of said valve in its closing movement being operable to shift the breech bolt to a locking position.

91. In a gun, the combination of a slide, a barrel and a breech block mounted on said slide for movement therewith in recoil and counter-recoil, means for closing said breech block, a breech bolt positioned in the breech block and movable therein for engagement with the barrel to thereby lock the breech block in a closed position, means for moving said breech block out of engagement with the barrel to unlock the breech block, and hydraulic means for opening said breech block, the said means including a valve which is shifted by the breech bolt as the bolt moves to its unlocked position whereby hydraulic fluid pressure is ported to the hydraulic means to open said breech block.

92. In a gun, the combination of a slide, a barrel and a breech block mounted on said slide for recoil and counter-recoil, a firing pin mechanism carried by said breech block, the said mechanism including a firing pin and a hammer, a sear, a safety latch for locking the sear in a position to hold the hammer cocked and a lever for withdrawing said firing pin to cock the hammer and for engaging the safety latch to unlock the sear, a rammer for ramming ammunition into the gun barrel, and means operable by said rammer for holding the lever out of engagement with the safety latch until the rammer has retracted sufficiently to clear the breech block in the recoil of the gun.

93. In a gun, the combination of a slide, a barrel and a breech block mounted on said slide for recoil and counter-recoil, a firing pin mechanism carried by said breech block, the said mechanism including a firing pin and a hammer, a sear, a safety latch for locking the sear in a position to hold the hammer cocked and a lever for withdrawing said firing pin to cock the hammer and for engaging the safety latch to unlock the sear, a rammer for ramming ammunition into the gun barrel and means including a bell crank mounted on said breech block and a cam operable to engage and rotate said bell crank for holding the lever out of engagement with the safety latch until the rammer has retracted sufficiently to clear the breech block in the recoil of the gun.

94. In a gun, the combination of a slide, a member and a barrel mounted on said slide for recoil and counter-recoil, a breech block movable transversely of said member for cooperation with said barrel, a firing pin mechanism carried by said breech block, a rammer for ramming ammunition into the gun barrel and means for preventing operation of the firing pin mechanism until the rammer has retracted sufficiently to clear the breech block in the recoil of the gun, the said means including a bell crank supported from the breech block for cooperation with the firing pin mechanism to render the same ineffective, a reciprocable cam carried by said member for rotating the bell crank, and a lever likewise carried by said member for actuating said cam to rotate the bell crank and thus release the firing pin.

95. In a gun, the combination of a slide, a member and a barrel mounted on said slide for recoil and counter-recoil, a breech block movable transversely of said member for cooperation with said barrel, a firing pin mechanism carried by said breech block, a rammer for ramming ammunition into the gun barrel, mechanism for moving said rammer, means supported by said breech block and member and contacting said firing pin mechanism for rendering the firing pin mechanism inoperative, means contacting the first mentioned means and including a linkage limited for movement on either side of its dead center position for actuating said first-mentioned means an element of said linkage mounted on said slide and being positioned at a predetermined position in the path of the rammer, said second-mentioned means being mounted on said slide and said element of the linkage being contacted by said rammer to actuate the second mentioned means as the rammer is moved rearwardly to the predetermined position whereby the firing pin mechanism is maintained in its inoperative condition until the rammer reaches the predetermined position at which time the rammer has moved beyond the recoil distance of the breech block.

96. In a gun, the combination of a slide, a member and a barrel mounted on said slide for recoil and counter-recoil, a breech block movable transversely of said member for cooperation with said barrel, a firing pin mechanism carried by said breech block, a rammer for ramming ammunition into the gun barrel, mechanism for moving said rammer, means in contact with the firing pin mechanism and including a bell crank supported from the breech block and a reciprocable cam carried by said member for engagement with the bell crank for rendering the firing pin mechanism inoperative, and means mounted on said slide so as to contact said first mentioned means for effecting actuation of said first-mentioned means, said second-mentioned means including an actuating lever mounted at a predetermined position on said slide and contacted by said rammer as the rammer moves to the predetermined position whereby the firing pin mechanism is maintained in its inoperative condition until the rammer reaches the predetermined position at which time the rammer has moved beyond the recoil distance of the breech block.

97. In a gun, the combination of a slide, a member and a barrel mounted on said slide for recoil and counter-recoil, a breech block movable transversely of said member for cooperation with said barrel, a firing pin mechanism carried by said breech block, the said mechanism including a firing pin and a hammer, a sear, a safety latch for locking the sear in a position to hold the hammer cocked, mechanism for withdrawing said firing pin to cock the hammer and for engaging the safety latch to unlock the sear, said mechanism including a lever connected to the firing pin, a rammer for ramming ammunition into the gun barrel, mechanism for moving said rammer, means contacting said lever and and including a bell crank mounted on said breech block and a cam carried by said member operable to engage and rotate said bell crank for holding the lever out of engagement with the safety latch, and means including a linkage limited for movement on either side of its dead center position for contacting the bell crank to actuate said first-mentioned means, an element of the linkage being mounted on said slide and positioned at a predetermined point in the path of movement of the rammer, said second-mentioned means being mounted on said slide and the said element of linkage being contacted by said rammer to actuate the second mentioned means as the rammer is moved to the predetermined position whereby the firing pin mechanism is maintained in its inoperative position until the rammer reaches the predetermined position at which time the rammer is beyond the recoil distance of the breech block.

98. In a gun, the combination of a slide, a member and a barrel mounted on said slide for recoil and counter-recoil, a breech block movable transversely of said member for cooperation with said barrel, a rammer for ramming ammunition into the gun barrel, mechanism for moving the rammer, a firing pin mechanism carried by said breech block including a firing pin, a safety latch which engages the firing pin and holds it in an inoperative position, and a cocking lever connected to the firing pin and being movable from an inoperative position to an operative position to withdraw the firing pin connected thereto, said lever being movable to an inoperative position in which it engages the safety latch so as to actuate the latch and lock the firing pin in its inoperative position, a bell crank mounted on said breech block and rotatable to hold the cocking lever out of engagement with the safety latch, a spring depressed lever and a cam operable thereby for imparting rotation to said bell crank carried by said member, means including a rod movable longitudinally of the slide for rotating said lever to shift the cam to an operative position, a linkage positioned at a predetermined point in the path of movement of said rammer so that the linkage is contacted by the rammer as it moves to the predetermined point at which time the rammer is outside the recoil distance of the breech block, and a lever being actuated by said linkage for imparting movement to said rod to thereby operate the cam and rotate the bell crank, the said linkage being mounted for limited movement on either side of its dead center position and including a pivotally mounted reciprocating rod and a spring compressible by said rod in moving to its dead center position.

99. In a gun, the combination of a slide, a barrel and a breech block mounted on said slide for recoil and counter-recoil, a firing pin mechanism carried by said breech block, the said mechanism including a firing pin and a hammer, a sear, a safety latch for locking the sear in a position to hold the hammer cocked and a lever which is connected to said firing pin and which is movable to withdraw the pin in the breech block to cock the hammer and which engages the safety latch to move the latch and unlock the sear, a tray mounted on said slide for transferring ammunition from a firing position in which the tray is positioned at one side of the slide out of the path of recoil of the barrel to a ramming position in which the tray is alined with the barrel, means for moving said tray from the firing position to the ramming position and back to the firing position in alignment with the barrel, and means including a bell crank mounted on said breech block and a cam operable to engage and rotate said bell crank for holding the lever out of engagement with said safety latch, interlocking means for preventing actuation of said first mentioned means until the tray has returned to the firing position and means connected to the first mentioned means and positioned at a predetermined point near the firing position in the path of movement of the tray and engaged by the tray in its movement for rotating the bell crank and releasing the lever whereby movement of the tray out of the path of recoil of the barrel is assured.

100. In a gun, the combination of a slide, a member and a barrel mounted on said slide for recoil and counter-recoil, a breech block movable transversely of said member for cooperation with said barrel, a firing pin mechanism carried by said breech block, the said mechanism including a firing pin and a hammer, a sear, a safety latch for locking the sear in a position to hold the hammer cocked, and a lever connected to said firing pin and movable to withdraw the pin and cock the hammer and to engage the safety latch to move the latch and unlock the sear, a tray mounted on said slide for transferring ammunition from a firing position in which the tray is positioned at one side of the slide out of the path of recoil of the barrel to a ramming position in which the tray is alined with the barrel, means for moving said tray from the firing position to the ramming position and back to the firing position, means including a bell crank in engagement with said lever mounted on said breech block and a cam carried by said member operable to engage and rotate said bell crank for holding the lever out of engagement with the safety latch, and means including a trigger mechanism for actuating said first-mentioned means said trigger mechanism being mounted on said slide at a predetermined point near the firing position in the path of movement of the tray and being engaged by the tray so as to actuate the second mentioned means, rotate the bell crank and release the lever only when the tray has reached the firing position out of the path of recoil of the barrel.

101. In a gun, the combination of a slide, a barrel and a breech block mounted on said slide for recoil and counter-recoil, a firing pin mechanism carried by said breech block, a tray mounted on said slide for transferring ammunition from a firing position in which the tray is positioned at one side of the slide out of the path of recoil of the barrel to a ramming position in which the tray is alined with the barrel, mechanism for moving said tray from the firing position to the ramming position and back to the firing position, means connected to said firing pin mechanism and supported in part by said breech block for rendering the firing pin mechanism inoperative, a trigger mechanism mounted on said slide, means interconnecting the trigger mechanism and said first mentioned means for actuating said first-mentioned means so that actuation of the trigger causes the firing pin to be rendered operative, the said trigger mechanism including a fork rotatable by the tray in its movements from and toward the firing position cam surfaces on said fork, a spring biased trigger pivotally mounted between the arms of the fork and a detent initially operable to engage a side of said trigger with the tray in the firing position, the said detent being movable by cam surfaces on the rotatable fork to engage the terminal surface of the trigger and being disengageable from the trigger terminal surface to assume its initial position only after the tray has returned to the firing position.

102. In a gun, the combination of a slide, a member and a barrel mounted on said slide for recoil and counter-recoil, a breech block movable transversely of said member for cooperation with said barrel, a tray mounted on said slide for transferring ammunition from a firing position in which the tray is positioned at one side of the slide out of the path of recoil of the barrel to a ramming position in which the tray is alined with the barrel, mechanism for moving said tray from the firing position to the ramming position and back to the firing position, a firing pin mechanism carried by said breech block including a safety latch which is movable to lock the firing pin mechanism in a position ineffective to fire the ammunition and a cocking lever operable to engage and release the safety latch when in its locking position, a bell crank mounted on said breech block and rotatable to hold the cocking lever out of engagement with the safety latch, a spring depressed lever and a cam operable thereby for imparting rotation to said bell crank carried by said member, means including a rod movable longitudinally of the slide for rotating said lever to shift the cam to an operative position, a trigger mechanism positioned in the path of movement of the tray near the firing position so that the trigger mechanism is engaged by said tray upon leaving the firing position, and a lever arm actuatable by said trigger mechanism for imparting movement to said rod to thereby operate the cam, rotate the bell crank and render the firing pin mechanism effective.

103. In a gun, the combination of a slide, a member and a barrel mounted on said slide for recoil and counter-recoil, a breech block movable transversely of said member for cooperation with said barrel, a tray mounted on said slide for transferring ammunition from a firing position in which the tray is positioned at one side of the slide out of the path of recoil of the barrel to a ramming position in which the tray is alined with the barrel, mechanism for moving said tray from the firing position to the ramming position and back to the firing position, a firing pin mechanism carried by said breech block including a safety latch which is movable to lock the firing pin mechanism in a position ineffective to fire the ammunition and a cocking lever being movable from an operative to an inoperative position, said lever in its operative position being operable to engage and release the safety latch from its locked position, a bell crank mounted on said breech block and rotatable to hold the cocking lever out of engagement with the safety latch, a spring depressed lever and a cam operable thereby for imparting rotation to said bell crank carried by said member, means including a rod movable longitudinally of the slide for rotating said lever to shift the cam to an operative position, a trigger mechanism mounted on said slide and positioned in the path of movement of and engaged by said tray near the firing position thereof, and a lever arm actuatable by said trigger mechanism for imparting movement to said rod, the said trigger mechanism including a fork rotatable by the tray in its movements from and toward the firing position cam surfaces on said fork, a spring biased trigger pivotally mounted between the arms of the fork and a detent for rotating said lever arm initially operable to engage a side of said trigger with the tray in the firing position, the said detent being movable by cam surfaces on the rotatable fork to engage the terminal surface of the trigger and being disengageable from the trigger terminal surface to assume its initial position only after the tray has returned to the firing position.

104. In a gun, the combination of a slide, a member and a barrel mounted on said slide for recoil and counter-recoil, a breech block movable transversely of said member for cooperation with said barrel, a tray and a rammer mounted on said slide for transferring ammunition from a firing position in which the tray is positioned at one side of the slide out of the path of recoil of the barrel to a ramming position in which the tray is alined with the barrel and for ramming the ammunition into the gun barrel, a firing pin mechanism carried by said breech block including a lever operable to withdraw the firing pin, a bell crank mounted on said breech block and rotatable to engage said lever and hold the firing pin withdrawn, a spring depressed lever carried by said member and a cam operable thereby for imparting rotation to said bell crank, means including a rod movable longitudinally of the slide for rotating said last-mentioned lever to shift the cam to an operative position to rotate the bell crank, a linkage positioned at a predetermined point in the path of movement of the rammer and being engaged by the rammer as it moves to the predetermined point at which time said rammer is outside the recoil distance of the breech block, a trigger mechanism being positioned in the path of movement of the tray near the firing position so that said mechanism is engaged by the tray as the tray leaves the firing position, and a lever arm connected with said linkage and trigger mechanism for imparting movement to said rod to operate the cam and rotate the bell crank to thus render the firing pin mechanism operative as soon as the linkage is actuated by the rammer and the trigger mechanism is actuated by the tray.

105. In a gun, the combination of a slide, a member and a barrel mounted on said slide for recoil and counter-recoil, a breech block movable transversely of said member for cooperation with said barrel, a tray mounted on said slide for transferring ammunition from a firing position in which the tray is positioned at one side of the slide out of the path of recoil of the barrel to a ramming position in which the tray is alined with the barrel, a rammer for ramming the ammunition into the gun barrel when the tray is in the ramming position, mechanism for moving the rammer, mechanism for moving the tray from the firing position to the ramming position and back to the firing position, a firing pin mechanism carried by said breech block including a lever operable to withdraw the firing pin, a bell crank mounted on said breech block and rotatable to engage said lever and hold the firing pin withdrawn, a spring depressed lever carried by said member and a cam operable thereby for imparting rotation to said bell crank, means including a rod movable longitudinally of the slide for rotating said last-mentioned lever to shift the cam to an operative position, a linkage positioned at a predetermined point in the path of movement of the rammer and being engaged by the rammer as it moves to the predetermined point at which time said rammer is outside the recoil distance of the breech block, a trigger mechanism mounted on said slide positioned in the path of movement of the tray near the firing position so that said trigger mechanism is engaged by the tray as the tray leaves the firing position, a lever arm connected with said linkage and trigger mechanism for imparting movement to said rod to operate the cam, rotate the bell crank and render the firing pin mechanism inoperative as soon as the linkage has been actuated by the rammer and the trigger mechanism has been actuated by the tray, the said linkage being mounted for limited movement on either side of its dead center position and including a pivotally mounted reciprocating rod and a spring compressible by said rod in moving to its dead center position and the trigger mechanism including a fork rotatable by the tray in its movements from and toward the firing position cam surfaces on said fork, a spring biased trigger pivotally mounted between the arms of the fork and a detent for rotating said lever arm initially operable to engage a side of said trigger with the tray in the firing position, the said detent being movable by cam surfaces on the rotatable fork to engage the terminal surface of the trigger and being disengageable from the trigger terminal surface to assume its initial position only after the tray has returned to the firing position.

106. In a gun, the combination of a barrel and a slide adapted to receive the barrel for recoil and counter-recoil said slide having trunnions thereof for permitting movement of the gun in elevation, a tray secured to said slide for receiving a round of ammunition and moving the same from a position adjacent to one trunnion to the rear of the slide, a fuse setting means movable longitudinally of said tray for engaging the ammunition, means for moving the fuse setting means and the ammunition engaged thereby longitudinally of said tray, a shaft for driving said fuse setting means in its positions along the tray, and mechanism mounted on said slide and interconnecting said shaft and said fuse setting means for regulating the fuse setting means during its longitudinal movement along said tray.

107. In a gun, the combination of a barrel and a slide adapted to receive the barrel for movement in recoil and counter-recoil, a tray secured to said slide for receiving a round of ammunition, a fuse setting means movable longitudinally of said tray for engaging the ammunition, means for moving the fuse setting means and the ammunition engaged thereby to the rear of said tray, the said moving means including a shaft for actuating said fuse setting means in its positions along the tray, setting and regulating mechanisms mounted on said slide and means for connecting said mechanisms with said shaft, the said means including a differential for combining the outputs of said mechanisms so that the shaft and the fuse setting means are rotated a predetermined amount which is determined by the output of said differential.

108. In a gun, the combination of a barrel and a slide adapted to receive the same for recoil and counter-recoil, a tray secured to said slide for receiving a round of ammunition, a fuse setting means including a rotatable socket member movable longitudinally of said tray for engaging the ammunition, means for moving the socket member longitudinally of the tray to thereby move the ammunition, a shaft connected to drive the rotatable socket member of the fuse setting means in its positions along the tray, setting mechanism mounted on said slide, regulating mechanism mounted on said slide, the said setting mechanism being operable to impart a single revolution to said socket member in the setting operation and the regulating mechanism being operable to adjust the rotatable socket member for the desired fuse setting, and means for connecting said mechanisms with said shaft, the said means including a differential for combining the outputs of said mechanisms.

109. In a gun, the combination of a barrel and slide adapted to receive barrel for movement in recoil and counter-recoil, a tray secured to said slide for receiving a round of ammunition, a movable stop engageable with one end of the tray supported ammunition, a fuse setting means engageable with the remaining end of the ammunition, means for driving said fuse setting means to the rear to thereby move said stop to the rear through the interposed ammunition, said driving means including a rotatable shaft extending lengthwise of said tray for actuating said fuse setting means in its positions longitudinally thereof, a setting mechanism mounted on said slide, and means for connecting said setting mechanism with said shaft so that the shaft and the fuse setting means are rotated a predetermined amount in accordance with the output of the setting mechanism.

110. In a gun, the combination of a barrel and a slide adapted to receive barrel for movement in recoil and counter-recoil, a tray secured to said slide for receiving a round of ammunition, a movable stop engageable with one end of the tray supported ammunition, a fuse setting means engageable with the remaining end of the ammunition, means for driving said fuse setting means to the rear to thereby move said stop to the rear through the interposed ammunition, said driving means including a rotatable shaft extending lengthwise of said tray for actuating said fuse setting means in its positions longitudinally thereof, setting and regulating mechanisms mounted on said slide and means for connecting said mechanisms with said shaft, the said means including a differential for combining the outputs of said mechanisms so that the shaft and the fuse setting means are rotated a predetermined amount which is controlled by the output of said differential.

111. In a gun, the combination of a barrel and a slide adapted to receive the barrel for movement in recoil and counter-recoil provided with trunnions for permitting movement of the gun in elevation, means for moving a round of ammunition from a position adjacent one of said trunnions to a position at the rear of the slide, a carriage mounted on the rearward portion of said slide including a first tray for receiving the round of ammunition and a second tray for receiving an extracted cartridge case, said carriage being movable from a firing position in which said trays are respectively adjacent one of said trunnions and in alinement with the gun barrel to a ramming position in which said trays are positioned respectively in alinement with the barrel and adjacent the other of said trunnions, a rammer and case ejector mounted on said slide for ramming the ammunition into the gun barrel and for ejecting the cartridge case to a position adjacent the other of said trunnions, hydraulic motors connected to drive said carriage, rammer and case ejector, a source of hydraulic energy for said motors, control units interposed between said source and motors including valves for admitting fluid pressure to and reversing the direction of drive of said motors, manually actuatable control valves for said units, a first group of hydraulic control circuits including said manually actuatable valves for shifting the valves of the carriage, rammer and case ejector control units to positions for driving the carriage to its ramming position and the rammer and case ejector in a forward direction, and a second group of hydraulic control circuits including said manually actuatable valves for shifting the valves of the carriage, rammer and case ejector control units to positions for driving the carriage to its firing position and the rammer and case ejector in a rearward direction, one of the hydraulic control circuits of said first-mentioned group including an interlock valve for preventing forward movement of the rammer and case ejector until the carriage has reached the ramming position.

112. In a gun, the combination of a barrel and a slide adapted to receive the barrel for movement in recoil and counter-recoil provided with trunnions for permitting movement of the gun in elevation, means for moving a round of ammunition from a position adjacent one of said trunnions to a position at the rear of the slide, a carriage mounted on the rearward portion of said slide including a tray for receiving the round of ammunition and a tray for receiving an extracted cartridge case, said carriage being movable from a firing position in which said trays are respectively adjacent one of said trunnions and in alinement with the gun barrel to a ramming position in which said trays are positioned respectively in alinement with the barrel and adjacent the other of said trunnions, a rammer and case ejector mounted on said slide for ramming the ammunition into the gun barrel and for ejecting the cartridge case to a position adjacent the other of said trunnions, hydraulic motors connected to drive said carriage, rammer and case ejector, a source of hydraulic energy for said motors, control units interposed between said source and motors including each a valve for admitting fluid pressure to the motor, a valve for reversing the direction of drive of the motor and a valve for controlling the speed of operation of the motor, manually actuatable valves for said units, a first group of hydraulic control circuits including said manually actuatable valves for shifting the first two valves of the carriage, rammer and case ejector control units to positions for driving the carriage to its ramming position and the rammer and case ejector in a forward direction, and a second group of hydraulic control circuits including said manually actuatable valves for shifting the first two valves of the carriage control unit and the reversing valve of the rammer and case ejector control unit to positions for driving the carriage to its firing position and the rammer and case ejector in a rearward direction, one of the hydraulic control circuits of said first-mentioned group including an interlock valve for preventing forward movement of the rammer and case ejector until the carriage has reached the ramming position and mechanism controllable by each motor for shifting the last-mentioned valve of its control unit in an intermittent fashion, the said last-mentioned valve providing a variable speed control for the motor during the period when the valve is being shifted and a substantially constant speed control for the motor after the valve reaches its fully shifted position.

113. In a gun, the combination of a barrel and a slide adapted to receive the barrel for movement in recoil and counter-recoil provided with trunnions for permitting movement of the gun in elevation, means including a longitudinally movable tray and stop for moving a round of ammunition from a position adjacent one of said trunnions to a position at the rear of the slide, a carriage mounted on the rearward portion of said slide including a tray for receiving the round of ammunition and a tray for receiving an extracted cartridge case, said carriage being movable from a firing position in which said trays are respectively adjacent one of said trunnions and in alinement with the gun barrel to a ramming position in which said trays are positioned respectively in alinement with the barrel and adjacent the other of said trunnions, a rammer and case ejector mounted on said slide for ramming the ammunition into the gun barrel and for ejecting the cartridge case to a position adjacent the other of said trunnions, hydraulic motors connected to drive said movable tray, carriage, rammer and case ejector, a source of hydraulic energy for said motors, control units interposed between said source and motors including valves for admitting fluid pressure to and reversing the direction of drive of said motors, manually actuatable control valves for said units, a first group of hydraulic control circuits including said manually actuatable valves for shifting the valves of the movable tray unit to positions to withdraw the tray from the ammunition and the valves of the carriage, rammer and case ejector control units to positions for driving the carriage to its ramming position and the rammer and case ejector in a forward direction, and a second group of hydraulic control circuits including said manually actuatable valves for shifting the valves of the carriage, rammer and case ejector control units to positions for driving the carriage to its firing position and the rammer and case ejector in a rearward direction, one of the hydraulic control circuits of said first-mentioned group including an interlock valve for preventing movement of the carriage to the ramming position until the longitudinally movable tray has withdrawn from a tray of the carriage and another of the hydraulic control circuits of this group including an interlock valve for preventing forward movement of the rammer and case ejector until the carriage has reached the ramming position.

114. In a gun, the combination of a barrel and slide adapted to receive the barrel for movement in recoil and counter-recoil provided with trunnions for permitting movement of the gun in elevation, means including a longitudinally movable tray and a normally forwardly positioned stop for moving a round of ammunition from a position adjacent one of said trunnions to a position at the rear of the slide, a carriage mounted on the rearward portion of said slide including a tray for receiving the round of ammunition and a tray for receiving an extracted cartridge case, said carriage being movable from a firing position in which said trays are respectively adjacent one of said trunnions and in alinement with the gun barrel to a ramming position in which said trays are positioned respectively in alinement with the barrel and adjacent the other of said trunnions, a rammer and case ejector mounted on said slide for ramming the ammunition into the gun barrel and for ejecting the cartridge case to a position adjacent the other of said trunnions, hydraulic motors connected to drive said movable tray, stop, carriage, rammer and case ejector, a source of hydraulic energy for said motors, control units interposed between said source and motors including valves for admitting fluid pressure to and reversing the direction of drive of said motors, a manually actuatable control valve for the longitudinally movable tray operable from one side of said slide, a hydraulic control circuit including said manually actuatable valve for shifting the valves of the longitudinally movable tray unit to positions to move the tray and stop with the interposed ammunition to the rear, said hydraulic control circuit including an interlock valve for preventing rearward movement of the longitudinally movable tray unless the ammunition receiving tray of the carriage is aligned therewith, manually actuatable control valves for the movable tray, traverse carriage, rammer and case ejector units operable from the other side of said slide, a first group of hydraulic control circuits including said last-mentioned manually actuatable valves for shifting the valves of the movable tray unit to positions to withdraw the tray from the ammunition and the valves of the carriage, rammer and case ejector control units to positions for driving the carriage to its ramming position and the rammer and case ejector in a forward direction, a second group of hydraulic control circuits including said last-mentioned manually actuatable valves for shifting the valves of the carriage, rammer and case ejector control units to positions for driving the carriage to its firing position and the rammer and case ejector in a rearward direction, and a hydraulic control circuit interconnecting the control units for the carriage and stop for shifting the reversing valve of the stop unit to return the stop to its normally forward position, one of the hydraulic control circuits of said first-mentioned group including an interlock valve for preventing movement of the carriage to the ramming position until the longitudinally movable tray has withdrawn from a tray of the carriage, another of the hydraulic control circuits of this group including an interlock valve for preventing forward movement of the rammer and case ejector until the carriage has reached the ramming position, and the hydraulic control circuit interconnecting the control units for the carriage and stop including an interlock valve for preventing forward movement of the stop until the carriage has moved the ammunition to clear the stop.

115. In a gun, the combination of a barrel and a slide adapted to receive the barrel for movement in recoil and counter-recoil provided with trunnions for permitting movement of the gun in elevation, means including a longitudinally movable tray and stop for moving a round of ammunition from a position adjacent one of said trunnions to a position at the rear of the slide, a transversely movable tray operable to receive ammunition from said first-mentioned tray, said tray being movable from a position at the rear of the slide transversely of the gun to a position in alinement with the barrel, a rammer mounted on said slide for moving the round of ammunition from said tray when in alignment with the barrel into the gun barrel, means including a first hydraulic drive unit for withdrawing said first-mentioned tray from the transversely movable tray, means including a second hydraulic drive unit for moving the stop to a forward position on the slide, means including a third hydraulic drive unit for moving the traverse tray, means interlocking the second and third hydraulic drive units to prevent forward movement of the stop until the ammunition has been moved out of the path of movement of the stop by the transversely movable tray, means including a fourth hydraulic drive unit for moving the rammer in a direction for effecting ramming, means interlocking the third hydraulic drive unit and the first hydraulic drive unit to prevent movement of the transversely movable tray until after the withdrawal of the first-mentioned tray, means interconnecting the third and fourth hydraulic drive units for successively moving the transversely movable tray and rammer in predetermined sequence and predetermined directions to move the ammunition into the barrel and for jointly moving the transversely movable tray and rammer in the reverse directions from said predetermined directions upon completion of the ramming stroke, a source of hydraulic energy common to said means and connected to the drive units thereof, and means for interlocking the hydraulic units of said transversely movable tray and rammer in the successive movements of the tray and rammer to prevent interference between the movement of the tray and the movement of the rammer.

116. In a gun, the combination of a slide, a barrel and breech block mounted on said slide for recoil and counter-recoil, a valve setting cam supported from said slide and fluid pressure operated means for opening said breech block comprising a source of fluid pressure, valve means interposed between the source of pressure and the fluid pressure operated means to control the flow of fluid to said pressure operated means, means for causing the cam to be actuated by the recoil of the gun, means interconnecting said valve means and said cam so that the recoil of the gun actuates the cam and shifts the valve means to control the direction of flow of fluid and a second valve means having mechanism positioned in the path of counter-recoil of the gun and operated by the counter-recoil to cause the flow of fluid to said pressure operated means in a direction to open the breech.

117. In a gun, the combination of a slide, a barrel and breech block mounted on said slide for recoil and counter-recoil, a breech bolt for locking breech block in a closed position, means for withdrawing said breech bolt from its locking position, said means being an element positioned in the path of recoil of the gun and being actuated by the recoil of the gun, a valve setting cam supported from said slide and fluid pressure operated means for opening said breech block, said pressure operated means comprising a source of fluid pressure, a valve interposed between the source of pressure and the fluid operated means to control the flow of fluid to said pressure operated means, means positioned in the path of recoil of the gun for actuating said cam, means interconnecting the cam and the valve so that actuation of said cam during the recoil of the gun shifts the valve to control the direction of flow of the fluid and a valve means connected to the breech bolt locking means and having mechanism positioned in the path of counter-recoil of the gun and being shifted thereby to cause the fluid to flow in a direction to withdraw the breech bolt and open the breech.

118. In a gun, the combination of a slide, a barrel and breech block mounted on said slide for recoil and counter-recoil, a breech bolt for locking breech block in a closed position, means for locking and unlocking said breech bolt, and means for opening and closing said breech block, both of said means including a source of fluid pressure and a valve common to each of the means for porting fluid pressure to effect closing of said breech block and for shifting the breech bolt to a locking position.

119. A gun comprising in combination a breech, a first tray movable between a ramming position and a firing position, in which latter position the tray is bodily offset from the breech so that it is out of the way of the latter during recoil and is properly positioned to receive a round of the type characterized by fuse setting elements, means for closing said breech on the insertion of a round therein, a firing mechanism including a firing pin, a cocking lever which is adapted to cock the firing pin and which is adapted to be moved to a firing position clear of the firing pin after the breech is closed, a second tray, a fuse-setter comprising fuse-setting elements having relative movement lengthwise with respect to a round in said second tray to engage and set a movable fuse-element of the round and then to separate the setting elements from the fuse-element, means for actuating said fuse-setter, means operable sequentially to fuse setting for thereafter in timed relationship moving said first tray with a fuse set round therein from the firing position into the ramming position, a rammer-device, means operably controlled in timed relationship with said actuating means to operate said rammer-device and ram a round into the breech and thereafter to return the first tray to the firing position, and means operably controlled by at least one of said tray-return means and breech-closing means automatically to actuate the firing mechanism only when the cocking lever is in the firing position.

120. A gun comprising in combination a breech, a tray movable transversely between a ramming position and a firing position, in which latter position the tray is bodily offset from the breech so that it is out of the way of the latter during recoil and is properly positioned to receive a round of the type characterized by a settable fuse, means for closing said breech on the insertion of a round therein, firing mechanism for the gun, fuse-setting means adapted to set the fuse of a round, means for automatically actuating the fuse-setting means, means for actuating the tray in timed relationship so that the fuse of the round is already set when the tray is in the ramming position, a rammer-device, means operably controlled in timed relationship with the movement of the tray to actuate the rammer-device and ram the round into the breech, and means associated with the breech to actuate the firing mechanism when the breech is closed, said last-named means comprising a spring adapted to be loaded by the breech block during run-out and to be released by the movement of the breech block as the latter completes its closing movement, whereby there is provided a setting-ramming-firing cycle giving a substantially constant dead-time for each round.

121. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, means for closing said breech on the insertion of a round therein, a firing mechanism including a firing pin and a cocking lever which is adapted to cock the firing pin and which is adapted to be moved to a firing position clear of the firing pin after the breech is closed, a fuse-setter comprising fuse-setting elements having relative movement lengthwise with respect to a round in the tray to engage and set a movable fuse-element of the round and then to separate the setting elements from the fuse-element, means for actuating the fuse-setter, means operable thereafter in timed relationship to fuse setting for actuating the tray to move the latter from the firing position into the ramming position, a rammer-device operably controlled in timed relationship with the tray actuating means to ram a round into the breech, means to actuate the rammer and thereafter to return the tray to the firing position, and means to actuate the firing mechanism only when the cocking lever is in the firing position, said last-named means including a trigger and a pressure-device operated thereby so that the trigger is operated by the tray when it reaches the firing position.

122. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, means for closing the breech on the insertion of a round therein, a firing mechanism including a firing pin and a cocking lever which is adapted to cock the firing pin and which is adapted to be moved to a firing position clear of the firing pin after the breech is closed, a fuse-setter comprising fuse-setting elements having relative movement lengthwise with respect to a round in the tray to engage and set a movable fuse-element of the round and then to separate the setting elements from the fuse-element, means for actuating said fuse-setter, means operable thereafter in timed relationship to fuse setting for moving the tray from the firing position into the ramming position, a rammer-device operably controlled in timed relationship with the tray moving means to ram a round into the breech, means to actuate the rammer and thereafter to return the tray to the firing position, and means to actuate the firing mechanism only when the cocking lever is in the firing position, said last-named means including a trigger and a pressure-device actuated thereby so that the trigger is operated by the tray when it reaches the firing position, an operating member for said pressure-device, levers linked to said operating member, and cam-surfaces on the tray arranged to engage said levers when the tray has moved away from the ramming position.

123. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive the tray, means including a manual control device for closing said breech on the insertion of a round therein, firing mechanism for the gun, fuse-setting means adapted to set the fuse of a round, an electric motor for automatically actuating the fuse-setting means, means operable in timed relationship with the loading fuse setting operation for moving the tray so that the fuse of the round is already set when the tray is in the ramming position, a rammer-device, a motor for driving the latter in timed relationship with the movement of the tray automatically to ram the round into the breech, circuits for said motors comprising a main circuit establishing means to start the first motor and control timing devices driven in timed relationship with the shafts of said motors to control said circuits, whereby the motors are controlled and brought into operation in the desired time sequence after the first motor is started by the main circuit establishing means, and means associated with the breech to actuate the firing mechanism automatically when the breech is closed.

124. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive said tray, means including a control lever for effecting closing of said breech on the insertion of a round therein, firing mechanism for the gun, fuse-setting means adapted to set the fuse of a round, an electric motor for automatically actuating the fuse-setting means in advance timed relationship with the movement of the tray so that the fuse of the round is already set when the tray is in the ramming position, a rammer-device, a motor for driving the latter in timed relationship with the movement of the tray automatically to ram the round into the breech, circuits for said motors comprising a main circuit establishing means to start the first motor and rotary and cam-operated timing devices driven in timed relationship with the shafts of said motors to control said circuits, whereby the motors are controlled and brought into operation in the desired time sequence after the first motor is started by the main circuit establishing means, and means associated with the breech to actuate the firing mechanism automatically when the breech is closed, whereby there is provided an automatic setting-ramming-firing cycle giving a substantially constant dead-time for each round.

125. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive the tray, means for effecting a manually controlled closing of said breech on the insertion of a round therein, firing mechanism including a firing-pin and a cocking-lever which is adapted to cock the firing-pin and which is adapted to be moved into a firing position clear of the firing pin after the breech is closed, a fuse-setter having fuse-setting elements, an electric motor for automatically actuating the fuse-setter, means operable in timed relationship with actuation of the fuse setter for moving the tray so that the fuse of the round is already set when the tray is in the ramming position, said fuse-setting elements having relative movement lengthwise with respect to a round in the tray to engage and set a movable fuse-element of the round and then to separate the setting elements and the fuse-element, said tray thereafter moving from the firing position into the ramming position, a rammer-device, a motor for driving the latter in timed relationship with the movement of the tray automatically to ram the round into the breech, the tray being thereafter returned by its motor to the firing position in response to actuation of said manually controlled means, circuits for said motors comprising a man circuit establishing means to start the first motor and timing devices driven in timed relationship with the shafts of said motors to control said circuits, whereby the motors are controlled and brought into operation in the desired time sequence after the first motor is started by the main circuit establishing means, and means operably controlled by at least one of said tray-return means and breech-closing means automatically to actuate the firing mechanism only when the cocking lever is in the firing position.

126. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive the tray, means including a manual control for closing said breech on the insertion of a round therein, firing mechanism including a firing-pin and a cocking-lever which is adapted to cock the firing-pin and which is adapted to be moved into a firing position clear of the firing pin after the breech is closed, a fuse-setter having fuse-setting elements, an electric motor for automatically actuating the fuse-setter, means operable in timed relationship with actuation of the fuse setter for moving the tray so that the fuse of the round is already set when the tray is in the ramming position, said elements having relative lengthwise movement with respect to a round in the tray to engage and set a movable fuse-element of the round and then to separate the setting elements from the fuse-element and said tray thereafter moving from the firing position into the ramming position, a rammer-device, a motor for driving the latter in timed relationship with the movement of the tray automatically to ram the round into the breech, said tray being thereafter returned by its motor to the firing position, circuits for said motors comprising a main circuit establishing means to start the first motor and rotary and cam-operated timing devices driven in timed relationship with the shafts of said motors to control said circuits, whereby the motors are controlled and brought into operation in the desired time sequence after the first motor is started by the main circuit establishing means, and means operably controlled by at least one of said tray-return means and breech-closing means automatically to actuate the firing mechanism only when the cocking is in the firing position.

127. A gun comprising in combination a breech, a tray movable between a ramming position and a firing position, in which latter position the tray is bodily offset from the breech so that it is out of the way of the latter during recoil and is properly positioned to receive a round of the type characterized by a settable fuze, a motor to drive the tray, manually controlled means for closing said breech on the insertion of a round therein, firing mechanism for the gun, fuse-setting means adapted to set the fuse of a round in said tray, an electric motor for automatically actuating the fuse-setting means, means operable in timed relationship with actuation of the fuse setting means for providing movement of said tray so that the fuse of the round is already set when the tray is in the ramming position, a rammer-device, a motor for driving the latter in timed relationship with the movement of the tray automatically to ram the round into the breech, circuits for said motors comprising a main valve to start the first motor and timing devices driven in timed relationship with the shafts of said motors to control said circuits, whereby the motors are controlled and brought into operation in the desired time sequence after the first motor is started by the main circuit establishing means, means associated with the breech to actuate the firing mechanism automatically when the breech is closed, whereby there is provided an automatic setting-ramming-firing cycle giving a substantially constant dead-time for each round, and means operable by actuation of said main circuit establishing means after one fuse-setting cycle of a complete setting-ramming firing cycle is completed and on return of said tray to firing position for initiating a new setting-ramming-firing cycle which overlaps the preceding setting-ramming-firing cycle.

128. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive the tray, manually initiated means for closing said breech on the insertion of a round therein, firing mechanism for the gun, fuse-setting means adapted to set the fuse of a round, an electric motor for automatically actuating the fuse-setting means, means operable in timed relationship with actuation of the fuse setting means for movement of the tray so that the fuse of a round is already set when the tray is in the ramming position, a rammer-device, a motor for driving the latter in timed relationship with the movement of the tray automatically to ram the round into the breech, circuits for said motors comprising a main circuit establishing means to start the first motor and cam-operated timing devices driven in timed relationship with the shafts of said motors to control said circuits, whereby the motors are controlled and brought into operation in the desired time sequence after the first motor is started by the main circuit establishing means, means associated with the breech to actuate the firing mechanism automatically when the breech is closed, whereby there is provided a setting-ramming-firing cycle giving a substantially constant dead-time for each round, and means operable by actuation of said main circuit establishing means after one fuse-setting cycle of a complete setting-ramming-firing cycle is completed and on return of said tray to firing position for initiating a new setting-ramming-firing cycle which overlaps the preceding setting-ramming-firing cycle.

129. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive the tray, means for closing said breech on the insertion of a round therein, firing mechanism including a firing-pin and a cocking-lever which is adapted to cock the firing-pin and which is adapted to be moved into a firing position clear of the firing pin after the breech is closed, a fuse-setter having fuse-setting elements, an electric motor for automatically actuating the fuse-setter, means operable in timed relationship with actuation of the fuse setter for moving the tray so that the fuse of the round is already set when the tray is in the ramming position, said fuse-setting elements having relative movement lengthwise with respect to a round in the tray to engage and set a movable fuse-element of the round and then to separate the setting elements from the fuse-element and said tray thereafter moving from the firing position into the ramming position, a rammer-device, a motor for driving the latter in timed relationship with the movement of the tray automatically to ram the round into the breech, manually operable means for presetting rammer retraction movement and breech closure, said tray being thereafter automatically returned to the firing position, circuits for said motors comprising a main circuit establishing means to start the first motor and timing devices driven in timed relationship with the shafts of said motors to control said circuits, whereby the motors are controlled and brought into operation in the desired time sequence after the first motor is started by the main circuit establishing means, means operably controlled by at least one of the tray-return means and breech-closing means automatically to actuate the firing mechanism only when the cocking lever is in the firing position, and means operable by actuation of said main circuit establishing means after one fuse-setting cycle of a complete setting-ramming-firing cycle is completed and on return of said tray to firing position for initiating a new setting-ramming-firing cycle which overlaps the preceding setting-ramming-firing cycle.

130. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive the tray, means for closing said breech on the insertion of a round therein, firing mechanism for the gun, fuse-setting means adapted to set the fuse of a round in said tray, an electric motor for automatically actuating the fuse-setting means, means operable in timed relationship with actuation of the fuse setting means for moving the tray so that the fuse of the round is already set when the tray is in the ramming position, a rammer-device, a motor for driving the latter in timed relationship with the movement of the tray automatically to ram the round into the breech, manually operable means for controlling retraction movement of said rammer-device, circuits for said motors comprising a main valve to start the first motor and timing devices driven in timed relationship with the shafts of said motors to control said circuits, whereby the motors are controlled and brought into operation in the desired time sequence after the first motor is started by the main valve, a round receiving device for supplying a round to the tray when the latter is in the firing position, means controlled by said main-valve for effecting delivery of a round to the tray, said valve-controlled means being operable only when the tray has returned to the firing position, means associated with the breech to actuate the firing mechanism automatically when the breech is closed, whereby there is provided a setting-ramming-firing cycle giving a substantially constant dead-time for each round, and means operable by actuation of said main valve after one fuse-setting cycle of a complete setting-ramming-firing cycle is completed and on return of said tray to firing position for initiating a new setting-ramming-firing cycle which overlaps the preceding setting-ramming-firing cycle.

131. A gun comprising in combination a breech, a tray movable between a ramming position and a firing position, in which latter position the tray is bodily offset from the breech so that it is out of the way of the latter during recoil and is properly positioned to receive a round of the type characterized by a settable fuse, a motor to drive the tray, means for closing said breech on the insertion of a round therein, firing mechanism including a firing-pin and a cocking-lever which is adapted to cock the firing-pin and which is adapted to be moved into a firing position clear of the firing pin after the breech is closed, a fuse-setter having fuse-setting elements, an electric motor for automatically actuating the fuse-setter, means operable in timed relationship with the tray so that the fuse of the round is already set when the tray is in the ramming position, said elements having relative movement lengthwise with respect to a round in the tray to engage and set a movable fuse-element of the round and then to separate the setting elements from the fuse-elements and said tray thereafter moving from the firing position into the ramming position, a rammer-device, a motor for driving the latter in timed relationship with the movement of the tray automatically to ram the round into the breech, manually operable means for presetting rammer retraction actuation, said tray being thereafter returned to the firing position, circuits for said motors comprising a main circuit establishing means to start the first motor and timing devices driven in timed relationship with the shafts of said motors to control said circuits, whereby the motors are controlled and brought into operation in the desired time sequence after the first motor is started by the main circuit establishing means, and means operably controlled by at least one of the tray-return means and breech-closing means automatically to actuate the firing mechanism and including a firing plunger, a pressure-device to actuate the firing plunger, and control-means movable to an actuating position in which the pressure-device can be caused to operate the firing plunger, said control-means being movable to its actuating position as the cocking lever moves to its firing position whereby the firing plunger can be actuated only when the cocking lever is in the firing position.

132. In a gun of the kind having a sliding breech block which is opened automatically after firing, means for closing the breech block, a means for supplying energy to the means for closing the breech, a cocking device, a firing pin, means operated by the opening of the breech block for actuating the cocking device to cock the firing pin, means operated by closing the breech for automatically returning the cocking device to the firing position, a firing plunger, a pressure-device for operating the firing plunger, and control-means for preventing actuation of said plunger and movable to an actuating position in which the pressure device can be caused to operate the firing plunger, said control-means moving to its actuating position after the cocking lever moves to its firing position whereby the firing plunger can be actuated only when the cocking lever is in the firing position.

133. Automatic firing mechanism as claimed in claim 132, in combination with a gun of the kind having a loading tray movable between a loading position and a firing position, in which latter position the tray is bodily offset from the breech so that it is out of the way of the latter during recoil and is properly positioned to receive a round, and means for controlling said pressure-device and operated by the movement of the loading-tray whereby the pressure-device is inoperative until such time as the tray has reached the firing position.

134. Automatic firing mechanism as claimed in claim 132, in combination with a gun of the kind having a loading tray movable between a loading position and a firing position, in which latter position the tray is bodily offset from the breech so that it is out of the way of the latter during recoil and is properly positioned to receive a round, and means for controlling the said pressure-device and operated by the movement of the loading-tray, whereby the pressure-device is inoperative until such time as the tray has reached the firing position, said pressure device being yieldable and adapted to be acuated by the tray when the latter reaches the firing position.

135. Automatic firing mechanism as claimed in claim 132, in combination with a gun of the kind having a loading tray movable between a loading position and a firing position, in which latter position the tray is bodily offset from the breech so that it is out of the way of the latter during recoil and is properly positioned to receive a round, and means for controlling said pressure-device and operated by the movement of the loading tray, whereby the pressure device is inoperative until such time as the tray has reached the firing position, said pressure device being yieldable and adapted to be actuated by the tray when the latter reaches the firing position, and said control means comprising an actuating member for said pressure-device, levers linked to said member, and cam surfaces on the loading tray arranged to engage said levers and to actuate said pressure-device when the tray has moved to the firing position and the levers are operated by said cam surfaces.

136. In a gun, the combination of a slide, a barrel and a transversely movable breech block mounted on said slide for recoil and counterrecoil, a breech bolt for locking the breech block in a closed position, a cylinder movable with said barrel and breech block in the recoil and counterrecoil thereof, a piston disposed within said cylinder and connected to said breech block, a source of hydraulic energy for said cylinder and piston, a control unit interposed between said source and cylinder including a valve shiftable by the breech bolt for admitting hydraulic fluid from said source to said cylinder and a pair of valves for controlling the direction of flow of the hydraulic fluid within the cylinder, means for holding the first-mentioned valve in its fluid porting position in all open positions of the breech block, means for shifting the pair of valves simultaneously in one direction to cause an opening of the breech block, means for shifting one of said pair of valves in a reverse direction for terminating the flow of the hydraulic fluid from said source through said first-mentioned valve to said cylinder, and means for shifting the other of said pair of valves in a reverse direction to cause a closing of the breech block.

References Cited in the file of this patent

UNITED STATES PATENTS

| Number | Name | Date |
|---|---|---|
| 311,973 | Gatling | Feb. 10, 1885 |
| 490,864 | Conradson | Jan. 31, 1893 |
| 715,839 | McClean | Dec. 16, 1902 |
| 770,320 | Schneider | Sept. 20, 1904 |
| 934,325 | Lehmann | Sept. 14, 1909 |
| 942,167 | Dawson et al. | Dec. 7, 1909 |
| 993,967 | Debauche | May 30, 1911 |
| 1,094,129 | Dawson et al. | Apr. 21, 1914 |
| 1,114,463 | Gebauer | Oct. 20, 1914 |
| 1,232,090 | Rimailho | July 3, 1917 |
| 1,302,520 | Dawson et al. | May 6, 1919 |
| 1,332,763 | Schneider | Mar. 2, 1920 |
| 1,342,966 | McCutchan | June 8, 1920 |
| 1,428,304 | Stevenson | Sept. 5, 1922 |
| 1,431,248 | Norris | Oct. 10, 1922 |
| 1,436,987 | Kempter | Nov. 28, 1922 |
| 1,438,670 | Standish | Dec. 12, 1922 |
| 1,541,712 | Horn | June 9, 1925 |
| 1,543,841 | Grigoleit | June 30, 1925 |
| 1,583,351 | Heald | May 4, 1926 |
| 1,612,851 | Beautty | Jan. 4, 1927 |
| 1,634,534 | Brewer | July 5, 1927 |
| 1,704,759 | Miller | Mar. 12, 1929 |
| 1,730,269 | Darne | Oct. 1, 1929 |
| 1,749,643 | Methlin | Mar. 4, 1930 |
| 1,949,511 | Flygare | Mar. 6, 1934 |
| 1,974,523 | Varaud | Sept. 25, 1934 |
| 2,004,856 | Daum | June 11, 1935 |
| 2,012,273 | Fraser | Aug. 27, 1935 |
| 2,075,917 | Vorech | Apr. 6, 1937 |
| 2,128,878 | Horton | Aug. 30, 1938 |
| 2,161,534 | Schultz | June 6, 1939 |
| 2,189,823 | Vickers | Feb. 13, 1940 |
| 2,279,176 | Pardee | Apr. 7, 1942 |
| 2,286,020 | Smyth | June 9, 1942 |
| 2,289,567 | Berglund | July 14, 1942 |
| 2,297,026 | Sanford | Sept. 29, 1942 |
| 2,327,344 | Forker | Aug. 24, 1943 |
| 2,379,180 | Pohl | June 26, 1945 |
| 2,402,777 | Rose et al. | June 25, 1946 |
| 2,407,692 | Vickers | Sept. 17, 1946 |
| 2,410,116 | Vickers | Oct. 29, 1946 |
| 2,416,244 | Vickers | Feb. 18, 1947 |
| 2,427,895 | Borden | Sept. 23, 1947 |

FOREIGN PATENTS

| Number | Country | Date |
|---|---|---|
| 28,534 | Great Britain | 1908 |
| 13,413 | Great Britain | Oct. 10, 1884 |
| 395,555 | France | Jan. 4, 1909 |
| 19,303 | Great Britain | of 1911 |
| 266,260 | Germany | Oct. 22, 1913 |
| 125,442 | Great Britain | Apr. 24, 1919 |
| 22,105 | France | Dec. 7, 1920 |
| | (Addition to No. 502,198) | |
| 466,368 | Germany | Oct. 4, 1927 |
| 551,205 | Germany | May 28, 1932 |
| 781,511 | France | Feb. 25, 1935 |
| 863,281 | France | Jan. 2, 1941 |
| 221,961 | Switzerland | Sept. 16, 1942 |